United States Patent
Levien et al.

(10) Patent No.: US 10,097,756 B2
(45) Date of Patent: Oct. 9, 2018

(54) ENHANCED VIDEO/STILL IMAGE CORRELATION

(71) Applicant: Searete LLC, Bellevue, WA (US)

(72) Inventors: Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 15/147,526

(22) Filed: May 5, 2016

(65) Prior Publication Data

US 2016/0323509 A1 Nov. 3, 2016

Related U.S. Application Data

(63) Continuation of application No. 11/475,516, filed on Jun. 26, 2006, now abandoned, and a continuation of (Continued)

(51) Int. Cl.
*H04N 7/00* (2011.01)
*H04N 5/232* (2006.01)
(Continued)

(52) U.S. Cl.
CPC ..... *H04N 5/23245* (2013.01); *H04N 5/23232* (2013.01); *H04N 5/765* (2013.01);
(Continued)

(58) Field of Classification Search
CPC .................................................. H04N 5/23245
(Continued)

(56) References Cited

U.S. PATENT DOCUMENTS 4,249,218 A 2/1981 Davis et al.
4,763,146 A 8/1988 Niikura
(Continued)

FOREIGN PATENT DOCUMENTS

JP H09-018762 1/1997
JP 10023303 A 1/1998
(Continued)

OTHER PUBLICATIONS

U.S. Appl. No. 12/290,538, Jung et al.
(Continued)

*Primary Examiner* — Richard Torrente

(57) ABSTRACT

A technique processes captured data on a device, wherein selected captured data of a given quality resolution is transferred via a communication link to a separate storage location for future availability. A storage protocol may include various storage organization categories. A possible aspect may provide an identifier record to enable future accessibility to selected captured data by one or more authorized parties or approved devices or authorized recipients. In some embodiments the captured data may include both a video data stream and one or more still image frames having different quality characteristics and/or formats. Initial and ongoing coordination as well as correlation may be facilitated between video and still image data derived from related fields of view.

20 Claims, 87 Drawing Sheets

Related U.S. Application Data application No. 14/698,753, filed on Apr. 28, 2015, which is a continuation-in-part of application No. 11/434,568, filed on May 15, 2006, which is a continuation-in-part of application No. 11/404,381, filed on Apr. 14, 2006, which is a continuation-in-part of application No. 11/404,104, filed on Apr. 13, 2006, now abandoned, which is a continuation-in-part of application No. 11/397,357, filed on Apr. 3, 2006, now Pat. No. 8,681,225, which is a continuation-in-part of application No. 11/376,627, filed on Mar. 15, 2006, now abandoned, which is a continuation-in-part of application No. 11/264,701, filed on Nov. 1, 2005, now Pat. No. 9,191,611, which is a continuation-in-part of application No. 11/263,587, filed on Oct. 31, 2005, now Pat. No. 7,872,675, which is a continuation-in-part of application No. 11/190,516, filed on Jul. 26, 2005, now Pat. No. 9,082,456, which is a continuation-in-part of application No. 11/143,970, filed on Jun. 2, 2005, now Pat. No. 7,876,357.

(51) Int. Cl.
| | |
|---|---|
| *H04N 5/765* | (2006.01) |
| *H04N 9/79* | (2006.01) |
| *H04N 21/4223* | (2011.01) |
| *H04N 21/433* | (2011.01) |
| *H04N 21/439* | (2011.01) |
| *H04N 21/4402* | (2011.01) |
| *H04N 5/77* | (2006.01) |
| *H04N 5/775* | (2006.01) |

(52) U.S. Cl.
CPC ....... *H04N 9/7921* (2013.01); *H04N 21/4223* (2013.01); *H04N 21/4334* (2013.01); *H04N 21/4398* (2013.01); *H04N 21/440263* (2013.01); *H04N 5/772* (2013.01); *H04N 5/775* (2013.01)

(58) Field of Classification Search
USPC .......................................................... 348/36
See application file for complete search history.

(56) References Cited

U.S. PATENT DOCUMENTS

| | | |
|---|---|---|
| 4,788,565 A | 11/1988 | Masuda et al. |
| 4,829,384 A | 5/1989 | Iida et al. |
| 4,862,280 A | 8/1989 | Iida et al. |
| 5,001,504 A | 3/1991 | Okanda |
| 5,034,759 A | 7/1991 | Watson |
| 5,150,215 A | 9/1992 | Shi |
| 5,164,831 A | 11/1992 | Kuchta et al. |
| 5,388,197 A | 2/1995 | Rayner |
| 5,444,476 A | 8/1995 | Conway |
| 5,467,288 A | 11/1995 | Faciano et al. |
| 5,485,553 A | 1/1996 | Kovalick et al. |
| 5,485,554 A | 1/1996 | Lowitz et al. |
| 5,546,145 A | 8/1996 | Bernardi et al. |
| 5,561,883 A | 10/1996 | Landry et al. |
| 5,493,353 A | 12/1996 | Chen |
| 5,588,029 A | 12/1996 | Maturi et al. |
| 5,629,778 A | 5/1997 | Reuman |
| 5,633,678 A | 5/1997 | Parulski et al. |
| 5,655,144 A | 8/1997 | Milne et al. |
| 5,659,662 A | 8/1997 | Wilcox et al. |
| 5,675,789 A | 10/1997 | Ishii et al. |
| 5,689,442 A | 11/1997 | Swanson et al. |
| 5,701,163 A | 12/1997 | Richards et al. |
| 5,715,487 A | 2/1998 | McIntyre et al. |
| 5,738,522 A | 4/1998 | Sussholz et al. |
| 5,764,800 A | 6/1998 | Yamagata |
| 5,793,630 A | 8/1998 | Theimer et al. |
| 5,809,161 A | 9/1998 | Auty et al. |
| 5,825,506 A | 10/1998 | Bednar et al. |
| 5,825,753 A | 12/1998 | Lo et al. |
| 5,867,614 A | 2/1999 | Ito |
| 5,892,509 A | 4/1999 | Jakobs et al. |
| 5,915,135 A | 6/1999 | Fiorentini |
| 5,917,958 A | 6/1999 | Nunally et al. |
| 5,926,605 A | 7/1999 | Ichimura |
| 5,949,484 A | 9/1999 | Nakaya et al. |
| 5,956,081 A | 9/1999 | Katz et al. |
| 5,977,867 A | 11/1999 | Blouin |
| 5,991,799 A | 11/1999 | Yen et al. |
| 5,995,095 A | 11/1999 | Ratakonda |
| 6,011,901 A | 1/2000 | Kirsten |
| 6,021,403 A | 2/2000 | Horvitz et al. |
| 6,046,762 A | 4/2000 | Sonesh et al. |
| 6,107,918 A | 8/2000 | Klein et al. |
| 6,122,003 A | 9/2000 | Anderson |
| 6,122,411 A | 9/2000 | Shen et al. |
| 6,134,345 A | 10/2000 | Berman et al. |
| 6,154,771 A | 11/2000 | Rangan et al. |
| 6,157,406 A | 12/2000 | Iura et al. |
| 6,157,935 A | 12/2000 | Tran et al. |
| 6,167,350 A | 12/2000 | Hiramatsu et al. |
| 6,167,469 A | 12/2000 | Safai et al. |
| 6,188,431 B1 | 2/2001 | Oie |
| 6,198,526 B1 | 3/2001 | Ohtsuka |
| 6,222,465 B1 | 4/2001 | Kumar et al. |
| 6,275,260 B1 | 8/2001 | Anderson |
| 6,282,377 B1 | 8/2001 | Lawther et al. |
| 6,359,649 B1 | 3/2002 | Suzuki |
| 6,384,862 B1 | 5/2002 | Brusewitz et al. |
| 6,434,398 B1 | 8/2002 | Ludwig et al. |
| 6,437,797 B1 | 8/2002 | Ota |
| 6,445,822 B1 | 9/2002 | Crill et al. |
| 6,446,095 B1 | 9/2002 | Mukai |
| 6,452,974 B1 | 9/2002 | Menon et al. |
| 6,453,336 B1 | 9/2002 | Beyda et al. |
| 6,476,858 B1 | 11/2002 | Ramirez Diaz et al. |
| 6,493,028 B1 | 12/2002 | Anderson et al. |
| 6,512,541 B2 | 1/2003 | Dunton et al. |
| 6,577,336 B2 | 1/2003 | Safai |
| 6,516,154 B1 | 2/2003 | Parulski et al. |
| 6,519,612 B1 | 2/2003 | Howard et al. |
| 6,522,418 B2 | 2/2003 | Yokomizo et al. |
| 6,539,169 B1 | 3/2003 | Tsubaki et al. |
| 6,542,183 B1 | 4/2003 | DeAngelis et al. |
| 6,546,189 B1 | 4/2003 | Koda |
| 6,567,122 B1 | 5/2003 | Anderson et al. |
| 6,573,927 B2 | 6/2003 | Parulski et al. |
| 6,611,293 B2 | 8/2003 | Tarnoff et al. |
| 6,629,104 B1 | 9/2003 | Parulski et al. |
| 6,633,309 B2 | 10/2003 | Lau et al. |
| 6,646,676 B1 | 11/2003 | DaGraca et al. |
| 6,657,667 B1 | 12/2003 | Anderson |
| 6,671,737 B1 | 12/2003 | Snowdon et al. |
| 6,678,413 B1 | 1/2004 | Liang et al. |
| 6,680,748 B1 | 1/2004 | Monti |
| 6,698,021 B1 | 2/2004 | Amini et al. |
| 6,701,845 B2 | 3/2004 | Ohmura |
| 6,714,192 B1 | 3/2004 | Torres |
| 6,734,911 B1 | 5/2004 | Lyons |
| 6,735,253 B1 | 5/2004 | Chang et al. |
| 6,738,155 B1 | 5/2004 | Rosenlund et al. |
| 6,741,864 B2 | 5/2004 | Wilcock et al. |
| 6,757,008 B1 | 6/2004 | Smith |
| 6,757,480 B1 | 6/2004 | Moon et al. |
| 6,757,684 B2 | 6/2004 | Svendsen et al. |
| 6,762,791 B1 | 7/2004 | Schuetzle |
| 6,766,036 B1 | 7/2004 | Pryor |
| 6,775,406 B1 | 8/2004 | Watson |
| 6,801,717 B1 | 10/2004 | Hofer |
| 6,813,312 B2 | 11/2004 | Tullberg et al. |
| 6,816,468 B1 | 11/2004 | Cruickshank |
| 6,871,010 B1 | 3/2005 | Taguchi et al. |
| 6,879,731 B2 | 4/2005 | Kang et al. |
| 6,885,395 B1 | 4/2005 | Rabbani et al. |
| 6,898,173 B2 | 5/2005 | McPherson et al. |

(56) References Cited

U.S. PATENT DOCUMENTS

| | | |
|---|---|---|
| 6,903,763 B1 | 6/2005 | Noguchi et al. |
| 6,928,230 B2 | 8/2005 | Squibbs |
| 6,930,707 B2 | 8/2005 | Bates et al. |
| 6,940,545 B1 | 9/2005 | Ray et al. |
| 6,947,075 B1 | 9/2005 | Niikawa |
| 6,954,224 B1 | 10/2005 | Okada et al. |
| 6,978,047 B2 | 10/2005 | Montgomery |
| 6,961,083 B2 | 11/2005 | Obrador et al. |
| 6,961,087 B1 | 11/2005 | Yoshida |
| 6,967,780 B2 | 11/2005 | Hillis et al. |
| 6,968,158 B1 * | 11/2005 | Bhuta .................... H04W 4/20 455/566 |
| 6,970,189 B1 | 11/2005 | Bernstein et al. |
| 6,987,528 B1 | 1/2006 | Nagahisa et al. |
| 6,999,626 B2 | 2/2006 | Andrew |
| 7,015,949 B1 | 3/2006 | Sah |
| 7,023,469 B1 | 4/2006 | Olson |
| 7,031,700 B1 | 4/2006 | Weaver et al. |
| 7,046,292 B2 | 5/2006 | Ziemkowski |
| 7,068,316 B1 | 6/2006 | Pine |
| 7,075,567 B2 | 7/2006 | Hunter et al. |
| 7,079,176 B1 | 7/2006 | Freeman et al. |
| 7,084,910 B2 | 8/2006 | Amerson et al. |
| 7,110,025 B1 | 9/2006 | Loui et al. |
| 7,110,027 B2 | 9/2006 | Wyman |
| 7,163,151 B2 | 1/2007 | Kiiskinen |
| 7,196,317 B1 | 3/2007 | Meissner, II et al. |
| 7,203,648 B1 | 4/2007 | Ostermann et al. |
| 7,213,766 B2 | 5/2007 | Ryan et al. |
| 7,218,792 B2 | 5/2007 | Raskar et al. |
| 7,221,863 B2 | 5/2007 | Kondo et al. |
| 7,227,569 B2 | 6/2007 | Maruya |
| 7,236,690 B2 | 6/2007 | Matsukawa |
| 7,257,317 B2 | 8/2007 | Ohnishi |
| 7,287,088 B1 | 10/2007 | Anderson |
| 7,292,229 B2 | 11/2007 | Morag et al. |
| 7,327,385 B2 | 2/2008 | Yamaguchi |
| 7,327,387 B2 | 2/2008 | Tanaka et al. |
| 7,460,781 B2 | 2/2008 | Kanai et al. |
| 7,339,623 B2 | 3/2008 | Kawai |
| 7,340,766 B2 | 3/2008 | Nagao et al. |
| 7,362,968 B2 | 4/2008 | Kim |
| 7,365,780 B1 | 4/2008 | Miyazaki |
| 7,366,979 B2 | 4/2008 | Spielberg et al. |
| 7,383,508 B2 | 6/2008 | Toyama et al. |
| 7,411,623 B2 | 8/2008 | Shibutani |
| 7,417,667 B2 | 8/2008 | Shibutani |
| 7,444,593 B1 | 10/2008 | Reid |
| 7,448,063 B2 | 11/2008 | Freeman et al. |
| 7,460,495 B2 | 12/2008 | Li |
| 7,504,942 B2 | 3/2009 | Marman |
| 7,525,568 B2 | 4/2009 | Raghunath |
| 7,529,411 B2 | 5/2009 | Haupt et al. |
| 7,535,491 B1 | 5/2009 | Kumagai et al. |
| 7,551,787 B2 | 6/2009 | Marks |
| 7,576,770 B2 | 8/2009 | Metzger et al. |
| 7,587,674 B2 | 9/2009 | Broeksteeg |
| 7,602,421 B2 | 10/2009 | Hunter et al. |
| 7,612,804 B1 | 11/2009 | Marcu et al. |
| 7,612,806 B2 | 11/2009 | Kazami et al. |
| 7,626,614 B1 | 12/2009 | Marcu |
| 7,626,733 B2 | 12/2009 | Kodama et al. |
| 7,647,614 B2 | 1/2010 | Krikorian et al. |
| 7,650,058 B1 | 1/2010 | Garoutte |
| 7,733,371 B1 | 6/2010 | Monroe |
| 7,751,628 B1 | 7/2010 | Reisman |
| 7,782,365 B2 | 8/2010 | Levien et al. |
| 7,860,319 B2 | 12/2010 | Obrador et al. |
| 7,872,675 B2 | 1/2011 | Levien et al. |
| 7,904,814 B2 | 3/2011 | Errico et al. |
| 7,924,324 B2 | 4/2011 | Fujita |
| 7,945,935 B2 | 5/2011 | Stonedahl |
| 8,026,944 B1 | 9/2011 | Sah |
| 8,098,287 B2 | 1/2012 | Misawa et al. |
| 8,350,946 B2 | 1/2013 | Jung et al. |
| 8,528,019 B1 | 9/2013 | Dimitrova et al. |
| 8,593,555 B1 | 11/2013 | Chun et al. |
| 9,019,383 B2 | 4/2015 | Jung et al. |
| 2001/0015756 A1 | 8/2001 | Wilcock et al. |
| 2001/0028398 A1 | 10/2001 | Takahashi |
| 2001/0029521 A1 | 10/2001 | Matsuda et al. |
| 2001/0030709 A1 | 10/2001 | Tarnoff et al. |
| 2001/0031005 A1 | 10/2001 | Nister et al. |
| 2001/0033333 A1 | 10/2001 | Suzuki et al. |
| 2001/0042043 A1 | 11/2001 | Shear et al. |
| 2001/0046199 A1 | 11/2001 | McPherson et al. |
| 2001/0050875 A1 | 12/2001 | Kahn et al. |
| 2001/0051863 A1 | 12/2001 | Razavi et al. |
| 2002/0012071 A1 | 1/2002 | Sun |
| 2002/0015094 A1 | 2/2002 | Kuwano et al. |
| 2002/0015582 A1 | 2/2002 | Matsumoto et al. |
| 2002/0023188 A1 | 2/2002 | Heidel et al. |
| 2002/0028026 A1 | 3/2002 | Chen et al. |
| 2002/0028060 A1 | 3/2002 | Murata et al. |
| 2002/0030749 A1 | 3/2002 | Nakamura et al. |
| 2002/0054232 A1 | 5/2002 | Inagaki |
| 2002/0069036 A1 | 6/2002 | Mizokawa |
| 2002/0072982 A1 | 6/2002 | Barton et al. |
| 2002/0075392 A1 | 6/2002 | Imaeda |
| 2002/0090217 A1 | 7/2002 | Limor et al. |
| 2002/0093575 A1 | 7/2002 | Kusaka |
| 2002/0144273 A1 | 10/2002 | Reto |
| 2002/0145622 A1 | 10/2002 | Kauffman et al. |
| 2002/0154221 A1 | 10/2002 | Ishimaru |
| 2002/0171737 A1 | 11/2002 | Tullis |
| 2002/0176016 A1 | 11/2002 | Misawa et al. |
| 2002/0176508 A1 | 11/2002 | Boyce et al. |
| 2002/0186668 A1 | 12/2002 | Thomason |
| 2002/0191952 A1 | 12/2002 | Fiore et al. |
| 2002/0196344 A1 | 12/2002 | McIntyre et al. |
| 2002/0197067 A1 | 12/2002 | Ohnishi |
| 2003/0005066 A1 | 1/2003 | Lazaridis et al. |
| 2003/0007078 A1 | 1/2003 | Feldis, III |
| 2003/0018802 A1 | 1/2003 | Romanik et al. |
| 2003/0020811 A1 | 1/2003 | Hunter et al. |
| 2003/0020814 A1 | 1/2003 | Ono |
| 2003/0021455 A1 | 1/2003 | Dixon et al. |
| 2003/0021591 A1 | 1/2003 | Grosvenor et al. |
| 2003/0025802 A1 | 2/2003 | Mayer, Jr. et al. |
| 2003/0026596 A1 | 2/2003 | Betti et al. |
| 2003/0058265 A1 | 3/2003 | Robinson et al. |
| 2003/0063114 A1 | 4/2003 | Nishida |
| 2003/0069898 A1 | 4/2003 | Christodoulou et al. |
| 2003/0070174 A1 | 4/2003 | Solomon |
| 2003/0072491 A1 | 4/2003 | Sirivara et al. |
| 2003/0076312 A1 | 4/2003 | Yokoyama |
| 2003/0080878 A1 | 5/2003 | Kirmuss |
| 2003/0081140 A1 | 5/2003 | Furukawa |
| 2003/0090690 A1 | 5/2003 | Katayama et al. |
| 2003/0093790 A1 | 5/2003 | Logan et al. |
| 2003/0103144 A1 | 6/2003 | Sesek et al. |
| 2003/0103670 A1 | 6/2003 | Schoelkopf et al. |
| 2003/0112354 A1 | 6/2003 | Ortiz et al. |
| 2003/0113014 A1 | 6/2003 | Katoh |
| 2003/0117505 A1 | 6/2003 | Sasaki et al. |
| 2003/0117642 A1 | 6/2003 | Haraguchi |
| 2003/0120784 A1 | 6/2003 | Johnson et al. |
| 2003/0131002 A1 | 7/2003 | Gennetten et al. |
| 2003/0133593 A1 | 7/2003 | Tullberg et al. |
| 2003/0152263 A1 | 8/2003 | Kawano et al. |
| 2003/0158958 A1 | 8/2003 | Chiu |
| 2003/0160870 A1 | 8/2003 | Ziemkowski |
| 2003/0162556 A1 | 8/2003 | Libes |
| 2003/0169367 A1 | 9/2003 | Ranta |
| 2003/0189654 A1 | 10/2003 | Kage et al. |
| 2003/0197794 A1 | 10/2003 | Sakata |
| 2003/0206232 A1 | 11/2003 | Suzuki et al. |
| 2003/0226023 A1 | 12/2003 | Peters |
| 2003/0227560 A1 | 12/2003 | Mattsson et al. |
| 2003/0229894 A1 | 12/2003 | Okada et al. |
| 2003/0236674 A1 | 12/2003 | Henry, Jr. |
| 2004/0001161 A1 | 1/2004 | Herley |
| 2004/0017333 A1 | 1/2004 | Cooper et al. |
| 2004/0037442 A1 | 2/2004 | Nielsen et al. |

(56) References Cited

U.S. PATENT DOCUMENTS

| | | |
|---|---|---|
| 2004/0037540 A1 | 2/2004 | Frohlich et al. |
| 2004/0042679 A1 | 3/2004 | Yamada |
| 2004/0056960 A1 | 3/2004 | Hayashi |
| 2004/0066968 A1 | 4/2004 | Glickman |
| 2004/0070678 A1 | 4/2004 | Toyama et al. |
| 2004/0071445 A1 | 4/2004 | Tarnoff et al. |
| 2004/0075750 A1 | 4/2004 | Bateman |
| 2004/0080537 A1 | 4/2004 | Adler |
| 2004/0085456 A1 | 5/2004 | Kwag et al. |
| 2004/0090526 A1 | 5/2004 | Watanabe et al. |
| 2004/0092311 A1 | 5/2004 | Weston et al. |
| 2004/0095474 A1 | 5/2004 | Matsufune |
| 2004/0108995 A1 | 6/2004 | Hoshino et al. |
| 2004/0109062 A1 | 6/2004 | Yamaya |
| 2004/0119733 A1 | 6/2004 | Morimoto et al. |
| 2004/0119841 A1 | 6/2004 | Shimizu |
| 2004/0120562 A1 | 6/2004 | Hays et al. |
| 2004/0123131 A1 | 6/2004 | Zacks et al. |
| 2004/0130634 A1 | 7/2004 | Delaney et al. |
| 2004/0141056 A1 | 7/2004 | Izumi et al. |
| 2004/0145657 A1 | 7/2004 | Yamamoto et al. |
| 2004/0150724 A1 | 8/2004 | Nozaki et al. |
| 2004/0166930 A1 | 8/2004 | Beaulieu et al. |
| 2004/0171381 A1 | 9/2004 | Inselberg |
| 2004/0172440 A1 | 9/2004 | Nakajima et al. |
| 2004/0174454 A1 | 9/2004 | Okamura |
| 2004/0179121 A1 | 9/2004 | Silverstein |
| 2004/0179545 A1 | 9/2004 | Erola et al. |
| 2004/0183903 A1 | 9/2004 | Pedersen |
| 2004/0183915 A1 | 9/2004 | Gotohda et al. |
| 2004/0189856 A1 | 9/2004 | Tanaka |
| 2004/0196399 A1 | 10/2004 | Stavely |
| 2004/0199387 A1 | 10/2004 | Wang et al. |
| 2004/0201683 A1 | 10/2004 | Murashita et al. |
| 2004/0201690 A1 | 10/2004 | Bryant et al. |
| 2004/0201709 A1 | 10/2004 | McIntyre et al. |
| 2004/0201711 A1 | 10/2004 | Lopaz |
| 2004/0201748 A1 | 10/2004 | Goldstein et al. |
| 2004/0216173 A1 | 10/2004 | Horoszowski et al. |
| 2004/0218894 A1 | 11/2004 | Harville et al. |
| 2004/0221044 A1 | 11/2004 | Rosenbloom et al. |
| 2004/0221063 A1 | 11/2004 | Mogul |
| 2004/0229696 A1 | 11/2004 | Beck |
| 2004/0233621 A1 | 11/2004 | Maeoka et al. |
| 2004/0239958 A1 | 12/2004 | Nagata et al. |
| 2004/0243419 A1 | 12/2004 | Wang |
| 2004/0252193 A1 | 12/2004 | Higgins |
| 2004/0257462 A1 | 12/2004 | Goris et al. |
| 2004/0263609 A1 | 12/2004 | Otsuki et al. |
| 2004/0263658 A1 | 12/2004 | Cozier et al. |
| 2005/0005308 A1 | 1/2005 | Logan et al. |
| 2005/0007456 A1 | 1/2005 | Lee et al. |
| 2005/0010531 A1 | 1/2005 | Kushalnager et al. |
| 2005/0010750 A1 | 1/2005 | Ward et al. |
| 2005/0013602 A1 | 1/2005 | Ogawa |
| 2005/0017068 A1 | 1/2005 | Zalewski et al. |
| 2005/0017947 A1 | 1/2005 | Shahoian et al. |
| 2005/0018053 A1 | 1/2005 | Suga et al. |
| 2005/0033991 A1 | 2/2005 | Crane |
| 2005/0036033 A1 | 2/2005 | Imai |
| 2005/0036044 A1 | 2/2005 | Funakura |
| 2005/0040951 A1 | 2/2005 | Zalewski et al. |
| 2005/0047676 A1 | 3/2005 | Kang et al. |
| 2005/0050043 A1 | 3/2005 | Pyhalammi et al. |
| 2005/0058321 A1 | 3/2005 | Buehler |
| 2005/0083411 A1 | 4/2005 | Cozier et al. |
| 2005/0084037 A1 | 4/2005 | Liang |
| 2005/0086391 A1 | 4/2005 | Chu et al. |
| 2005/0088417 A1 | 4/2005 | Mulligan |
| 2005/0099519 A1 | 5/2005 | Creamer et al. |
| 2005/0103863 A1 | 5/2005 | Zhu et al. |
| 2005/0105806 A1 | 5/2005 | Nagaoka et al. |
| 2005/0111036 A1 | 5/2005 | Takasaki et al. |
| 2005/0113136 A1 | 5/2005 | Gosieski, Jr. |
| 2005/0125843 A1 | 6/2005 | Okezie et al. |
| 2005/0130717 A1 | 6/2005 | Gosieski, Jr. et al. |
| 2005/0131905 A1 | 6/2005 | Margolus et al. |
| 2005/0134696 A1 | 6/2005 | Nath et al. |
| 2005/0140498 A1 | 6/2005 | Bastian, II |
| 2005/0140803 A1 | 6/2005 | Ohtsuka et al. |
| 2005/0150362 A1 | 7/2005 | Uehara |
| 2005/0158015 A1 | 7/2005 | Nakayama et al. |
| 2005/0162533 A1 | 7/2005 | Noguchi et al. |
| 2005/0162965 A1 | 7/2005 | Fukuda et al. |
| 2005/0169367 A1 | 8/2005 | Venetianer et al. |
| 2005/0177794 A1 | 8/2005 | Kameyama et al. |
| 2005/0185062 A1 | 8/2005 | Hillis et al. |
| 2005/0187901 A1 | 8/2005 | Maritzen et al. |
| 2005/0188399 A1 | 8/2005 | Tischer |
| 2005/0193421 A1 | 9/2005 | Cragun |
| 2005/0195285 A1 | 9/2005 | Ide |
| 2005/0203930 A1 | 9/2005 | Bukowski et al. |
| 2005/0207487 A1 | 9/2005 | Monroe |
| 2005/0210267 A1 | 9/2005 | Sugano et al. |
| 2005/0210516 A1 | 9/2005 | Pettinato |
| 2005/0212912 A1 | 9/2005 | Huster |
| 2005/0212950 A1 | 9/2005 | Kanai |
| 2005/0231625 A1 | 10/2005 | Parulski et al. |
| 2005/0232242 A1 | 10/2005 | Karaoguz et al. |
| 2005/0237388 A1 | 10/2005 | Tani |
| 2005/0237422 A1 | 10/2005 | Kido |
| 2005/0243176 A1 | 11/2005 | Wu et al. |
| 2005/0262097 A1 | 11/2005 | Sim-Tang et al. |
| 2005/0271251 A1 | 12/2005 | Russell et al. |
| 2005/0275747 A1 | 12/2005 | Nayar et al. |
| 2006/0008254 A1 | 1/2006 | Seo |
| 2006/0023066 A1 | 2/2006 | Li et al. |
| 2006/0034533 A1 | 2/2006 | Batchvarov |
| 2006/0044398 A1 | 3/2006 | Foong et al. |
| 2006/0044416 A1 | 3/2006 | Miyazaki et al. |
| 2006/0048057 A1 | 3/2006 | Herberger et al. |
| 2006/0050785 A1 | 3/2006 | Watanabe et al. |
| 2006/0056326 A1 | 3/2006 | Croome |
| 2006/0064341 A1 | 3/2006 | Frengut et al. |
| 2006/0068824 A1 | 3/2006 | Inselberg |
| 2006/0072028 A1 | 4/2006 | Hong |
| 2006/0072837 A1 | 4/2006 | Ralston et al. |
| 2006/0083298 A1 | 4/2006 | Wang et al. |
| 2006/0083440 A1 | 4/2006 | Chen |
| 2006/0085534 A1 | 4/2006 | Ralston et al. |
| 2006/0088276 A1 | 4/2006 | Cho et al. |
| 2006/0092291 A1 | 5/2006 | Bodie |
| 2006/0098112 A1 | 5/2006 | Kelly |
| 2006/0104483 A1 | 5/2006 | Harel et al. |
| 2006/0104600 A1 | 5/2006 | Abrams |
| 2006/0109349 A1 | 5/2006 | Takashima |
| 2006/0119711 A1 | 6/2006 | Ejima et al. |
| 2006/0125922 A1 | 6/2006 | Albert et al. |
| 2006/0136998 A1 | 6/2006 | Oowaki et al. |
| 2006/0143665 A1 | 6/2006 | Meek et al. |
| 2006/0173756 A1 | 8/2006 | Benight |
| 2006/0173972 A1 | 8/2006 | Jung et al. |
| 2006/0174204 A1 | 8/2006 | Jung et al. |
| 2006/0174206 A1 | 8/2006 | Jung et al. |
| 2006/0176392 A1 | 8/2006 | Rainier et al. |
| 2006/0177150 A1 | 8/2006 | Uyttendaele et al. |
| 2006/0187860 A1 | 8/2006 | Li |
| 2006/0192887 A1 | 8/2006 | Miyamaki et al. |
| 2006/0195322 A1 | 8/2006 | Broussard et al. |
| 2006/0197839 A1 | 9/2006 | Senior et al. |
| 2006/0209089 A1 | 9/2006 | Date |
| 2006/0226298 A1 | 10/2006 | Pierson |
| 2006/0230123 A1 | 10/2006 | Simmons et al. |
| 2006/0242164 A1 | 10/2006 | Evans et al. |
| 2006/0262352 A1 | 11/2006 | Hull et al. |
| 2006/0274165 A1 | 12/2006 | Levien et al. |
| 2006/0288273 A1 | 12/2006 | Erol et al. |
| 2006/0288374 A1 | 12/2006 | Ferris et al. |
| 2007/0097214 A1 | 5/2007 | Jung et al. |
| 2007/0100533 A1 | 5/2007 | Jung et al. |
| 2007/0100606 A1 | 5/2007 | Rogers |
| 2007/0100621 A1 | 5/2007 | Jung et al. |
| 2007/0100860 A1 | 5/2007 | Jung et al. |
| 2007/0106892 A1 | 5/2007 | Engberg |

(56) References Cited

U.S. PATENT DOCUMENTS

| | | | |
|---|---|---|---|
| 2007/0113250 A1 | 5/2007 | Logan et al. | |
| 2007/0120980 A1 | 5/2007 | Jung et al. | |
| 2007/0217761 A1 | 9/2007 | Chen et al. | |
| 2007/0274705 A1 | 11/2007 | Kashiwa et al. | |
| 2008/0023232 A1 | 1/2008 | Morag et al. | |
| 2008/0037749 A1 | 2/2008 | Metzger et al. | |
| 2008/0120325 A1 | 5/2008 | Davis | |
| 2008/0162668 A1 | 7/2008 | Miller | |
| 2008/0192129 A1 | 8/2008 | Walker et al. | |
| 2008/0228296 A1 | 9/2008 | Eilam et al. | |
| 2008/0298796 A1 | 12/2008 | Kuberka et al. | |
| 2008/0303909 A1 | 12/2008 | Watanabe et al. | |
| 2009/0097672 A1 | 4/2009 | Buil et al. | |
| 2009/0215388 A1 | 8/2009 | Karaoguz et al. | |
| 2010/0017289 A1 | 1/2010 | Sah et al. | |
| 2011/0270916 A1 | 11/2011 | Shih et al. | |
| 2012/0105716 A1 | 5/2012 | Jung et al. | |
| 2013/0036438 A1* | 2/2013 | Kutaragi | H04N 21/2743 725/38 |
| 2013/0176341 A1 | 7/2013 | Jung et al. | |
| 2014/0146205 A1 | 5/2014 | Xu et al. | |
| 2014/0195011 A1 | 7/2014 | Sakuta et al. | |
| 2014/0282923 A1 | 9/2014 | Narayan et al. | |

FOREIGN PATENT DOCUMENTS

| | | |
|---|---|---|
| JP | 2001-309236 A | 11/2001 |
| JP | 2002-083280 A | 3/2002 |
| JP | 2002-094862 A | 3/2002 |
| JP | 2003-009044 A | 1/2003 |
| WO | WO 2005/045807 A1 | 5/2005 |
| WO | WO 2005/078597 A1 | 8/2005 |
| WO | WO 2005112437 | 11/2005 |

OTHER PUBLICATIONS

U.S. Appl. No. 12/284,202, Jung et al.
U.S. Appl. No. 12/283,420, Jung et al.
U.S. Appl. No. 12/806,060, Royce A. Levien et al.
Colbert, Martin et al; "Live, Audio-Visual Communication Systems for Distance Learning: Experience, Heuristics and ISDN"; 1995; pp. 1-40.
Cummins, Fred; "Synchronization Among Speakers Reduces Macroscopic Temporal Viability"; 2004; pp. 1-6.
Dodd, George; "Music Performance Venues—keeping them in tune with modern requirements"; 2009, pp. 1-11.
physorg.com; "World's First Built-In Wi-Fi-Enabled Digital Cameras"; pp. 1-3; located at http://physorg.com/news6183.html; bearing a date of Sep. 2, 2005; printed on Sep. 7, 2005.
El Saddik, Abdulmotaleb Dr,; "Multimedia Communications: Multimedia Technologies & Applications"; Multimedia Communications Research Laboratory, School of Information Technology and Engineering, University of Ottawa, Ottawa, Ontario, Canada; 22 slides; printed on Sep. 15, 2010. pp. 1-8.
Adobe Photoshop User Guide 5.0; bearing a date of 1998; pp. 1,2,22,31-35,41,46,48,55-58,101,108,128,167-1-7,259-284, and 311-316; Adobe Systems Inc.
Seifert, Eric et al.; "Acoustical Design Considerations at Universal Studios CityWalk™, Orlando, Florida"; Acoustics at CityWalk; pp. 1-5; located at http://www.acousticdimensions.com/tech_CityWalk.html; bearing dates of Apr. 23, 1999 and Apr. 24, 1999; printed on Jul. 20, 2005.
"SOUNDaround: Get Cinema quality surround sound through two speakers"; RAM: SOUNDaround by Xitel; pp. 1-7; located at http://ramelectronics.net/html/soundaround.html; printed on Jul. 20, 2005.
"Yamaha Internet 'MidLive vol. 3': An Open Experiment: The First Midlive to Feature Synchronized Streaming of MIDI and Audio Data"; Yamaha News Release: wMid Live vol. 3x; pp. 1-5; located at http://www.yamaha.co.jp/english/news/97121101.html ; bearing a date of Dec. 1997; printed on Jul. 19, 2005.
"Editing & Organizing Photos" Snapfish Website; bearing a date of: Jan. 20, 2005; located at: http://web.archive.org/web/20050405222248/www.snapfish.com/helpediting; pp. 1-8; printed on Apr. 22, 2010.
"Snapfish Privacy Policy"; Snapfish Website; bearing a date of: Jan. 20, 2005; located at: http://web.archive.org/web/20050403221640/www.snapfish.com/privacy/t_=0; pp. 1-5; printed on Apr. 22, 2010.

* cited by examiner

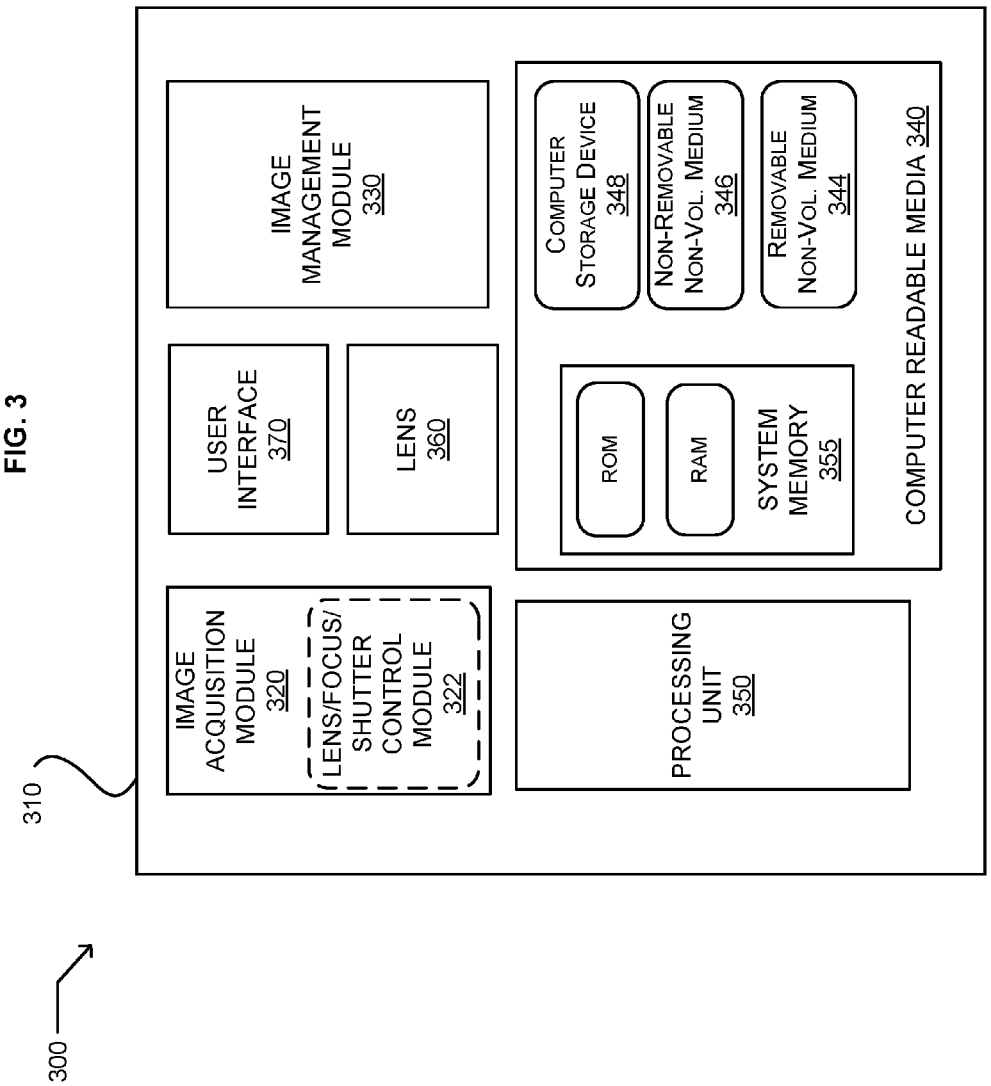

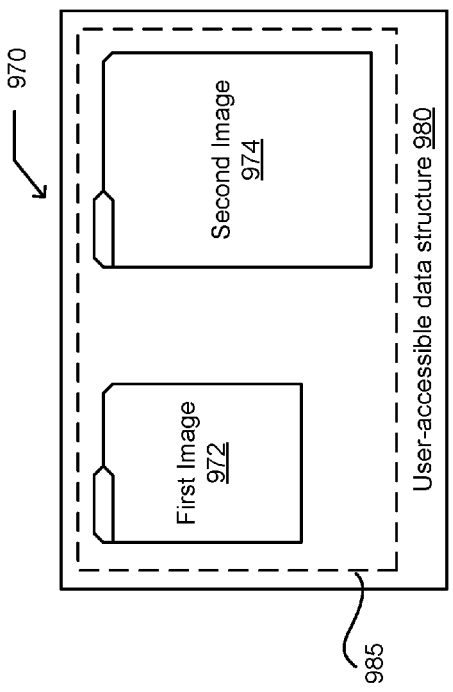
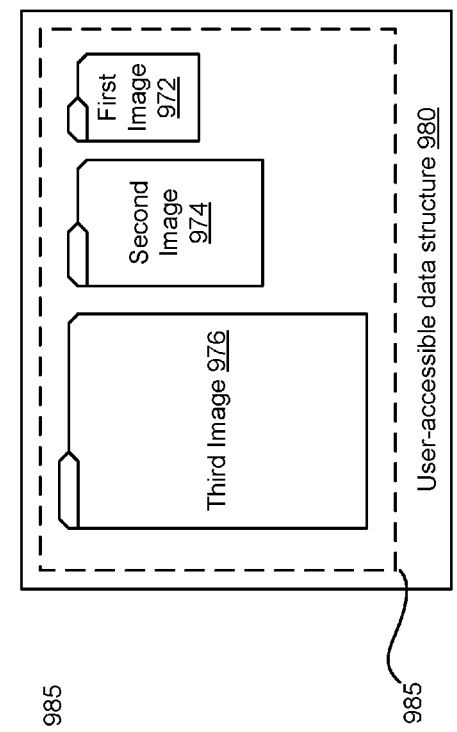
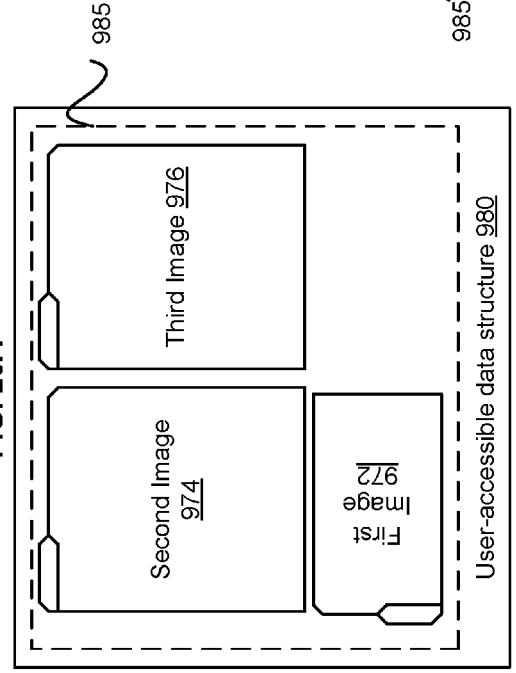
FIG. 20A
FIG. 20B
FIG. 20C
FIG. 20D

ENHANCED VIDEO/STILL IMAGE CORRELATION

PRIORITY CLAIM, CROSS-REFERENCE TO RELATED APPLICATION, AND INCORPORATION BY REFERENCE

The present application is related to and claims the benefit of the earliest available effective filing date(s) from the following listed application(s) (the "Related Applications") (e.g., claims earliest available priority dates for other than provisional patent applications or claims benefits under 35 U.S.C. .sctn. 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation in part of United States patent application entitled ESTIMATING SHARED IMAGE DEVICE OPERATIONAL CAPABILITIES OR RESOURCES, naming Edward K. Y. Jung, Royce A. Levien, Robert W. Lord, Mark A. Malamud, and John D. Rinaldo, Jr. as inventors, filed Jun. 2, 2005, Ser. No. 11/143,970, which is currently co-pending, or is an application of which a currently co-pending application listed as a Related Application is entitled to the benefit of the filing date.

For purposes of the USPTO extra-statutory requirements, the present application constitutes a continuation in part of United States patent application entitled SHARED IMAGE DEVICE DESIGNATION, naming Edward K. Y. Jung, Royce A. Levien, Robert W. Lord, Mark A. Malamud, and John D. Rinaldo, Jr. as inventors, filed Jul. 26, 2005, Ser. No. 11/190,516, which is currently co-pending, or is an application of which a currently co-pending application listed as a Related Application is entitled to the benefit of the filing date.

For purposes of the USPTO extra-statutory requirements, the present application constitutes a continuation in part of United States patent application entitled SAVED-IMAGE MANAGEMENT, naming Royce A. Levien, Robert W. Lord, and Mark A. Malamud, as inventors, filed Oct. 31, 2005, Ser. No. 11/263,587, which is currently co-pending, or is an application of which a currently co-pending application listed as a Related Application is entitled to the benefit of the filing date.

For purposes of the USPTO extra-statutory requirements, the present application constitutes a continuation in part of United States patent application entitled CONDITIONAL ALTERATION OF A SAVED IMAGE, naming Royce A. Levien, Robert W. Lord, and Mark A. Malamud, as inventors, filed Nov. 1, 2005, Ser. No. 11/264,701 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled DATA MANAGEMENT OF A DATA STREAM, naming Edward K. Y. Jung, Royce A. Levien, Robert W. Lord, Mark A. Malamud, and John D. Rinaldo, Jr. as inventors, filed Mar. 15, 2006, Ser. No. 11/376,627 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled STORAGE ACCESS TECHNIQUE FOR CAPTURED DATA, naming Royce A. Levien, Robert W. Lord, and Mark A. Malamud as inventors, filed Apr. 3, 2006, Ser. No. 11/397,357 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled THIRD PARTY STORAGE OF CAPTURED DATA, naming Royce A. Levien, Robert W. Lord, and Mark A. Malamud as inventors, filed Apr. 13, 2006, Ser. No. 11/404,104 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled DATA STORAGE USAGE PROTOCOL, naming Royce A. Levien, Robert W. Lord, and Mark A. Malamud as inventors, filed Apr. 14, 2006, Ser. No. 11/404,381 which is currently co-pending, or is an application of which a currently co-pending application listed as a Related Application is entitled to the benefit of the filing date.

For purposes of the USPTO extra-statutory requirements, the present application constitutes a continuation in part of U.S. patent application Ser. No.11/434,568, entitled DEGRADATION/PRESERVATION MANAGEMENT OF CAPTURED DATA, naming Edward K. Y. Jung, Royce A. Levien, Robert W. Lord, Mark A. Malamud, and John D. Rinaldo, Jr. as inventors, filed May 15, 2006, which is currently co-pending, or is an application of which a currently co-pending application listed as a Related Application is entitled to the benefit of the filing date.

For purposes of the USPTO extra-statutory requirements, the present application constitutes a continuation in part of U.S. patent application Ser. No. 11/437,284, entitled DUAL MODE IMAGE CAPTURE TECHNIQUE, naming Royce A. Levien, Robert W. Lord, Mark A. Malamud, and John D. Rinaldo, Jr. as inventors, filed May 19, 2006, which is currently co-pending, or is an application of which a currently co-pending application listed as a Related Application is entitled to the benefit of the filing date.

For purposed of the USPTO extra-statutory requirements, the present application constitutes a continuation of U.S. patent application Ser. No. 11/475,516 entitled ENHANCED VIDEO/STILL IMAGE CORRELATION, naming Royce A. Levien, Robert W. Lord, Mark A. Malamud, and John D. Rinaldo, Jr. as inventors, filed Jun. 26, 2006, which application is currently co-pending, or is an application of which a currently co-pending application is entitled to the benefit of filing date.

For purposed of the USPTO extra-statutory requirements, the present application constitutes a continuation of U.S. patent application Ser. No. 14/698,753 entitled SHARED IMAGE DEVICES, naming Edward K. Y. Jung, Royce A. Levien, Robert W. Lord, Mark A. Malamud, and John D. Rinaldo, Jr. as inventors, filed Apr. 28, 2015, which application is currently co-pending, or is an application of which a currently co-pending application is entitled to the benefit of the filing date.

All subject matter of the Related Applications and of any and all parent, grandparent, great-grandparent, etc. applications of the Related Applications is incorporated herein by reference to the extent such subject matter is not inconsistent herewith.

SUMMARY

Various possible system embodiment implementations are disclosed herein. For example an exemplary image capture system may include a video capture module with specified quality parameters for obtaining a video data stream generated in a first format, a still image capture module with given quality capabilities for capturing one or more still image frames generated in a second different format, and data record means operatively coupled with said video capture module and with said still image capture module to store selected versions of the video data stream and the still image frames. Related features may include control means for coordinating operation of the video capture module and operation of the still image capture module, wherein said control means establishes a cross-reference association between the video data stream and the one or more still image frames to facilitate future accessibility between a portion of the video data stream and a particular correlated still image frame.

Some exemplary methods of image capture correlation may include creating a video data stream derived from a field of view of a video capture component; capturing one or more still image frames derived from a related field of view of a still image capture component, wherein the one or more still image frames include different quality characteristics compared to the video data stream; and providing a cross-reference association between the video data stream and the one or more still image frames, which cross-reference association facilitates future accessibility between a portion of the video data stream and a particular correlated still image frame.

Another possible process embodiment for image capture correlation may include obtaining a portion of video data stream derived from a field of view of a video capture component; initiating a capture of one or more still image frames derived from a related field of view of a still image capture component; and generating a stored version of the captured still image frames, which stored version includes different quality characteristics compared to a stored version of the video data stream. A related aspect may include providing a cross-reference association between the stored versions of the video data stream and the one or more still image frames, which cross-reference association facilitates future accessibility between a portion of the video data stream and a particular correlated still image frame.

Exemplary computer program product implementations may have instructions for executing a process that includes obtaining a portion of video data stream derived from a field of view of a video capture component; initiating a capture of one or more still image frames derived from a related field of view of a still image capture component; and generating a stored version of the captured still image frames, which stored version includes different quality characteristics compared to a stored version of the video data stream. A related process aspect may include providing a cross-reference association between the stored versions of the video data stream and the one or more still image frames to facilitate future accessibility to the stored version of a portion of the video data stream or to the stored version of a particular correlated still image frame.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 illustrates an exemplary system in which embodiments may be implemented;

FIGS. 20A-D illustrates an embodiment of the exemplary operational flow of FIG. 16;

DETAILED DESCRIPTION

Figure 1:
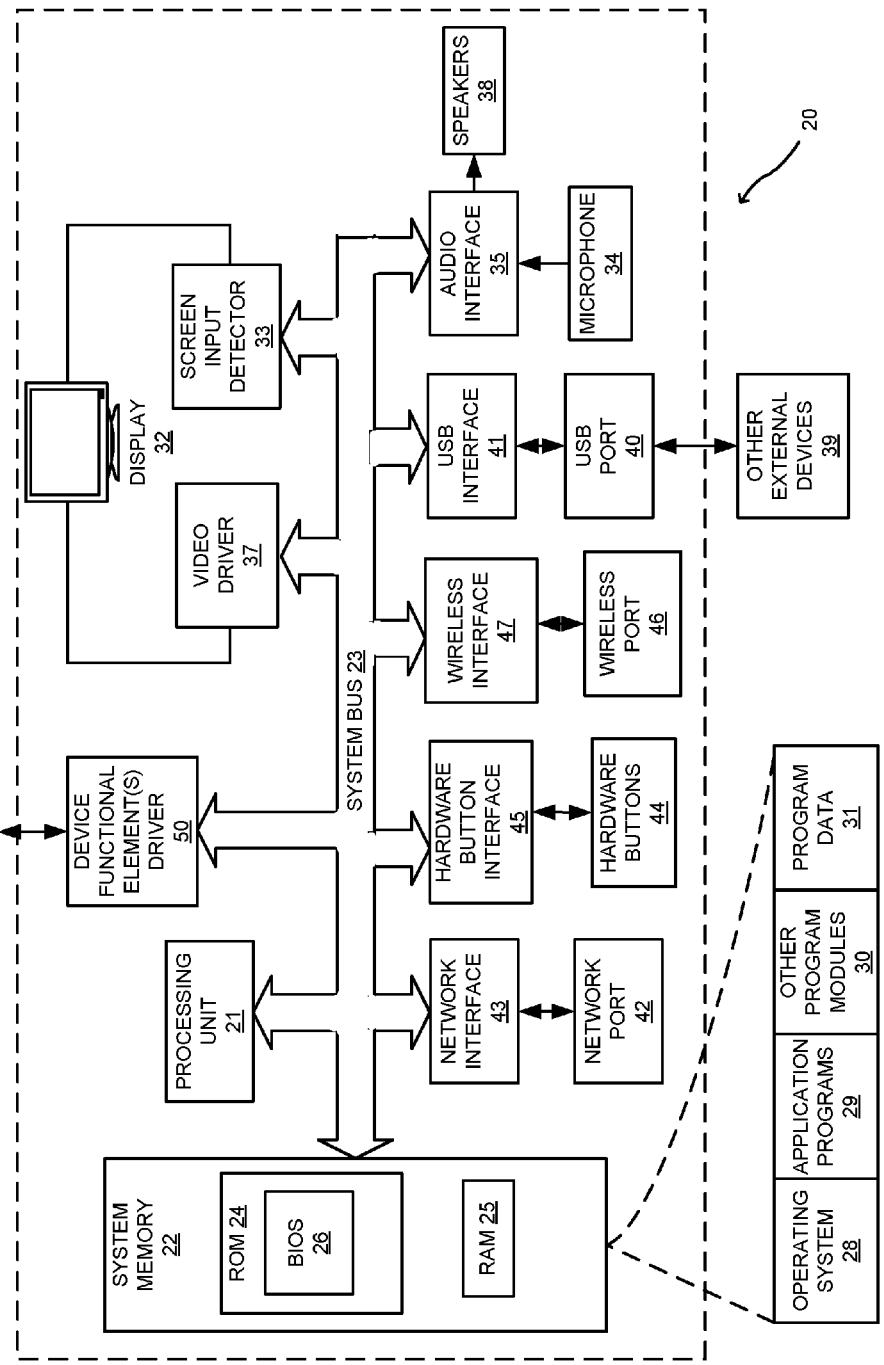
FIG. 1 illustrates the exemplary system that includes a thin computing device that may interface with an electronic device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 provides a brief, general description of an illustrative and/or suitable exemplary environment in which embodiments may be implemented. In FIG. 1, as in the other figures, the figure is an example of an environment and does not suggest any limitation as to the structure, scope of use, or functionality of an embodiment. An embodiment should not be interpreted as having any dependency or requirement relating to any one or combination of components illustrated in an exemplary environment. For example, in certain instances, elements of an environment and/or a method may be deemed not necessary and omitted. In other instances, other elements may be deemed necessary and added.

FIG. 1 illustrates the exemplary system that includes a thin computing device 20 that may interface with an electronic device (not shown). The electronic device may include one or more functional elements 51. For example, the electronic device may include any item having electrical and/or electronic components playing a role in a functionality of the item, such as a limited resource computing device, a game console, a digital camera, a cell phone, a printer, a refrigerator, a car, and an airplane. The thin computing device includes a processing unit 21, a system memory 22, and a system bus 23 that couples various system components including the system memory to the processing unit. The system bus may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between subcomponents within the thin computing device, such as during start-up, is stored in the ROM. A number of program modules may be stored in the ROM and/or RAM, including an operating system 28, one or more application programs 29, other program modules 30, and program data 31.

A user may enter commands and information into the computing device 20 through user input devices, such as a number of switches and buttons, illustrated as hardware buttons 44, which may be associated with the electronic device and connected via a suitable interface 45. Input devices may further include a touch-sensitive display screen 32 with suitable input detection circuitry 33. The output circuitry of the touch-sensitive display screen is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner, an external computer readable medium, or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device may further include or be capable of a connection with a network through a network port 42 and network interface 43, and/or through wireless port 46 and corresponding wireless interface 47. Such a connection may be provided to facilitate communication with other peripheral devices, including other computers, printers, and so on (not shown). It will be appreciated that the various components and connections shown are exemplary and other components and means of establishing communications links may be used.

The computing device 20 may be designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device may be designed to include a user interface having a physical keyboard (not shown).

The device functional elements 51 are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and/or a camera capturing and saving an image.

In the description that follows, certain embodiments may be described with reference to acts and symbolic representations of operations that are performed by one or more computing devices, such as the thin computing device 20 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Embodiments may be implemented with numerous other general-purpose or special-purpose computing devices, computing system environments, and/or configurations. Examples of well-known computing systems, environments, and/or configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Figure 2:
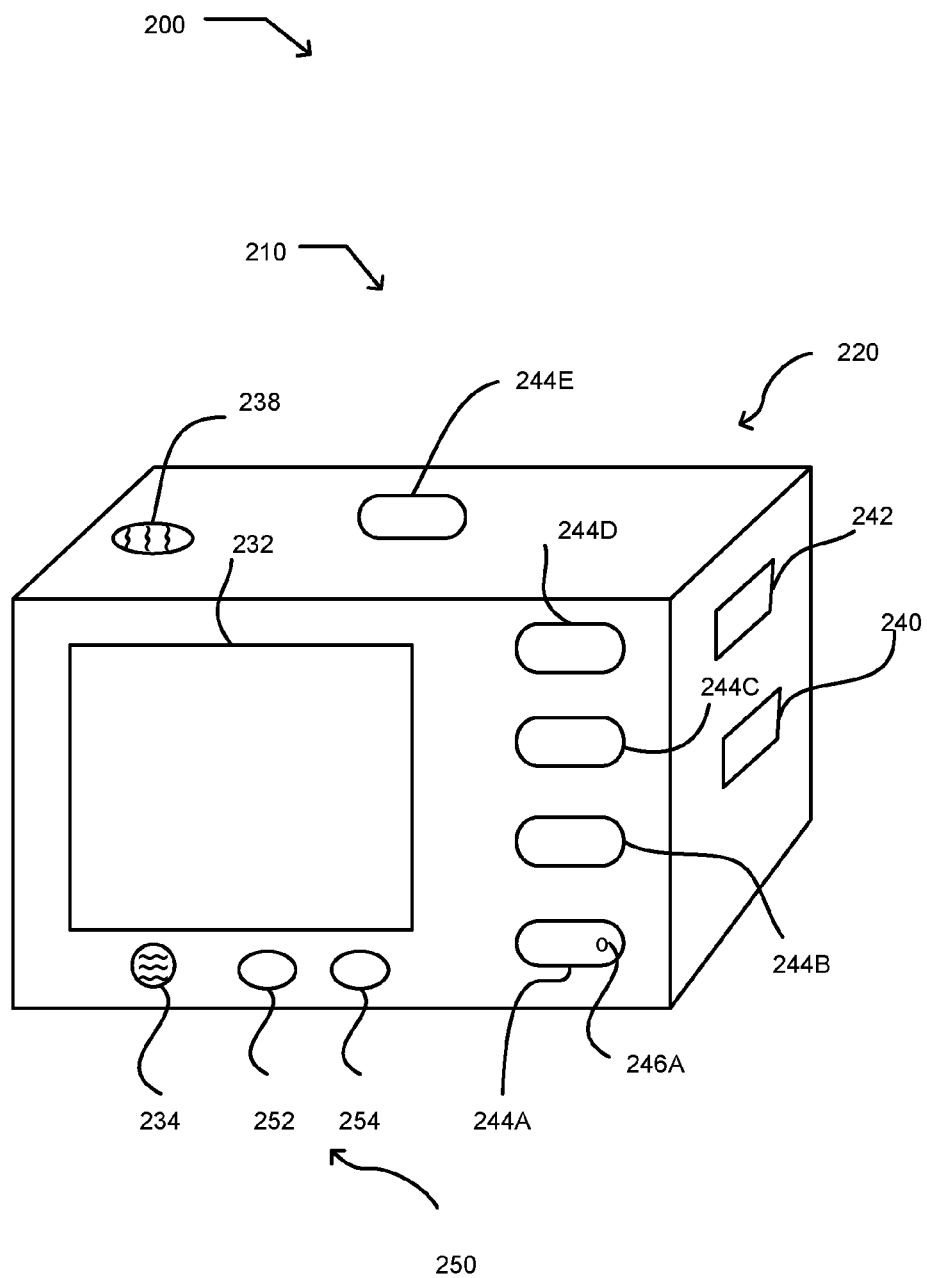
FIG. 2 illustrates an exemplary system in which embodiments may be implemented.

FIG. 2 illustrates an exemplary system 200 in which embodiments may be implemented. The system includes a digital camera 210 having image capture and image storage functionality. The digital camera 210 includes a computing device (not shown), such as the thin computing device 20 described in conjunction with FIG. 1, that is operable to interact with functional elements of the digital camera. The digital camera also includes a plurality of user interfaces 220. The plurality of interfaces 220 includes a display 232. In alternative embodiments, the display may provide a textual, a visual display, and/or a graphical display. In a further embodiment, the display may include touch screen functionality operable to accept a user input. The plurality of user interfaces of the camera also includes a microphone 234, a speaker 238, and a plurality of tangible buttons 244A-244E. One or more of the tangible buttons may include a light emitter, such as a light emitting device 246A. Further, one or more of the tangible buttons 244A-244E may include a vibrator operable to provide a tactile display. The display 232 and the tangible buttons 244A-244E may have any functionality appropriate to the digital camera. For example, the button 244E may be assigned to operate a camera element, such as a shutter function. The button 244A may be assigned an "enter" function, and buttons 244B and 244C may be respectively assigned a scroll up and scroll down function relative to a menu displayed on the display 232. The button 244D may be assigned to operate another camera element, such as a lens zoom function. The digital camera also includes context sensors 250, which may be selected, for example, to produce relevant information about an environment extrinsic to the digital camera. The context sensors are illustrated as an external temperature sensor 252 and a light intensity sensor 254. The digital camera further includes a USB port 240, a network port 242, and/or a wireless port (not shown).

In addition, the digital camera 210 includes a lens (not shown) and an image acquisition module (not shown). The image acquisition module controls the lens, a shutter, an aperture, and/or other elements as necessary to capture an image through the lens. In an embodiment, capturing images using digital cameras or camcorders may be equated with photography as performed by conventional film cameras. A captured image may be processed, stored, viewed, and/or distributed by the digital camera. The digital camera also includes a system memory (not shown), such as the system memory 22 of the thin computing device 20 of FIG. 1. The system memory includes saved operating systems and programs necessary to operate the digital camera. In addition, the digital camera may include a computer readable media (not shown), such as the computer readable medium described in conjunction with FIG. 3 below.

The digital camera 210 includes operability to receive a user input through an interface of the plurality of interfaces 220. For example, in an embodiment, detecting a user touch to the button 244D may be received as an instruction and/or a selection. Another detected user touch to another user interface of the plurality of user interfaces 220 may be received as another instruction and/or a selection. The user touch may be detected by a user interface physically incorporated in the aspect of the digital camera 210 or proximate thereto. In an alternative embodiment, a user input may be received by detecting a signal responsive to a sound or voice received by the microphone 234. For example, a detection and recognition of a signal responsive to a spoken command to the microphone 234 may be received as an instruction to activate a program associated with the digital camera. Further, a detection of a signal responsive to a sound or voice may be received by the microphone 234.

FIG. 3 illustrates an exemplary system 300 in which embodiments may be implemented. The system includes a digital camera 310. The digital camera includes an image acquisition module 320 operable to capture an image, an image management module 330, and a computer readable medium, illustrated as computer readable media 340.

In an embodiment, the digital camera 310 may include a computing device (not expressly shown) that handles any required processing. For example, the computing device may include at least a part of the system described in conjunction with FIG. 1, including the thin computing device 20, that may interface with at least one functional element of the digital camera. In an embodiment, the digital camera may include a processing unit, illustrated as a processing unit 350, and a system memory 355, which may be substantially similar to the processing unit 21 and the system memory 22 respectively of FIG. 1. In another embodiment, the digital camera may include at least a part of the exemplary system 200 and/or the digital camera 210 described in conjunction with FIG. 2.

The image management module 330 includes an operability to save a captured image at a resolution in the computer readable medium 340 and in a user-accessible form. In an embodiment, the operability to save the captured image at a resolution in the computer readable medium and in a user-accessible form includes an operability to save a captured image in a format at least substantially suitable for presentation by a visual display of the digital camera 310, such as a display screen. For example, the operability to save a captured image at a resolution in the computer readable medium and in a user-accessible form may include an operability to save a captured image at a resolution in a JPEG format, a GIF format, a TIFF format, or a PDF format. In another embodiment, the operability to save the captured image at a resolution in the computer readable medium and in a user-accessible form includes an operability to save the captured image at a resolution in the computer readable medium after data representative of the captured image has been decoded and processed from a raw format. Typically, the raw data is decoded and/or processed from a raw format, i.e., raw image data, into a JPEG format, a GIF format, a TIFF format, or a PDF format. In a further embodiment, the operability to save the captured image at a resolution in the computer readable medium and in a user-accessible form includes an operability to save the captured image in a form accessible to a user of the digital camera in the computer readable medium. For example, the form accessible to a user of the digital camera may include a JPEG format, a GIF format, a TIFF format, a PDF format, or a raw format where the digital camera allows a user access to a saved captured image in a raw format.

In an embodiment, an "image" may include a full image. In another embodiment, an "image" may include a portion of an image, a segment of a full image, a thumbnail of an image, and/or an icon that pertains to an image. Another embodiment of an "image" may include a photograph and/or a digital image that can be captured by an image capture device such as, for example, the digital camera 310. Certain embodiments of a streaming image may include a video that may be captured by the digital camera, such as, for example, a digital camcorder camera.

The term "resolution" may include an indication of a measurement of image detail, such as may be expressed as pixels per inch, dots per inch, or samples per inch, etc. In certain embodiments, a file size of an image is a function of its resolution, and in certain embodiments of relatively limited storage-capability cameras, relatively few high-resolution images can be saved.

In another embodiment, a "user-accessible form" may include at least one of a location in the computer readable medium that allows a user to access a file saved therein, a file formatted to allow a user of the digital camera 310 to view and/or manipulate the captured image, a property of the captured image written to the computer readable medium, and/or an organization of the computer readable medium that allows a user to access a file saved therein. For example, data indicative of the captured image written to a hard drive in a JPEG format generally allows a user to view and/or manipulate the captured image. In an embodiment, a user-accessible storage medium may include all or any portion of any computer readable storage medium that allows a user, typically through a user interface, to act with respect to and/or interact with the image, such as viewing the image, manipulating the image, and/or directing the image to another location.

The image management module 330 also includes an operability to decrease the resolution of the saved captured image in the computer readable medium if a condition is met. In an embodiment, the condition may include a condition corresponding in part or whole to a state of the computer readable medium, a presence and/or absence of a predetermined content of the saved captured image, a characteristic of the saved image, an image storage administrative criterion, and/or a temporal criterion. In a further embodiment, a condition does not include an automatic or standing condition that normally occurs upon completion of a processing, for example, completion of decoding raw image data into a more machine usable and/or user viewable format.

Examples of decreasing a resolution of a saved captured image include, but are not limited to, changing a resolution of a saved captured image, resampling a saved captured image, adjusting an exposure of a saved captured image, adjusting some image content of a saved captured image, and/or adjusting image composition of a saved captured image. As described within this document, certain embodiments of the decreasing a resolution of a saved captured image are configurable to decrease the resolution of the image such as by utilizing pixel-combination and/or combination of multiple images. The decreasing a resolution of a saved captured image may include altering image intensity and/or color values. The decreasing a resolution of a saved captured image may in certain embodiments, but not others, be equated to sizing the resolution of an image downward, and may other embodiments be implemented by removing pixels from the saved captured image. The decreasing a resolution of a saved captured image may pertain in certain embodiments, but not others, to altering the color values and/or the color intensities of a particular image. The decreasing a resolution of a saved captured image may pertain to decreasing the density of the pixels forming the image. During a resolution decreasing process, in certain embodiments of a display or projector, a footprint of pixels may be suitably altered to effectively change the resolution of the at least one image.

In an embodiment, the computer readable media 340 may include a variety of computer readable media products. The computer readable media may include any storage media accessible by a computing device, and includes both removable and non-removable media. By way of example, and not of limitation, computer-readable media may include any computer storage media. Computer storage media includes removable and non-removable media implemented in any method or technology for storage of information such as computer-readable instructions, data structures, program modules, or other data. Computer storage media may include, but are not limited to, magnetic devices, such as magnetic disk storage, magnetic cassettes, magnetic tape, or other magnetic storage devices; optical devices, such as CD-ROM, digital versatile disks (DVD), or other optical disk storage; memory cards, such a flash memory card; and/or any other medium which may be used to store the captured information and which can be accessed by a computing device. Combinations of any of the above may also be included within the scope of a computer-readable medium.

FIG. 3 illustrates an embodiment where the computer readable media 340 includes at least one instance of a computer readable medium. Illustrated instances of a computer readable medium include a computer storage device 348, a non-removable non-volatile medium 346, and/or a removable non-volatile medium 344. In an embodiment, the computer storage device may include any device capable of storing data, such as, for example, a mass storage device, a disk drive, and/or a tape drive. In another embodiment, the non-removable non-volatile medium may include a non-volatile magnetic disk or other medium. In a further embodiment, the removable non-volatile medium may include an optical disk such as a CD ROM, magnetic tape cassettes, flash memory cards, DVDs, and/or digital video tape.

In an embodiment, the computer readable medium 340 includes a non-volatile computer storage device. In another embodiment, the computer readable medium includes a non-volatile computer readable medium. In a further embodiment, the computer readable medium includes a removable non-volatile computer readable medium.

In an embodiment, the image acquisition module 320 operable to capture an image includes an image acquisition module operable to capture a still image, an image stream, and/or a combination of a still image and an image stream. In another embodiment, the image acquisition module operable to capture an image includes an image acquisition module operable to capture at least one of a visual image, an audio image, and/or a combination of a visual image and an audio image. In a further embodiment, the image acquisition module operable to capture an image includes an image acquisition module operable to capture an image in response to a received instruction from another digital device. The received instruction from another digital device may include an instruction received from another digital camera. The received instruction may direct capture of the image, or may include data responsive to which the image acquisition module captures the image.

In an embodiment, the image management module 330 operable to save a captured image at a resolution in a computer readable medium and in a user-accessible form includes an image management module operable to save a captured image at a resolution in the computer readable medium and in a user-accessible album of images stored in a computer readable medium. In another embodiment, the image management module operable to save a captured image at a resolution in a computer readable medium includes an image management module operable to save a captured image at a resolution in the computer readable medium and in a user-accessible collection of images stored in a computer readable medium. In a further embodiment, the image management module operable to save a captured image at a resolution in the computer readable medium and in a user-accessible form includes an image management module operable to save a captured image at a resolution in a user-accessible data structure.

In an embodiment, the image management module 330 operable to decrease the resolution of the saved captured image in the computer readable medium if a condition is met includes an image management module operable to decrease the resolution of the saved captured image in the computer readable medium using a lossy compression algorithm if a condition is met. In another embodiment, the image management module operable to decrease the resolution of the saved captured image in the computer readable medium if a condition is met includes an image management module operable to decrease the resolution of the saved captured image in the computer readable medium if a time exceeds a preselected time threshold. The preselected time threshold may exceed five seconds. The preselected time threshold may exceed at least a selected one of ten seconds, thirty seconds, one minute, thirty minutes, ninety minutes, five hours, twelve hours, one day, one week, one month, or one year.

In a further embodiment, the image management module 330 operable to decrease the resolution of the saved captured image in the computer readable medium if a condition is met includes an image management module operable to decrease the resolution of the saved captured image in the computer readable medium if a time value is inside a preselected time window. In an embodiment, the image management module operable to decrease the resolution of the saved captured image in the computer readable medium if a condition is met includes an image management module operable to decrease the resolution of the saved captured image in the computer readable medium if a condition is met where the condition corresponds to at least one of a storage space availability in the computer readable medium, a user established parameter, a preselected content of the image, and/or a parameter established by a storage management algorithm. In another embodiment, the image management module operable to decrease the resolution of the saved captured image in the computer readable medium if a condition is met includes an image management module operable to decrease the resolution of the saved captured image in the computer readable medium if a condition independent of the operation to save a captured image at a resolution in the computer readable medium is met. In a further embodiment, the image management module operable to decrease the resolution of the saved captured image in the computer readable medium if a condition is met includes an image management module operable to decrease the resolution of the saved captured image in the computer readable medium if a condition responsive to an examination of at least one other captured image saved in the computer readable medium is met. For example, a condition responsive to an examination of at least one other captured image saved in the computer readable medium may include examining a content and/or context of the at least one or more other saved captured images for a repetition and/or duplication. If at least one other saved captured image is examined and found to be repetitive and/or duplicative of the saved captured image, the condition would be met and the image management module would operate to reduce the resolution of the saved captured image. In an alternative embodiment, the image management module may include an operability to reduce the resolution of the at least one other saved image in response to the condition being met.

In an embodiment, the image management module 330 may further include an image management module operable to further decrease the resolution of the captured image saved in the computer readable medium if another condition is met.

Figure 4A:
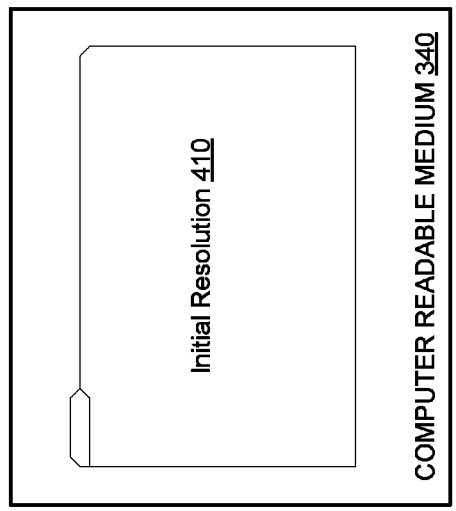
FIGS. 4A-C illustrates an exemplary operation that decreases the resolution of the saved captured image in the computer readable medium.
Figure 4B:
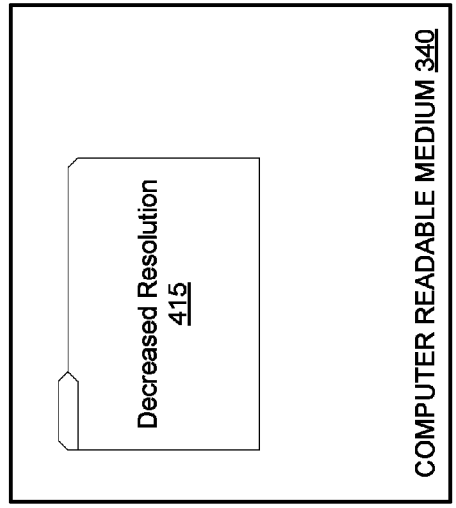
Figure 4C:
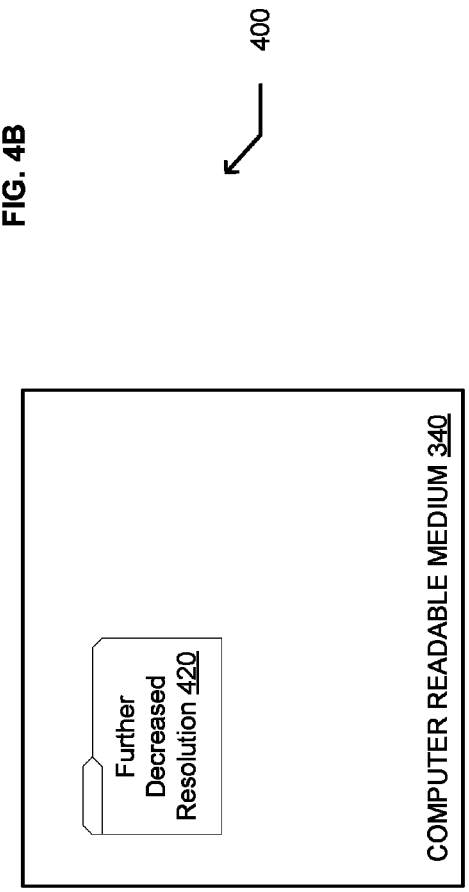

FIGS. 4A-C illustrate an exemplary operation 400 that decreases the resolution of the saved captured image in the computer readable medium. The operation is described using the exemplary system 300 and the digital camera 310 of FIG. 3 as an example. In operation of an embodiment of the exemplary system, a user may compose a picture by orientating the lens 360 toward a subject in a scene. The user may communicate their preferences about the intended picture to the digital camera using elements of the user interface 370. Upon shutter activation, an imaging chip 322 of the image acquisition module 320 generates electrical signals corresponding to the scene in a raw-format. A processing unit 350 and/or an image management module 330 of the digital camera decodes and/or processes the raw-format image of the scene into a format, such as a JPEG format, a GIF format, a TIFF format, or a PDF format. The decoding and/or processing typically involve the system memory 355 of FIG. 3. The image management module 330 then saves the captured image in a post-decoded/processed format, such as the JPEG format, at an initial resolution 410 in the computer readable medium 340. FIG. 4A illustrates the saved captured image in the post-decoded/processed format, such as a JPEG format, in the file at, at the initial resolution 410 in the computer readable medium. Typically, the file will have an initial file size measured in bytes.

If a condition is met, the image management module 330 decreases the resolution of the saved captured image in the computer readable medium 340 from the initial resolution 410 to a decreased resolution 415. For example, a condition may include whether a user has not caused the digital camera 310 to display the captured saved image at the initial resolution 410 for more than ten seconds in the 30 days immediately after the image was captured. The image management module monitors for the condition being met. If the condition is met, i.e., a user has not caused the digital camera to display the saved captured image at the initial resolution for more than 10 seconds during the 30 days after the image was captured, the image management module decreases the resolution of the saved captured image in the computer readable medium. The resolution of the saved captured image is decreased from the initial resolution 410 to a lesser or decreased resolution, illustrated as the decreased resolution 415.

If another condition is met, the image management module 330 may further decrease the decreased resolution 415 of the saved captured image in the computer readable medium 340. For example, a condition may include whether a user has not caused the digital camera 310 to display the captured saved image at its decreased resolution 415 for more than ninety seconds during the 90 days after the resolution was reduced from the file 410. If the condition is met, i.e., a user has not caused the digital camera to display the saved captured image for more than ninety seconds during the 90 days after the saved captured image was reduced, the image management module further decreases the resolution of the written captured image in the computer readable medium. The resolution is decreased from the decreased resolution 415 to a further decreased resolution, illustrated as a further decreased resolution 420. In an embodiment, each decreased resolution is selected to use less file storage space in the computer readable medium than its predecessor does. In an embodiment, less viewed or lower user-valued files have their resolution degraded over time to maximize available storage capacity for newly captured images and/or frequently viewed images.

Figure 5:
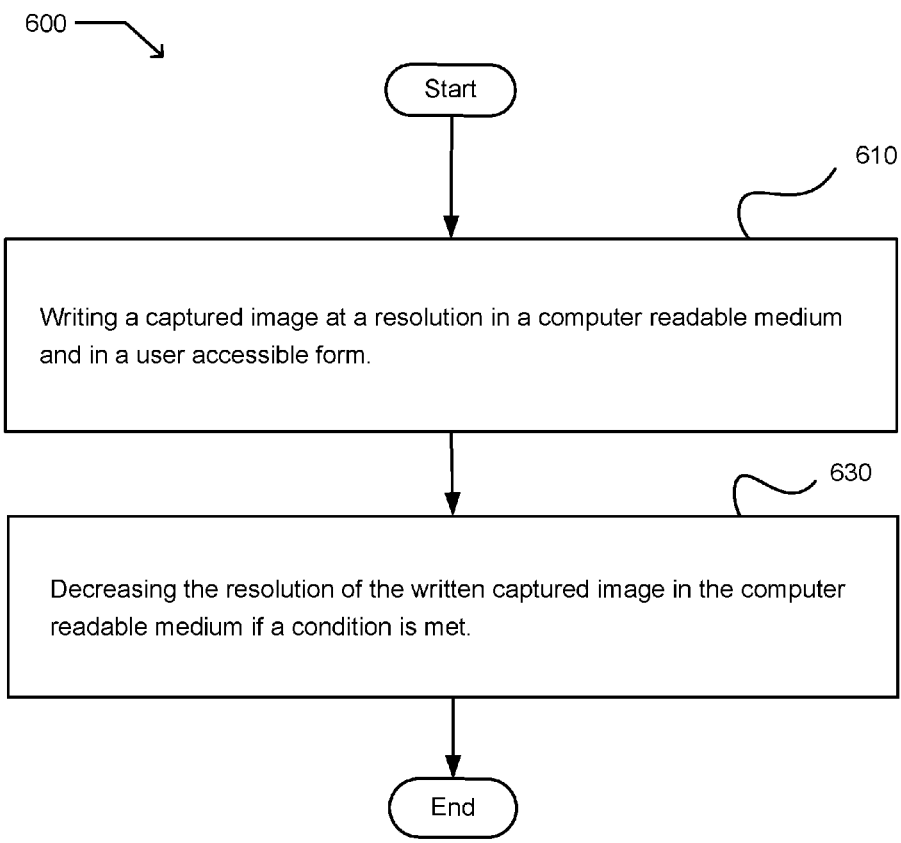
FIG. 5 illustrates an exemplary operational flow.

FIG. 5 illustrates an exemplary operational flow 600. The exemplary operational flow may be implemented in the exemplary system 300 described in conjunction with FIG. 3. After a start operation, a storage operation 610 writes a captured image at a resolution in a computer readable medium and in a user-accessible form. A transformation operation 630 decreases the resolution of the written captured image in the computer readable medium if a condition is met. The operational flow then proceeds to an end operation.

Figure 6:
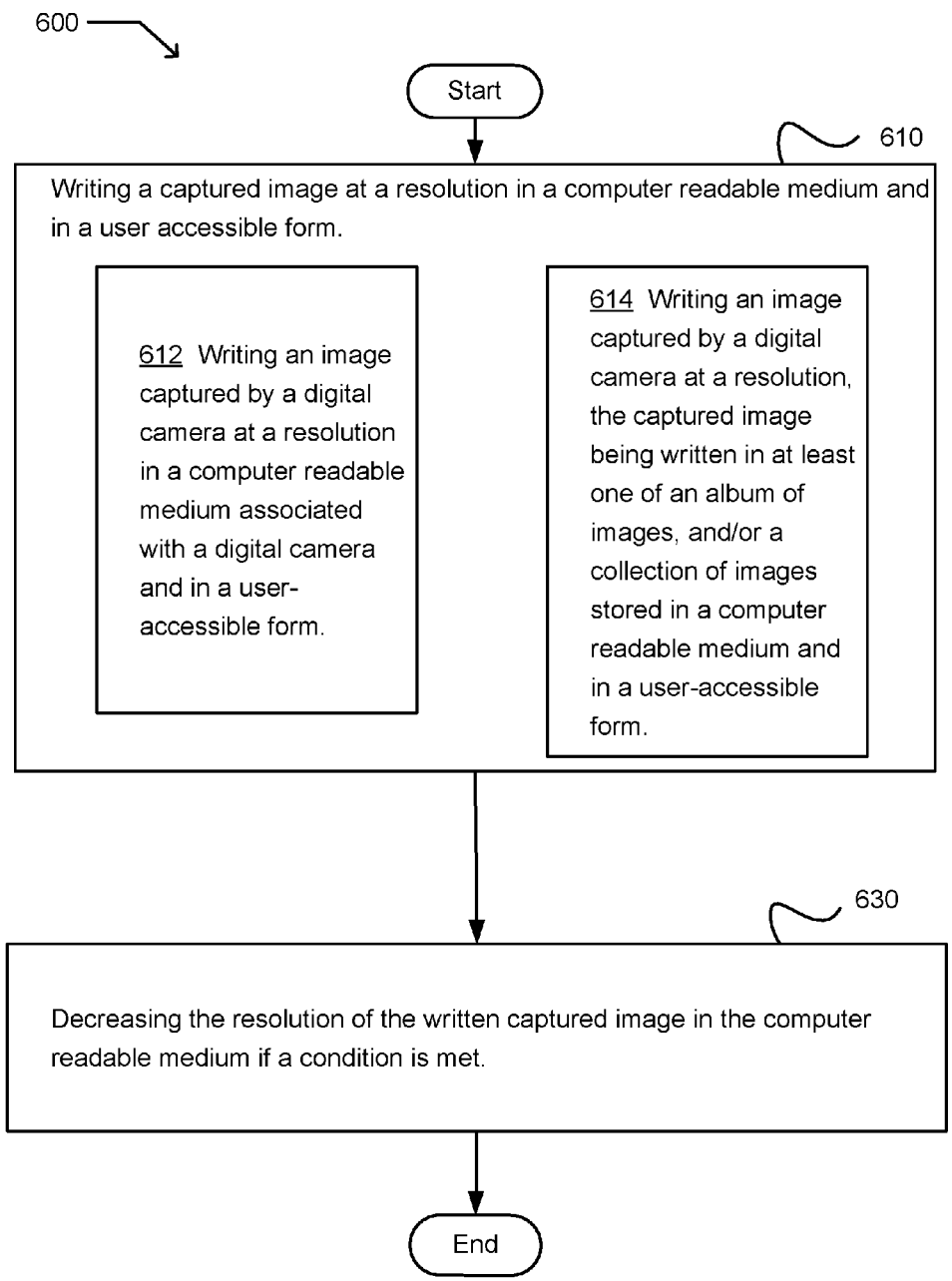
FIG. 6 illustrates an alternative embodiment of the exemplary operational flow of FIG. 5.

FIG. 6 illustrates an alternative embodiment of the exemplary operational flow 600 of FIG. 5. The storage operation 610 may include at least one additional operation. The at least one additional operation may include an operation 612, and/or an operation 614. The operation 612 writes an image captured by a digital camera at a resolution in a computer readable medium associated with a digital camera and in a user-accessible form. The operation 614 writes an image captured by a digital camera at a resolution and in a user-accessible form, the captured image being written in at least one of an album of images, and/or a collection of images stored in a computer readable medium.

Figure 7:
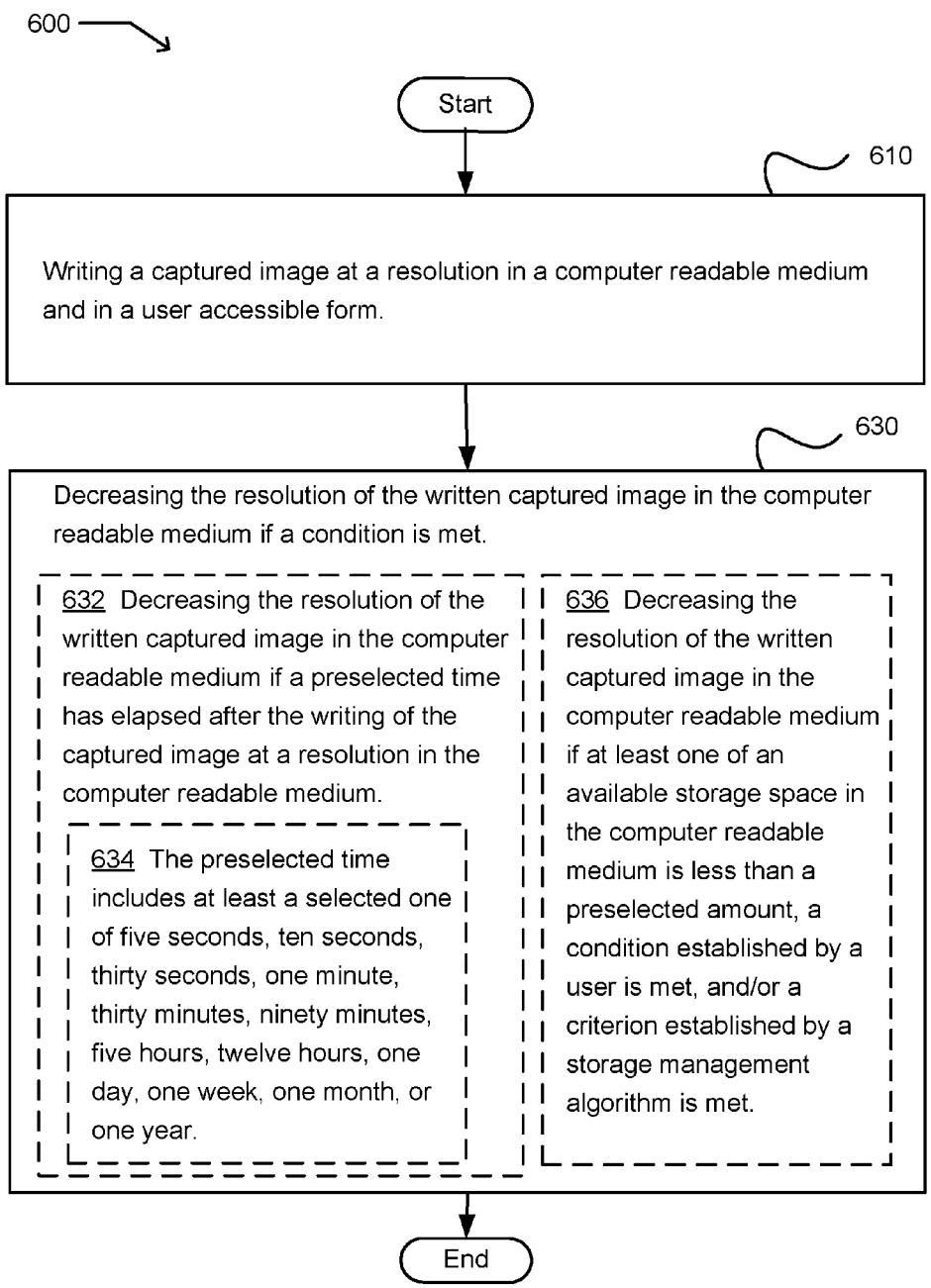
FIG. 7 illustrates an alternative embodiment of the exemplary operational flow of FIG. 5.

FIG. 7 illustrates an alternative embodiment of the exemplary operational flow 600 of FIG. 5. The transformation operation 630 may include at least one additional operation. The at least one additional operation may include an operation 632, and/or an operation 636. The operation 632 decreases the resolution of the written captured image in the computer readable medium if a preselected time has elapsed after the writing of the captured image at a resolution in the computer readable medium. The operation 632 may include at least one additional operation, such as the operation 634. At the operation 634, the preselected time includes at least a selected one of five seconds, ten seconds, thirty seconds, one minute, thirty minutes, ninety minutes, five hours, twelve hours, one day, one week, one month, or one year. The operation 636 decreases the resolution of the written captured image in the computer readable medium if at least one of an available storage space in the computer readable medium is less than a preselected amount, a condition established by a user is met, and/or a criterion corresponding to a storage management algorithm is met.

Figure 8:
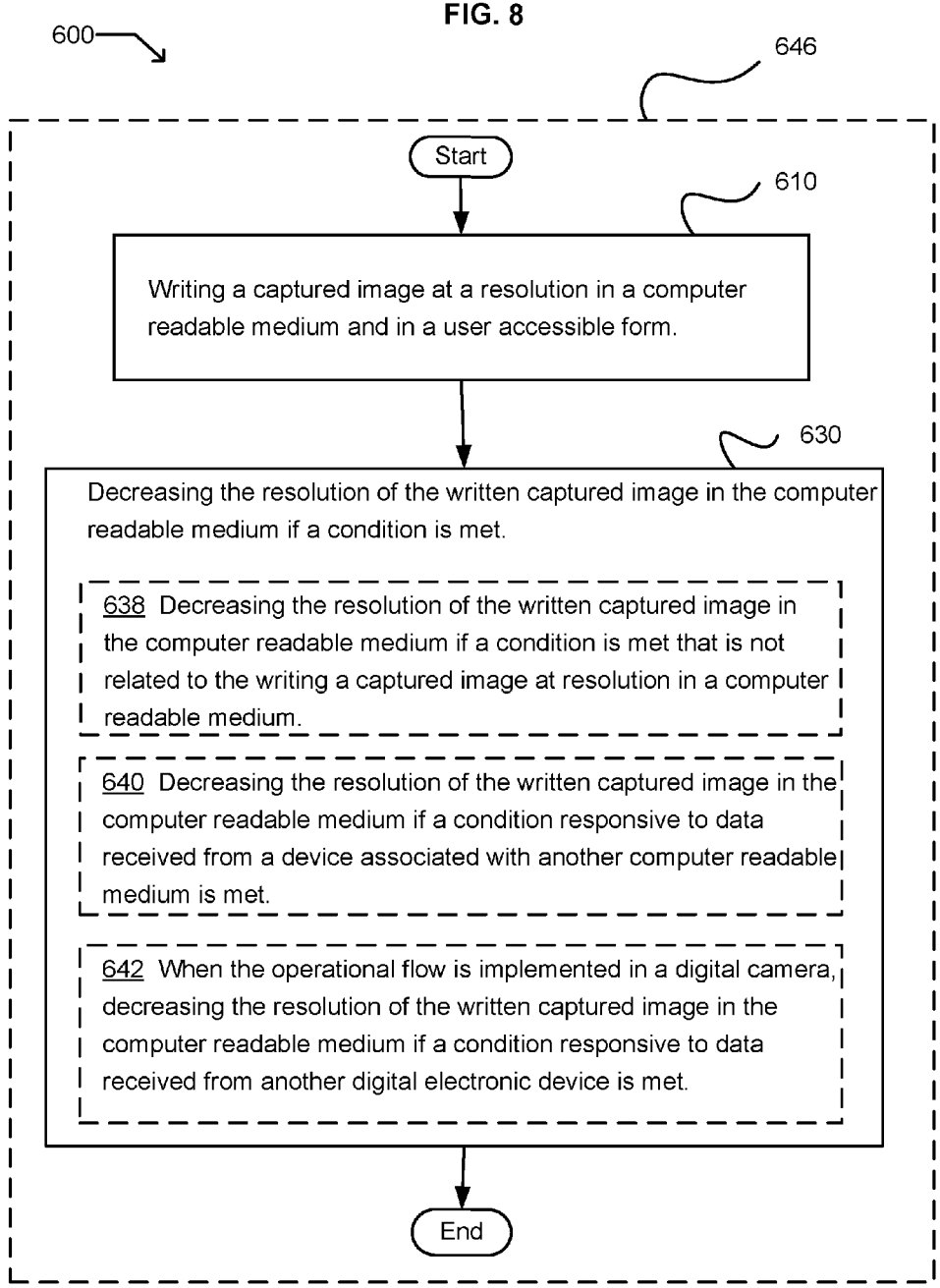
FIG. 8 illustrates an alternative embodiment of the exemplary operational flow of FIG. 5.

FIG. 8 illustrates an alternative embodiment of the exemplary operational flow 600 of FIG. 5. The operational flow may be implemented in a handheld digital camera 646. The transformation operation 630 may include at least one additional operation. The additional operation may include an operation 638, an operation 640, and/or an operation 642. The operation 638 decreases the resolution of the written captured image in the computer readable medium if a condition is met that is not related to the writing a captured image at resolution in a computer readable medium. The operation 640 decreases the resolution of the written captured image in the computer readable medium if a condition responsive to data received from a device associated with another computer readable medium is met. When the operational flow is implemented in a digital camera, the operation 642 decreases the resolution of the written captured image in the computer readable medium if a condition responsive to data received from another digital device is met.

Figure 9:
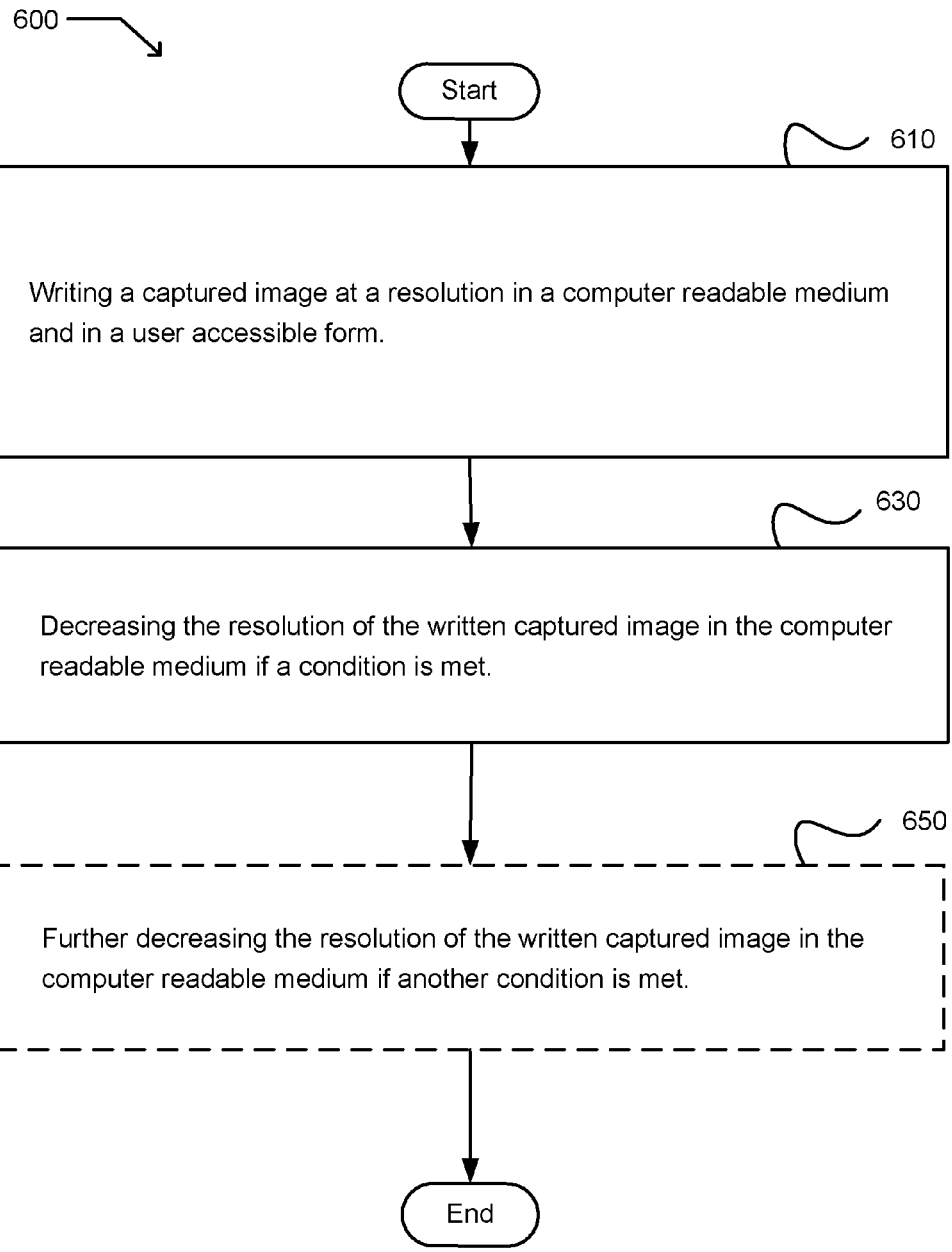
FIG. 9 illustrates an alternative embodiment of the exemplary operational flow of FIG. 5.

FIG. 9 illustrates an alternative embodiment of the exemplary operational flow 600 of FIG. 5. The operational flow may include at least one additional operation, such as an operation 650. The operation 650 further decreases the resolution of the written captured image in the computer readable medium if another condition is met.

Figure 10:
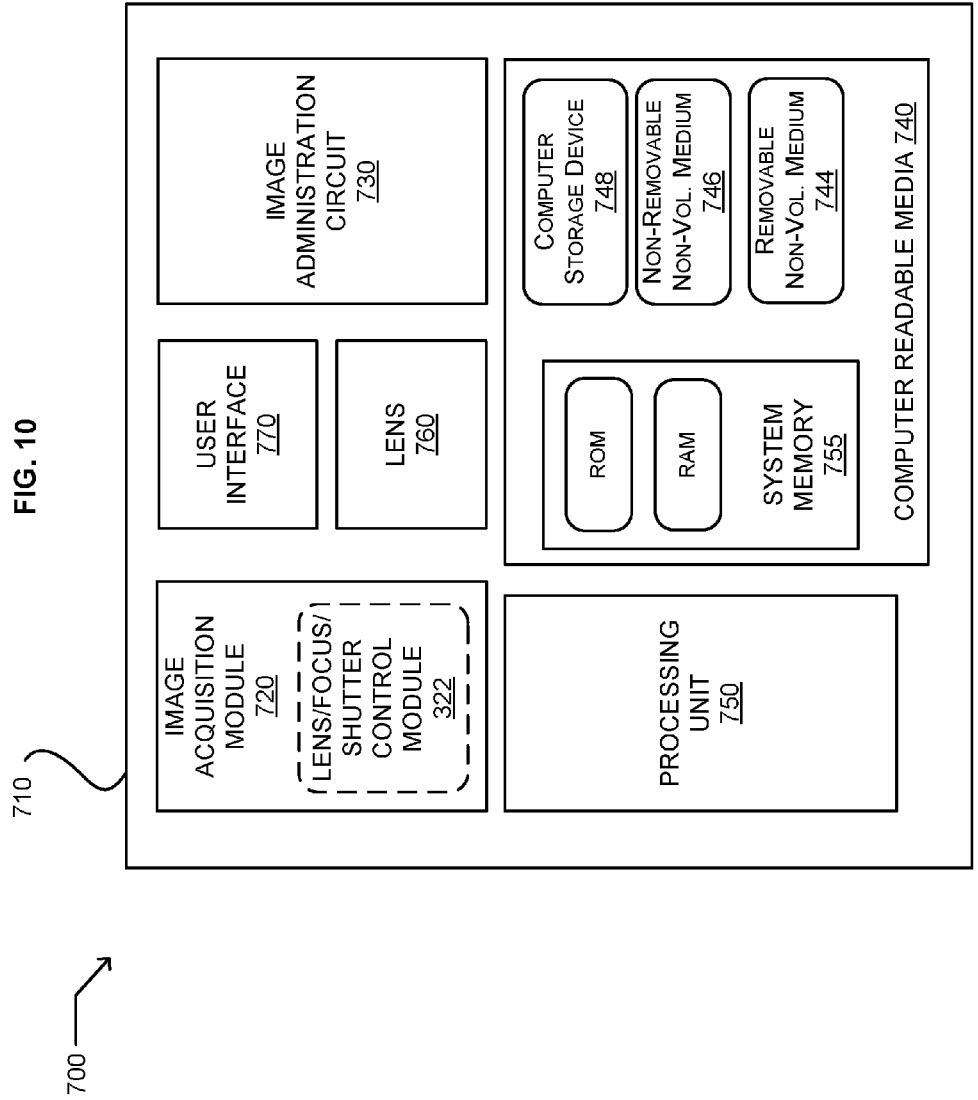
FIG. 10 illustrates an exemplary environment in which embodiments may be implemented.

FIG. 10 illustrates an exemplary environment 700 in which embodiments may be implemented. The exemplary environment includes a device 710, which may include elements that are at least substantially similar to the digital camera 310 of FIG. 3. The device includes an image acquisition module 720 operable to capture an image, a computer readable medium, illustrated as a computer readable media 740, and an image administration circuit 730. The image administration circuit includes an image administration circuit for saving a captured image at a first resolution in the computer readable medium. The image administration circuit also includes a image administration circuit for saving the captured image in the computer readable medium at a second resolution that is less than the first resolution, and for removing the captured image saved at the first resolution from the computer readable medium, both if a condition is met.

In an embodiment, the image administration circuit 730 for saving a captured image in the computer readable medium at a first resolution includes an image administration circuit for saving a captured image at a first resolution in at least one of a nonvolatile, a removable, and/or non-removable media implemented in any method and/or technology for storage of digital information. In another embodiment, the image acquisition module 720 operable to capture an image includes an image acquisition module operable to capture at least one of a still image, an image stream, and/or a combination of a still image and an image stream. In a further embodiment, the image acquisition module operable to capture an image includes an image acquisition module operable to capture at least one of visual image, an audio image, and/or a combination of a visual image and an audio image.

In an embodiment, the image acquisition module 720 operable to capture an image includes an image acquisition module operable to capture a real-world image. In another embodiment, the image administration circuit 730 for saving a captured image at a first resolution in the computer readable medium includes an image administration circuit for saving a captured real-world image at a first resolution in the computer readable medium. In a further embodiment, the image acquisition module operable to capture an image includes an image acquisition module operable to capture a virtual-world image. In another embodiment, the image administration circuit for saving a captured image at a first resolution in the computer readable medium includes an image administration circuit for saving a captured virtual-world image at a first resolution in the computer readable medium.

In another embodiment, the image administration circuit 730 for saving a captured image at a first resolution in the computer readable medium includes an image administration circuit for saving a captured image at a first resolution in the computer readable medium and in a user-accessible form. In a further embodiment, the image administration circuit for saving a captured image at a first resolution in the computer readable medium and in a user-accessible form includes an image administration circuit for saving a captured image at a first resolution in the computer readable medium and in a user-accessible location. In an embodiment, the image administration circuit for saving a captured image at a first resolution in the computer readable medium and in a user-accessible form includes an image administration circuit for saving a captured image at a first resolution in a computer readable medium that allows user access to the saved captured image. In a further embodiment, the image administration circuit for saving a captured image at a first resolution in the computer readable medium and in a user-accessible form includes an image administration circuit for saving a captured image at a first resolution in a computer readable medium configured for user access to the saved captured image.

In an embodiment, the image administration circuit 730 for saving the captured image in the computer readable medium at a second resolution that is less than the first resolution includes an image administration circuit for saving the captured image in the computer readable medium at a resolution reduced from the first resolution. In another embodiment, the image administration circuit for saving the captured image in the computer readable medium at a second resolution that is less than the first resolution if a condition is met includes an image administration circuit for saving the captured image in the computer readable medium at a second resolution where at least a portion of the saved captured image has a resolution less than the first resolution. In a further embodiment, the image administration circuit for saving the captured image in the computer readable medium at a second resolution that is less than the first resolution includes an image administration circuit for reducing the resolution of the captured image from the first resolution into the second resolution and for saving the captured image in the computer readable medium at the second resolution. In an embodiment, the image administration circuit for saving the captured image in the computer readable medium at a second resolution that is less than the first resolution includes an image administration circuit for reducing the resolution of at least one selected frame of a streaming captured image from the first resolution into the second resolution and not reducing at least one other selected frame of the streaming captured image.

In an embodiment, the image administration circuit 730 for removing the captured image saved at the first resolution from the computer readable medium includes an image administration circuit for deleting the captured image saved at the first resolution from the computer readable medium. In another embodiment, the image administration circuit for removing the captured image saved at the first resolution from the computer readable medium includes an image administration circuit for communicating the captured image saved at the first resolution to another computer readable medium. In an embodiment, the another computer readable medium may be physically associated with the device. In further embodiment, the another computer readable medium may not physically associated with the device.

In an embodiment, the image administration circuit 730 for communicating the captured image saved at the first resolution to another computer readable medium includes an image administration circuit for communicating the captured image saved at the first resolution to another computer readable medium and acquiring a track-back link to the communicated captured image. In another embodiment, the image administration circuit for removing the captured image saved at the first resolution from the computer readable medium includes an image administration circuit for communicating the captured image saved at the first resolution to at least one of another computer readable medium that is a less accessible computer readable medium, a slower computer readable medium, a cheaper computer readable medium, a temporarily available computer readable medium, an intermittently available computer readable medium, a more secure computer readable medium, a less secure computer readable medium, a public computer readable medium, a private computer readable medium, and/or a computer readable medium that is less accessible in terms of a location and/or a rate and/or a format.

In an embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a preselected time has elapsed since the captured image at a first resolution was saved in the computer readable medium. In a further embodiment, the image administration circuit for saving the captured image in the computer readable medium at a second resolution that is less than the first resolution if a condition is met includes an image administration circuit for saving the captured image in the computer readable medium at a second resolution that is less than the first resolution if available storage space in the computer readable medium is less than a preselected threshold. For example, the available storage space in the computer readable medium may include a presently available storage in the computer readable medium that is less than a preselected threshold, and/or predicted availability of storage in the computer readable medium that is less than a preselected threshold.

In another embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a condition established by a user is met. The condition established by a user may include a user-selected condition, a user-created condition, and/or a user-determined condition. In a further embodiment, the image administration circuit for saving the captured image in the computer readable medium at a second resolution that is less than the first resolution if a condition is met includes an image administration circuit for saving the captured image in the computer readable medium at a second resolution that is less than the first resolution if an image resolution changing criterion established by a storage administration criterion is met. In an embodiment, the storage administration criterion may correspond to image content, image content attributes, time, storage space, presence and/or absence of a selected subject, a frequent presence of a selected subject in other saved captured images, an at least substantial similarity to other saved captured images, and/or an at least substantial similarity to other saved captured images having a commonality; such as recently captured, captured in a time frame, and/or captured in temporal or spatial proximity. For example, a storage administration criterion may include keeping only one high resolution saved captured image of my son from all those captured during the month of December. In another example, a storage administration criterion may include keeping, i.e., not decreasing the resolution of sufficient images to enable some task or goal, such as keeping just enough images to construct a panorama, to create a high dynamic range composite, and/or an infinite depth of field image.

In an embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a condition corresponding to data received from another digital device is met. In another embodiment, the image administration circuit for saving the captured image in the computer readable medium at a second resolution that is less than the first resolution if a condition is met includes an image administration circuit for saving the captured image in the computer readable medium at a second resolution that is less than the first resolution if a condition responsive to an examination of at least one other captured image saved in the computer readable medium is met. In a further embodiment, the another digital device includes an image acquisition module operable to capture an image. In another embodiment, the device includes a digital camera. In a further embodiment, the device includes a handheld digital camera.

In an embodiment, the an image administration circuit 730 further includes an image administration circuit for saving the captured image in the computer readable medium at a third resolution that is less than the second resolution and removing from the computer readable medium the captured image saved at the second resolution, if another condition is met.

Figure 11:
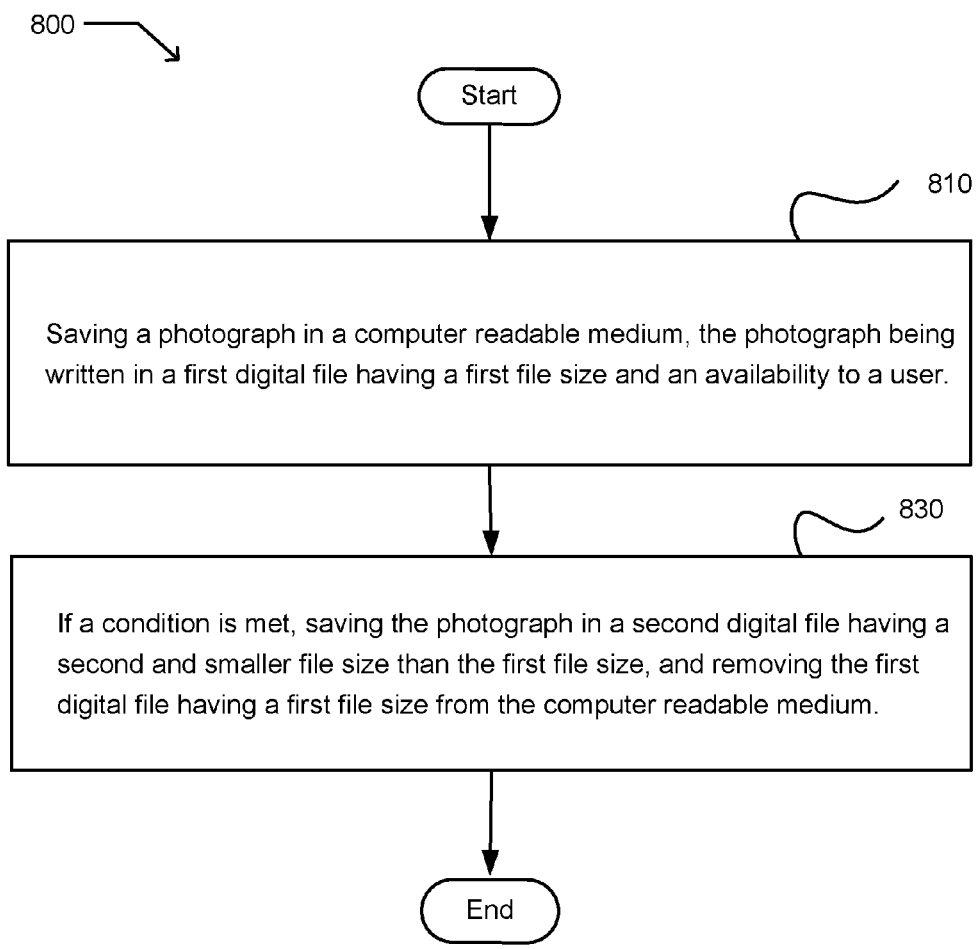
FIG. 11 illustrates an exemplary operational flow.

FIG. 11 illustrates an exemplary operational flow 800. After a start operation, a storage operation 810 saves a photograph in a computer readable medium, the photograph being written in a first digital file having a first file size and an availability to a user. For example, in an embodiment, after a raw image is processed, data representative of the photograph is written into a semi-permanent or permanent storage medium for a later retrieval. A reduction operation 830 saves the photograph in a second digital file having a second and smaller file size than the first file size, and removes the first digital file having a first file size from the computer readable medium, both if a condition is met. The operational flow then proceeds to an end operation.

In an embodiment, a photograph may include a single picture of a scene, a stream of pictures of a scene that may be static or dynamic, and/or a combination thereof. In another embodiment, the image acquisition module operable to capture an image includes an image acquisition module operable to capture at least one of a visual picture, a sound, and/or a combination thereof.

Figure 12:
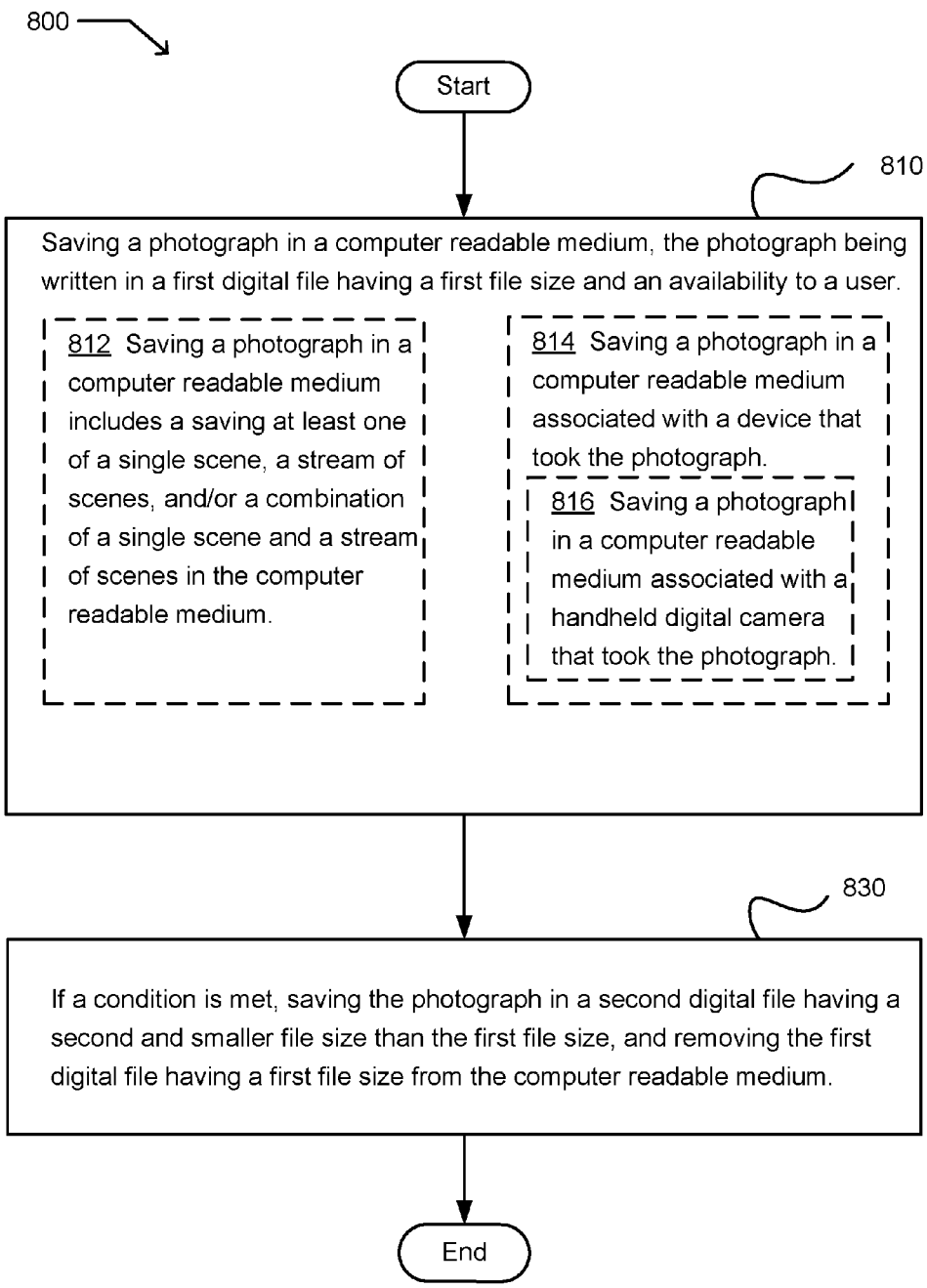
FIG. 12 illustrates an alternative embodiment of the exemplary operational flow of FIG. 11.

FIG. 12 illustrates an alternative embodiment of the exemplary operational flow 800 of FIG. 11. The storage operation 810 may include at least one additional operation. The at least one additional operation may include an operation 812 and/or an operation 814. At the operation 812, the saving a photograph in a computer readable medium includes a saving at least one of a single scene, a stream of scenes, and/or a combination of a single scene and a stream of scenes in the computer readable medium. The operation 814 saves a photograph in a computer readable medium associated with a device that took the photograph. The operation 814 may include at least one additional operation, such as the operation 816. The operation 816 saves a photograph in a computer readable medium associated with a handheld digital camera that took the photograph.

Figure 13:
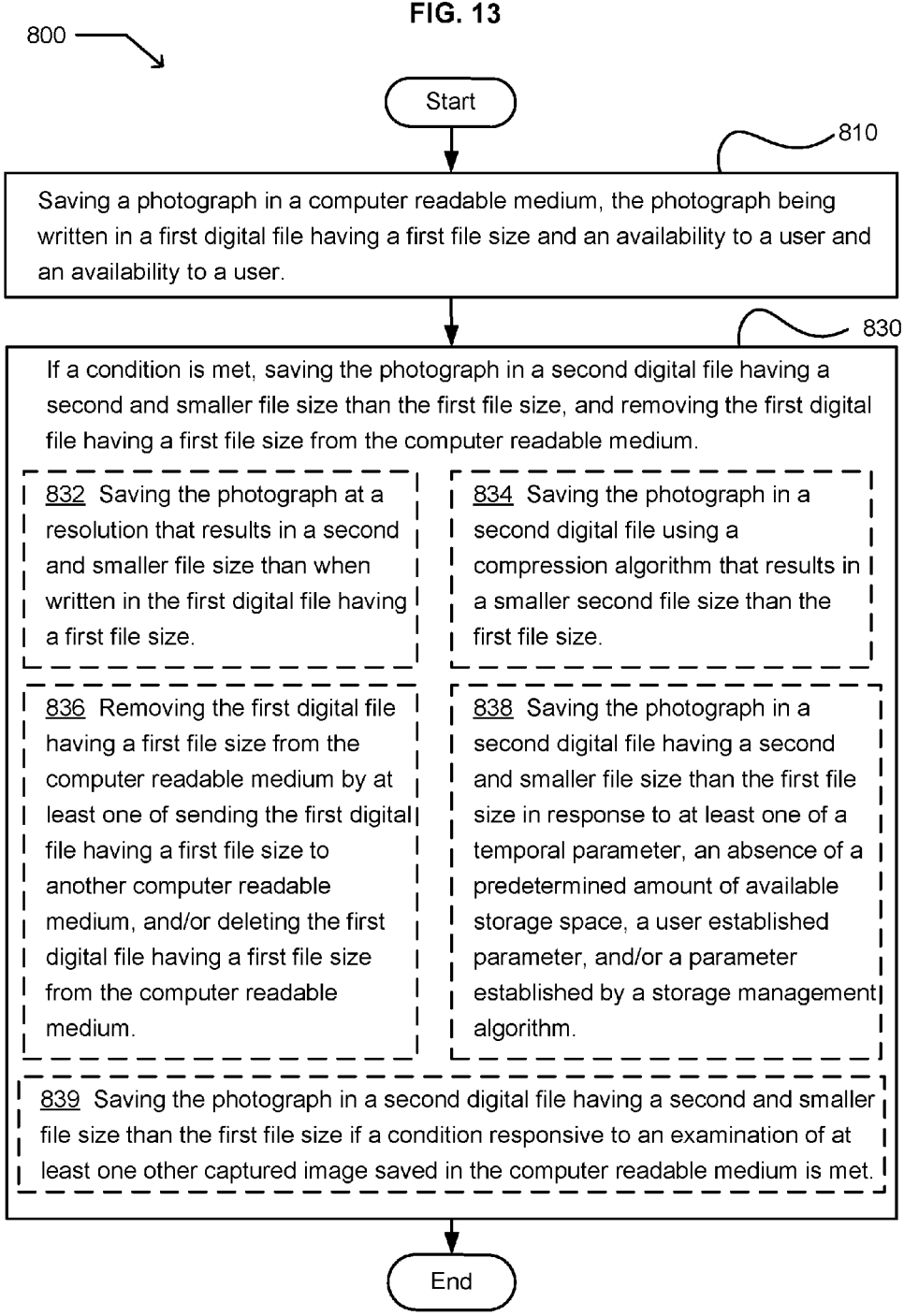
FIG. 13 illustrates an alternative embodiment of the exemplary operational flow of FIG. 11.

FIG. 13 illustrates an alternative embodiment of the exemplary operational flow 800 of FIG. 11. The reduction operation 830 may include at least one additional operation. The at least one additional operation may include an operation 832, an operation 834, and operation 836, an operation 838 and/or an operation 839. The operation 832 saves the photograph at a resolution that results in a second and smaller file size than when written in the first digital file having a first file size. The operation 834 saves the photograph in a second digital file using a compression algorithm that results in a smaller second file size than the first file size.

The operation 836 removes the first digital file having a first file size from the computer readable medium by at least one of sending the first digital file having a first file size to another computer readable medium, and/or deleting the first digital file having a first file size from the computer readable medium. For example, the first digital file may be removed from the computer readable medium and sent to another computer readable medium. The another computer readable medium may be permanently or removably associated with an electronic device that is also associated with the computer readable medium, such as a flash memory card or an external hard drive. Alternatively, the another computer readable medium may be permanently or removably associated with another electronic device, such as a computing device or digital camera. The operation 838 saves the photograph in a second digital file having a second and smaller file size than the first file size in response to at least one of a temporal parameter, an absence of a predetermined amount of available storage space, a user established parameter, and/or a parameter established by a storage management algorithm. For example, a temporal parameter may include an elapsed time since the photograph was taken, or last viewed. An absence of a predetermined amount of available storage space may include less than a percentage of the computer readable medium being available for a storage of new data; e.g., less than 10% of a flash memory card being available. Alternatively, the absence of a predetermined amount of available storage space may include less than a preselected storage capacity being available, such as 500 KB, or 1 MB. A storage management algorithm may include an algorithm that characterizes factors that limit the amount of photographs, and alternatively other files, that may be saved on the computer readable medium, and manages the size of at least one of the digital files. The operation 839 saves the photograph in a second digital file having a second and smaller file size than the first file size if a condition responsive to an examination of at least one other captured image saved in the computer readable medium is met.

Figure 14:
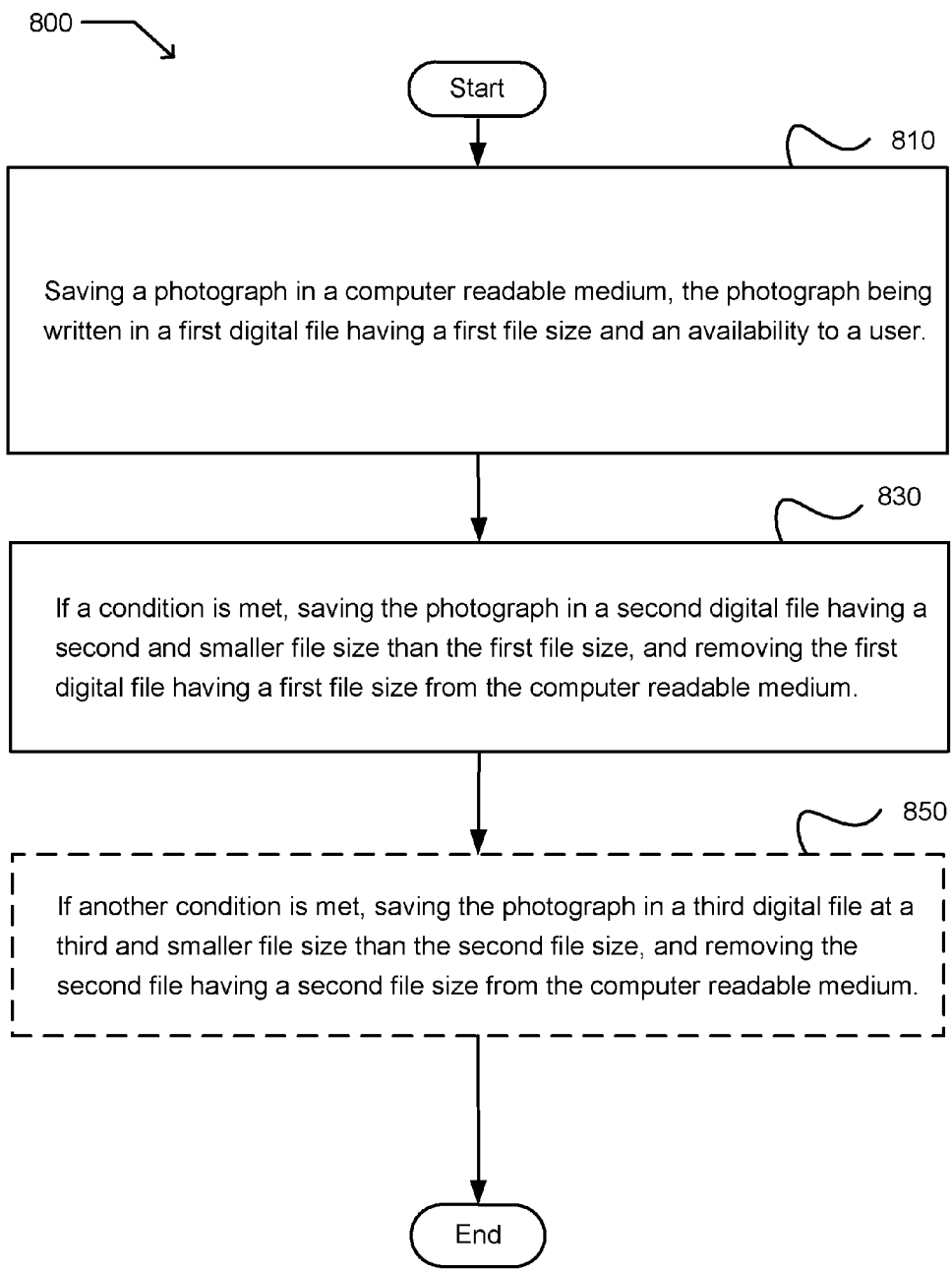
FIG. 14 illustrates another alternative embodiment of the exemplary operational flow of FIG. 11.

FIG. 14 illustrates another alternative embodiment of the exemplary operational flow 800 of FIG. 11. The exemplary operational flow may include at least one additional operation, such as another reduction operation 850. If another condition is met, the another reduction operation saves the photograph in a third digital file at a third and smaller file size than the second file size and removes the second file having a second file size from the computer readable medium.

Figure 15:
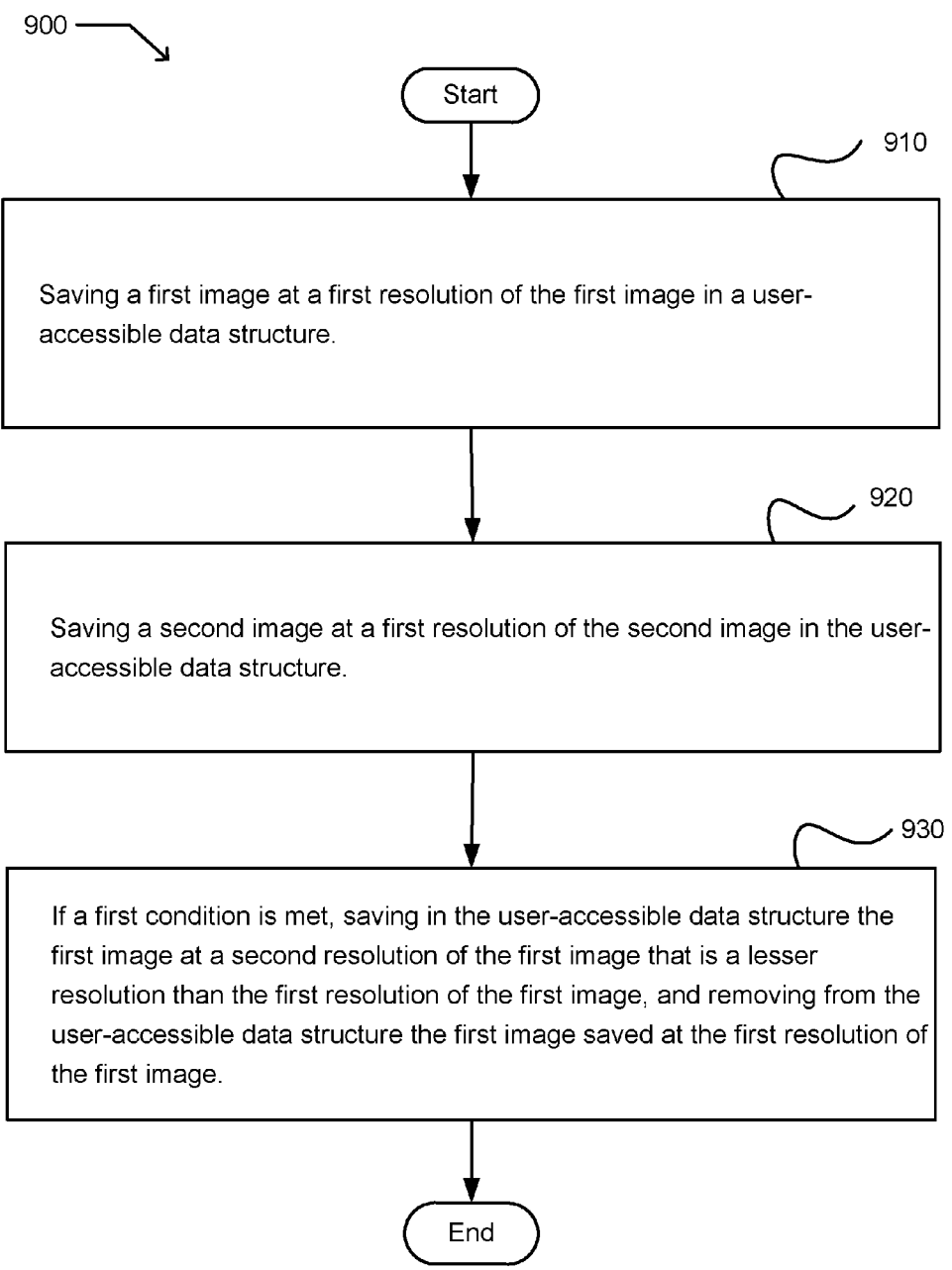
FIG. 15 illustrates an exemplary operational flow.

FIG. 15 illustrates an exemplary operational flow 900. After a start operation, the exemplary operational flow moves to a first storage operation 910. The first storage operation saves a first image at a first resolution of the first image in a user-accessible data structure. A second storage operation 920 saves a second image at a first resolution of the second image in the user-accessible data structure. If a condition is met, a degradation operation 930 saves in the user-accessible data structure the first image at a second resolution of the first image that is a lesser resolution than the first resolution of the first image, and removes from the user-accessible data structure the first image saved at the first resolution of the first image. In an embodiment, the degradation operation 930 may be performed before or after the second storage operation. The operational flow then moves to an end operation.

Figure 16:
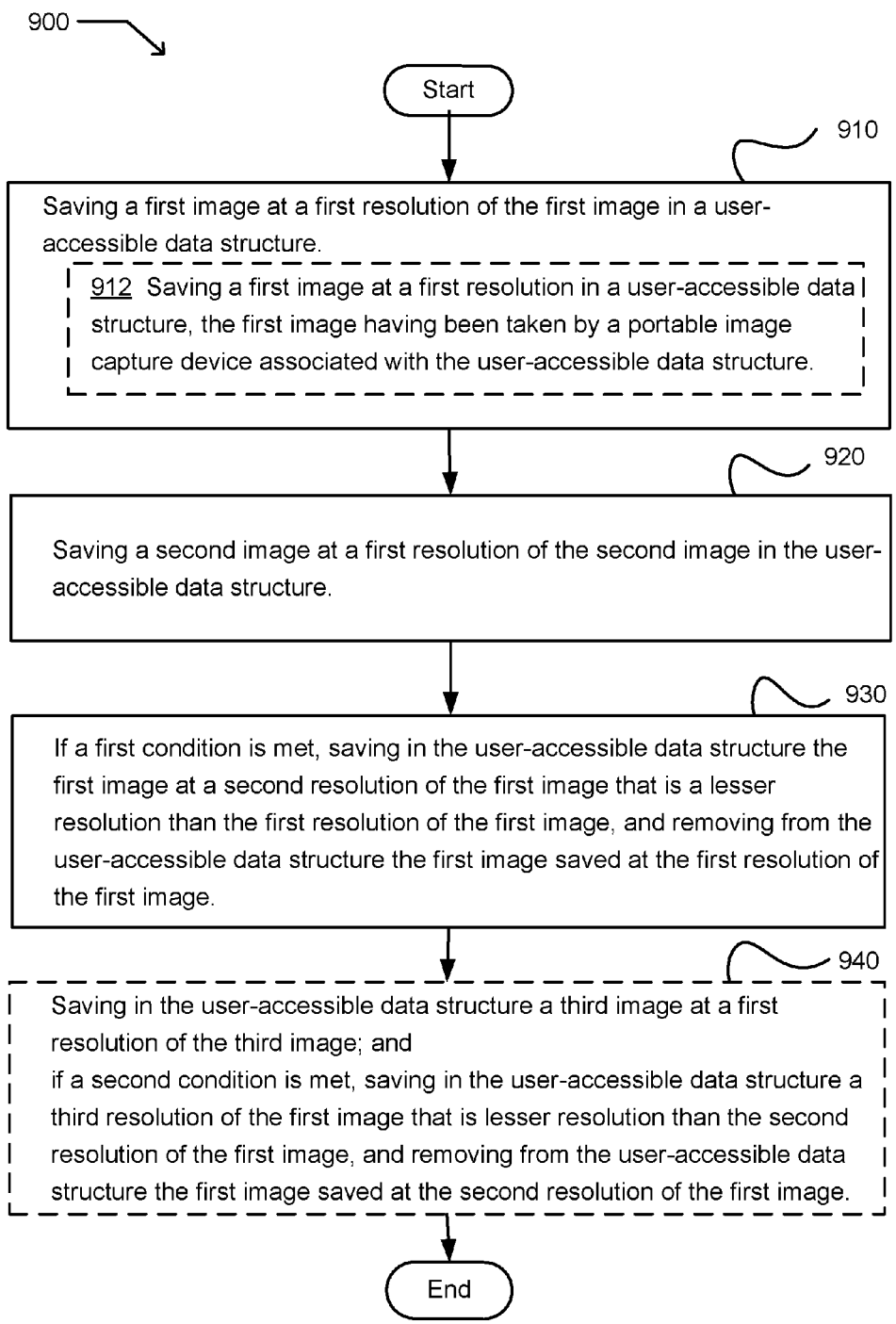
FIG. 16 illustrates another embodiment of the exemplary operational flow of FIG. 15.

FIG. 16 illustrates another embodiment of the exemplary operational flow 900 of FIG. 15. The exemplary operational flow may include at least one additional operation. An additional operation may include a third storage operation 940. The third storage operation 940 includes saving in the user-accessible data structure a third image at a first resolution of the third image. If a second condition is met, the third storage operation also includes saving in the user-accessible data structure a third resolution of the first image that is lesser resolution than the second resolution of the first image, and removing from the user-accessible data structure the first image saved at the second resolution of the first image.

Figure 17:
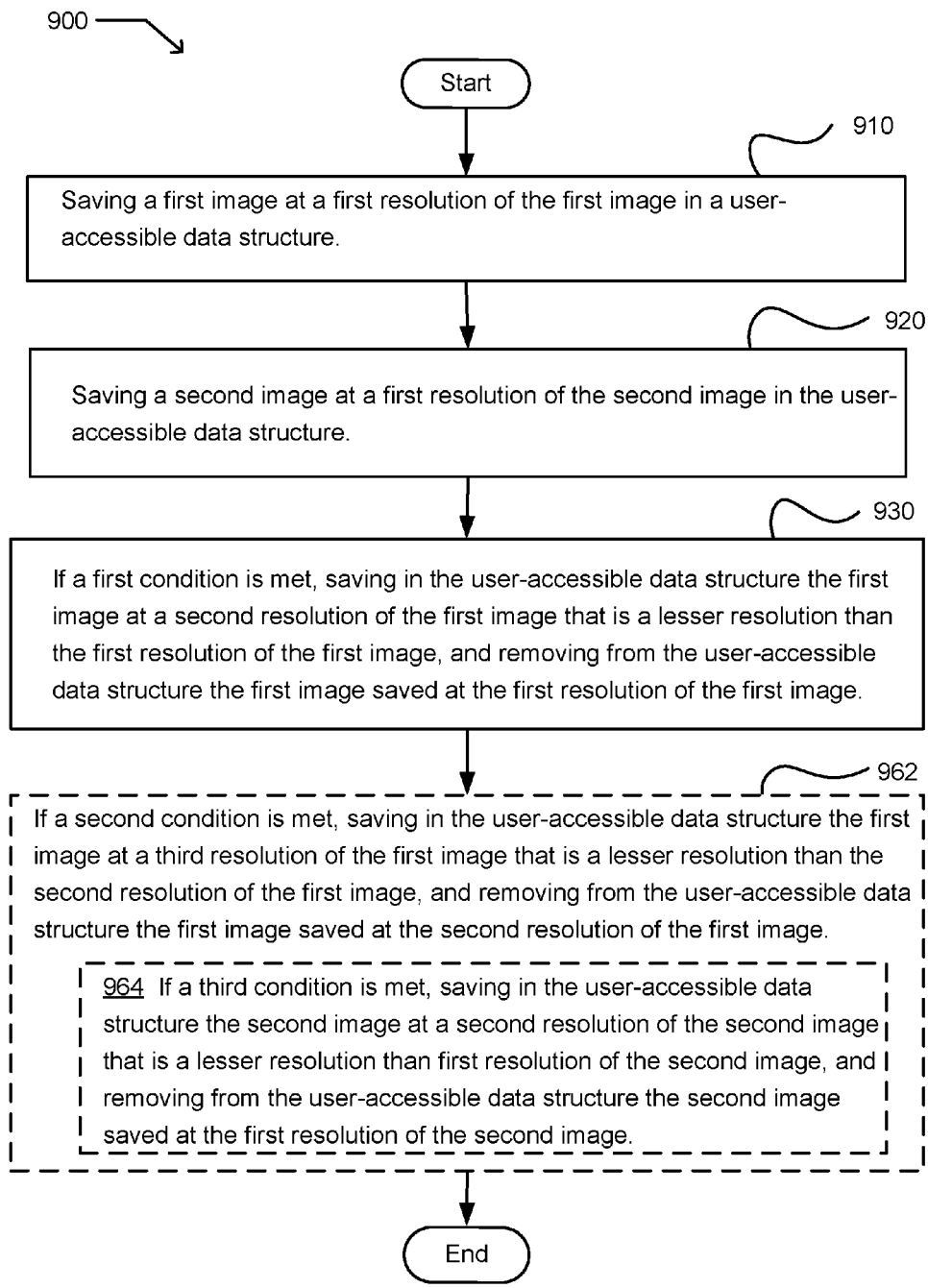
FIG. 17 illustrates a further embodiment of the exemplary operational flow of FIG. 15.

FIG. 17 illustrates a further embodiment of the exemplary operational flow 900 of FIG. 15. The exemplary operational flow may include at least one another additional operation. Another additional operation may include another third storage operation 962. If a second condition is met, the another third storage operation includes saving in the user-accessible data structure a third resolution of the first image that is lesser resolution than the second resolution of the first image, and removing from the user-accessible data structure the first image saved at the second resolution of the first image. The operation 962 may include at least one additional operation, such as the operation 964. If a third condition is met, the operation 964 saves in the user-accessible data structure the second image at a second resolution of the second image that is a lesser resolution than first resolution of the second image, and removes from the user-accessible data structure the second image saved at the first resolution of the second image.

Figure 18:
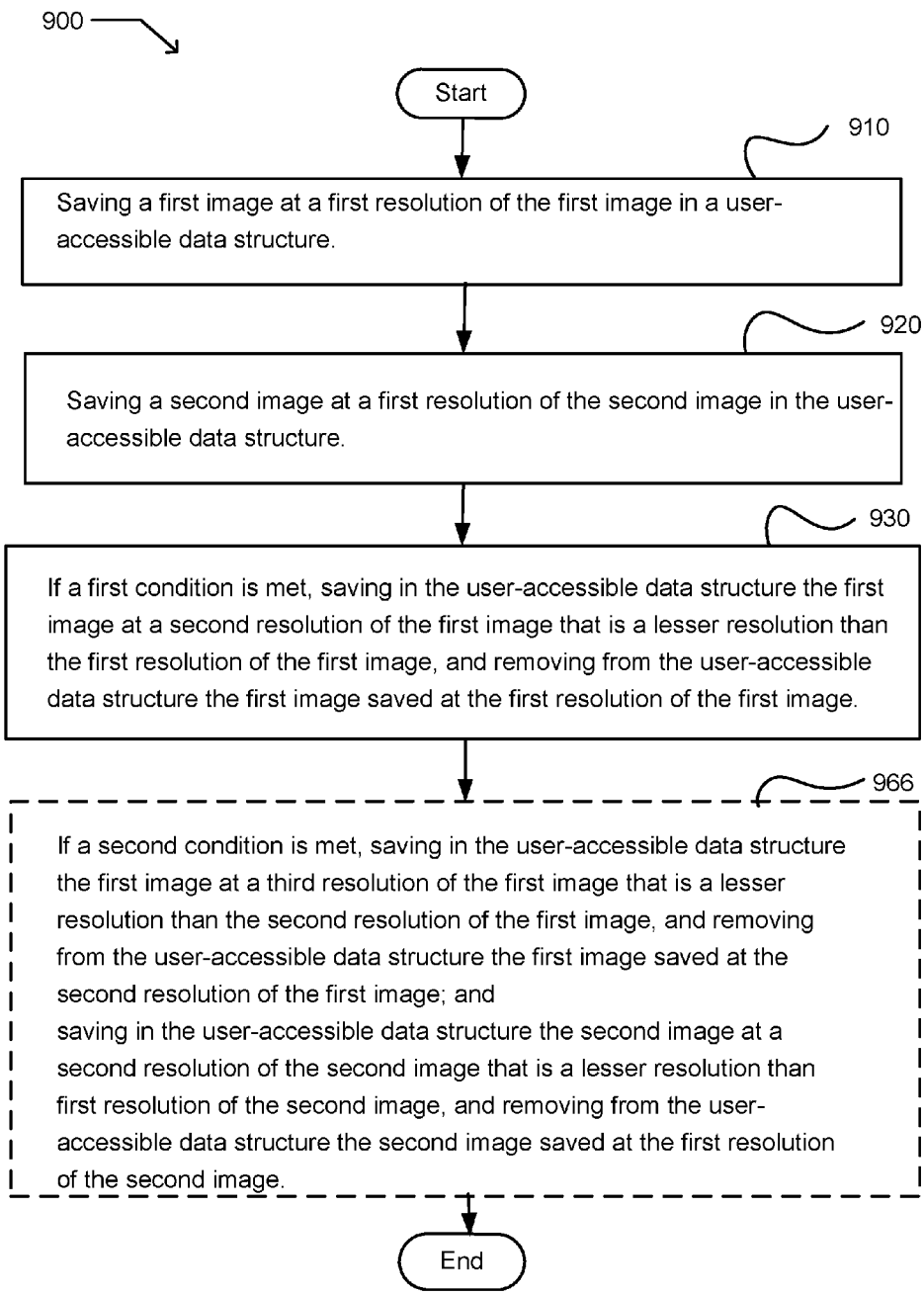
FIG. 18 illustrates a further embodiment of the exemplary operational flow of FIG. 15.

FIG. 18 illustrates a further embodiment of the exemplary operational flow 900 of FIG. 15. The exemplary operational flow may include at least one further additional operation. A further additional operation may include an operation 966. If a second condition is met, the operation 966 saves in the user-accessible data structure the first image at a third resolution of the first image that is a lesser resolution than the second resolution of the first image, and removes from the user-accessible data structure the first image saved at the second resolution of the first image. Also if the second condition is met, the operation 966 saves in the user-accessible data structure the second image at a second resolution of the second image that is a lesser resolution than first resolution of the second image, and removing from the user-accessible data structure the second image saved at the first resolution of the second image.

Figure 19:
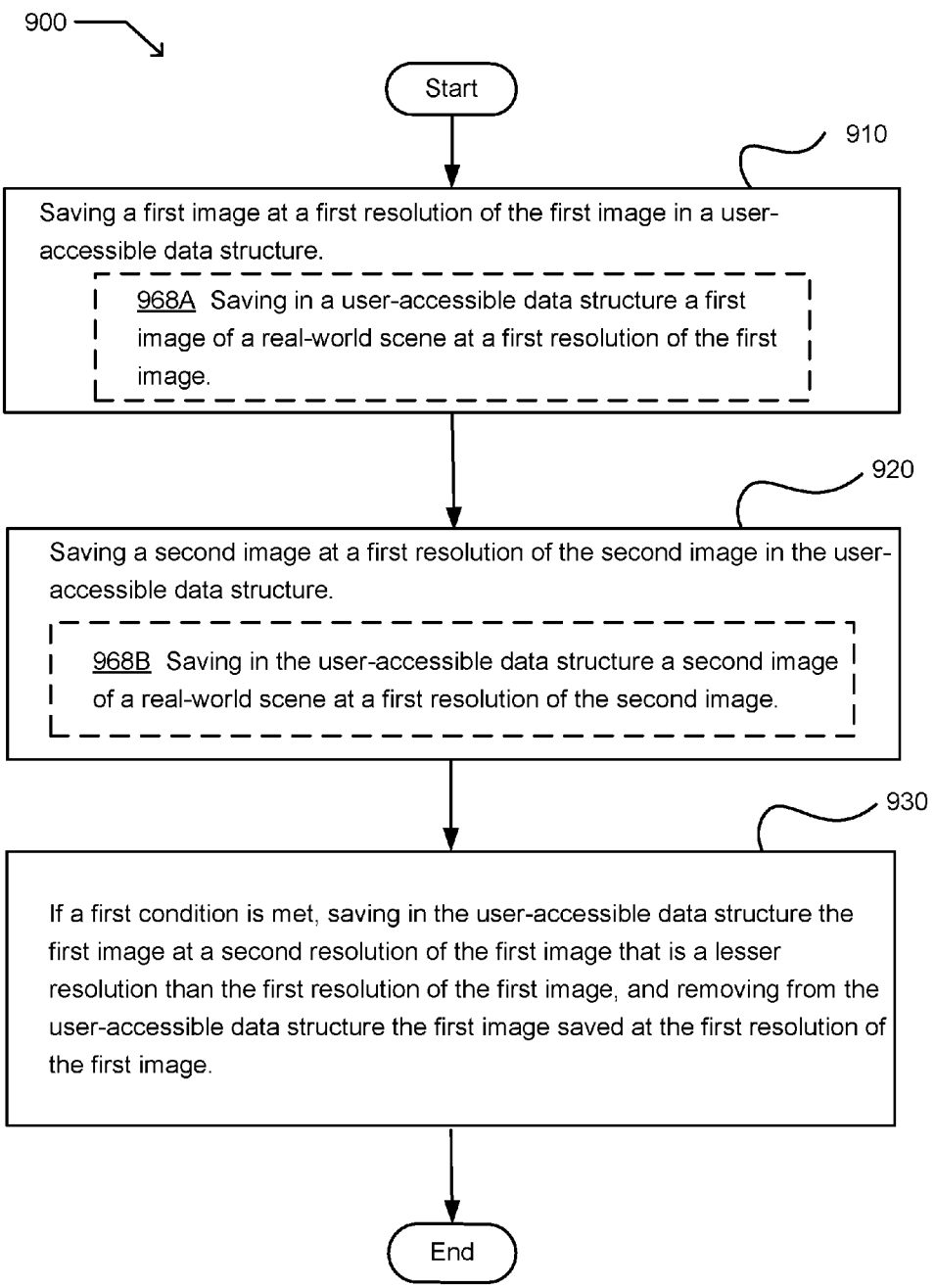
FIG. 19 illustrates another embodiment of the exemplary operational flow of FIG. 15.

FIG. 19 illustrates another embodiment of the exemplary operational flow 900 of FIG. 15. The exemplary operational flow may include at least one further additional operation. A further additional operation may include an operation 968, which comprises an operation 986A and an operation 968B. At the operation 968A, the saving in a user-accessible data structure a first image at a first resolution of the first image includes saving in a user-accessible data structure a first image of a real-world scene at a first resolution of the first image. At the operation 968B, saving in the user-accessible data structure a second image at a first resolution of the second image includes saving in the user-accessible data structure a second image of a real-world scene at a first resolution of the second image.

FIGS. 20A-D illustrates an embodiment 870 of the exemplary operational flow 800 of FIG. 16. The embodiment 870 of the exemplary operational flow 800 is described using the exemplary system 300 and digital camera 310 of FIG. 3 as an example. In operation of an embodiment of the digital camera 310, a user may compose a first picture/image by orientating the lens 360 toward a subject in a first scene. The user may communicate their preferences about the first composed picture to the digital camera using elements of the user interface 370. Upon shutter activation, an imaging chip of the image acquisition module 320 generates electrical signals corresponding to the first picture/image in a raw format. A processing unit 350 and/or an image management module 330 of the digital camera decodes and/or processes the first image in the raw format into a format, such as a JPEG format, a GIF format, a TIFF format, or a PDF format. The decoding and/or processing typically involves the system memory 355 of FIG. 3. The image management module 330 then saves the first image 972 in a post-decoded/processed format, such as the JPEG format, at a first resolution of the first image in a user-accessible data structure, illustrated as the user-accessible data structure 340 of FIG. 3. FIG. 20A illustrates the first image in the post-decoded/processed format saved in a file at a first resolution of the first image in the user-accessible data structure 980, such as the JPEG format. In an alternative embodiment, the first image may be saved in a raw format in the user-accessible data structure.

For a second image, the user may compose a second picture/image by orientating the lens 360 toward a subject in a second scene as above. The image management module 330 saves the second image 974 at a first resolution of the second image in the computer readable medium 980. FIG. 20A illustrates the second image in a post-decoded/processed format in a saved file at a first resolution of the second image in the user-accessible data structure, such as a JPEG format.

FIG. 20B further illustrates an embodiment that may be implemented at any time, such as before the second image is saved at a first resolution of the second image or thereafter. If a first condition is met, the first image 972 is saved in the user-accessible data structure 980 at a second resolution of the first image that is a lesser resolution than the first resolution of the first image. Also if the first condition is met, the first image saved at the first resolution of the first image is removed from the user-accessible data structure. The first condition may include any condition described in this document. An exemplary first condition may include an absence of a predetermined amount of available storage space in the user-accessible data structure.

For a third image, the user may compose a third picture/image by orientating the lens 360 toward a subject in a third scene as above. The image management module 330 saves the third image 976 at a first resolution of the third image in the computer readable medium 980. FIG. 20C illustrates the third image in a post-decoded/processed format in a saved file at a first resolution of the third image in the user-accessible data structure, such as a JPEG format.

FIG. 20D illustrates an embodiment that may be implemented at any time, such as before the third image 976 is saved at a first resolution of the third image or thereafter. If a second condition is met, the first image 972 is saved in the user-accessible data structure 980 at a third resolution of the first image that is a lesser resolution than the second resolution of the first image. Also if the first condition is met, the first image saved at the second resolution of the first image is removed from the user-accessible data structure. The second condition may include any condition described in this document.

FIG. 20D also illustrates another embodiment that may be implemented at any time, such as before the third image 976 is saved at a first resolution of the third image or thereafter. If a third condition is met, the second image 974 is saved in the user-accessible data structure 980 at a second resolution of the second image that is a lesser resolution than the first resolution of the second image. Also if the second condition is met, the second image saved at the second resolution of the second image is removed from the user-accessible data structure. The second condition may include any condition described in this document.

In an embodiment, the first image 972, the second image 974, and/or the third image 976 may be saved in a digital photo album of images and/or a collection of digital images 985 in the user-accessible data structure. In another embodiment, the first image 972, the second image 974, and/or the third image 976 may be received from a source that may or may not have captured the images. These received images may be saved and managed as described in conjunction with FIGS. 16-19.

Figure 21:
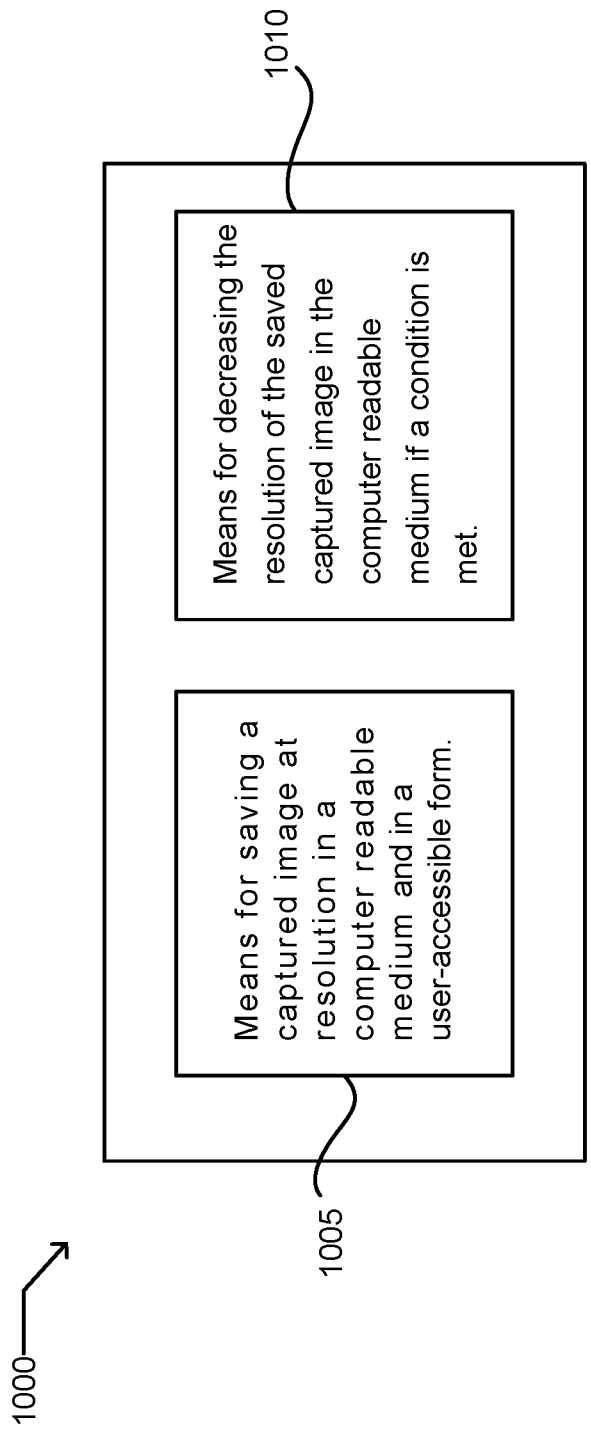
FIG. 21 illustrates an exemplary device in which embodiments may be implemented.

FIG. 21 illustrates an exemplary device 1000 in which embodiments may be implemented. The exemplary device includes means 1005 for saving a captured image at resolution in a computer readable medium and in a user-accessible form. The exemplary device 1010 also includes means 1010 for decreasing the resolution of the saved captured image in the computer readable medium if a condition is met.

Figure 22:
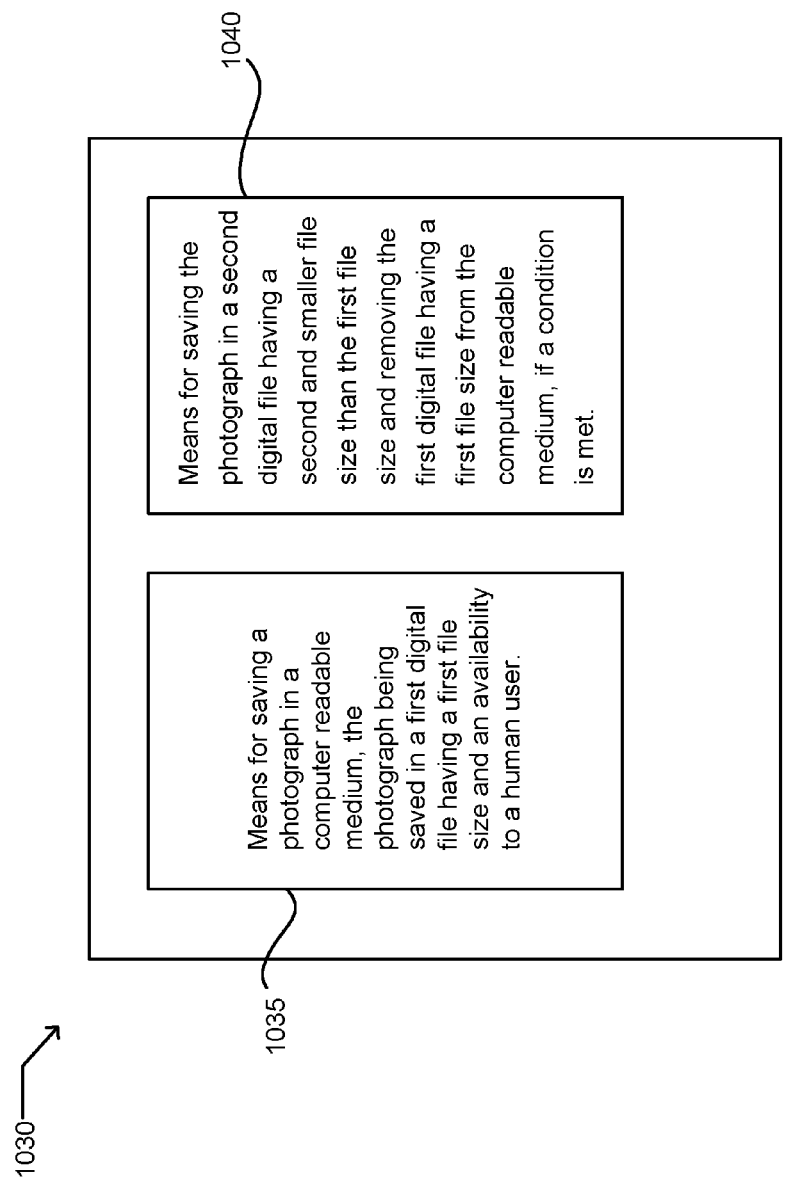
FIG. 22 illustrates another exemplary device in which embodiments may be implemented.

FIG. 22 illustrates another exemplary device 1030 in which embodiments may be implemented. The exemplary device includes means 1035 for saving a photograph in a computer readable medium, the photograph being saved in a first digital file having a first file size and availability to a human user. The exemplary device also includes means 1040 for saving the photograph in a second digital file having a second and smaller file size than the first file size and removing the first digital file having a first file size from the computer readable medium, if a condition is met.

Figure 23:
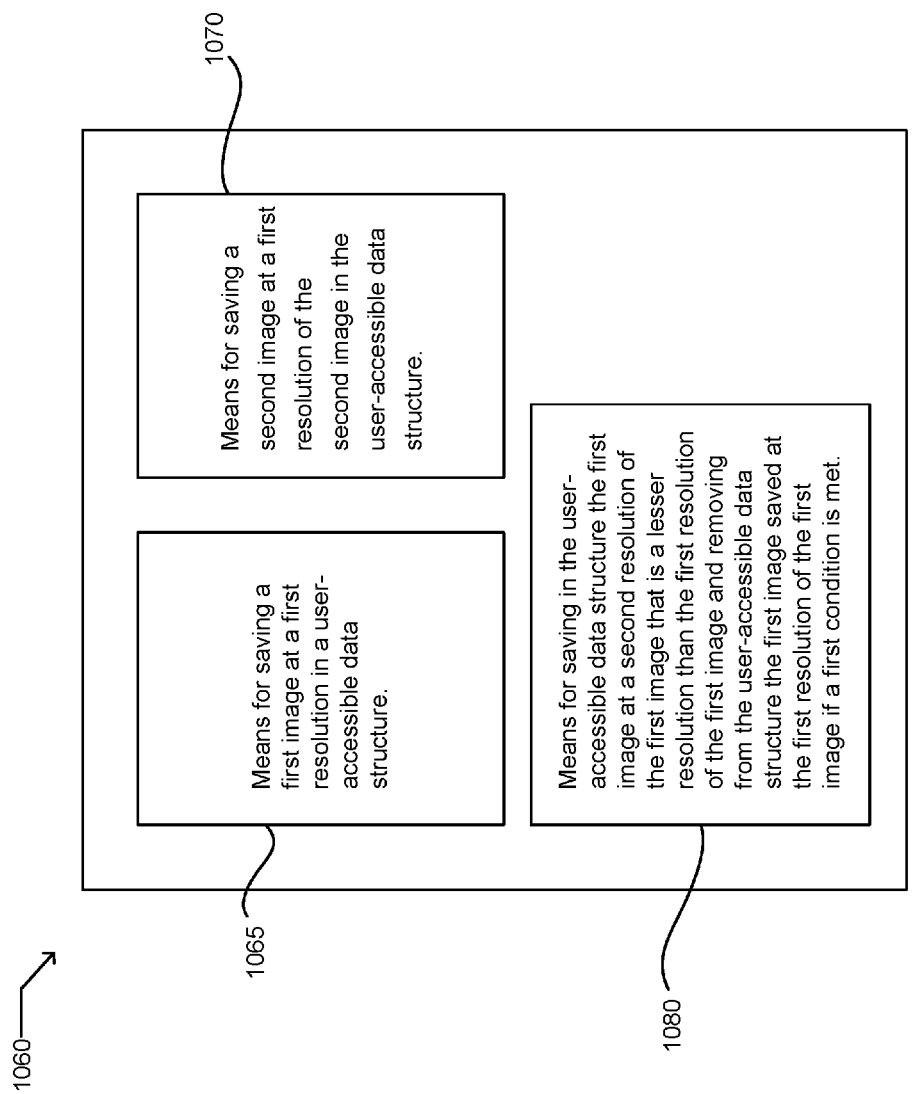
FIG. 23 illustrates a further exemplary device in which embodiments may be implemented.

FIG. 23 illustrates a further exemplary device 1060 in which embodiments may be implemented. The exemplary device includes means 1065 for saving a first image at a first resolution in a user-accessible data structure. The exemplary device also includes means 1070 for saving a second image at a first resolution of the second image in the user-accessible data structure. The exemplary device further includes means 1080 for saving in the user-accessible data structure the first image at a second resolution of the first image that is a lesser resolution than the first resolution of the first image and removing from the user-accessible data structure the first image saved at the first resolution of the first image if a first condition is met.

Figure 24:
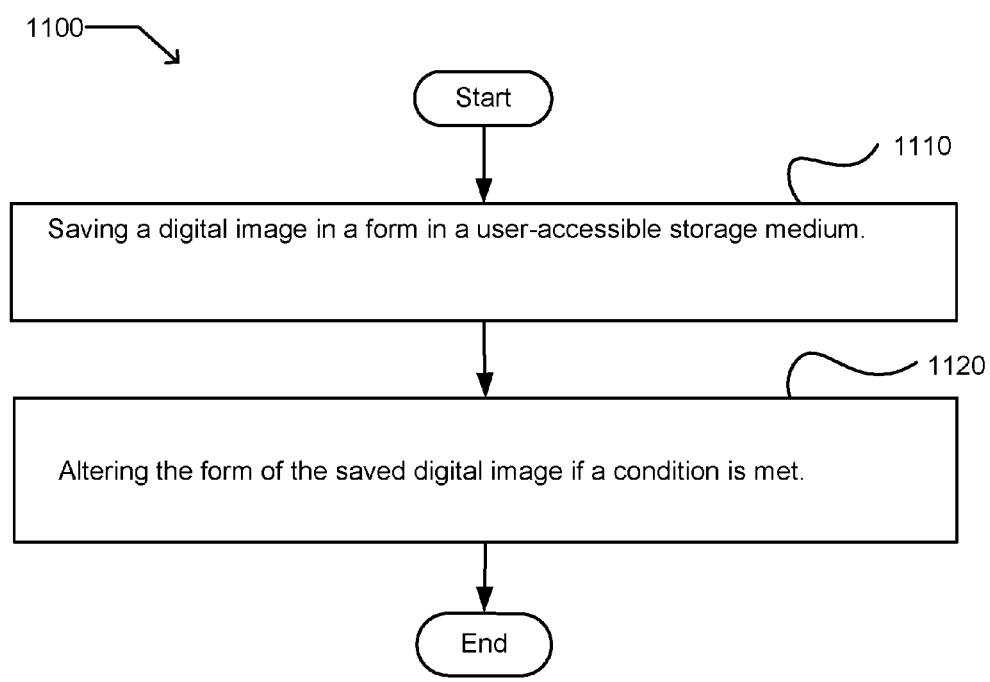
FIG. 24 illustrates an exemplary operational flow in which embodiments may be implemented.

FIG. 24 illustrates an exemplary operational flow 1100 in which embodiments may be implemented. After a start operation, the exemplary operational flow moves to a hold operation 1110. The hold operation saves a digital image in a form in a user-accessible storage medium. A change operation 1120 alters the form of the saved digital image if a condition is met. The operational flow then proceeds to an end operation.

Figure 25:
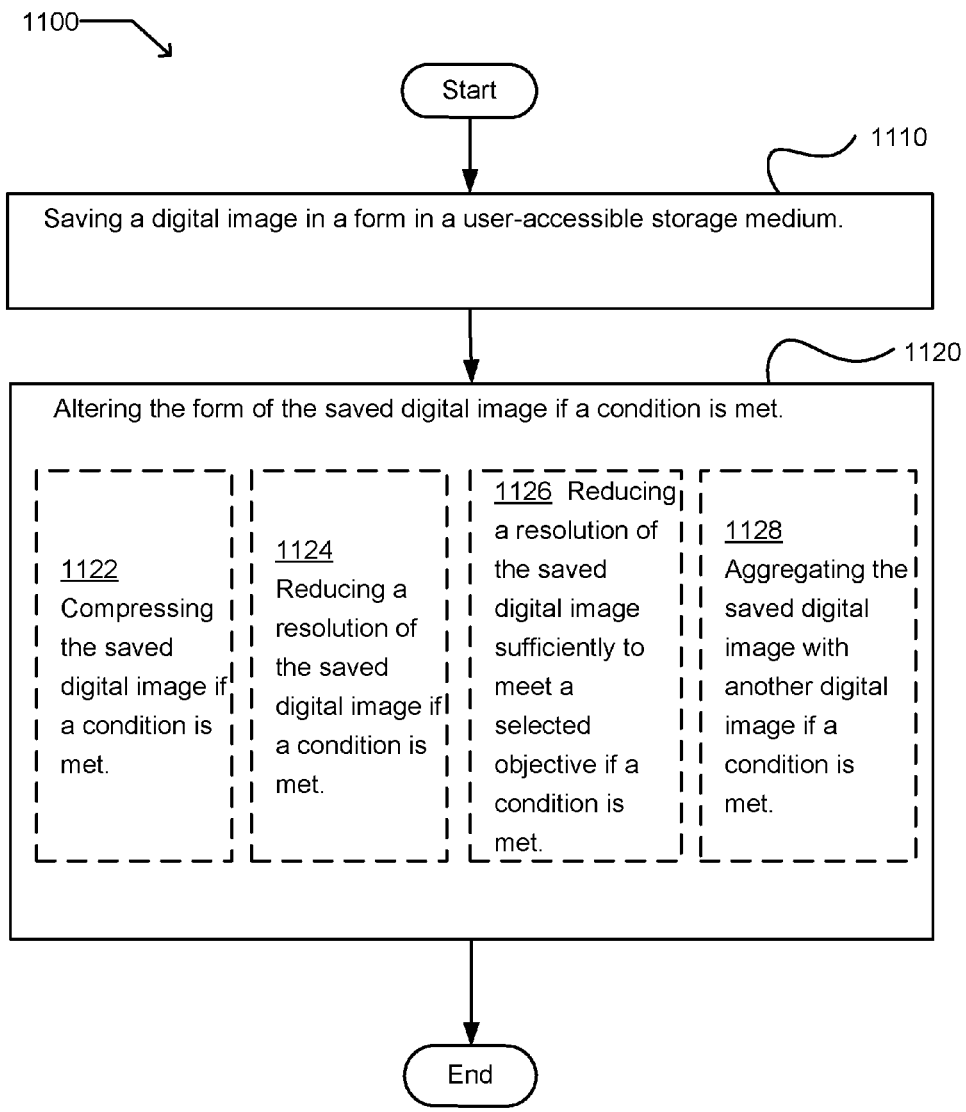
FIG. 25 illustrates an alternative embodiment of the exemplary operational flow of FIG. 24.

FIG. 25 illustrates an alternative embodiment of the exemplary operational flow 1100 of FIG. 24. The change operation 1120 may include at least one additional operation. The at least one additional operation may include an operation 1122, an operation 1124, an operation 1126, and/or an operation 1128. If a condition is met, the operation 1122 compresses the saved digital image. If a condition is met, the operation 1124 reduces a resolution of the saved digital image. If a condition is met, the operation 1126 reduces a resolution of the saved digital image sufficiently to meet a selected objective. For example, the selected objective may include a preselected objective or a substantially contemporaneously selected objective. By way of another example, a selected objective may include constructing a panorama that includes the digital image, creating a high dynamic range composite that includes the digital image, and/or a selected depth of field. If a condition is met, the operation 1128 aggregates the saved digital image with another digital image.

Figure 26:
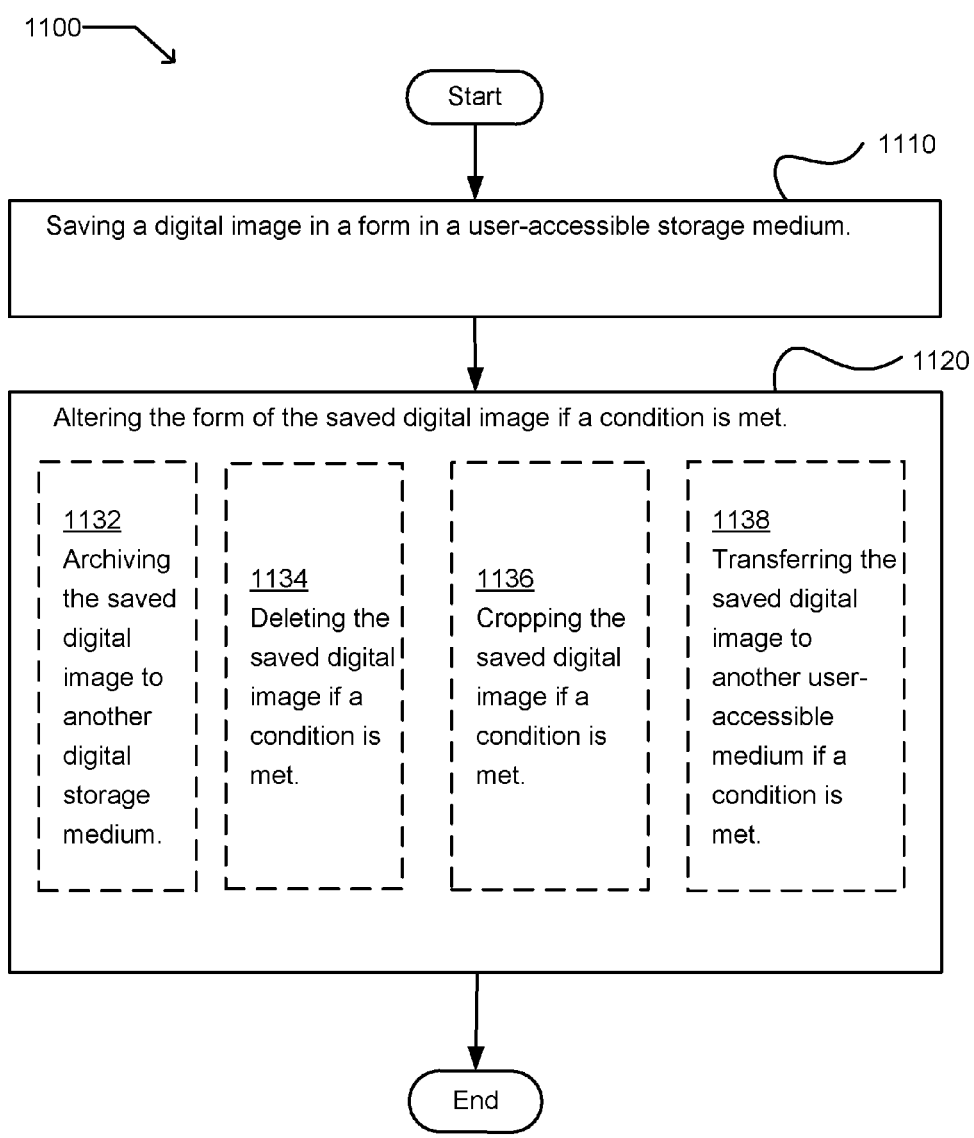
FIG. 26 illustrates another alternative embodiment of the exemplary operational flow of FIG. 24.

FIG. 26 illustrates another alternative embodiment of the exemplary operational flow 1100 of FIG. 24. The change operation 1120 may include at least one additional operation. The at least one additional operation may include an operation 1132, an operation 1134, an operation 1136, and/or an operation 1138. If a condition is met, the operation 1132 archives the saved digital image to another user-accessible storage medium. If a condition is met, the operation 1134 deletes the saved digital image. If a condition is met, the operation 1136 crops the saved digital image. If a condition is met, the operation 1138 transfers the saved digital image to another user-accessible storage medium.

Figure 27:
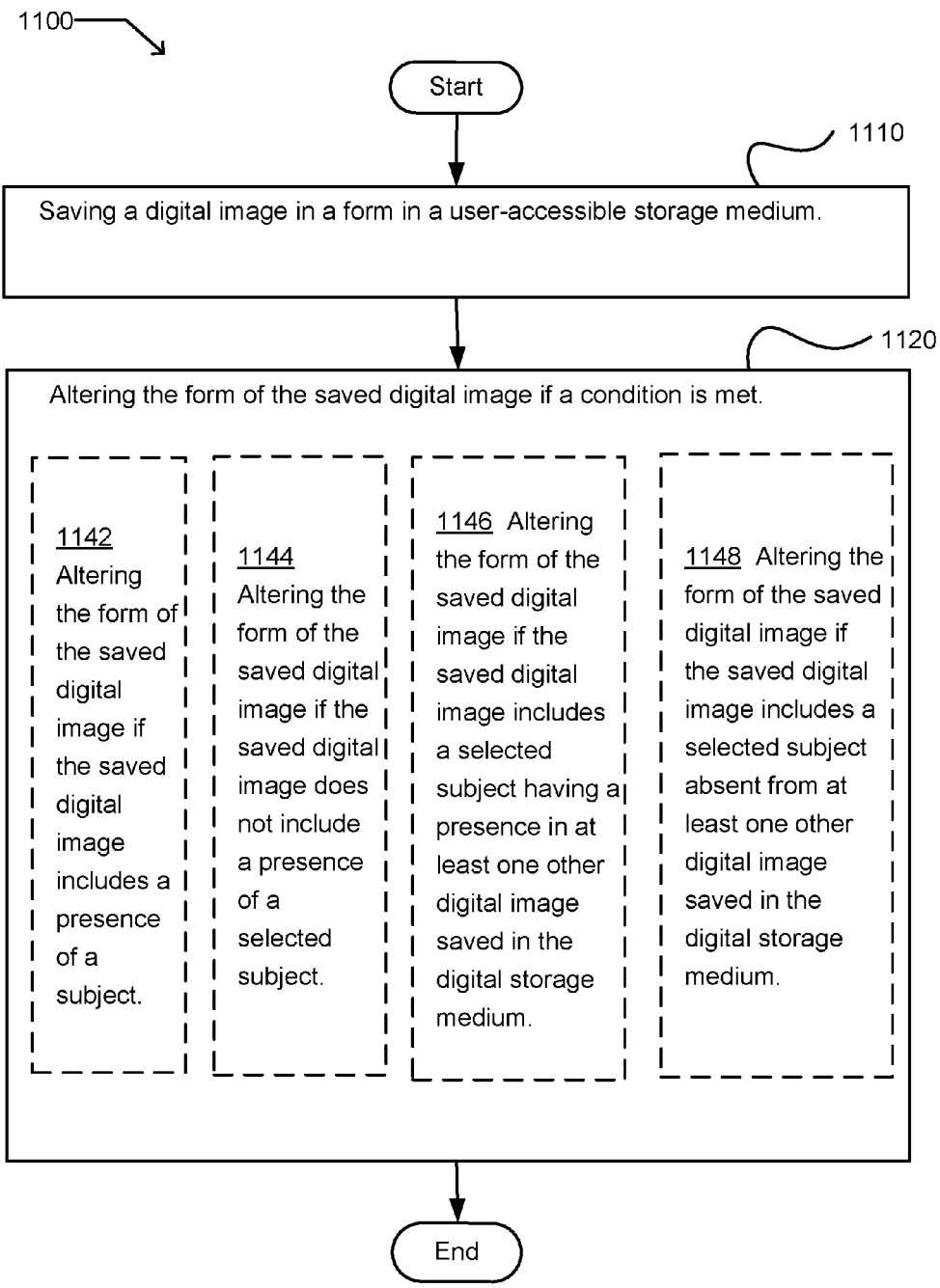
FIG. 27 illustrates a further alternative embodiment of the exemplary operational flow of FIG. 24.

FIG. 27 illustrates a further alternative embodiment of the exemplary operational flow 1100 of FIG. 24. The change operation 1120 may include at least one additional operation. The at least one additional operation may include an operation 1142, an operation 1144, an operation 1146, and/or an operation 1148. If a condition is met, the operation 1142 alters the form of the saved digital image if the saved digital image includes a presence of a selected subject. If a condition is met, the operation 1144 alters the form of the saved digital image if the saved digital image does not include a presence of a selected subject. If a condition is met, the operation 1146 alters the form of the saved digital image if the saved digital image includes a presence of a selected subject having a presence in at least one other digital image saved in the user-accessible storage medium. For example, a presence of a selected subject may include a selected frequency of a presence of a selected subject. If a condition is met, the operation 1148 alters the form of the saved digital image if the saved digital image includes a selected subject absent from at least one other digital image saved in the user-accessible storage medium.

Figure 28:
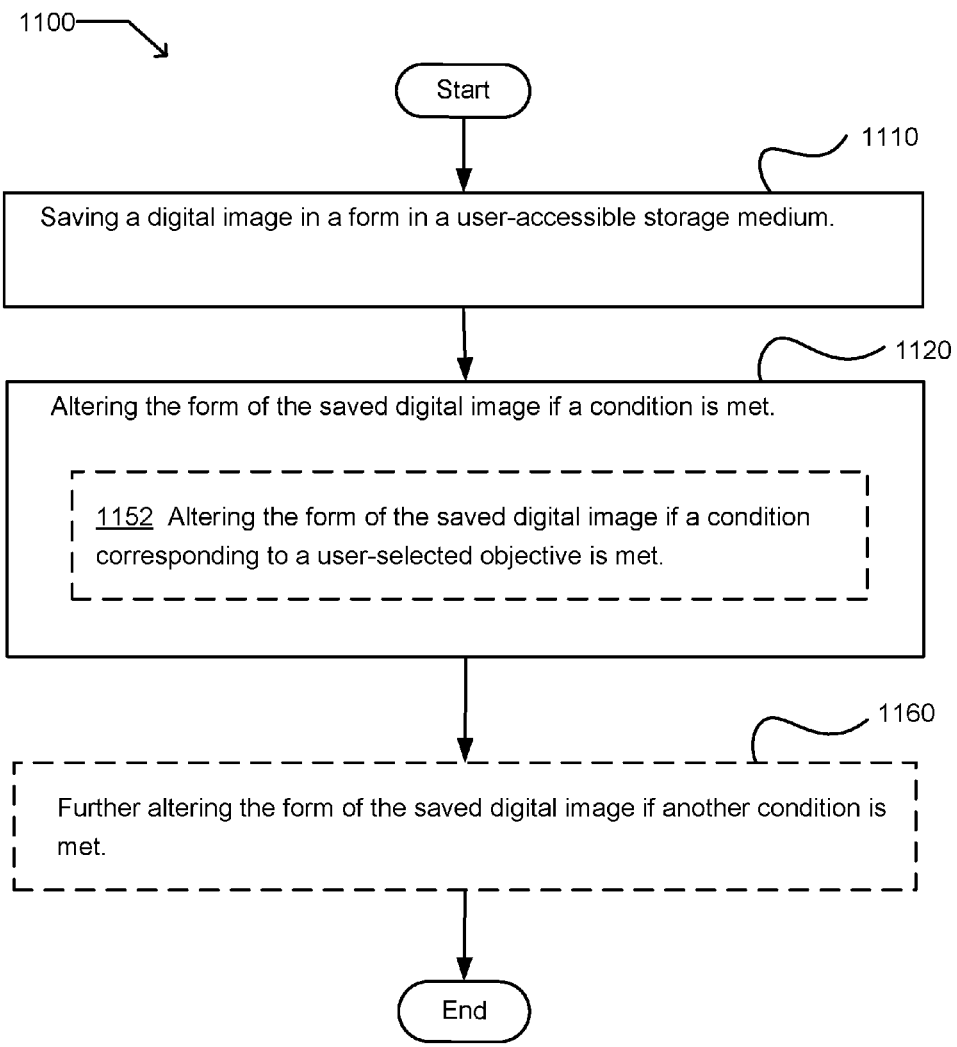
FIG. 28 illustrates an alternative embodiment of the exemplary operational flow of FIG. 24.

FIG. 28 illustrates an alternative embodiment of the exemplary operational flow 1100 of FIG. 24. The change operation 1120 may include at least one additional operation, such as the operation 1152. If a condition is met, the operation 1152 alters the form of the saved digital image if a condition corresponding to a user-selected objective. For example, a user-selected objective may include limiting saved images of my cat in an album or in the computer readable medium to X saved images, and/or saving the digital image to a contact sheet of exemplars and/or thumbnail display if more than Y pictures of subject Z are saved in the computer readable medium. The operational flow 1100 may include at least one additional operation, such as the operation 1160. If a condition is met, the operation 1160 further alters the form of the saved digital image.

Figure 29:
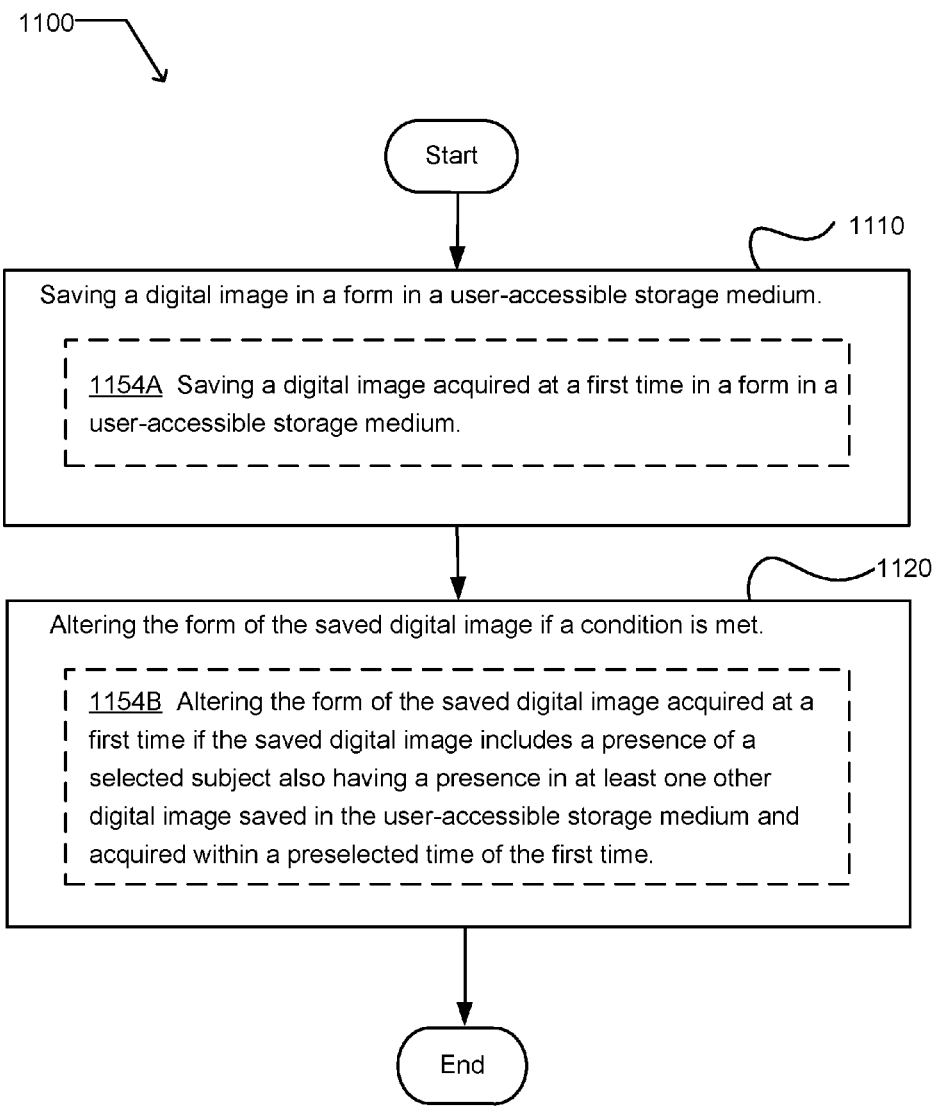
FIG. 29 illustrates an alternative embodiment of the exemplary operational flow of FIG. 24.

FIG. 29 illustrates an alternative embodiment of the exemplary operational flow 1100 of FIG. 24. An additional operation may include an operation 1154, which comprises an operation 1154A and an operation 1154B. At the operation 1154A, the saving a digital image in a form in a user-accessible storage medium includes saving a digital image acquired at a first time in a form in a user-accessible storage medium. The digital image acquired at a first time may include a digital image captured at a first time or a digital image saved at a first time. At the operation 1154B, the altering the form of the saved digital image if a condition is met includes altering the form of the saved digital image acquired at a first time if the saved digital image includes a presence of a selected subject also having a presence in at least one other digital image saved in the user-accessible storage medium and acquired within a preselected time of the first time.

Figure 30:
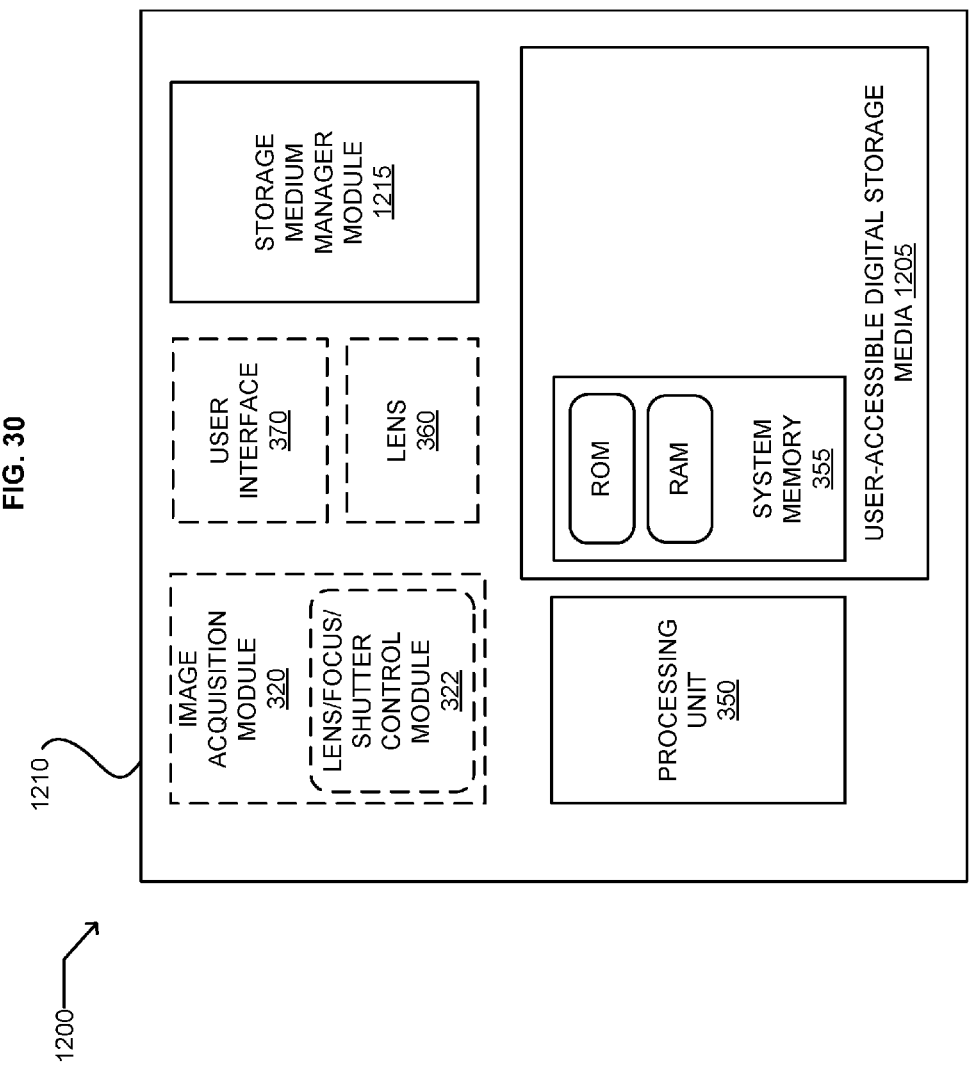
FIG. 30 illustrates an exemplary system in which embodiments may be implemented.

FIG. 30 illustrates an exemplary system 1200 in which embodiments may be implemented. The exemplary system includes a device 1210. The device includes a processing unit, such as the processing unit 350 of FIG. 3, a system memory, such as the system memory 355 of FIG. 3, a storage medium manager module 1215, and a user-accessible digital storage medium, illustrated as the user-accessible digital storage media 1205. In an alternative embodiment, the device may include an image acquisition module, such as the image acquisition module 320 of FIG. 3; a lens, such as the lens 360 of FIG. 3; and/or a user interface, such as the user interface 370 of FIG. 3.

The storage medium manager module 1230 is operable to save a digital image in a form in the user-accessible digital storage medium 1240. The storage medium manager module is also operable to alter the form of the saved digital image if a condition is met. The condition may include at least one of clarifying condition, a user-defined condition, an informed condition, an evaluated condition, and/or a computed condition. An informed condition may include a condition that employs obtained information, in contrast to a condition running autonomously or an uninformed condition. An evaluated condition may include a condition evaluated in response to an internal condition, an external condition, and/or both conditions. A computed condition may include any computed condition, in contrast with a standing condition and/or a normal or native condition related to the digital image and/or the storage medium.

In an embodiment, the storage medium manager module 1230 operable to save a digital image in a form in the user-accessible digital storage medium 1240 includes a storage medium manager module operable to save a digital image of a real-world event in a form in the user-accessible digital storage medium. In another embodiment, the user-accessible digital storage medium includes a user-accessible digital storage medium associated with a digital camera operable to capture the digital image. In a further embodiment, the device 1210 further includes the processing unit 350. In another embodiment, the storage medium manager module further includes a storage medium manager module operable to provide the altered form of the saved digital image.

An embodiment provides a computer program product. The computer program product includes a computer-readable signal-bearing medium bearing program instructions. The program instructions include instructions operable to perform a process in a computing device. The process includes saving a digital image in a form in a user-accessible storage medium, and altering the form of the saved digital image if a condition is met. The computer-readable signal-bearing medium bearing the program instructions may include a computer-storage medium bearing the program instructions. The computer-readable signal-bearing medium bearing the program instructions may include a communications medium bearing the program instructions.

Another embodiment provides a device. The device includes means for saving a digital image in a form in the digital storage medium. The device also includes means for altering the form of the saved digital image if a condition is met.

A further embodiment provides a method. The method includes saving a captured image in a user-accessible memory. The method also includes deallocating at least a portion of the user-accessible memory associated with the saved captured image if a condition is met. In an embodiment, the saving a captured image into a user-accessible memory includes saving a captured image at a resolution into a user-accessible memory. In another embodiment, the deallocating at least a portion of the user-accessible memory associated with the saved captured image if a condition is met includes deallocating at least a portion of the user-accessible memory associated with the saved captured image if a condition is met. In a further embodiment, the deallocating at least a portion of the user-accessible memory associated with the saved captured image if a condition is met includes deallocating at least a portion of the user-accessible memory associated with the saved captured image if a condition is met that includes at least one of a clarifying condition, a user-defined condition, an informed condition, an evaluated condition, and/or a computed condition.

An embodiment provides a device. The device includes a memory and a memory manager. The memory manager includes operability to save a captured image into a user-accessible memory. The memory manager also includes operability to deallocate at least a portion of the memory associated with the resolution if a condition is met.

Another embodiment provides a device. The device includes first means for a holding user-accessible digital data representative of an image. The device also includes second means for saving user-accessible digital data representative of an image in the first means. The device further includes third means for altering the saved user-accessible digital data representative of the saved digital image if a condition is met.

A further embodiment provides a computer program product. The computer program product includes a computer-readable signal-bearing medium bearing program instructions. The program instructions are operable to perform a process in a computing device. The process includes saving a captured image in a memory and in a user-accessible form. The process also includes deallocating at least a portion of the memory associated with the saved captured image if a condition is met. The computer-readable signal-bearing medium bearing the program instructions may include a computer-storage medium bearing the program instructions. The computer-readable signal-bearing medium bearing the program instructions may include a communications medium bearing the program instructions.

An embodiment provides a method. The method includes directing digital data representative of an image to a managed means for holding the digital data representative of an image. The method also includes accepting modified digital data representative of the image, the digital data representative of the image having been modified by deallocating at least a portion of the digital data representative of the image by the managed means for holding digital data upon occurrence of a condition.

Figure 31:
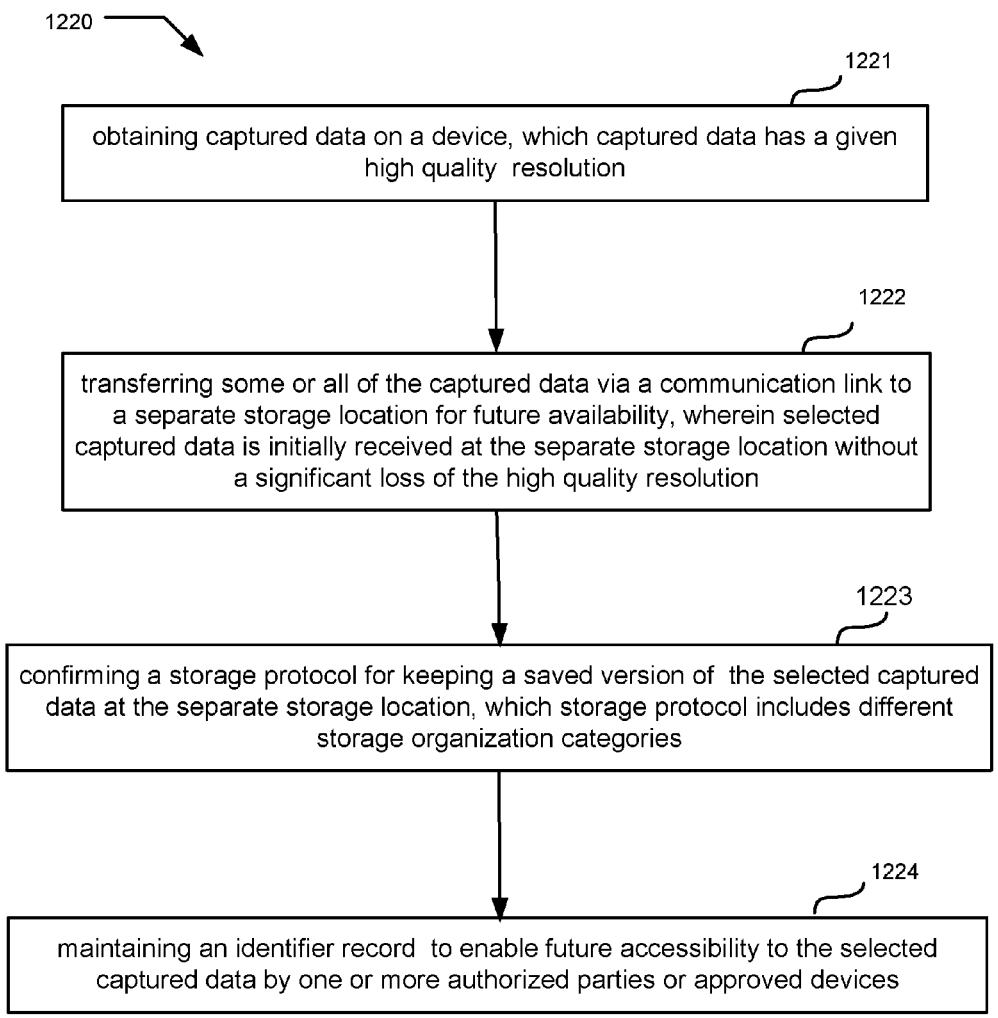
FIG. 31 is a high level flow chart showing an exemplary data storage access embodiment.

Referring to an exemplary high level embodiment 1220 shown in FIG. 31, process components may include obtaining captured data on a device, which captured data has a given high quality resolution (block 1221); transferring some or all of the captured data via a communication link to a separate storage location for future availability, wherein selected captured data is initially received at the separate storage location without a significant loss of the high quality resolution (block 1222); confirming a storage protocol for keeping a saved version of the selected captured data at the separate storage location, which storage protocol includes different storage organization categories (block 1223); and maintaining an identifier record to enable future accessibility to the selected captured data by one or more authorized parties or approved devices (block 1224).

Figure 32:
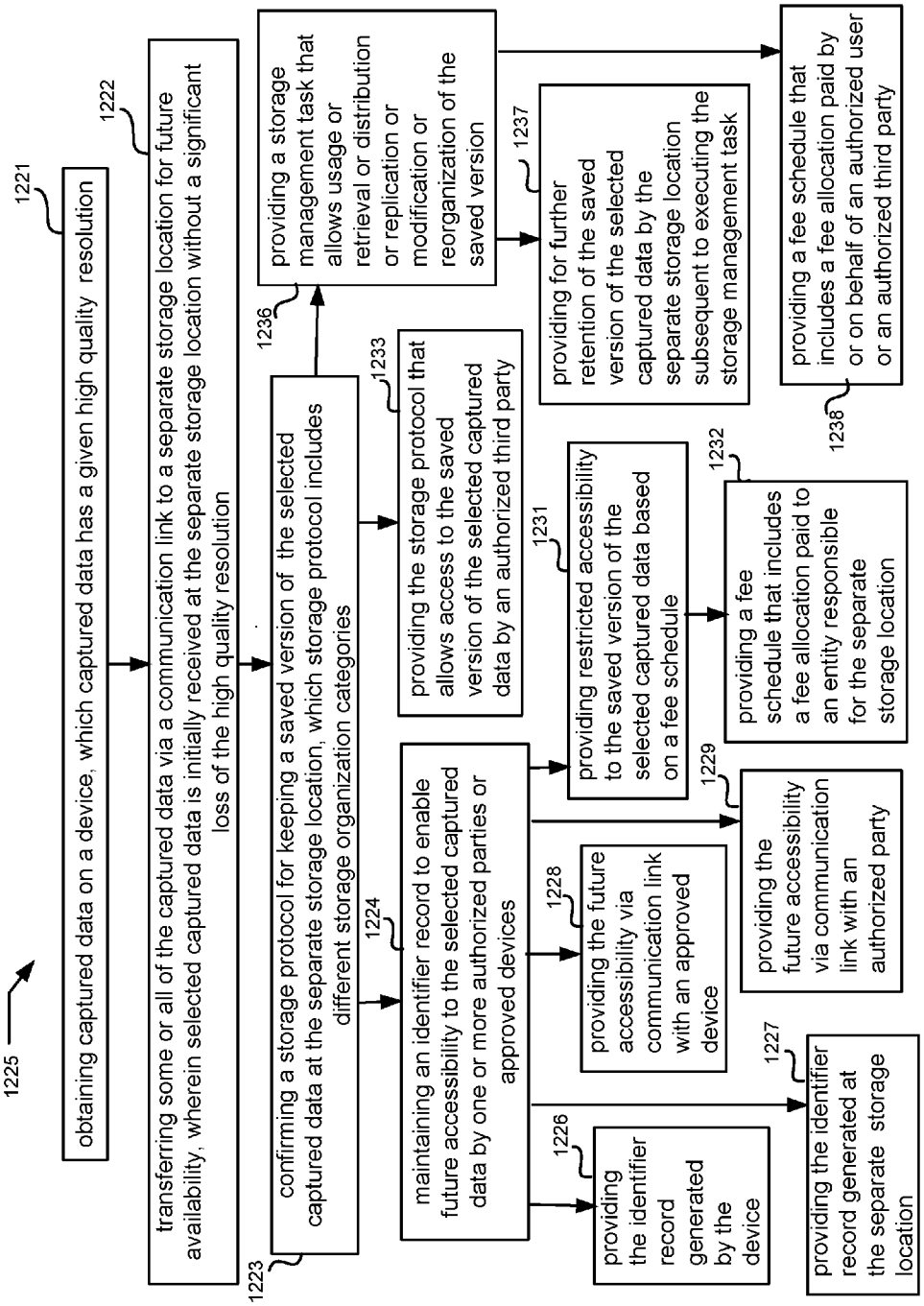
FIGS. 32-41 are more detailed flow charts illustrating further exemplary embodiments.

The flow chart of FIG. 32 discloses additional exemplary embodiments 1225 which may include previously described process features 1221, 1222, 1223, 1224 along with possible attributes relating to the identifier record. For example, an implementation may include providing the identifier record generated by the device (block 1226), and in some instances providing the identifier record generated at the separate storage location (block 1227).

Additional features may include providing the future accessibility via a communication link with an approved device (block 1228), and providing the future accessibility via a communication link with an authorized party (block 1229). Further features may include providing restricted accessibility to the saved version of the selected captured data based on a fee schedule (block 1231) and providing a fee schedule that includes a fee allocation paid to an entity responsible for the separate storage location (block 1232).

Some implementations may provide a storage protocol that allows access to the saved version of the selected captured data by an authorized third party (block 1233). Other possible features may include providing a storage management task that allows usage or retrieval or distribution or replication or modification or reorganization of the saved version of the selected captured data (block 1236), providing for further retention of the saved version of the selected captured data by the separate storage location subsequent to executing the storage management task (block 1237), and providing a fee schedule that includes a fee allocation paid by or on behalf of an authorized user or an authorized third party (block 1238).

Figure 33:
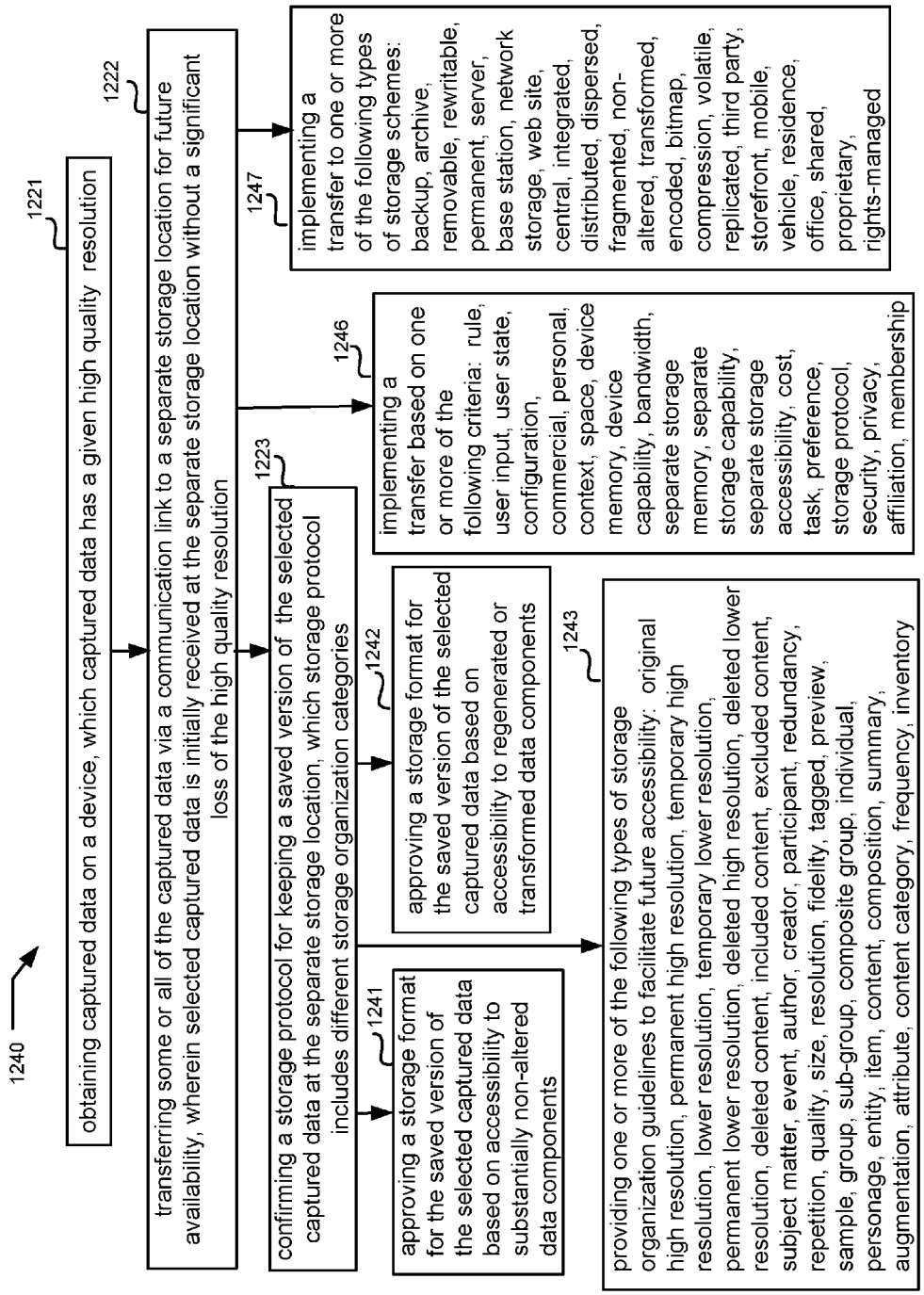

Referring to detailed embodiments 1240 shown in FIG. 33, other embodiments may include previously described process components 1221, 1222, 1223 along with providing one or more of the following types of storage organization guidelines to facilitate future accessibility: original high resolution, permanent high resolution, temporary high resolution, lower resolution, temporary lower resolution, permanent lower resolution, deleted high resolution, deleted lower resolution, deleted content, included content, excluded content, subject matter, event, author, creator, participant, redundancy, repetition, quality, size, resolution, fidelity, tagged, preview, sample, group, sub-group, composite group, individual, personage, entity, item, content, composition, summary, augmentation, attribute, content category, frequency, and inventory (block 1243).

Additional aspects may include approving a storage format for the saved version of the selected captured data based on accessibility to substantially non-altered data components (block 1241), and in some instances accessibility to regenerated or transformed data components (block 1242).

Further possible aspects shown in FIG. 33 may include implementing a transfer based on one or more of the following criteria: rule, user input, user state, configuration, commercial, personal, context, space, device memory, device capability, bandwidth, separate storage memory, separate storage capability, separate storage accessibility, cost, task, preference, storage protocol, security, privacy, affiliation, and membership (block 1246).

Another feature may include implementing a transfer to one or more of the following types of storage schemes: backup, archive, removable, rewritable, permanent, server, base station, network storage, web site, central, integrated, distributed, dispersed, fragmented, non-altered, transformed, encoded, bitmap, compression, volatile, replicated, third party, storefront, mobile, vehicle, residence, office, shared, proprietary, and rights-managed (block 1247).

Figure 34:
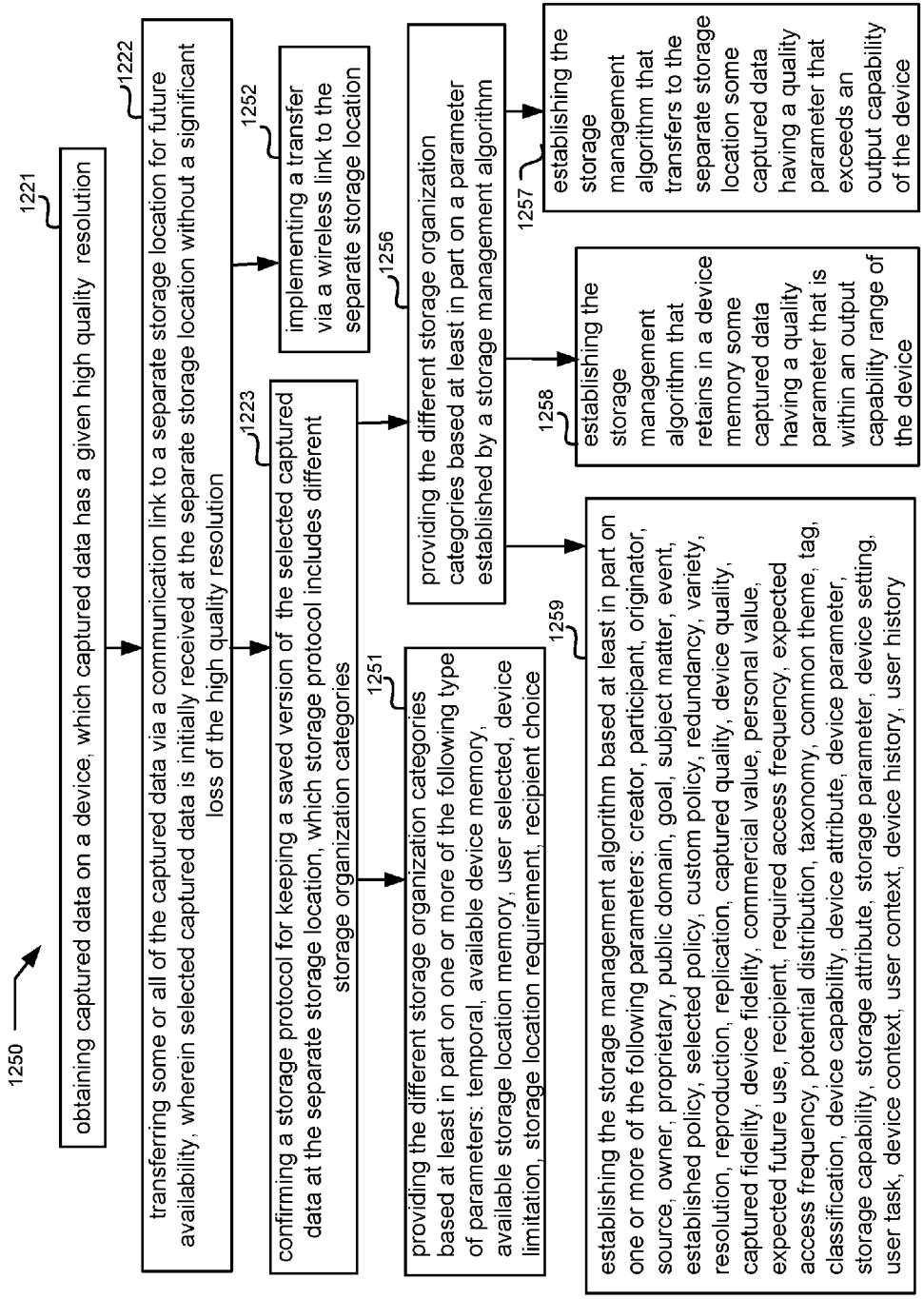

The embodiments 1250 of FIG. 34 may include previously disclosed features 1221, 1222, 1223 in combination with related aspects concerning the storage protocol. For example, a possible aspect may include providing the different storage organization categories based at least in part on one or more of the following type of parameters: temporal, available device memory, available storage location memory, user selected, device limitation, storage location requirement, and recipient choice (block 1251).

Another process features may include implementing a transfer via a wireless link to the separate storage location (block 1252). Further aspects may include providing the different storage organization categories based at least in part on a parameter established by a storage management algorithm (block 1256). Related possible aspects may establish the storage management algorithm that retains in a device memory some captured data having a quality parameter that is within an output capability range of the device (block 1258), and in some instance may establish the storage management algorithm that transfers to the separate storage location some captured data having a quality parameter that exceeds an output capability of the device (block 1257).

Another possible feature includes establishing the storage management algorithm based at least in part on one or more of the following parameters: creator, participant, originator, source, owner, proprietary, public domain, goal, subject matter, event, established policy, selected policy, custom policy, redundancy, variety, resolution, reproduction, replication, captured quality, device quality, captured fidelity, device fidelity, commercial value, personal value, expected future use, recipient, required access frequency, expected access frequency, potential distribution, taxonomy, common theme, tag, classification, device capability, device attribute, device parameter, storage capability, storage attribute, storage parameter, device setting, user task, device context, user context, device history, and user history (block 1259).

Figure 35:
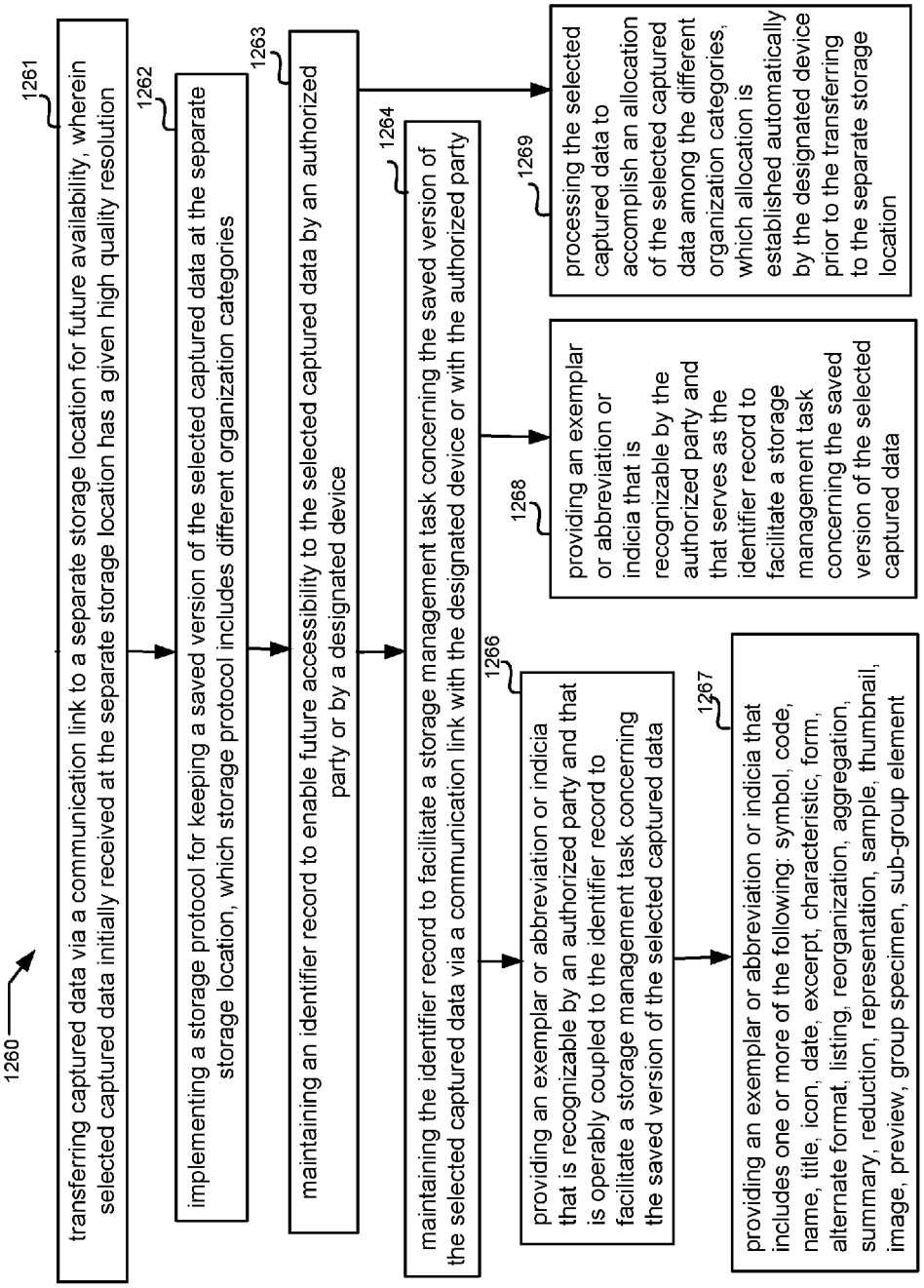

Referring to FIG. 35, additional detailed embodiments 1260 may include transferring some or all of the captured data via a communication link to a separate storage location for future availability, wherein selected captured data initially received at the separate storage location has a given high quality resolution (block 1261). Other possible process features may include implementing a storage protocol for keeping a saved version of the selected captured data at the separate storage location, which storage protocol includes different organization categories (block 1262). A further aspect may include maintaining an identifier record to enable future accessibility to the selected captured data by an authorized party or by a designated device (block 1263).

Some implementations may further provide for maintaining the identifier record to facilitate a storage management task concerning the saved version of the selected captured data via a communication link with the designated device or with an authorized party (block 1264). Further aspects may include providing an exemplar or abbreviation or indicia that is recognizable by the authorized party and that is operably coupled to the identifier record to facilitate a storage management task concerning the saved version of the selected captured data (block 1266).

Another possible feature disclosed in FIG. 35 may provide an exemplar or abbreviation or indicia including one or more of the following: symbol, code, name, title, icon, date, excerpt, characteristic, form, alternate format, listing, reorganization, aggregation, summary, reduction, representation, sample, thumbnail, image, preview, group specimen, and sub-group element (block 1267). Further aspects may include providing an exemplar or abbreviation or indicia that is recognizable by the authorized party and that serves as the identifier record to facilitate a storage management task concerning the saved version of the selected captured data (block 1268).

Some implementations may include processing the selected captured data to accomplish an allocation of the selected captured data among the one or more storage organization categories, which allocation is established automatically by the device prior to the transferring to the separate storage location (block 1269).

Figure 36:
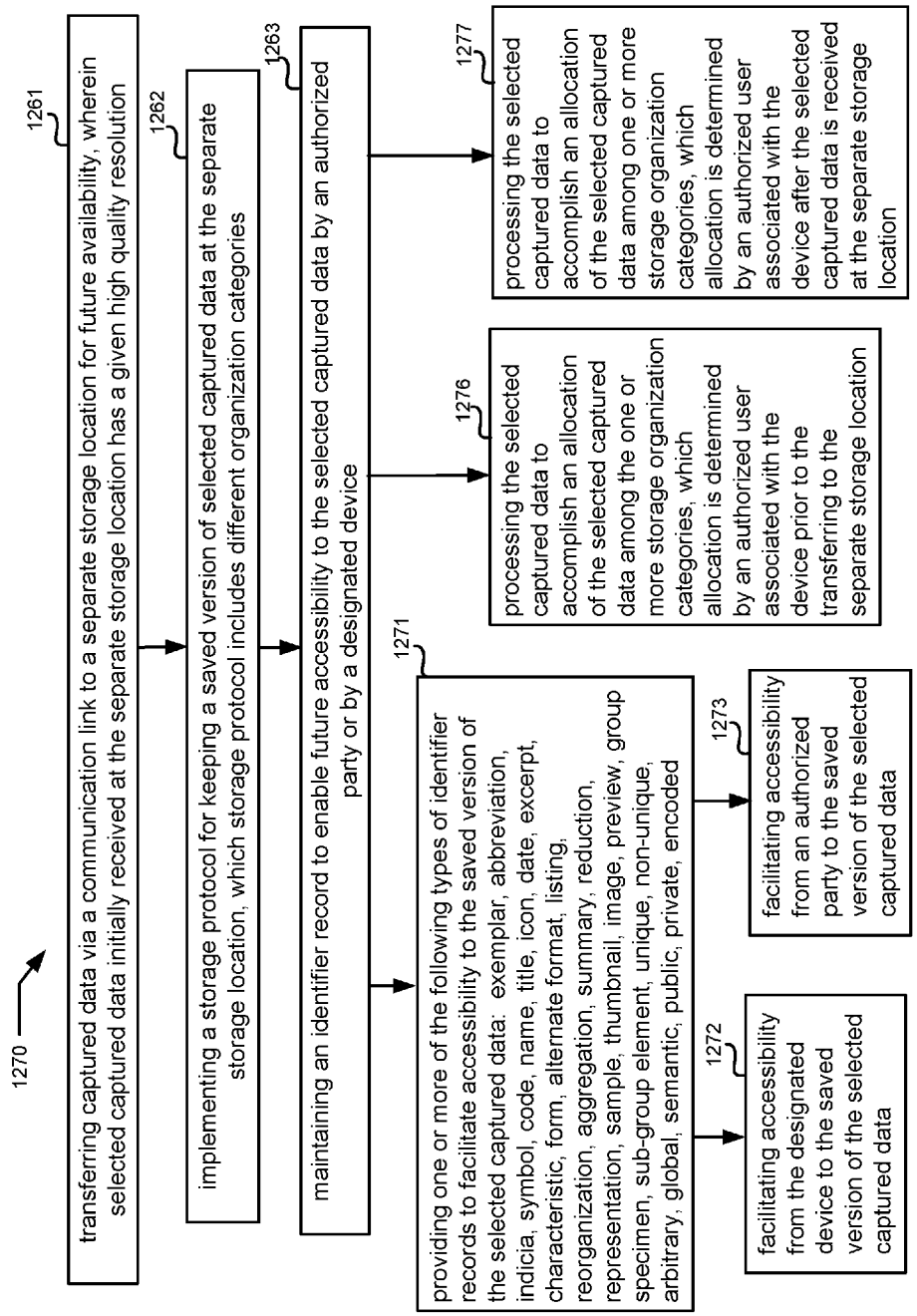

Referring to FIG. 36, various embodiments 1270 may include previously described process components 1261, 1262, 1263 in combination with possible aspects relating to the identifier record. For example, a possible aspect may include providing one or more of the following types of identifier records to facilitate accessibility to the saved version of the selected captured data: exemplar, abbreviation, indicia, symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded (block 1271). Such accessibility may be facilitated to the saved version of the selected captured data from the designated device (block 1272), and also may be facilitated from an authorized party (block 1273).

As further illustrated in FIG. 36, additional implementation features may include processing the selected captured data to accomplish an allocation of the selected captured data among the one or more storage organization categories, which allocation is determined by an authorized user associated with the device prior to the transferring to the separate storage location (block 1276). In some instances such allocation is determined by an authorized user associated with the device after the selected captured data is received at the separate storage location (block 1277).

Figure 37:
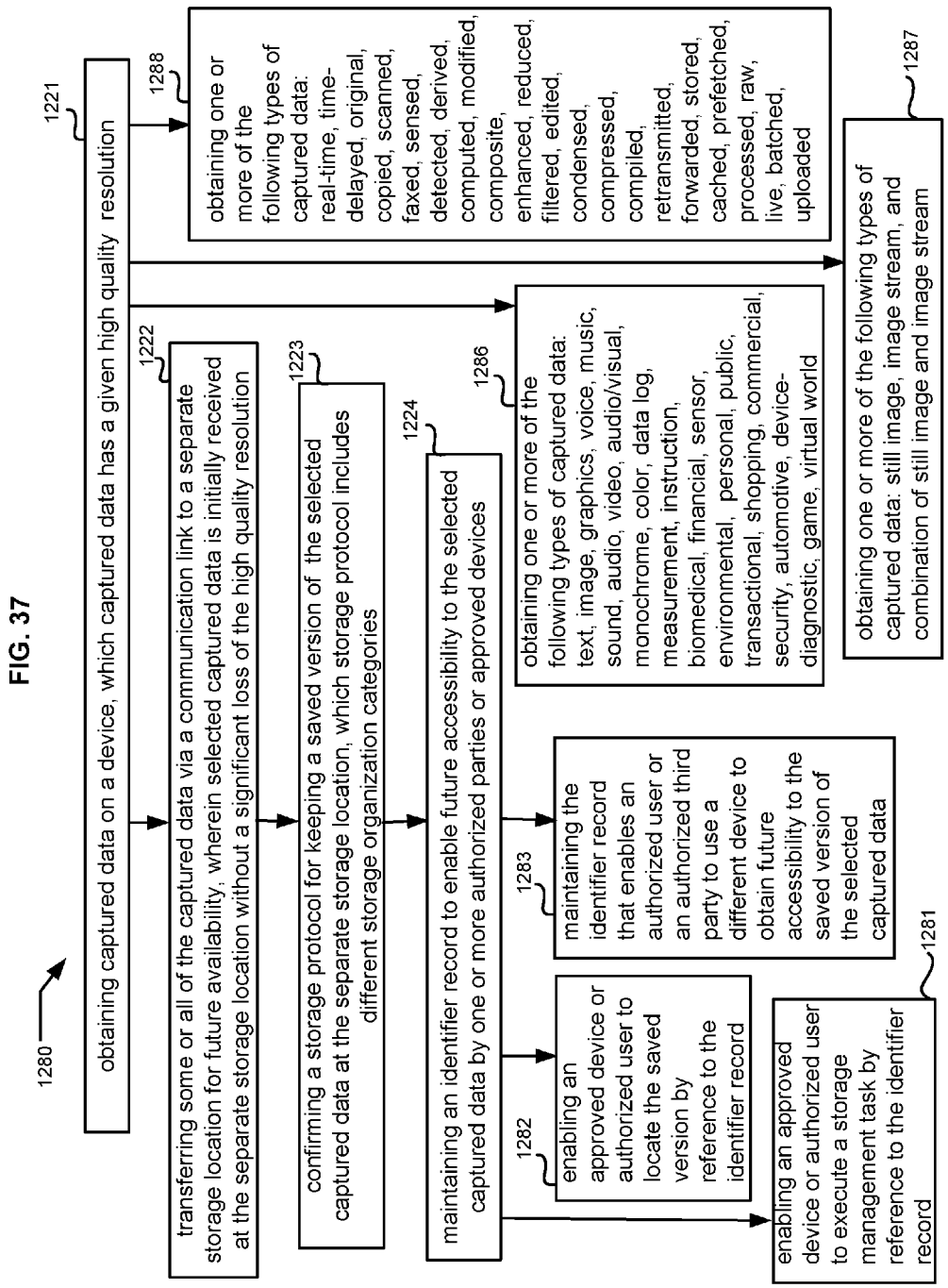

The exemplary embodiments 1280 disclosed in FIG. 37 include previously discussed process components 1221, 1222, 1223, 1224 as well as various features related to the identifier record. For example, a possible aspect may include enabling an approved device or authorized user to locate the saved version by reference to the identifier record (block 1282). Another possible aspect may include enabling an approved device or authorized user to execute a storage management task by reference to the identifier record (block 1281).

Other possible features may include maintaining the identifier record that enables an authorized user or an authorized third party to use a different device to obtain future accessibility to the saved version of the selected captured data (block 1283).

Additional implementations may include obtaining one or more of the following types of captured data: text, image, graphics, voice, music, sound, audio, video, audio/visual, monochrome, color, data log, measurement, instruction, biomedical, financial, sensor, environmental, personal, public, transactional, shopping, commercial, security, automotive, device-diagnostic, game, and virtual world (block 1286). Another possible aspect may include obtaining one or more of the following types of captured data: still image, image stream, and combination of still image and image stream (block 1287).

Further illustrated aspects may include obtaining one or more of the following types of captured data: real-time, time-delayed, original, copied, scanned, faxed, sensed, detected, derived, computed, modified, composite, enhanced, reduced, filtered, edited, condensed, compressed, compiled, retransmitted, forwarded, stored, cached, prefetched, processed, raw, live, batched, and uploaded (block 1288).

Figure 38:
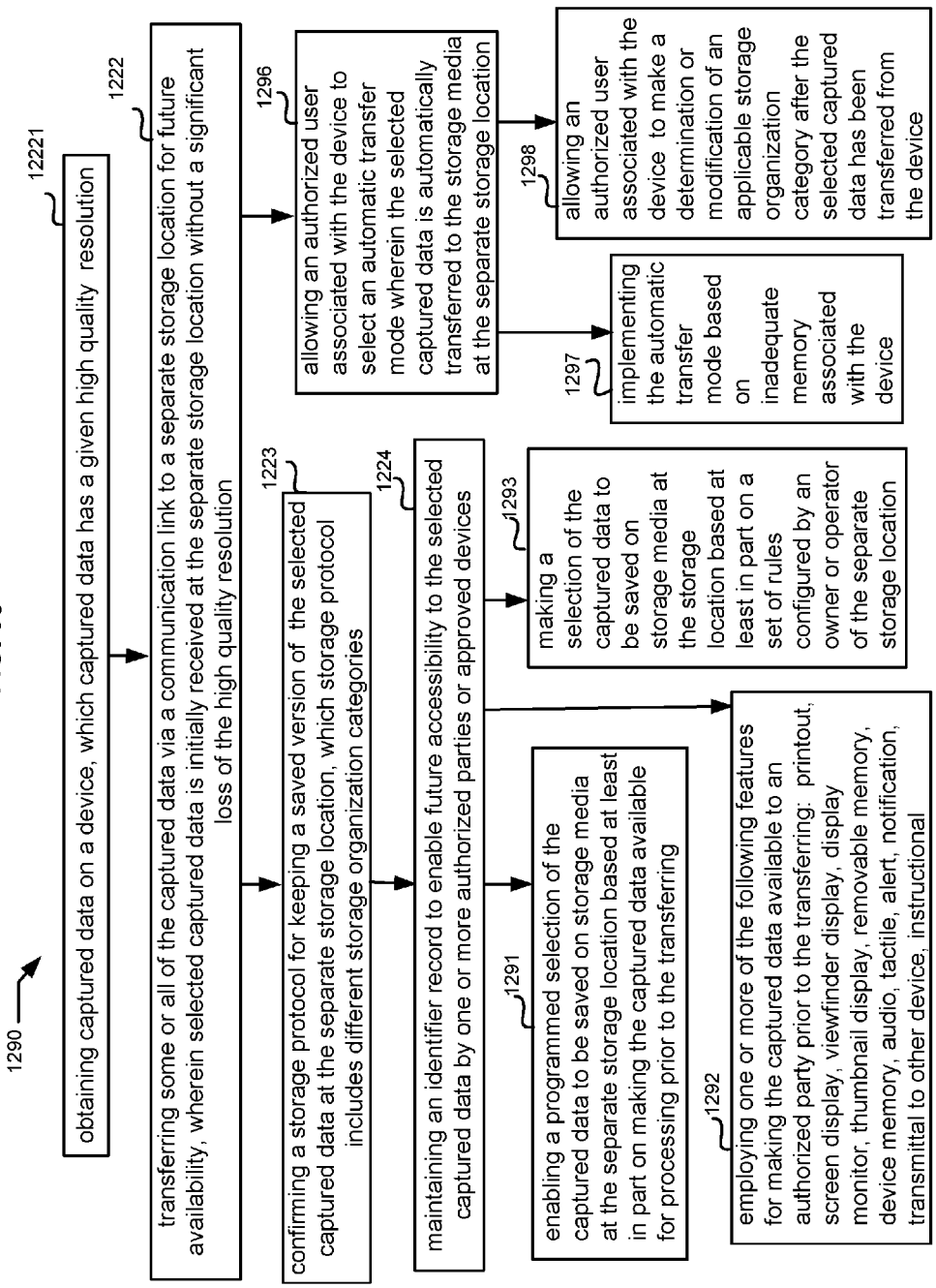

The detailed flow chart of FIG. 38 shows exemplary embodiments 1290 that include previously discussed process components 1221, 1222, 1223, 1224 in combination with other possible aspects. For example, some implementations may include enabling a programmed selection of the captured data to be saved on storage media at the separate storage location based at least in part on making the captured data available for processing prior to the transferring (block 1291). A further aspect may include employing one or more of the following features for making the captured data available to an authorized party prior to the transferring: printout, screen display, viewfinder display, display monitor, thumbnail display, removable memory, device memory, audio, tactile, alert, notification, transmittal to other device, and instructional (block 1292).

Further possible features may include making a selection of the captured data to be saved on storage media at the storage location based at least in part on a set of rules configured by an owner or operator of the separate storage location (block 1293).

Other illustrated process components shown in FIG. 38 include may include allowing an authorized user associated with the device to select an automatic transfer mode wherein the selected captured data is automatically transferred to the storage media at the separate storage location (block 1296), and implementing the automatic transfer mode based on inadequate memory associated with the device (block 1297).

A further possible aspect may include allowing an authorized user associated with the device to make a determination or modification of an applicable storage organization category after the selected captured data has been transferred from the device (block 1298).

Figure 39:
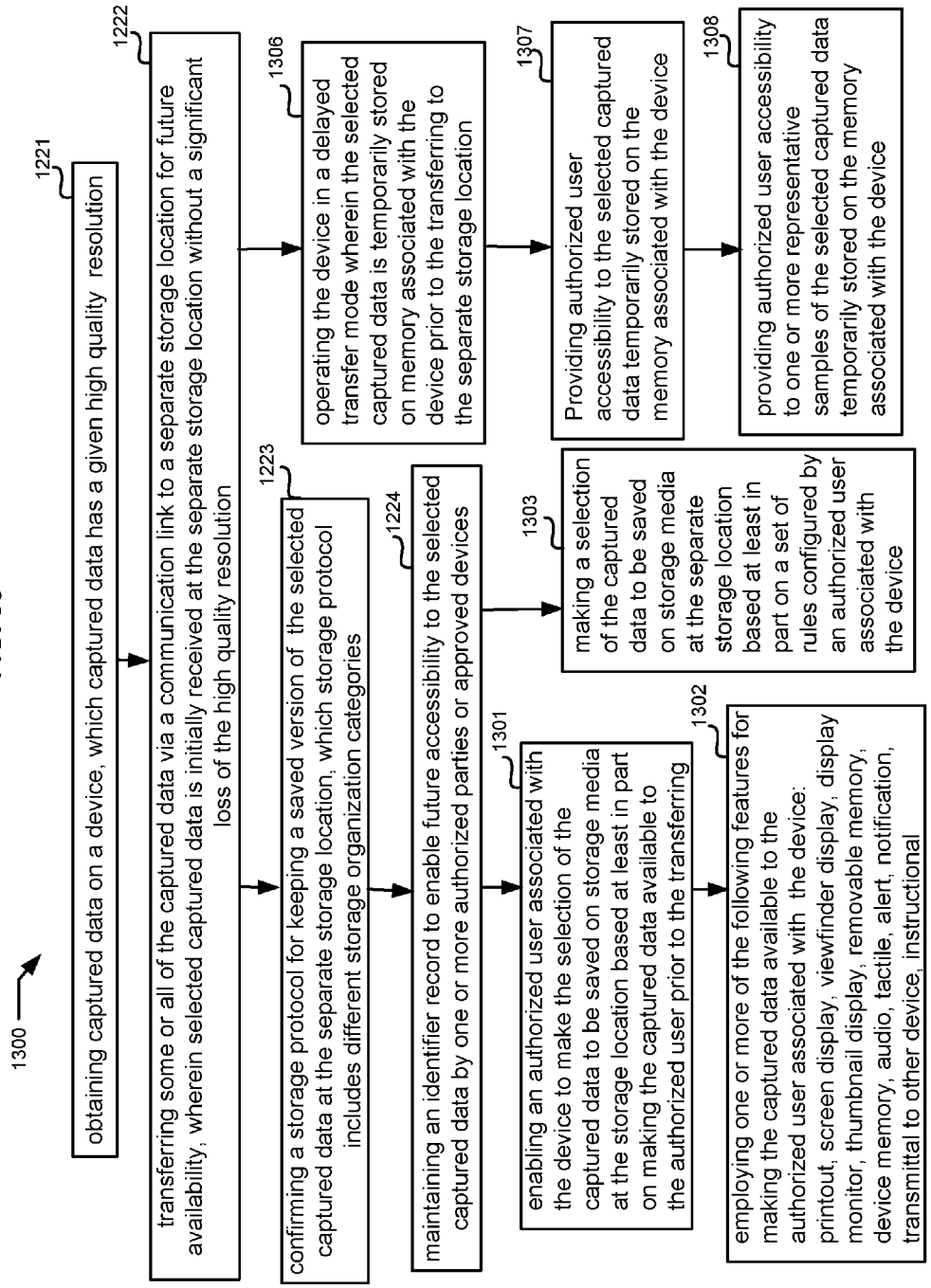

Referring to the various embodiments 1300 of FIG. 39, previously discussed process features 1221, 1222, 1223, 1224 are combined with further possible aspects relating to the identifier record. For example, some implementations may include enabling an authorized user associated with the device to make the selection of the captured data to be saved on storage media at the storage location based at least in part on making the captured data available to the authorized user associated with the device prior to the transferring (block 1301).

A further related aspect may include employing one or more of the following features for making the captured data available to an authorized user associated with the device: printout, screen display, viewfinder display, display monitor, thumbnail display, removable memory, device memory, audio, tactile, alert, notification, transmittal to other device, and instructional (block 1302).

Another possible feature may include making a selection of the captured data to be saved on storage media at the separate storage location based at least in part on a set of rules configured by an authorized user associated with the device (block 1303).

FIG. 39 illustrates additional possible aspects including operating the device in a delayed transfer mode wherein the selected captured data is temporarily stored on memory associated with the device prior to the transferring to the separate storage location (block 1306), and providing authorized user accessibility to the selected captured data temporarily stored on the memory associated with the device (block 1307). Another related aspect may include providing authorized user accessibility to one or more representative samples of the selected captured data temporarily stored on the memory associated with the device (block 1308).

Figure 40:
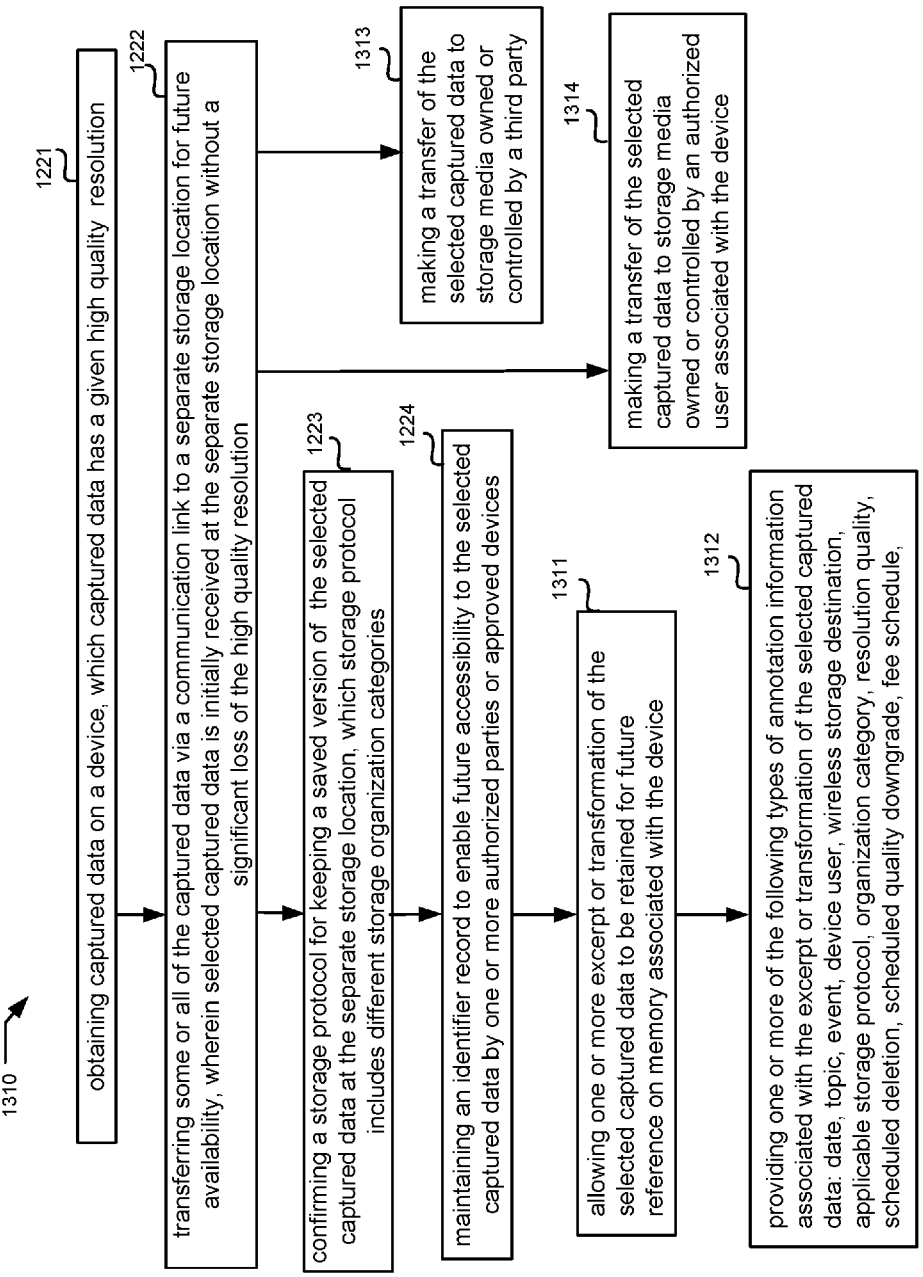

The flow chart of FIG. 40 shows exemplary embodiments 1310 that include previously described process components 1221, 1222, 1223, 1224 in combination with other possible aspects including allowing one or more excerpt or transformation of the selected captured data to be retained for future reference on memory associated with the device (block 1311). A further related aspect may include providing one or more of the following types of annotation information associated with the excerpt or transformation of the selected captured data: date, topic, event, device user, wireless storage destination, applicable storage protocol, organization category, resolution quality, scheduled deletion, scheduled quality downgrade, and fee schedule (block 1312).

Additional implementations may include making a transfer of the selected captured data to storage media owned or controlled by an authorized user associated with the device (block 1314), and making a transfer of the selected captured data to a storage media owned or controlled by a third party (block 1313).

Figure 41:
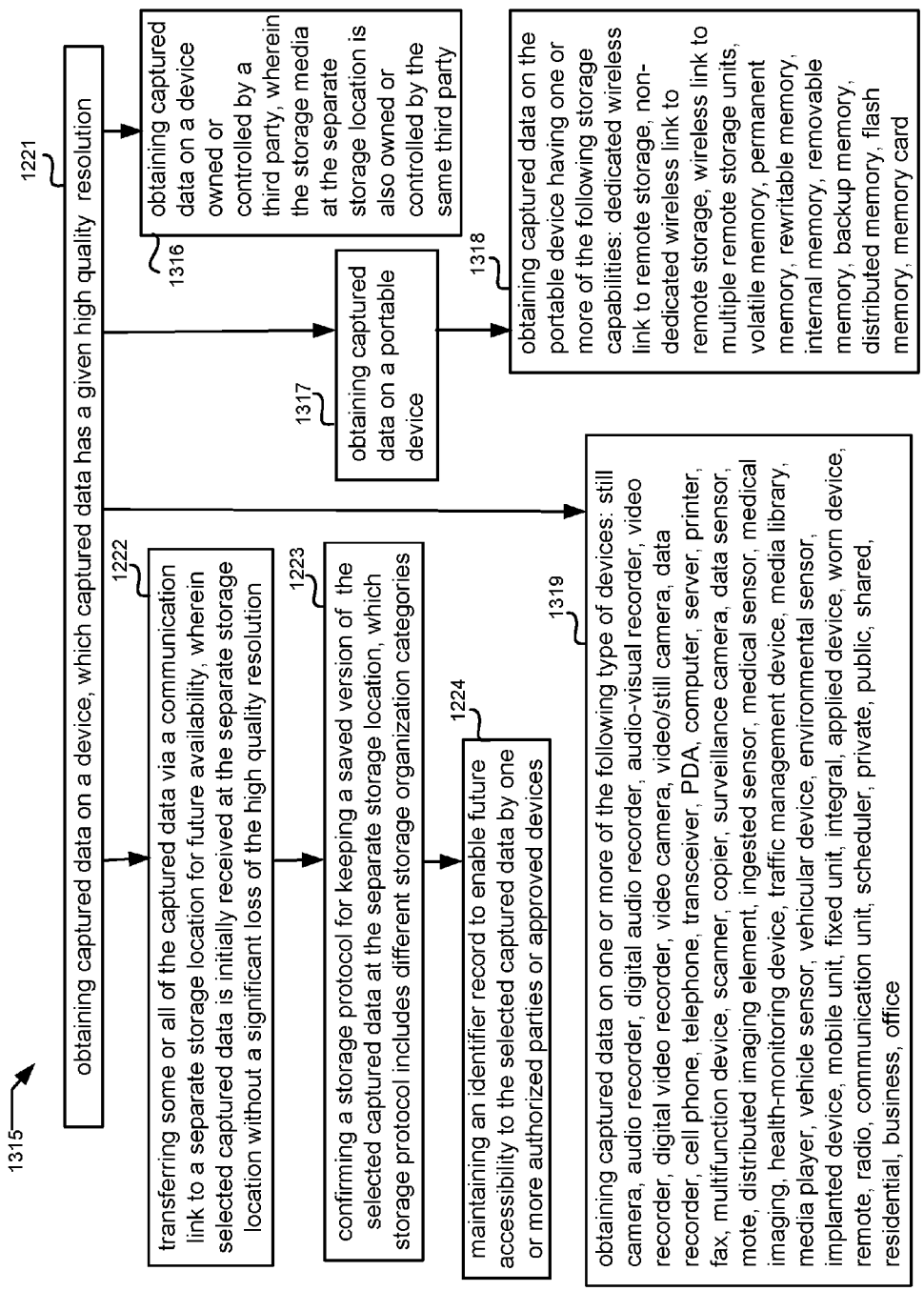

Referring to the exemplary embodiments 1315 of FIG. 41, previously discussed process features 1221, 1222, 1223, 1224 may be implemented with possible aspects that include obtaining captured data on one or more of the following type of devices: still camera, audio recorder, digital audio recorder, audio-visual recorder, video recorder, digital video recorder, video camera, video/still camera, data recorder, telephone, cell phone, transceiver, PDA, computer, server, printer, fax, multi-function device, scanner, copier, surveillance camera, data sensor, mote, distributed imaging element, ingested sensor, medical sensor, medical imaging, health-monitoring device, traffic management device, media library, media player, vehicle sensor, vehicular device, environmental sensor, implanted device, mobile unit, fixed unit, integral, applied device, worn device, remote, radio, communication unit, scheduler, private, public, shared, residential, business, and office (block 1319).

Additional possible features may include obtaining captured data on a portable device (block 1317), and obtaining captured data on the portable device having one or more of the following storage capabilities: dedicated wireless link to remote storage, non-dedicated wireless link to remote storage, wireless link to multiple remote storage units, volatile memory, permanent memory, rewritable memory, internal memory, removable memory, backup memory, distributed memory, flash memory, and memory card (block 1318).

Further aspects may include obtaining captured data on a device owned or controlled by a third party, wherein the storage media at the storage location is also owned or controlled by the same third party (block 1316).

Figure 42:
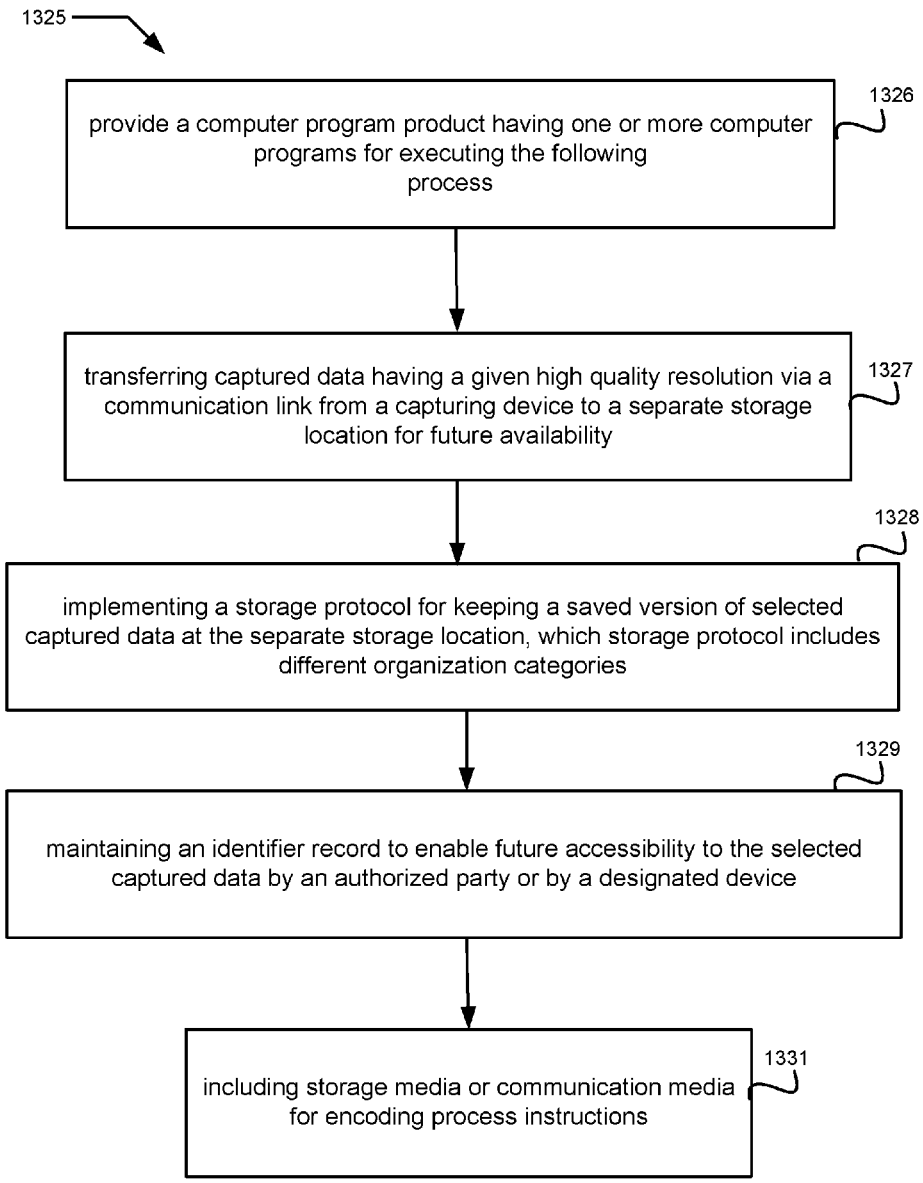
FIG. 42 illustrates an exemplary computer program product embodiment.

The high level flow chart of FIG. 42 shows an exemplary embodiment 1325 for a computer program product having one or more computer programs for executing a process (block 1326). An exemplary process may include transferring captured data having a given high quality resolution via a communication link from a capturing device to a separate storage location for future availability (block 1327).

Additional process features may include implementing a storage protocol for keeping a saved version of selected captured data at the separate storage location, which storage protocol includes different organization categories (block 1328). A further process feature may include maintaining an identifier record to enable future accessibility to the selected captured data by an authorized party or by, a designated device (block 1329). The exemplary computer program product may include storage media or communication media for encoding the process instructions (block 1331).

Figure 43:
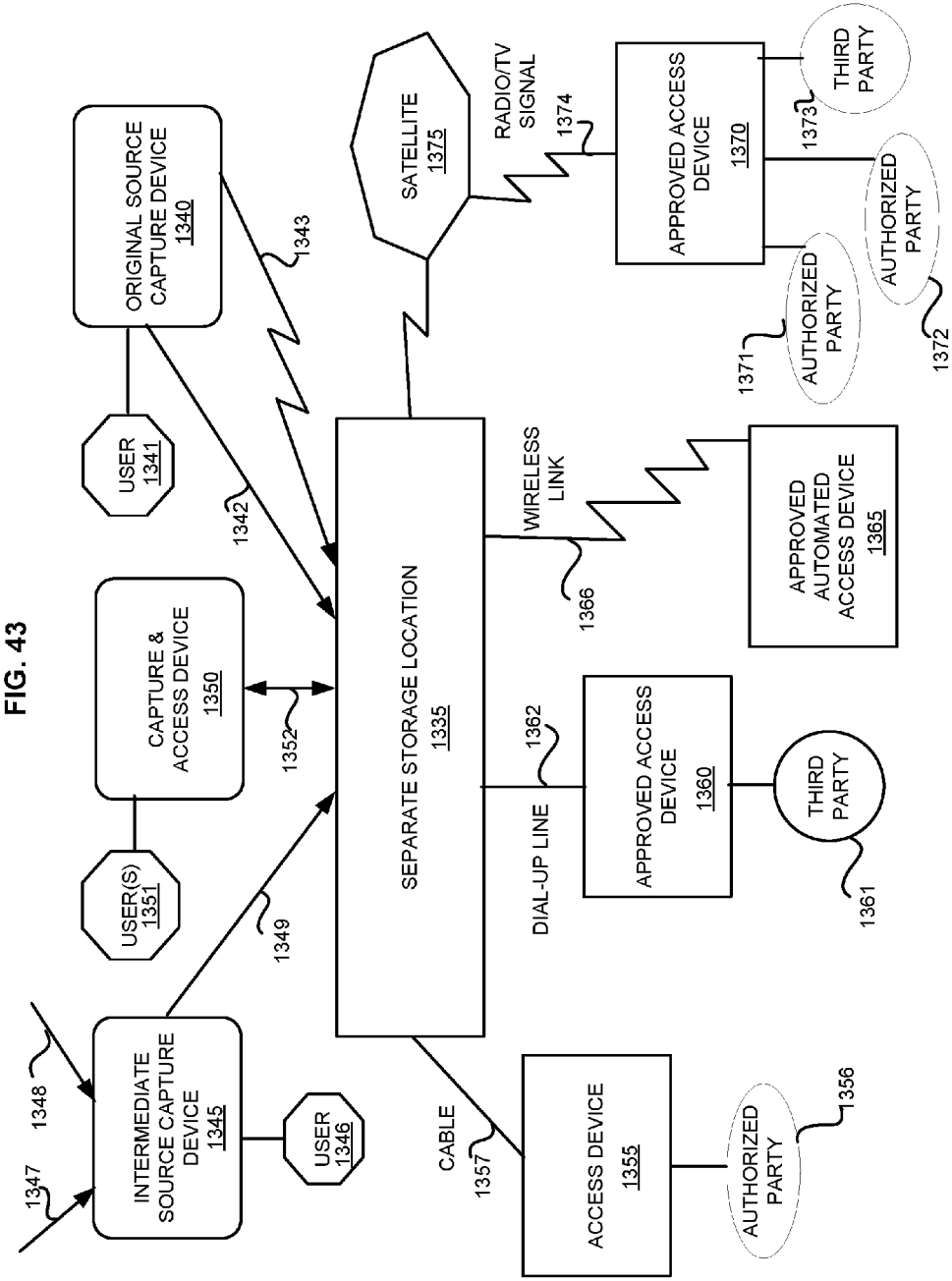
FIG. 43 is a schematic block diagram showing exemplary data storage communication embodiments.

The schematic block diagram of FIG. 43 illustrates various features of exemplary embodiments including separate storage location 1335, original source capture device 1340, intermediate source capture device 1345, and capture & access device 1350. A system implementation may include various combinations of features shown in FIG. 43. For example, original source capture device 1340 associated with user 1341 may have capability for transferring selected captured data via communication link 1342 to separate storage location 1335. A wireless communication link 1343 may also be used for such transfer to separate storage location 1335.

The intermediate source capture device 1345 associated with user 1346 is shown receiving data inputs 1347, 1348 and may have capability for transferring selected captured data via communication link 1349 to separate storage location 1335. The hybrid capture/access device 1350 associated with one or more users 1351 may have capability for both transferring selected captured data to separate storage location 1335 as well as accessing saved versions of the selected captured data available at the separate storage location (see bidirectional communication link 1352).

In some instances a designated device may be approved for implementing a transfer and/or access to the separate storage location 1335. In other instances an authorized party (e.g., user associated with the capture device or with access device, authorized third party, etc.) may be authorized for implementing a transfer and/or access from many types of designated devices to the separate storage location 1335.

The schematic diagram of FIG. 43 shows exemplary system embodiment components that may include access device 1355, approved access device 1360, approved automated access device 1365, and approved access device 1370.

Possible aspects may include an authorized party 1356 associated with access device 1355 having a communication link 1357 via cable to separate storage location 1335. Another possible aspect may include a third party 1361 associated with approved access device 1360 having a communication link 1362 via dial-up line to separate storage location 1335. A further possible aspect may include the approved automated access device 1365 having a wireless communication link 1366 to separate storage location 1335.

Another possible aspect may include multiple entities such as authorized party 1371, authorized party 1372, and third party 1373 associated with approved access device 1370 having a communication link 1374 (e.g., radio signal, television signal, etc.) via satellite 1375 to separate storage location 1335.

Figure 44:
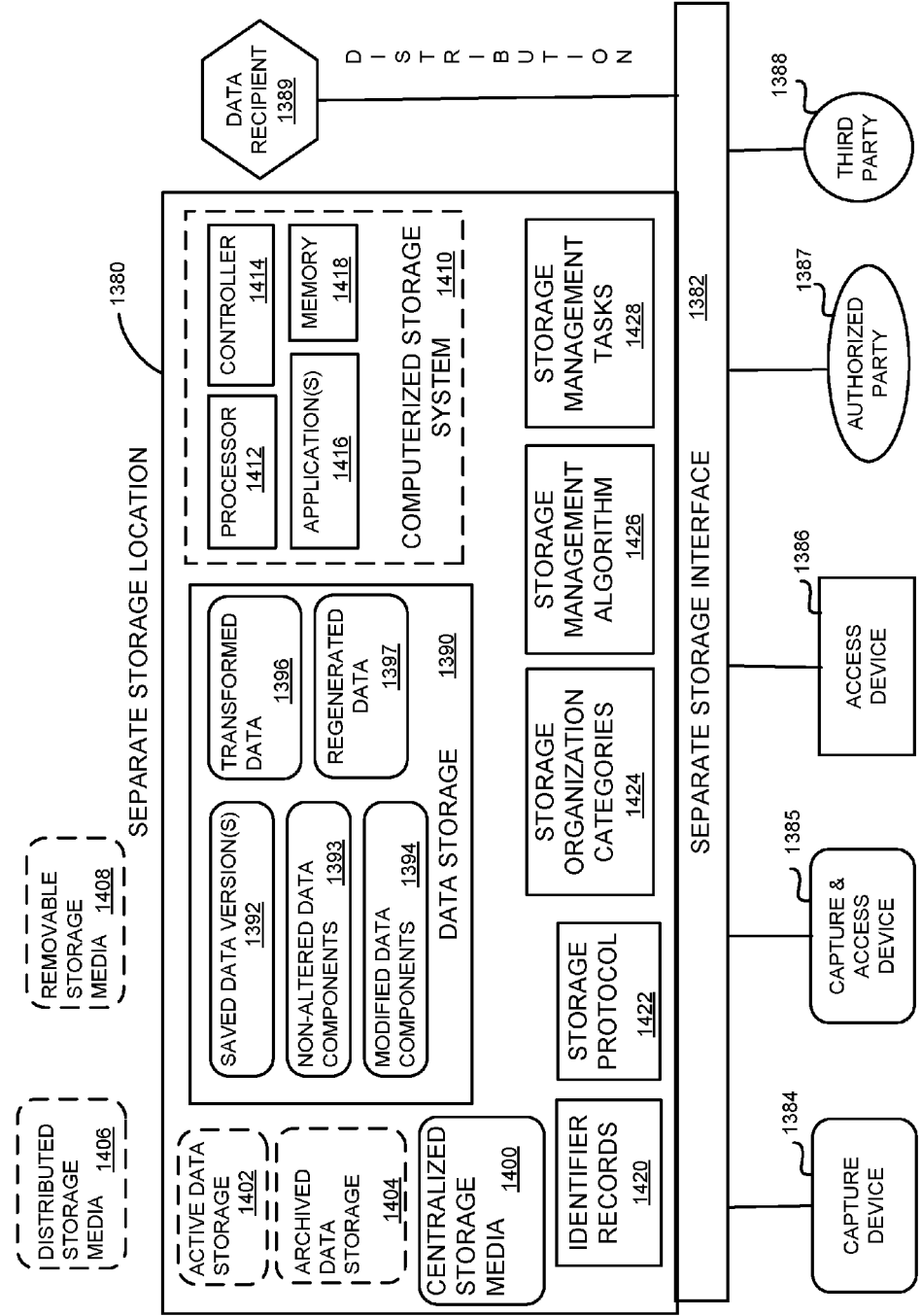
FIG. 44 schematically illustrates other possible features incorporated in an exemplary separate storage facility/location.

Referring to the schematic block diagram of FIG. 44, various exemplary embodiment features related to separate storage location 1380 may include a separate storage interface 1382 that has possible communication links with capture device 1384, capture & access device 1385, access device 1386, authorized party 1387 and third party 1388. In some implementations a data recipient 1389 may be connected via a distribution link to the separate storage interface 1382.

An exemplary data storage module 1390 may include one or more saved data versions 1392, non-altered data components 1393, modified data components 1394, transformed data 1396, and regenerated data 1397. An illustrated possible feature may include centralized storage media 1400, and in some instances active data storage files 1402 and archived data storage files 1404. Further aspects in some implementations may include distributed storage media 1406 and removable storage media 1408.

Processing of data may be accomplished by an exemplary computerized storage system 1410 incorporated as an integral part of the separate storage location 1380 or remotely linked to the separate storage location 1380. The computerized storage system 1410 may include processor 1412, controller 1414, one or more applications 1416, and memory 1418.

Additional types of storage-related modules may include identifier records 1420, storage protocol 1422, storage organization categories 1424, storage management algorithm 1426, and storage management tasks 1428.

Figure 45:
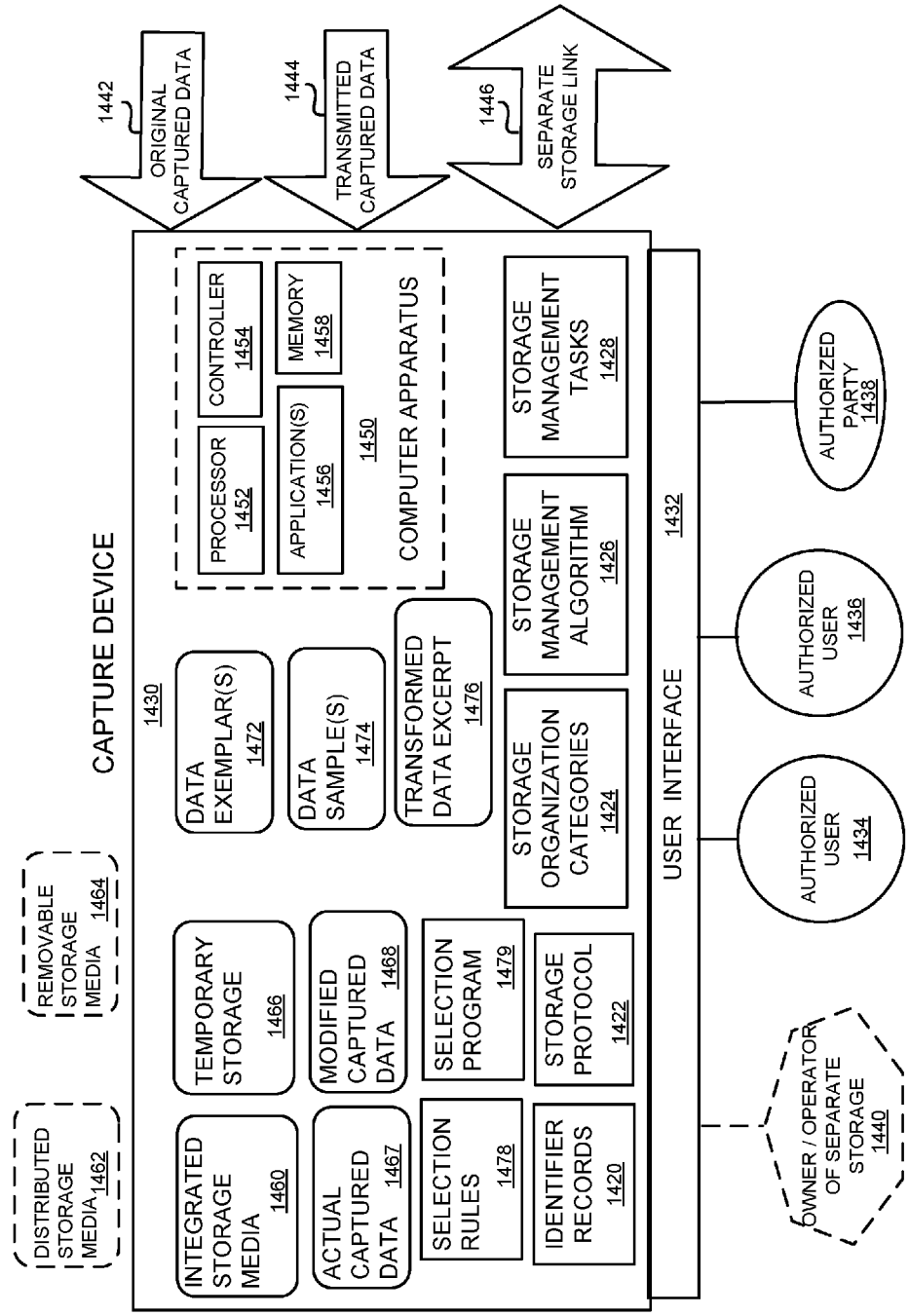
FIG. 45 schematically illustrates other possible features incorporated in an exemplary capture/transmitting device.

Referring to the schematic block diagram of FIG. 45, exemplary embodiment features incorporated in a capture device 1430 include user interface 1432 for authorized users 1434, 1436 as well as for authorized party 1438. In some instances such user interface 1432 may also be available to an owner or operator of a separate storage location 1440 that is linked (see 1446) to the capture device 1430.

Other communication links to the capture device 1430 may include an input channel for original captured data 1442, and another input channel for transmitted captured data 1444.

It will be understood that various functional aspects may be incorporated with the capture device and/or with the separate storage location. Accordingly the illustrated embodiment features of FIG. 45 may include previously described identifier records 1420, storage protocol 1422, storage organization categories 1424, storage management algorithm 1426, and storage management tasks 1428.

Of course it will be understood that the various exemplary type of records and data files are disclosed herein for purposes of illustration only and are not intended to be limiting. Some of the specified file parameters and records may not be included in certain implementations, and additional types of file parameters and records may be desirable additions in other implementations.

A computer apparatus 1450 incorporated in the capture device 1430, or in some instances remotely linked to the capture device 1430, may include processor 1452, controller 1454, one or more applications 1456, and memory 1458. Additional aspects operably coupled with the capture device 1430 may include integrated storage media 1460, temporary storage 1466, distributed storage media 1462, and removable storage media 1464.

Further types of data storage files may include actual captured data 1467, modified captured data 1468, one or more data exemplars 1472, one or more data samples 1474, and in some instances various transformed data excerpts 1476. Depending on the circumstances additional aspects may include data selection rules 1478, and a data selection program 1479 to process the captured data and facilitate a determination of which captured data will be immediately or ultimately transferred to the separate storage location. It will be understood that various records may be maintained at the transmitting device and/or at a destination storage facility to identify which individual or groups of captured data have been transferred, and in some instances providing addition details regarding the nature (e.g., resolution, future access limitations, etc.) of the selected captured data that has been transferred.

It will be further understood that aspects of such data selection rules 1478 or data selection program 1479 may be incorporated at the destination storage facility or at the transmitting device in order to achieve efficient and desirable transfer results. Some embodiments may provide somewhat sophisticated rules, including an ability to detect redundancies and carry out selection policies and goals. For example, a storage algorithm regarding soccer match data may seek to transfer at least one high resolution shot of each goal attempted or made, as well as limiting transferred spectator images to not more than ten per match and limiting transferred action player images to not more than fifty per match. Similarly a policy guideline may provide predetermined limits regarding transferred audiovisual data for each soccer match. Of course, availability of local storage capacity associated with the transmitting device may result in temporary (or perhaps long term) retention policies regarding certain types of captured data (current topical interest, additional time for pre-transfer review, etc.).

As disclosed herein, some exemplary system embodiments and computer program implementations may provide one or more program applications that include encoded process instructions for implementing a storage management algorithm that allows accessibility by a particular device to selected captured data having a quality parameter that is within an operational capability range of the particular device. Another possible implementation may provide one or more program applications that include encoded process instructions for implementing a storage management algorithm that retains for future accessibility the selected captured data having a quality parameter that exceeds an operational capability of a transmitting device.

Additional exemplary system embodiments and computer program implementations may provide one or more program applications that include encoded process instructions for implementing a storage management algorithm that facilitates accessibility to the different storage organization categories based on one or more of the following parameters: creator, participant, originator, source, owner, proprietary, public domain, goal, subject matter, event, established policy, selected policy, custom policy, redundancy, variety, resolution, reproduction, replication, captured quality, device quality, captured fidelity, device fidelity, commercial value, personal value, expected future use, recipient, required access frequency, expected access frequency, potential distribution, taxonomy, common theme, tag, classification, device capability, device attribute, device parameter, storage capability, storage attribute, storage parameter, device setting, user task, device context, user context, device history, and user history.

Other exemplary system embodiments may provide data storage files that include a saved version of selected captured data received from one or more of the following type of transmitting devices: still camera, audio recorder, digital audio recorder, audio-visual recorder, video recorder, digital video recorder, video camera, video/still camera, data recorder, telephone, cell phone, transceiver, PDA, computer, server, printer, fax, multi-function device, scanner, copier, surveillance camera, data sensor, mote, distributed imaging element, ingested sensor, medical sensor, medical imaging, health-monitoring device, traffic management device, media library, media player, vehicle sensor, vehicular device, environmental sensor, implanted device, mobile unit, fixed unit, integral, applied device, worn device, remote, radio, communication unit, scheduler, private, public, shared, residential, business, and office.

Additional possible system features may provide one or more transmitting devices for transferring the selected captured data via a communication link to the data storage files at a separate storage facility. Further possible system aspects may include one or more transmitting devices configured to implement transferring of the selected captured data based on one or more of the following criteria: rule, user input, user state, configuration, commercial, personal, context, space, device memory, device capability, bandwidth, separate storage memory, separate storage capability, separate storage accessibility, cost, task, preference, storage protocol, security, privacy, affiliation, and membership.

In some instances an exemplary implementation may include one or more transmitting devices that are owned or controlled by an entity that is an owner or operator of the separate storage facility.

Further exemplary system embodiments may provide one or more transmitting devices that include a portable transmitting device having one or more of the following storage capabilities: dedicated wireless link to remote storage, non-dedicated wireless link to remote storage, wireless link to multiple remote storage units, volatile memory, permanent memory, rewritable memory, internal memory, removable memory, backup memory, distributed memory, flash memory, and memory card.

Additional process components incorporated in a computer program product may include retaining at a separate storage facility for future availability some selected captured data having a given quality characteristic, which selected captured data is received via a communication link with a capturing device. A related incorporated process component may include retaining for future availability one or more of the following types of selected captured data: real-time, time-delayed, original, copied, scanned, faxed, sensed, detected, derived, computed, modified, composite, enhanced, reduced, filtered, edited, condensed, compressed, compiled, retransmitted, forwarded, stored, cached, prefetched, processed, raw, live, batched, and uploaded.

Other process components incorporated in a computer program product may include enabling future accessibility by an authorized user or approved device or recipient party to the selected captured data pursuant to the storage protocol. A related incorporated process component may include providing one or more of the following parameters associated with or incorporated in an identity record to facilitate the future accessibility: exemplar, abbreviation, indicia, symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded.

A further process component incorporated in a computer program product may include providing an identifier record that is operably coupled to one or more of the different organization categories. In some implementations an incorporated process feature related to the identifier record may include providing the identifier record at the separate storage facility. Another possible incorporated process feature related to the identifier record may include providing the identifier record at the capturing device or other approved device.

Figure 46:
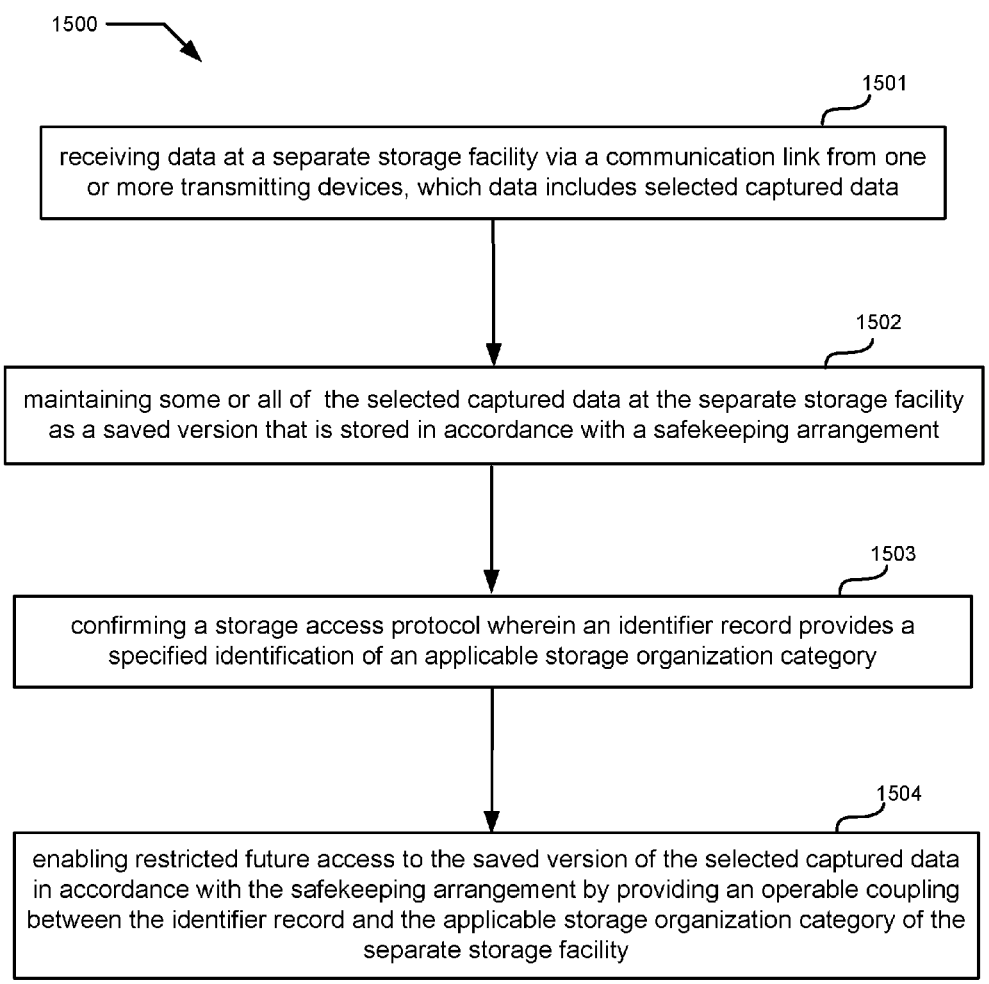
FIG. 46 is a high level flow chart showing another exemplary data storage access embodiment.

Referring to the high level flow chart of FIG. 46, an exemplary process embodiment 1500 for managing data storage may include receiving data at a separate storage facility via a communication link from one or more transmitting devices, which data includes selected captured data (block 1501); maintaining some or all of the selected captured data at the separate storage facility as a saved version that is stored in accordance with a safekeeping arrangement (block 1502); and confirming a storage access protocol wherein an identifier record provides a specified identification of an applicable storage organization category (block 1503). A further possible process feature may include enabling restricted future access to the saved version of the selected captured data in accordance with the safekeeping arrangement by providing an operable coupling between the identifier record and the applicable storage organization category of the separate storage facility (block 1504).

Figure 47:
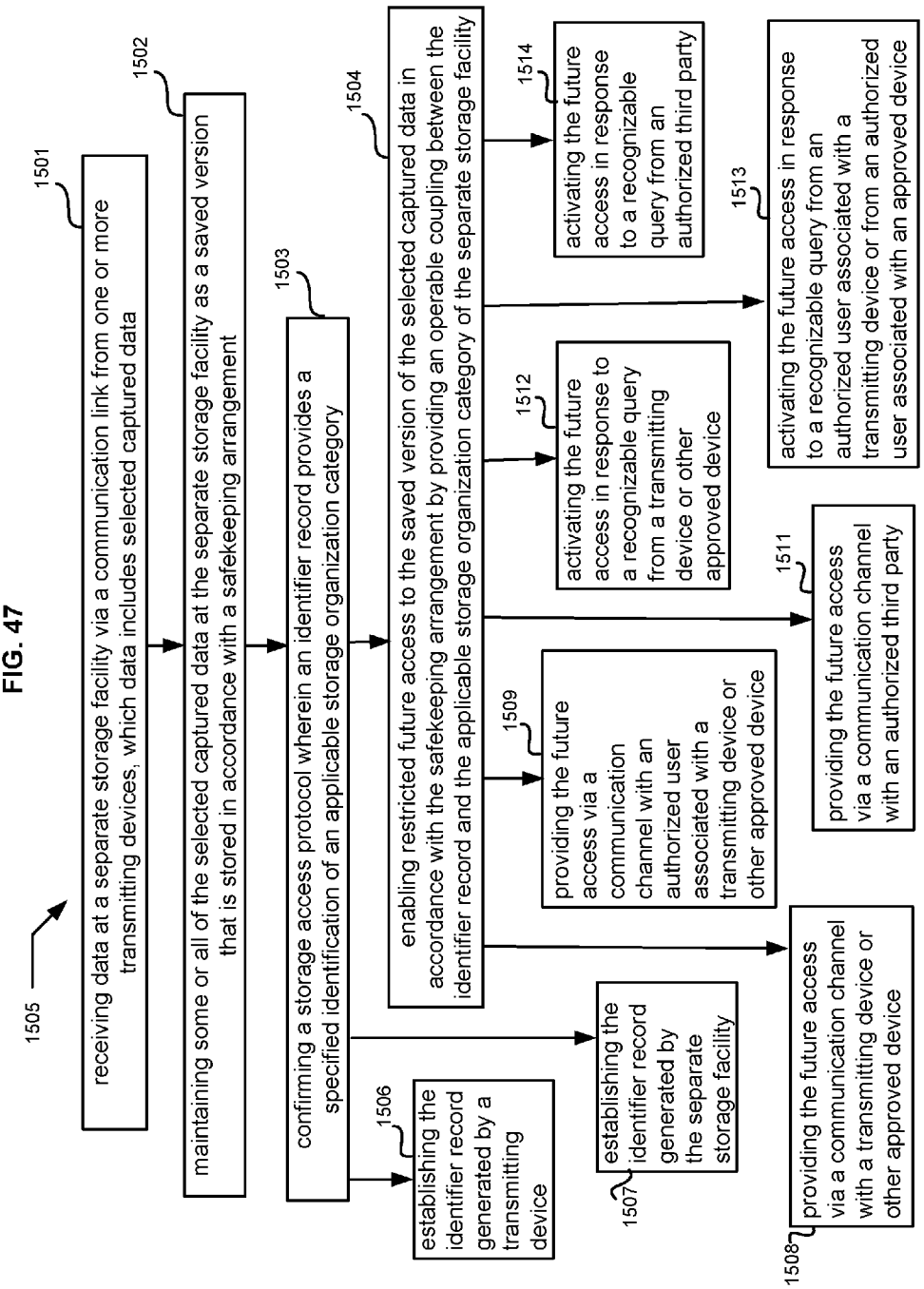
FIGS. 47-51 are detailed flow charts illustrating additional exemplary embodiments.

Additional exemplary process embodiments 1505 are shown in FIG. 47 which illustrates previously described components 1501, 1502, 1503, 1504 along with other possible features such as establishing an identifier record generated by a transmitting device (block 1506), and establishing an identifier record generated by the separate storage facility (block 1507). A further possible aspect related to restricted future access to the saved version of selected captured data may include providing such future access via a communication channel with a transmitting device or other approved device (block 1508).

It will be understood that some implementations may provide an authentication relationship between a collection of identifier records and an approved device (e.g., capture device, transmitting device, personal mobile device, etc.). Data security may then be accomplished by providing limited logon rights, lockout schemes, or other restricted device usage techniques. The pertinent identifier record(s) can be activated pursuant to specified device interaction with the separate storage facility.

Some implementations may include providing the future access via a communication channel with an authorized user associated with a transmitting device or other device (block 1509). Another possible feature may include providing the future access via a communication channel with an authorized third party (block 1511).

It will be understood that some embodiments may provide an authentication relationship between a collection of identifier records and an authorized user or authorized third party. This results in future access to the separate storage facility becoming potentially more global. For example, such an authorized user or authorized third party who moves to any appropriate convenient device can generate or acquire the pertinent identifier record(s) necessary for activating a management task (e.g., retrieval, reorganization, status change, distribution authorization, etc.). In other words, such an appropriate convenient device temporarily becomes an "approved device" so long as its user qualifies as an "authorized user" or authorized third party.

Additional possible aspects illustrated in FIG. 47 include activating the future access in response to a recognizable query from a transmitting device or other approved device (block 1512). A further possible aspect includes activating the future access in response to a recognizable query from an authorized user associated with a transmitting device or from an authorized user associated with an approved device (block 1513). Yet another possible feature may include activating the future access in response to a recognizable query from an authorized third party (block 1514).

Figure 48:
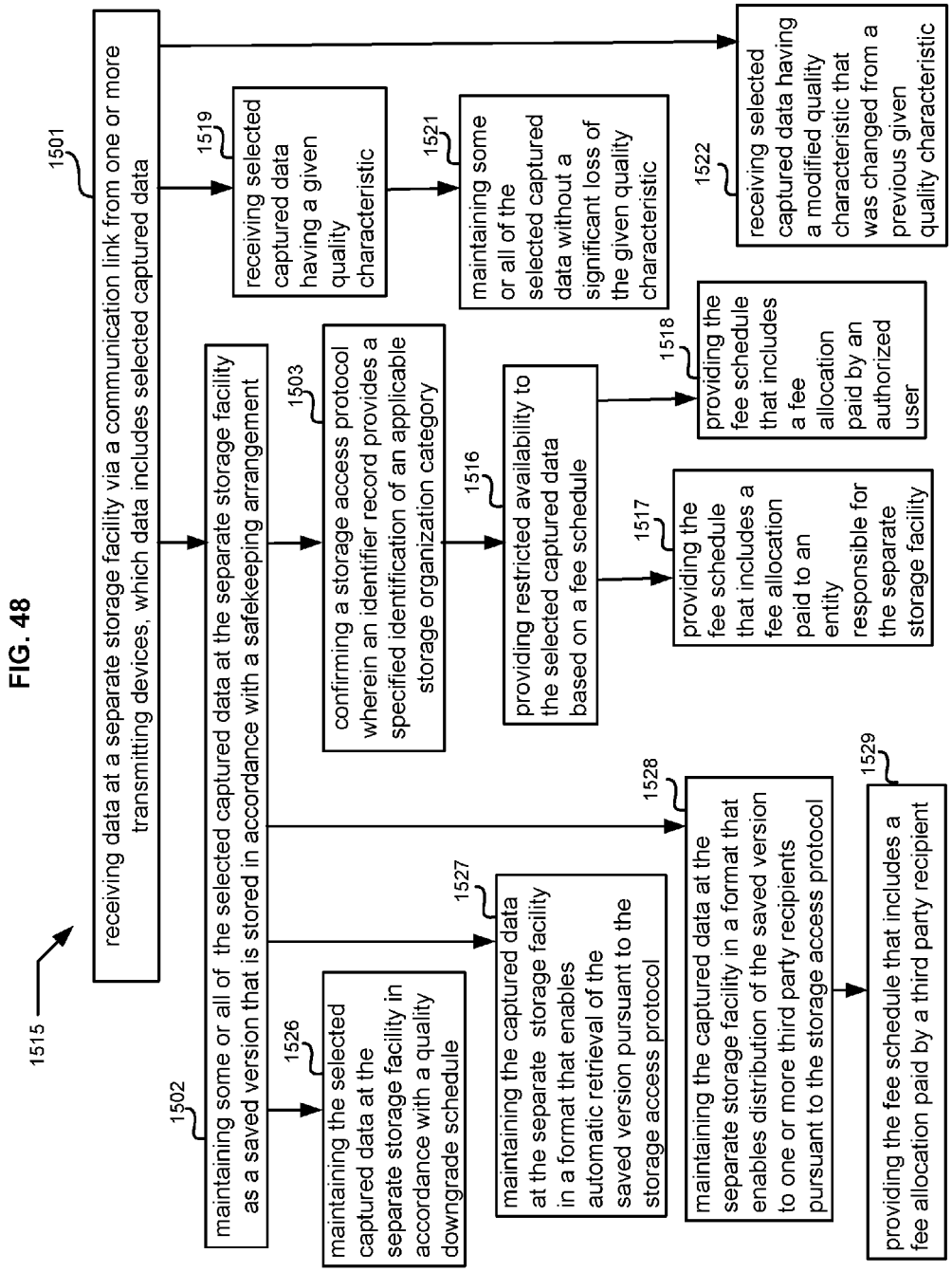

The exemplary embodiments 1515 shown in FIG. 48 show previously disclosed process components 1501, 1502, 1503 along with various possible fee arrangements. For example, some implementations may include providing restricted availability to the selected captured data based on a fee schedule (block 1516), and in some instances providing the fee schedule that includes a fee allocation paid to an entity responsible for the separate storage facility (block 1517). Another possible aspect may include providing the fee schedule that includes a fee allocation paid by an authorized user (block 1518).

Additional process components may include receiving selected captured data having a given quality characteristic (block 1519), maintaining some or all of the selected captured data without a significant loss of the given quality characteristic (block 1521), and receiving selected captured data having a modified quality characteristic that was changed from a previous given quality characteristic (block 1522).

Further illustrated exemplary features in FIG. 48 include maintaining the selected captured data at the separate storage facility in accordance with a quality downgrade schedule (block 1526), and maintaining the captured data at the separate storage facility in a format that enables automatic retrieval of the saved version pursuant to the storage access protocol (block 1527).

Other possible aspects may include maintaining the captured data at the separate storage facility in a format that enables distribution of the saved version to one or more third party recipients pursuant to the storage access protocol (block 1528), and providing restricted availability to the selected captured data based on a fee schedule that includes a fee allocation paid by a third party recipient (block 1529).

Figure 49:
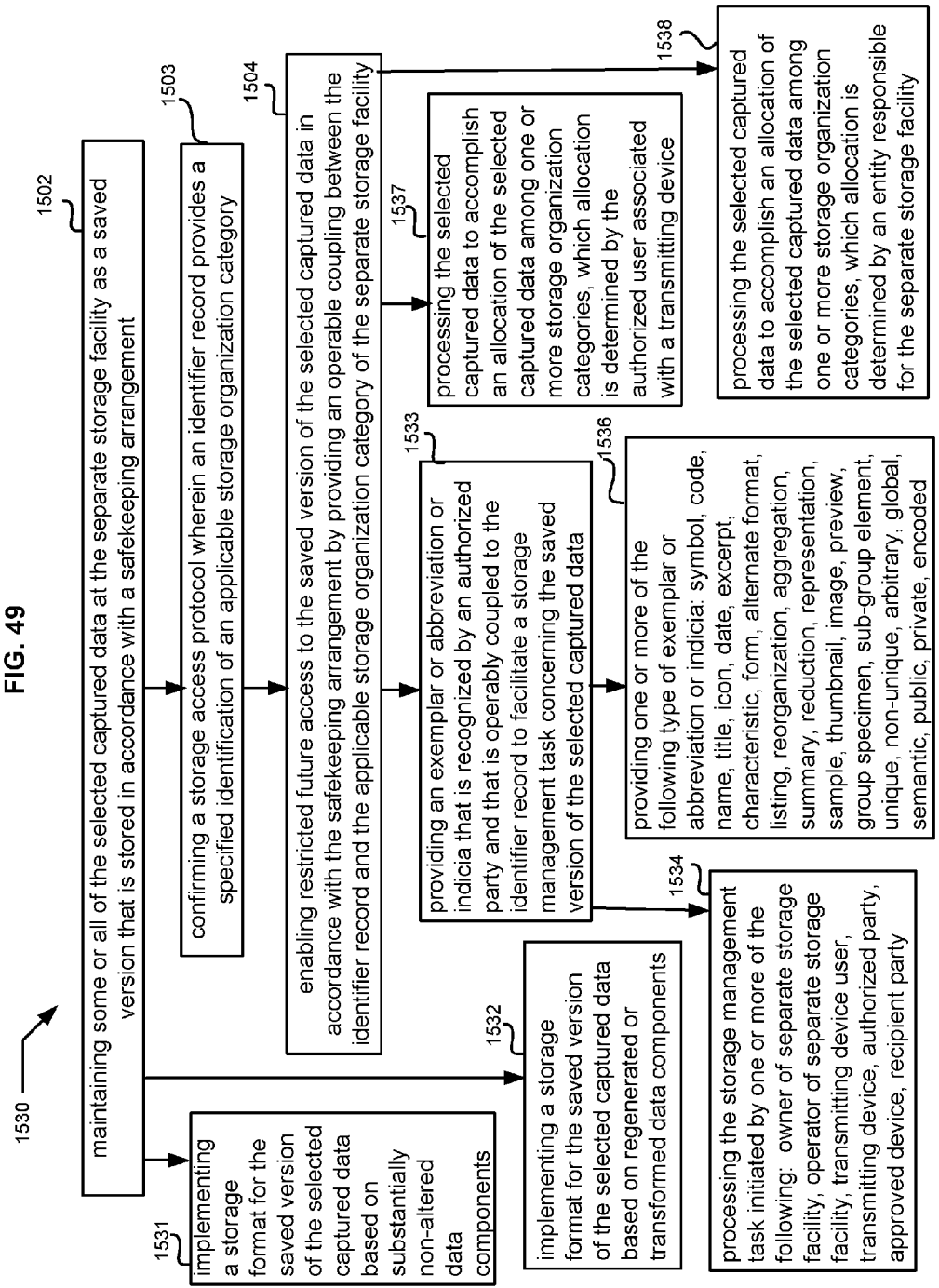

The detailed flow chart of FIG. 49 illustrates various exemplary embodiment features 1530 including previously described components 1502, 1503, 1504 along with various possible aspects relating to the saved version of the selected captured data. For example, some embodiments may include implementing a storage format for the saved version of the selected captured data based on substantially non-altered data components (block 1531). Other embodiments may include implementing a storage format for the saved version of the selected captured data based on regenerated or transformed data components (block 1532).

Additional process components may include providing an exemplar or abbreviation or indicia that is recognized by an authorized party and that is operably coupled to the identifier record to facilitate a storage management task concerning the saved version of the selected captured data (block 1533). A related aspect may include processing a storage management task initiated by one or more of the following: owner of separate storage facility, operator of separate storage facility, transmitting device user, transmitting device, authorized party, approved device, and recipient party (block 1534). Further related aspects may include providing one or more of the following type of exemplar or abbreviation or indicia: symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded (block 1536).

Other possible aspects illustrated in FIG. 49 include processing the selected captured data to accomplish an allocation of the selected captured data among one or more storage organization categories, which allocation is determined by the authorized user associated with a transmitting device (block 1537) or by an entity responsible for the separate storage facility (block 1538).

Figure 50:
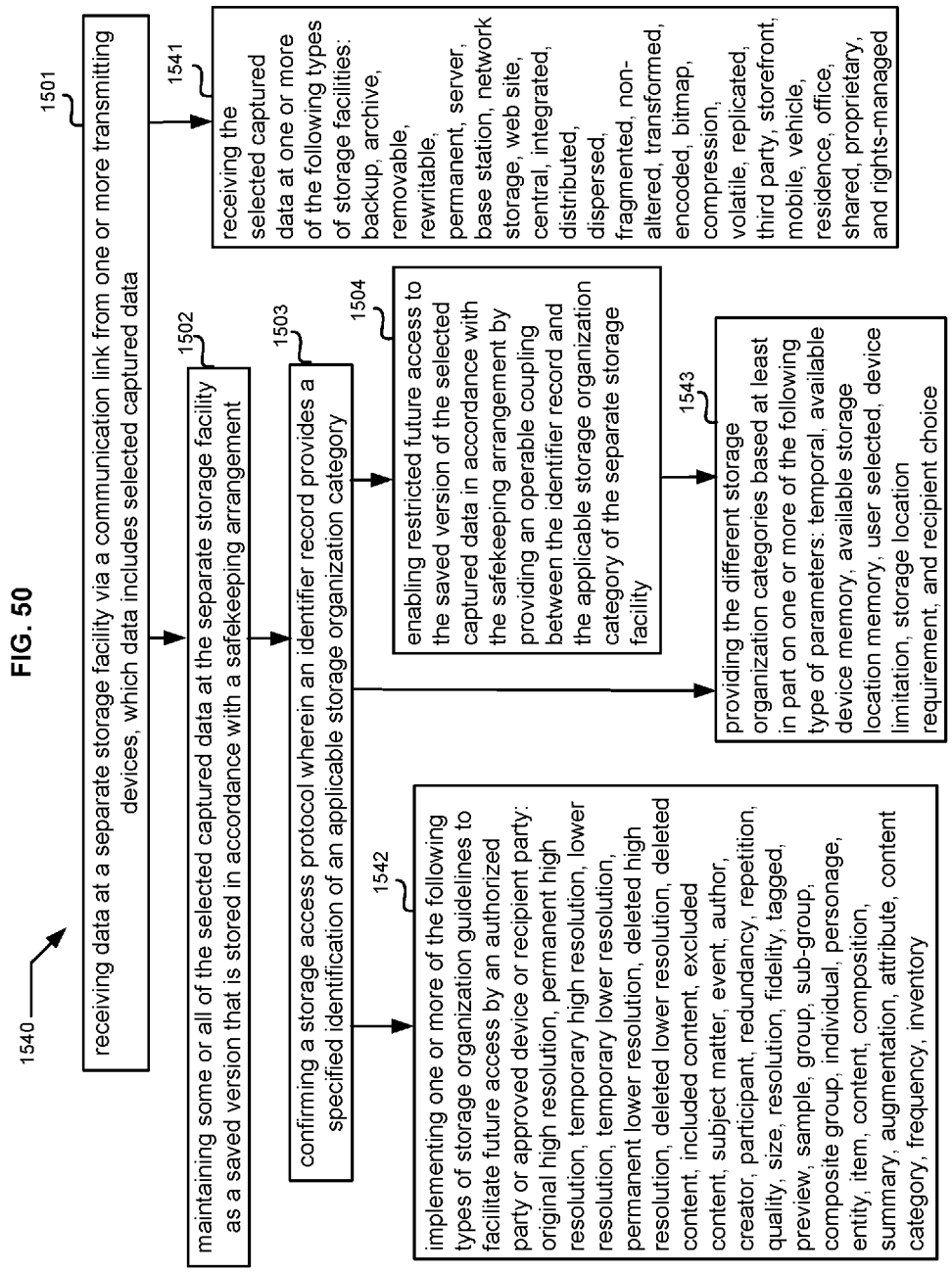

Referring to the exemplary embodiment features 1540 shown FIG. 50, previously described process features 1501, 1502, 1503, 1504 may in some instances also include receiving the selected captured data at one or more of the following types of storage facilities: backup, archive, removable, rewritable, permanent, server, base station, network storage, web site, central, integrated, distributed, dispersed, fragmented, non-altered, transformed, encoded, bitmap, compression, volatile, replicated, third party, storefront, mobile, vehicle, residence, office, shared, proprietary, and rights-managed (block 1541).

Additional possible aspects may include implementing one or more of the following types of storage organization guidelines to facilitate future access by an authorized party or approved device or recipient party: original high resolution, permanent high resolution, temporary high resolution, lower resolution, temporary lower resolution, permanent lower resolution, deleted high resolution, deleted lower resolution, deleted content, included content, excluded content, subject matter, event, author, creator, participant, redundancy, repetition, quality, size, resolution, fidelity, tagged, preview, sample, group, sub-group, composite group, individual, personage, entity, item, content, composition, summary, augmentation, attribute, content category, frequency, and inventory (block 1542).

Another exemplary feature may include providing the different storage organization categories based at least in part on one or more of the following type of parameters: temporal, available device memory, available storage location memory, user selected, device limitation, storage location requirement, and recipient choice (block 1543).

Figure 51:
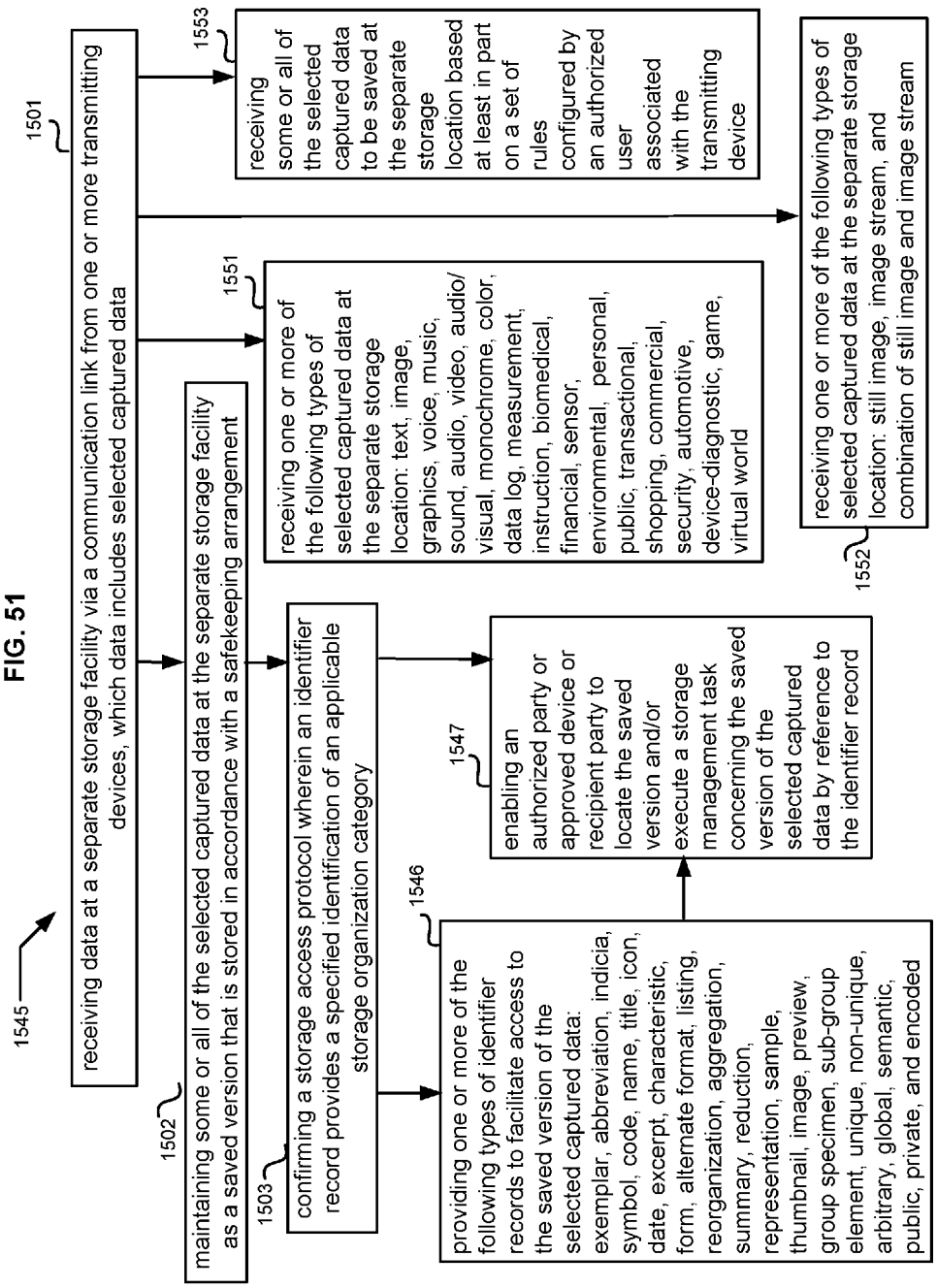

The exemplary detailed embodiments 1545 shown in FIG. 51 include previously described process features 1501, 1502, 1503 along with other possible aspects. For example, some implementations may provide one or more of the following types of identifier records to facilitate access to the saved version of the selected captured data: exemplar, abbreviation, indicia, symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded (block 1546).

Another possible aspect relating to an identifier record may include enabling an authorized party or approved device or recipient party to locate the saved version and/or execute a storage management task concerning the saved version of the selected captured data by reference to the identifier record (block 1547). It will be understood that in some embodiments the identifier record is operably coupled with a recognizable element that an authorized user can "look at" or authorized device can detect (e.g., identify) in order to locate selected captured data and/or execute a storage management task. However in other embodiments such a recognizable element (e.g., representative sample, thumbnail, exemplar, topical pointer, etc.) may directly function as the identifier record that is operably coupled to the separate storage facility.

Further possible features may include receiving one or more of the following types of selected captured data at the separate storage location: text, image, graphics, voice, music, sound, audio, video, audio/visual, monochrome, color, data log, measurement, instruction, biomedical, financial, sensor, environmental, personal, public, transactional, shopping, commercial, security, automotive, device-diagnostic, game, and virtual world (block 1551).

FIG. 51 also illustrates other possible aspects including receiving one or more of the following types of selected captured data at the separate storage location: still image, image stream, and combination of still image and image stream (block 1552). Yet another possible aspect may include receiving some or all of the selected captured data to be saved at the separate storage location based at least in part on a set of rules configured by an authorized user associated with the transmitting device (block 1553).

Figure 52:
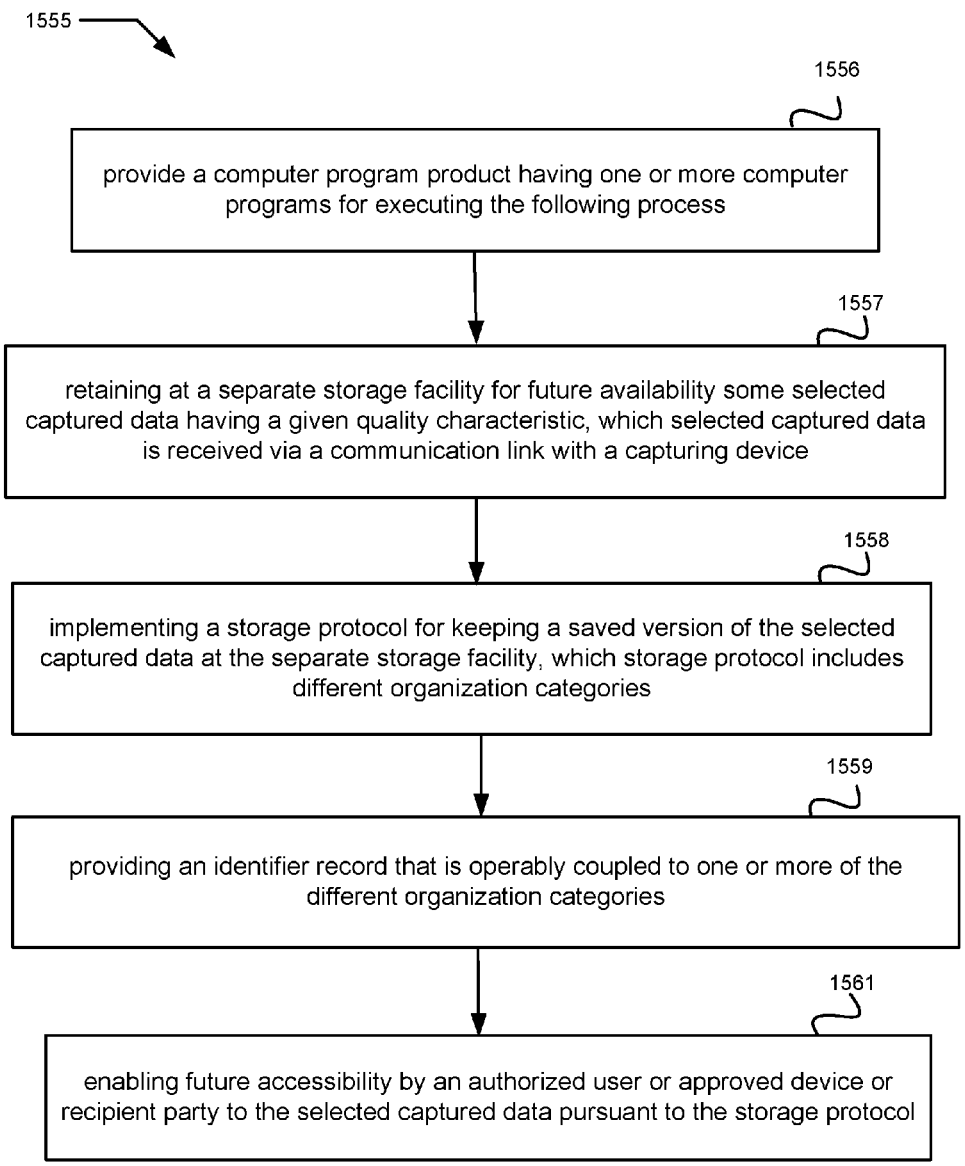
FIG. 52 illustrates another exemplary computer program product embodiment.

The exemplary embodiment 1555 shown in FIG. 52 illustrates a computer program product having one or more computer programs for executing a process (block 1556). Such a process may include retaining at a separate storage facility for future availability some selected captured data having a given quality characteristic, which selected captured data is received via a communication link with a capturing device (block 1557); and implementing a storage protocol for keeping a saved version of the selected captured data at the separate storage facility, which storage protocol includes different organization categories (block 1558).

Further possible programmed process components may include providing an identifier record that is operably coupled to one or more of the different organization categories (block 1559), and enabling future accessibility by an authorized user or approved device or recipient party to the selected captured data pursuant to the storage protocol (block 1561).

Figure 53:
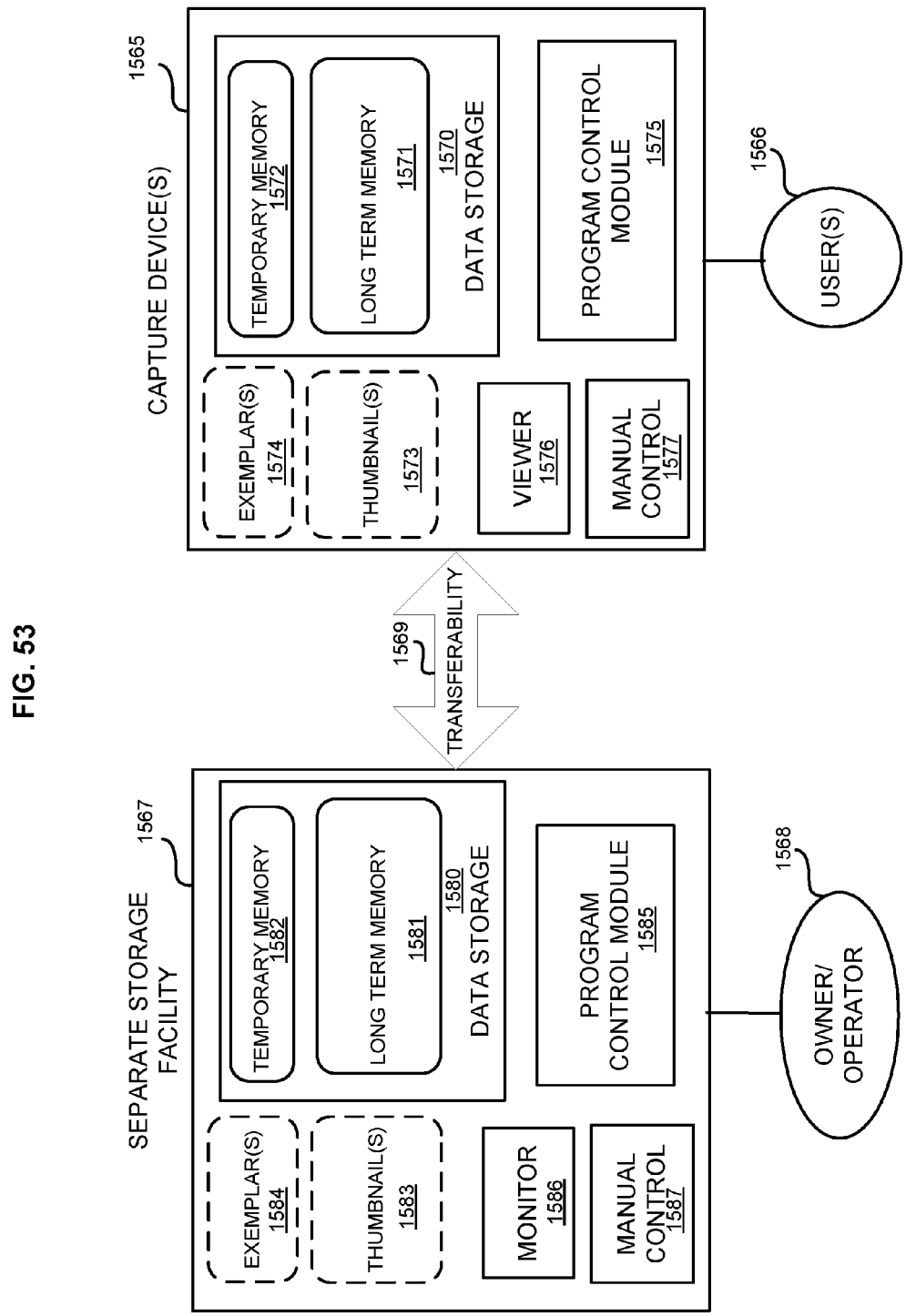
FIG. 53 is a schematic block diagram showing exemplary embodiments for a capture device and a separate data storage facility.

Referring to the schematic block diagram of FIG. 53, one or more exemplary capture devices 1565 may provide data storage files 1570 that store captured data in both long term memory 1571 and temporary memory 1572. An exemplary data management technique may include representative thumbnails 1573 and other exemplars 1574 that serve as an identifier link (e.g., directly and/or through an identifier record) to different categories of captured data. Visual access to the captured data as well as to the thumbnails 1573 and exemplars 1574 may be provided to a device user in various ways such as by viewer 1576.

As disclosed herein, a particular process for choosing selected captured data to be transferred to a separate storage facility 1567 may be accomplished by a program control module 1575 and/or by manual control 1577. Various types of transferability communication channels 1569 may be used that incorporate short and long distance communication media connections (e.g., Internet, wireless, cable, LAN, WAN, etc.) in order to provide periodic back and forth transfers between an approved external unit such as capture device 1565 and one or more separate storage facilities such as 1567.

In some exemplary implementations, various storage management functions may be performed at the separate storage facility 1567 under control of an owner/operator 1568 or in some instances under remote control by an approved device or authorized user 1566. Accordingly the illustrated separate storage facility embodiment 1567 includes data storage files 1580 with long term memory 1581 and temporary memory 1582 that store inventory data versions of the selected captured data received from a transmitting capture device 1565.

An exemplary data management technique at the separate storage facility 1567 may include representative thumbnails 1583 and other exemplars 1584 that serve as an identifier link (e.g., directly and/or through an identifier record) to different categories of stored inventory data versions (e.g., replicated, enhanced quality, downgraded quality, transformed, regenerated, etc.). Visual access to the inventory data versions as well as to thumbnails 1583 and exemplars 1584 may be provided in various ways such as by monitor 1586. Transferability management is shown to be subject to instructions from program control module 1585 as well as by manual control 1587.

Figure 54:
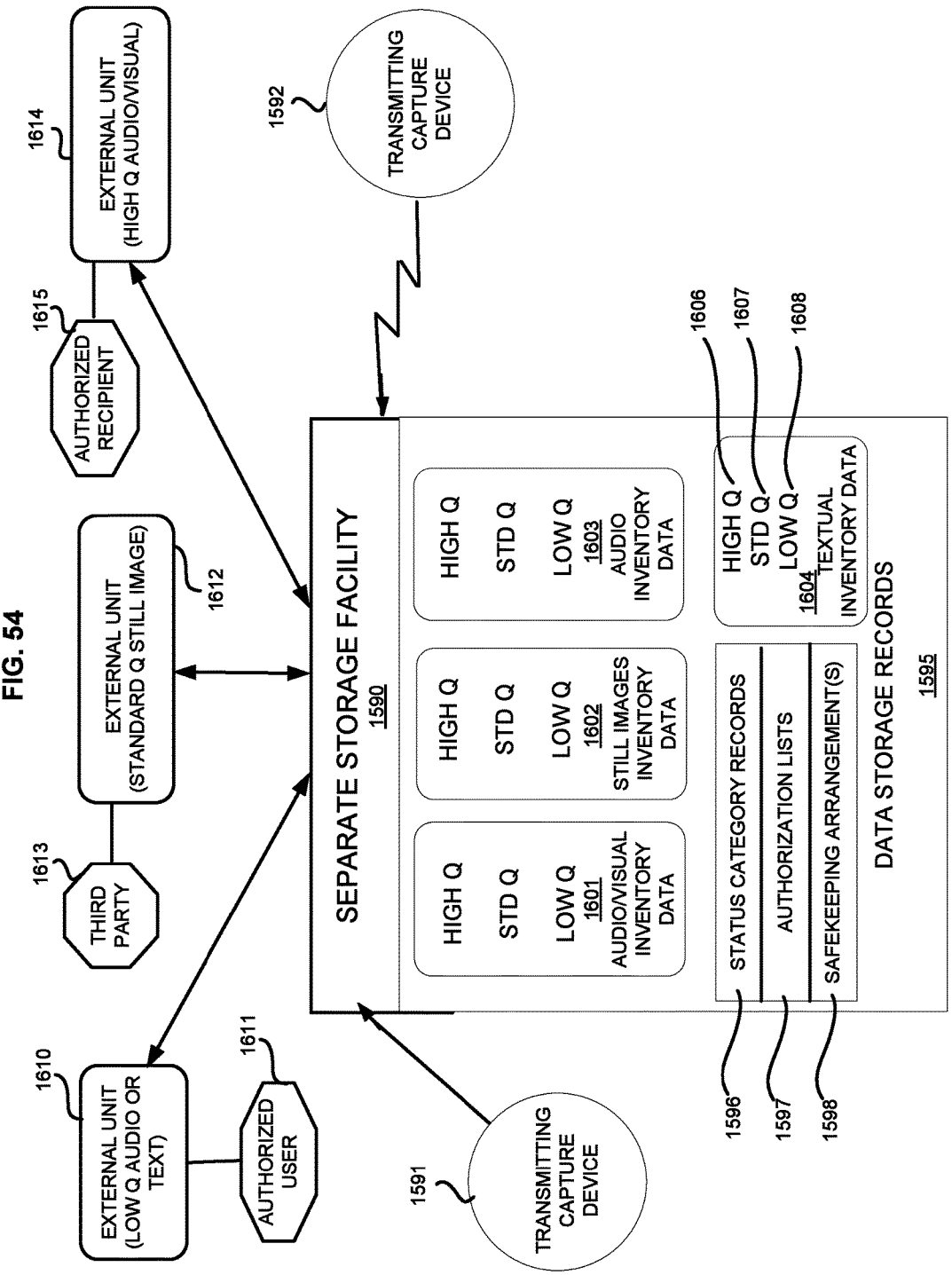
FIG. 54 schematically illustrates additional exemplary data storage access embodiments.

Referring to the schematic block diagram of FIG. 54, an exemplary separate storage facility embodiment 1590 may be accessible via a wireless connection by transmitting capture device 1592 as well as via a wired connection (e.g., cable, telephone line, etc.) by transmitting capture device 1591.

Exemplary informational file records that may be included in data storage records 1595 provided at or in connection with the separate storage facility 1590 may include status category records 1596, and authorization lists 1597 with respect to users, third parties, data recipients, approved capture/transmitting devices, approved access devices, etc. Another possible file record may specify obligated parties and applicable provisions related to safekeeping arrangements 1598. Of course such file records are for purposes of illustration only, and may be augmented or simplified depending on the circumstances.

Data storage records 1595 may include audio/visual inventory data 1601, still images inventory data 1602, audio inventory data 1603, and textual inventory data 1604. Each type of data files may be categorized in various ways, such as for example between high quality 1606, standard quality 1607 and low quality 1608. Such examples are for purposes of illustration only and are not intended to be limiting. It will be understood that such categorization of stored data files may be updated or modified as access availability needs change over time.

As further shown in the exemplary embodiments of FIG. 54, future accessibility to the inventory data versions of separate storage facility 1590 may be provided to one or more external units. Depending on the circumstances, a management scheme may seek to automatically and/or manually match an available inventory data version with a capability attribute of an external unit. For example, an external unit 1610 of authorized user 1611 may have hardware and/or software functional specifications for handling low quality audio or text. Another external unit 1612 of third party 1613 may have hardware and/or software functional specifications for handling standard quality still images. A further external unit 1614 of authorized distribution recipient 1615 may have hardware and/or software specifications for handling high quality audio/visual data.

It will be understood that some exemplary transferability schemes may provide transfers of captured or stored data that does not identically match a destination device or destination storage capability. However such type of matching may in some circumstances provide additional advantages and benefits.

Figure 55:
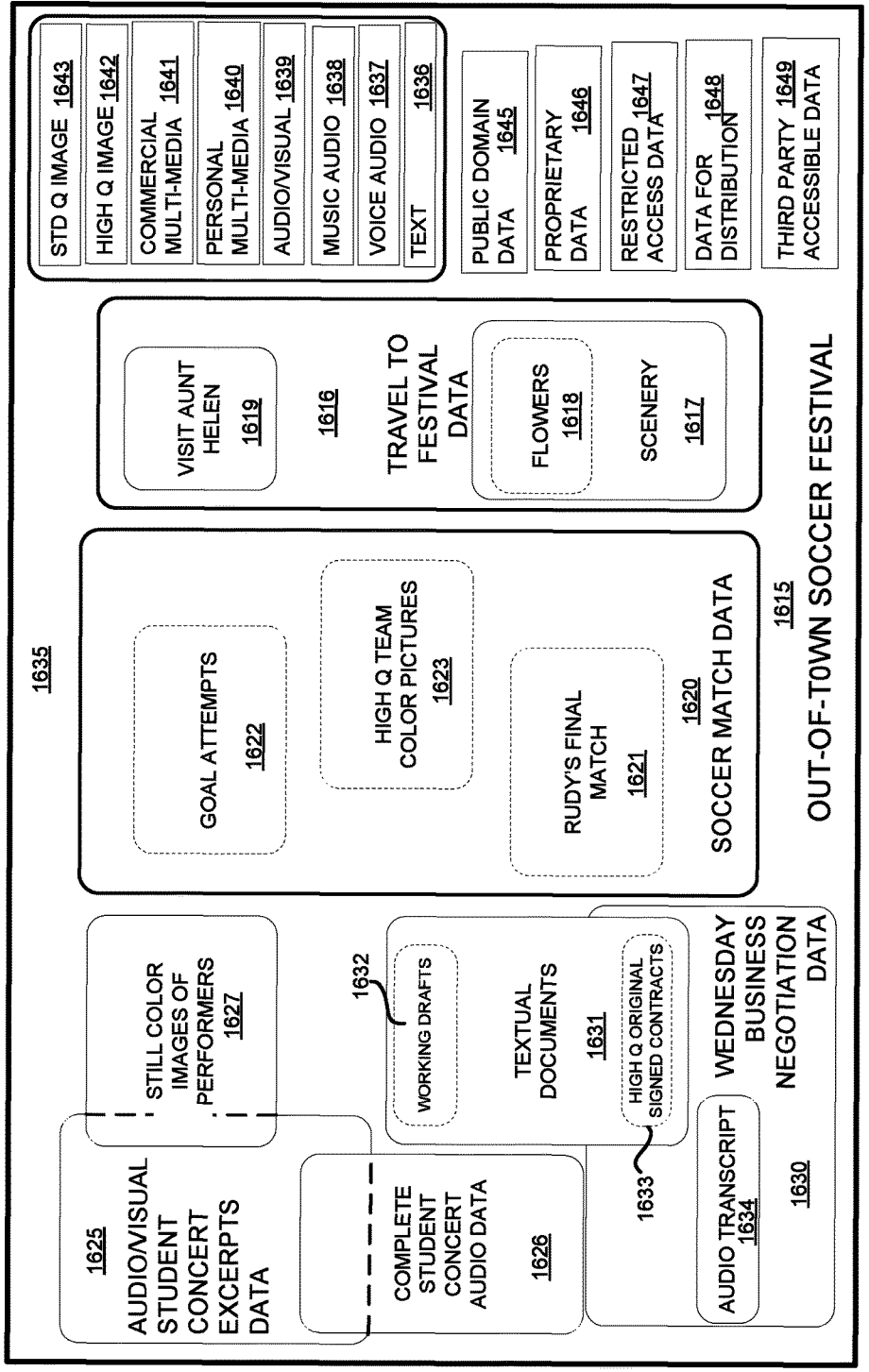
FIG. 55 is a schematic diagram showing exemplary storage categories for captured data.

Referring to the schematic diagram of FIG. 55, various exemplary embodiment features regarding storage categories for captured data 1635 are illustrated. It will be understood that a particular data structure or collection of data structures may be incorporated in many different distinct and/or different overlapping categories depending on parameters used to make an allocation to a particular category.

The various exemplary storage categories of FIG. 55 relate to captured data regarding an out-of-town soccer festival 1615. A possible broad category includes travel to festival data 1616 with a sub-category for scenery 1617 (e.g., includes a "flowers" segment 1618), and another sub-category for Aunt Helen visit 1619.

Another possible broad category includes soccer match data 1620 with sub-categories for Rudy's final match 1621, goal attempts 1622, and high quality team color pictures 1623. A further possible broad category includes audio/visual student concert excerpts data 1625 with overlapping related sub-categories for complete student concert audio data 1626 and for still color images of performers 1627.

Yet a further possible broad category includes Wednesday business negotiation data 1630 with a sub-category for audio transcript 1634. A related sub-category may be provided for textual documents 1631 that includes a working draft segment 1632 and a high quality original signed contracts segment 1633.

Some or all of these same captured data components may collectively and individually also be incorporated in a different categorization scheme. For example, exemplary categories may include text 1636, voice audio 1637, music audio 1638, and audio/visual 1639. Other possible categories for this scheme may include personal multi-media 1640, commercial multi-media 1641, high quality image 1642, and standard quality image 1643.

Some or all of these same captured data components may collectively and individually also be incorporated in yet another different categorization scheme. For example, exemplary categories may include public domain data 1645, proprietary data 1646, restricted access data 1647, data for distribution 1648 and third party accessible data 1649.

It will be understood that a particular separate data storage facility may have numerous authorized users and designated devices providing selected captured data under different safekeeping arrangements and related fee schedules. These same authorized users and designated devices as well as other patrons may be subject to additional accessibility guidelines and related fee schedules. Accordingly the illustrated examples are not intended to be limiting, and it is understood that changes may be made to accommodate the needs and desires of all different types of users and patrons.

Figure 56:
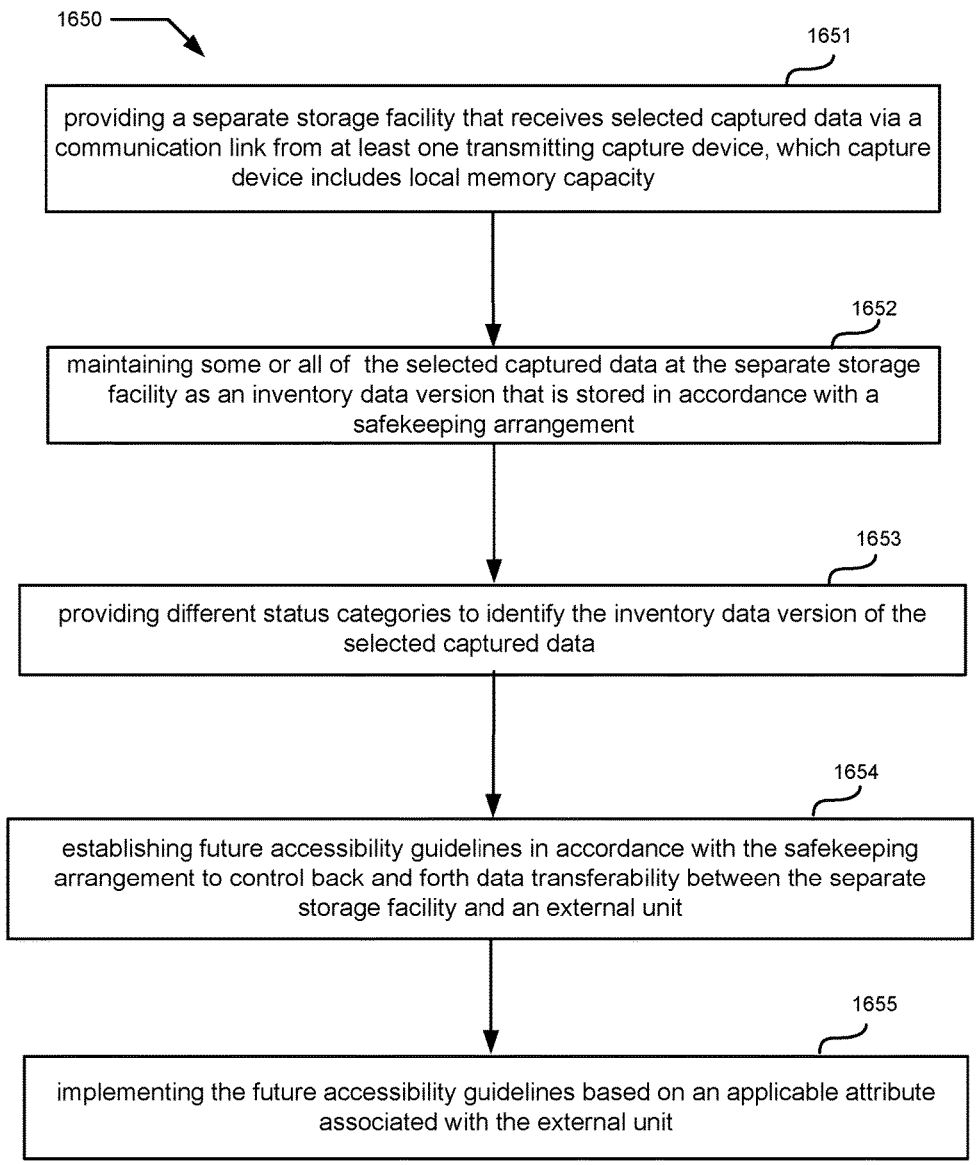
FIG. 56 is a high level flow chart showing a further exemplary process embodiment.

The high level flow chart of FIG. 56 illustrates an exemplary process embodiment 1650 for a data storage protocol technique that includes providing a separate storage facility that receives selected captured data via a communication link from at least one transmitting capture device, which capture device includes local memory capacity (block 1651); maintaining some or all of the selected captured data at the separate storage facility as an inventory data version that is stored in accordance with a safekeeping arrangement (block 1652); and providing different status categories to identify the inventory data version of the selected captured data (block 1653). Additional possible process features may include establishing future accessibility guidelines in accordance with the safekeeping arrangement to control back and forth data transferability between the separate storage facility and an external unit (block 1654), and implementing the future accessibility guidelines based on an applicable attribute associated with the external unit (block 1655).

Figure 57:
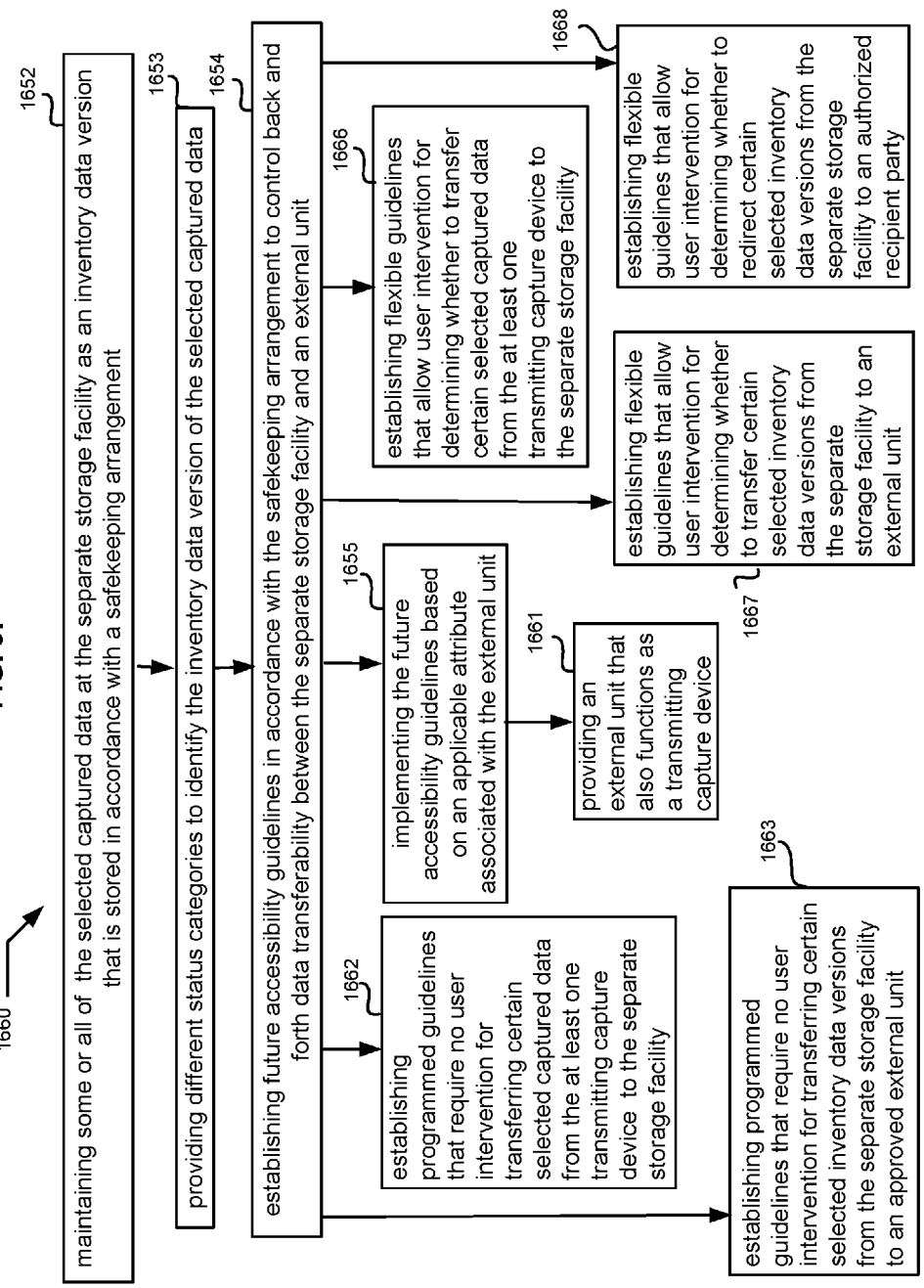
FIGS. 57-62 are detailed flow charts illustrating other exemplary embodiments.

Additional exemplary embodiment features 1660 are disclosed in FIG. 57 including previously described process components 1652, 1653, 1654, 1655 in combination with providing an external unit that also functions as a transmitting capture device (block 1661). Other possible aspect may include establishing programmed guidelines that require no user intervention for transferring certain selected captured data from the at least one transmitting capture device to the separate storage facility (block 1662), and establishing programmed guidelines that require no user intervention for transferring certain selected inventory data versions from the separate storage facility to an approved external unit (block 1663).

Further possible implementations may include establishing flexible guidelines that allow user intervention for determining whether to transfer certain selected captured data from the at least one transmitting capture device to the separate storage facility (block 1666), establishing flexible guidelines that allow user intervention for determining whether to transfer certain selected inventory data versions from the separate storage facility to an external unit (block 1667), and establishing flexible guidelines that allow user intervention for determining whether to redirect certain selected inventory data versions from the separate storage facility to an authorized recipient party (block 1668).

Figure 58:
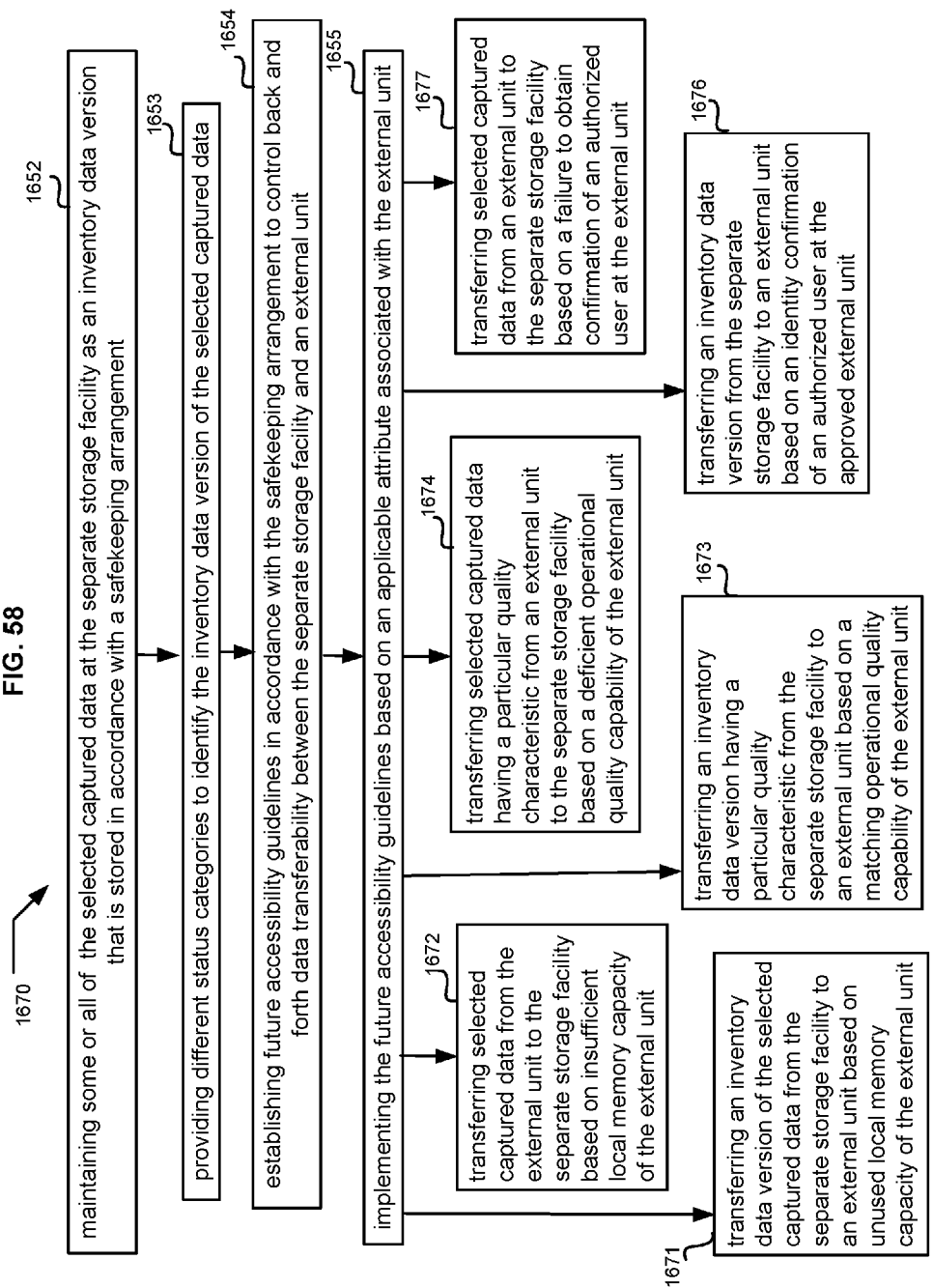

The more detailed flow chart of FIG. 58 discloses various exemplary embodiment components 1670 including previously described process features 1652, 1653, 1654, 1655 in combination with other possible features including transferring an inventory data version of the selected captured data from the separate storage facility to an external unit based on unused local memory capacity of the external unit (block 1671), transferring selected captured data from the external unit to the separate storage facility based on insufficient local memory capacity of the external unit (block 1672).

Other exemplary implementation features may include transferring an inventory data version having a particular quality characteristic from the separate storage facility to an external unit based on a matching operational quality capability of the external unit (block 1673), and transferring selected captured data having a particular quality characteristic from an external unit to the separate storage facility based on a deficient operational quality capability of the external unit (block 1674).

Additional aspects may include transferring an inventory data version from the separate storage facility to an external unit based on an identity confirmation of an authorized user at the approved external unit (block 1676), transferring selected captured data from an external unit to the separate storage facility based on a failure to obtain confirmation of an authorized user at the external unit (block 1677).

Figure 59:
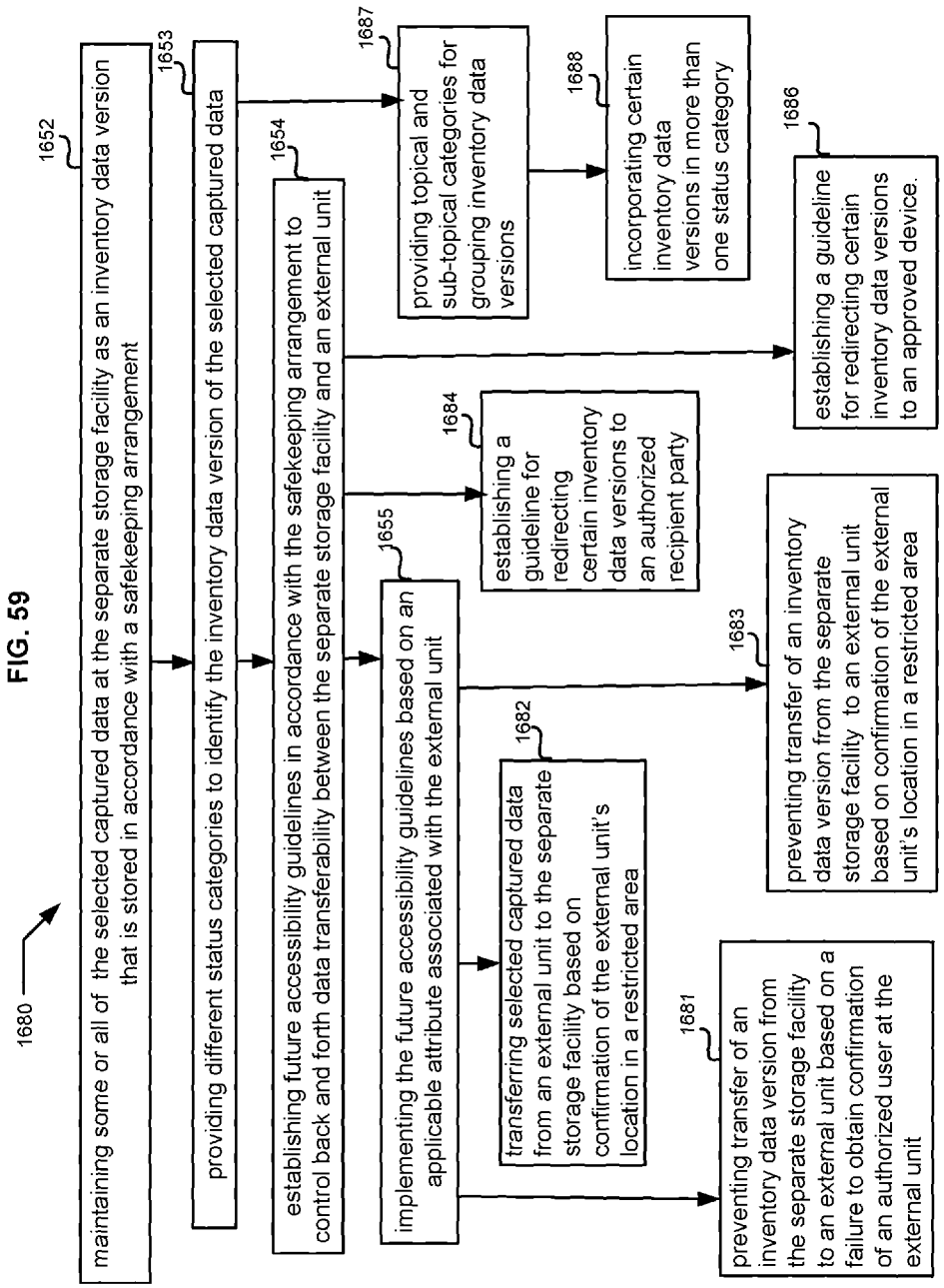

The illustrative features 1680 shown in FIG. 59 include previously discussed process components 1652, 1653, 1654, 1655 along with other possible data transfer options. For example, some implementations may include preventing transfer of an inventory data version from the separate storage facility to an external unit based on a failure to obtain confirmation of an authorized user at the external unit (block 1681), transferring selected captured data from an external unit to the separate storage facility based on confirmation of the external unit's location in a restricted area (block 1682).

Further exemplary features may include preventing transfer of an inventory data version from the separate storage facility to an external unit based on confirmation of the external unit's location in a restricted area (block 1683), establishing a guideline for redirecting certain inventory data versions to an authorized recipient party (block 1684), and establishing a guideline for redirecting certain inventory data versions to an approved device (block 1686).

FIG. 59 also discloses other possible aspects including providing topical and sub-topical categories for grouping inventory data versions (block 1687), and incorporating certain inventory data versions in more than one status category (block 1688).

Figure 60:
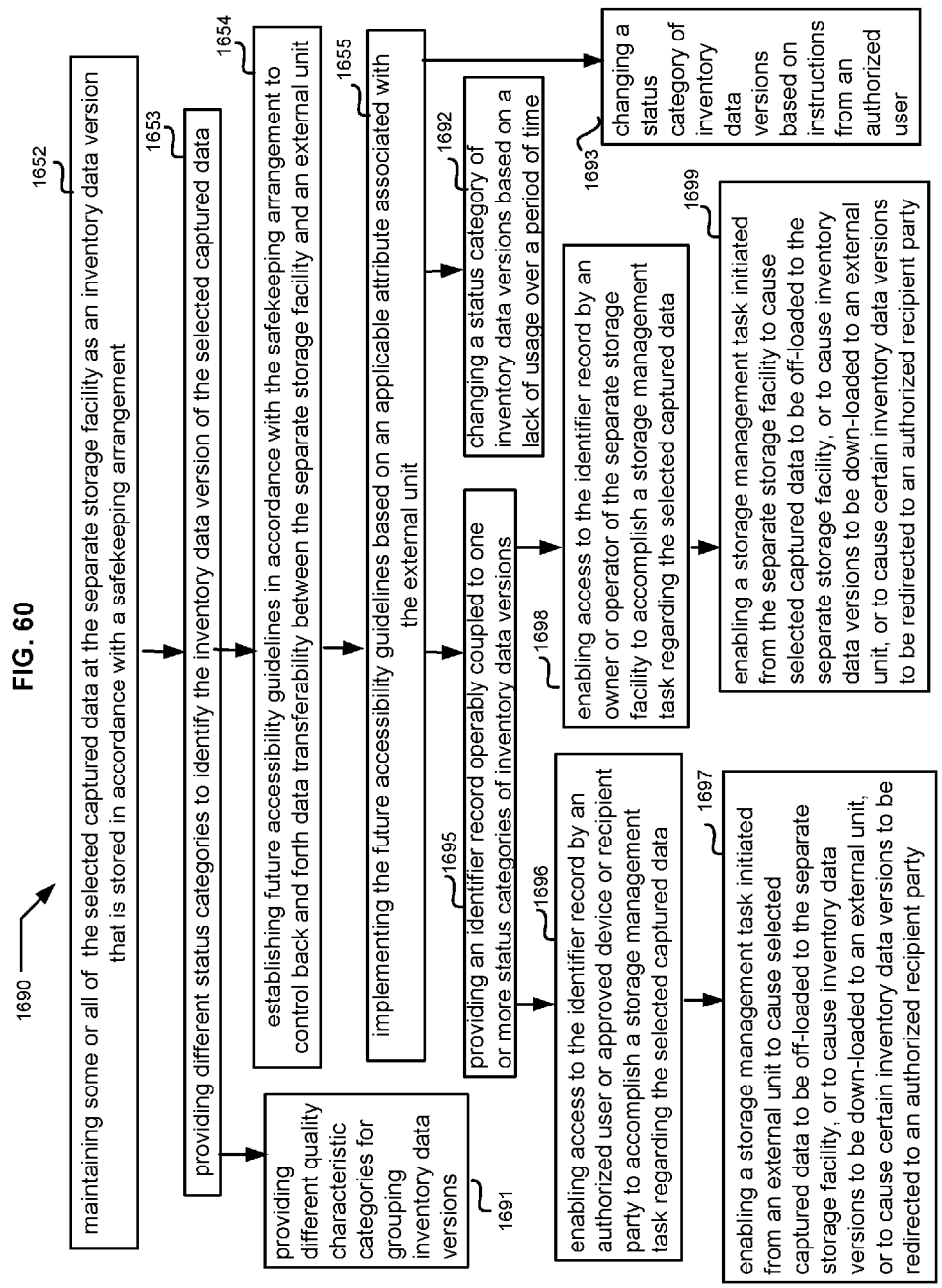

Referring to the detailed exemplary embodiments 1690 shown in FIG. 60, the previous discussed process components 1652, 1653, 1654, 1655 may further include providing different quality characteristic categories for grouping inventory data versions (block 1691). Other possible process components may include changing a status category of inventory data versions based on a lack of usage over a period of time (block 1692), and changing a status category of inventory data versions based on instructions from an authorized user (block 1693).

Another possible aspect may include providing an identifier record operably coupled to one or more status categories of inventory data versions (block 1695). A further related aspect may include enabling access to the identifier record by an authorized user or approved device or recipient party to accomplish a storage management task regarding the selected captured data (block 1696). Other possible implementation features may include enabling a storage management task initiated from an external unit to cause selected captured data to be off-loaded to the separate storage facility, or to cause inventory data versions to be down-loaded to an external unit, or to cause certain inventory data versions to be redirected to an authorized recipient party (block 1697).

FIG. 60 also shows an exemplary aspect that includes enabling access to the identifier record by an owner or operator of the separate storage facility to accomplish a storage management task regarding the selected captured data (block 1698). Further possible aspects may include enabling a storage management task initiated from the separate storage facility to cause selected captured data to be off-loaded to the separate storage facility, or to cause inventory data versions to be down-loaded to an external unit, or to cause certain inventory data versions to be redirected to an authorized recipient party (block 1699).

Figure 61:
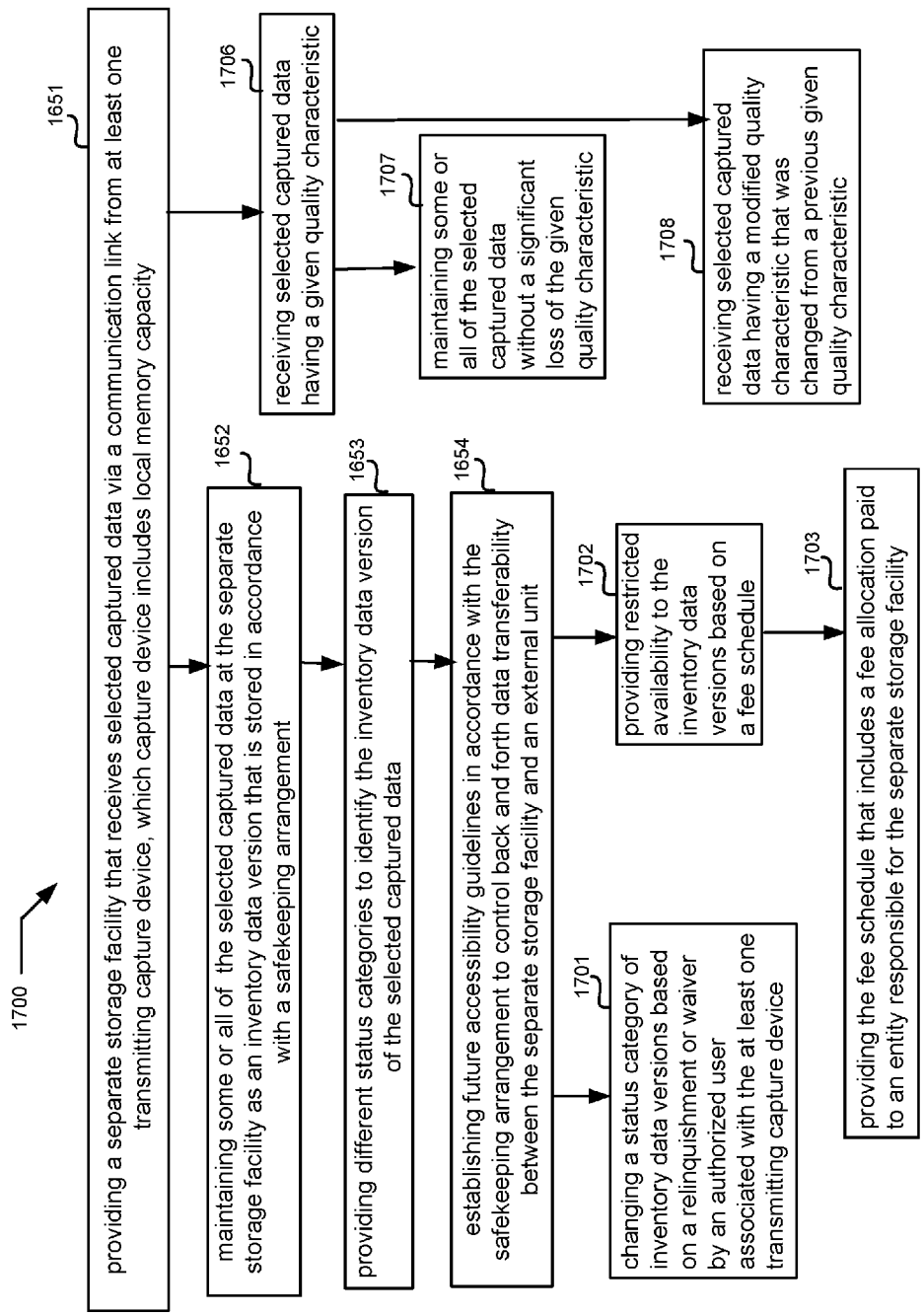

The detailed exemplary embodiment features 1700 shown in FIG. 61 include previously discussed process components 1651, 1652, 1653, 1654 along with another aspect that may include changing a status category of inventory data versions based on a relinquishment or waiver by an authorized user associated with the at least one transmitting capture device (block 1701). Further possible implementation features may include providing restricted availability to the inventory data versions based on a fee schedule (block 1702), and providing the fee schedule that includes a fee allocation paid to an entity responsible for the separate storage facility (block 1703).

FIG. 61 also shows additional exemplary aspects including receiving selected captured data having a given quality characteristic (block 1706), maintaining some or all of the selected captured data without a significant loss of the given quality characteristic (block 1707), and receiving selected captured data having a modified quality characteristic that was changed from a previous given quality characteristic (block 1708).

Figure 62:
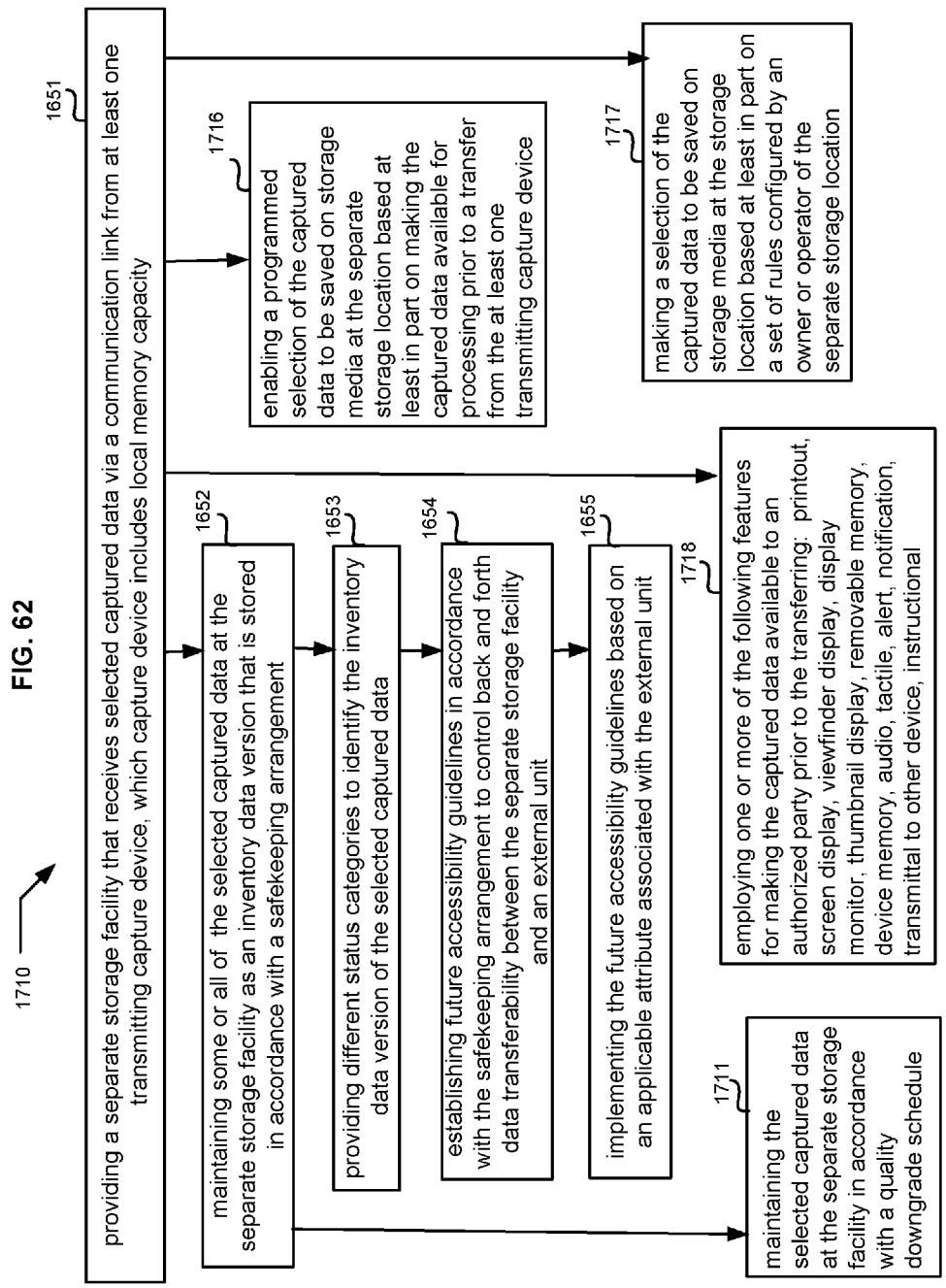

The various exemplary embodiment features 1710 of FIG. 62 may include previously discussed process components 1651, 1652, 1653, 1654, 1655 as well as maintaining the selected captured data at the separate storage facility in accordance with a quality downgrade schedule (block 1711). A further possible aspect may include enabling a programmed selection of the captured data to be saved on storage media at the separate storage location based at least in part on making the captured data available for processing prior to a transfer from the at least one transmitting capture device (block 1716).

Further possible implementation features may include making a selection of the captured data to be saved on storage media at the storage location based at least in part on a set of rules configured by an owner or operator of the separate storage location (block 1717). Other possible features may include employing one or more of the following features for making the captured data available to an authorized party prior to the transferring: printout, screen display, viewfinder display, display monitor, thumbnail display, removable memory, device memory, audio, tactile, alert, notification, transmittal to other device, and instructional (block 1718).

Figure 63:
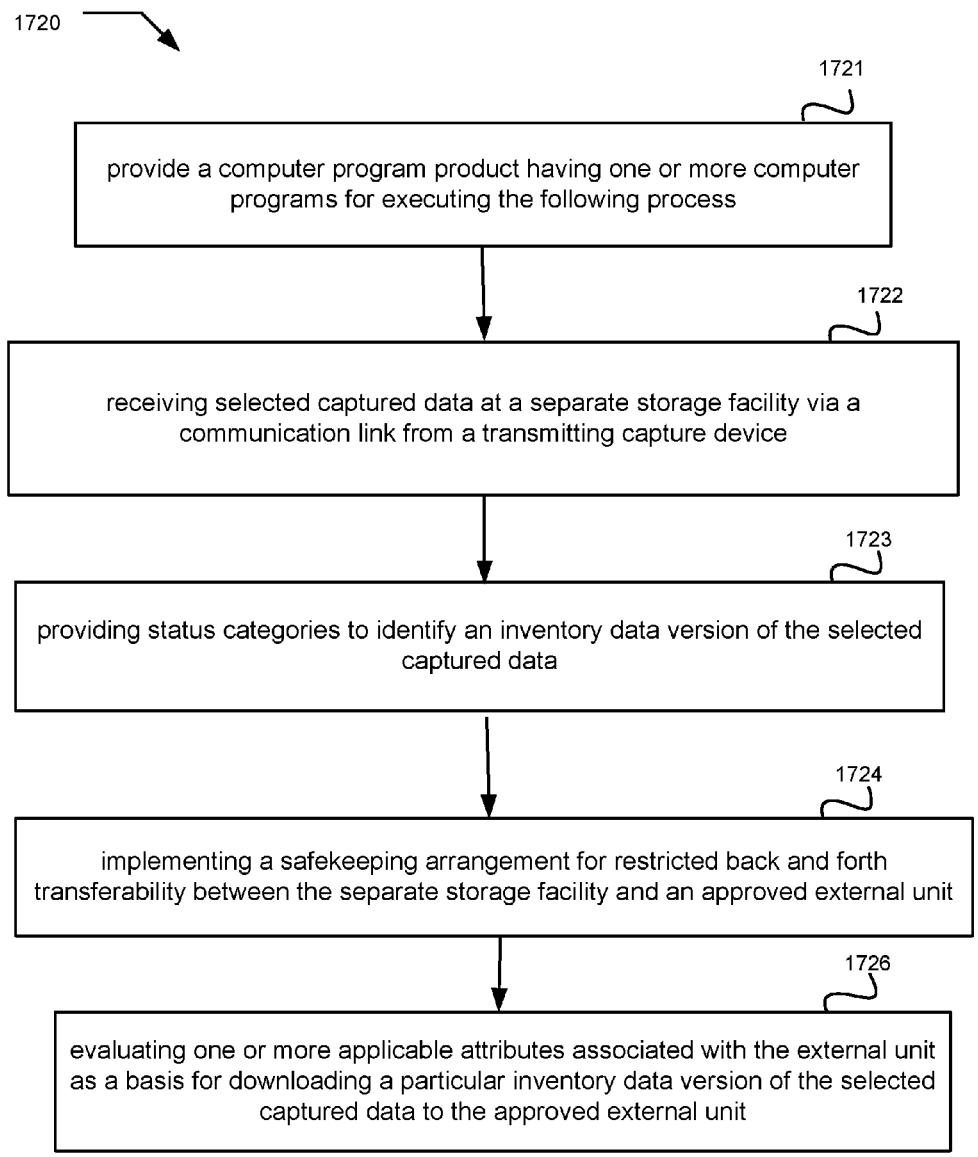
FIG. 63 illustrates a further exemplary computer program product embodiment.

Referring to FIG. 63, an exemplary computer program product embodiment 1720 provides a computer program product having one or more computer programs for executing a process (block 1721). An exemplary process may include receiving selected captured data at a separate storage facility via a communication link from a transmitting capture device (block 1722), providing status categories to identify an inventory data version of the selected captured data (block 1723), implementing a safekeeping arrangement for restricted back and forth transferability between the separate storage facility and an approved external unit (block 1724), and evaluating one or more applicable attributes associated with the external unit as a basis for downloading a particular inventory data version of the selected captured data to the approved external unit (block 1726).

Examples of back and forth transferability may involve replacing a thumbnail representation on a capture/access device with high resolution quality photographs retrieved from the separate storage facility. Another example may involve replacing an entire collection of recent photographs held in local memory of a user's capture/access device that are organized by a "date categorization" scheme with topical thumbnails organized by topics that are pertinent to a currently active project. As part of the replacement, the remaining non-topical recent photos may be transferred to the remote storage location for safekeeping and future accessibility.

Another possible example may involve prefetching from the separate storage facility previously archived high quality resolution images in anticipation of an upcoming event. A further example may involve using an external unit such as a mobile telephone to select certain individual or collective archived image data in remote archived storage, and initiate a redirection (e.g., distribution) of an enhanced transformed high quality resolution version that is matched to a high quality capability external unit of an approved recipient.

Figure 64:
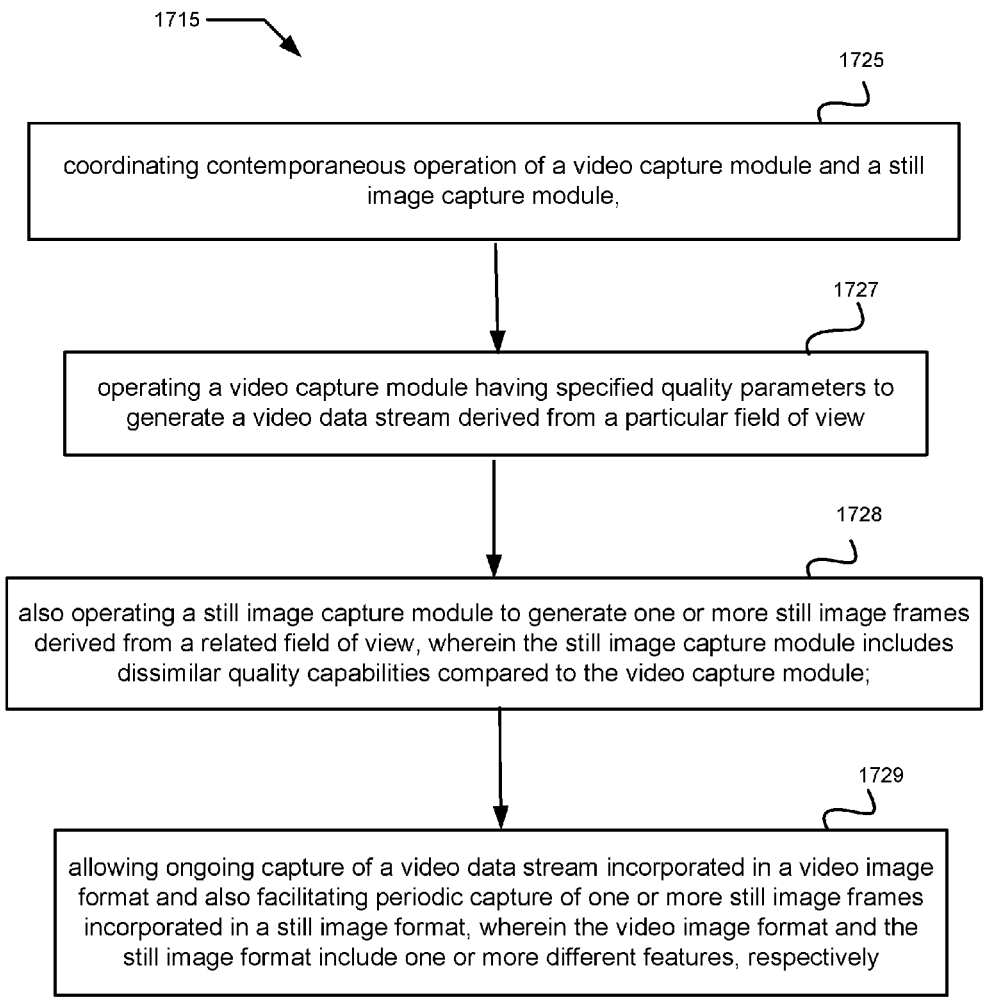
FIGS. 64-65 are high level flow charts showing additional exemplary process embodiments.

Referring to the exemplary dual mode capture embodiment 1715 of FIG. 64, process components may include coordinating contemporaneous operation of a video capture module and a still image capture module (block 1725); operating a video capture module having specified quality parameters to generate a video data stream derived from a particular field of view (block 1727); and also operating a still image capture module to generate one or more still image frames derived from a related field of view, wherein the still image capture module includes dissimilar quality capabilities compared to the video capture module (block 1728). A further related process component may include allowing ongoing capture of a video data stream incorporated in a video image format and also facilitating periodic capture of one or more still image frames incorporated in a still image format, wherein the video image format and the still image format include one or more different features, respectively (block 1729).

Figure 65:
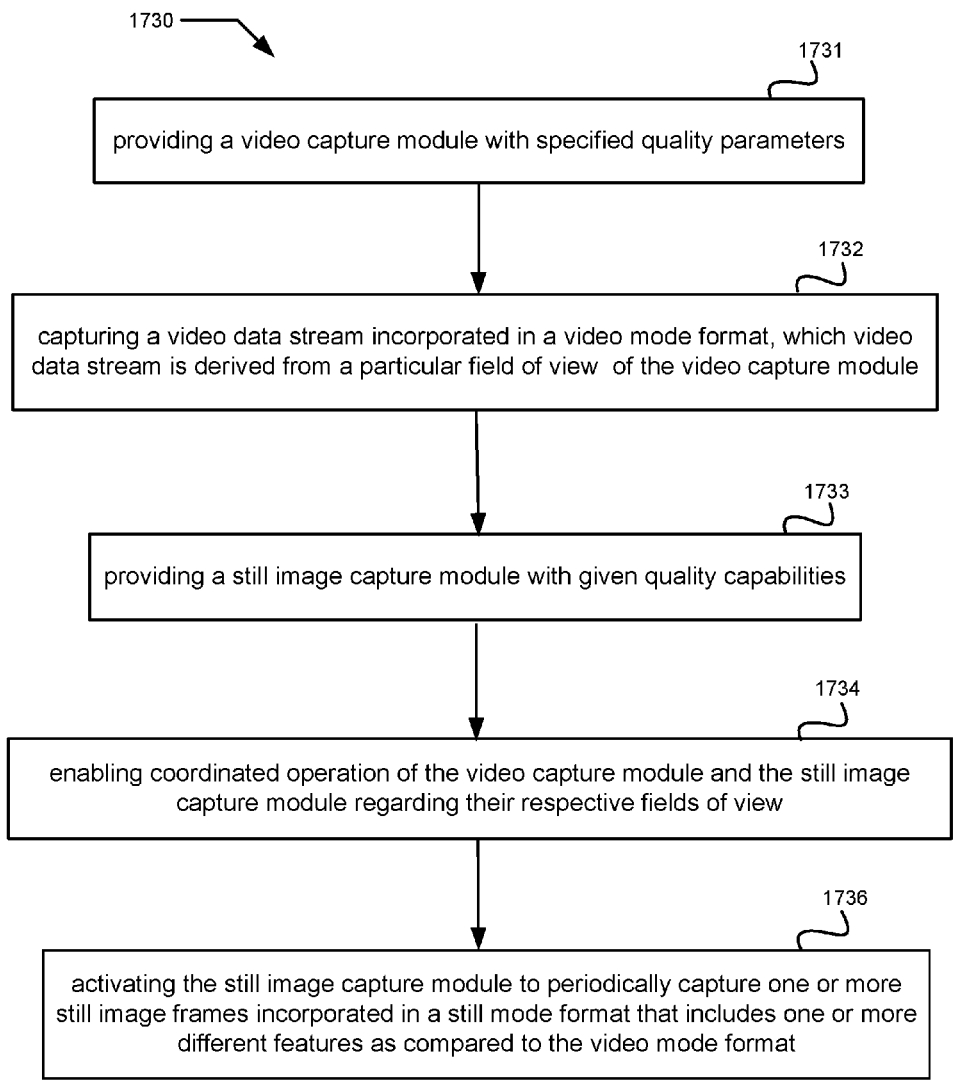

FIG. 65 illustrates another exemplary image capture technique embodiment 1730 that may include providing a video capture module with specified quality parameters (block 1731), capturing a video data stream incorporated in a video mode format, which video data stream is derived from a particular field of view of the video capture module (block 1732), providing a still image capture module with given quality capabilities (1733), and enabling coordinated operation of the video capture module and the still image capture module regarding their respective fields of view. A further possible aspect may include activating the still image capture module to periodically capture one or more still image frames incorporated in a still mode format that includes one or more different features as compared to the video mode format (block 1736).

Figure 66:
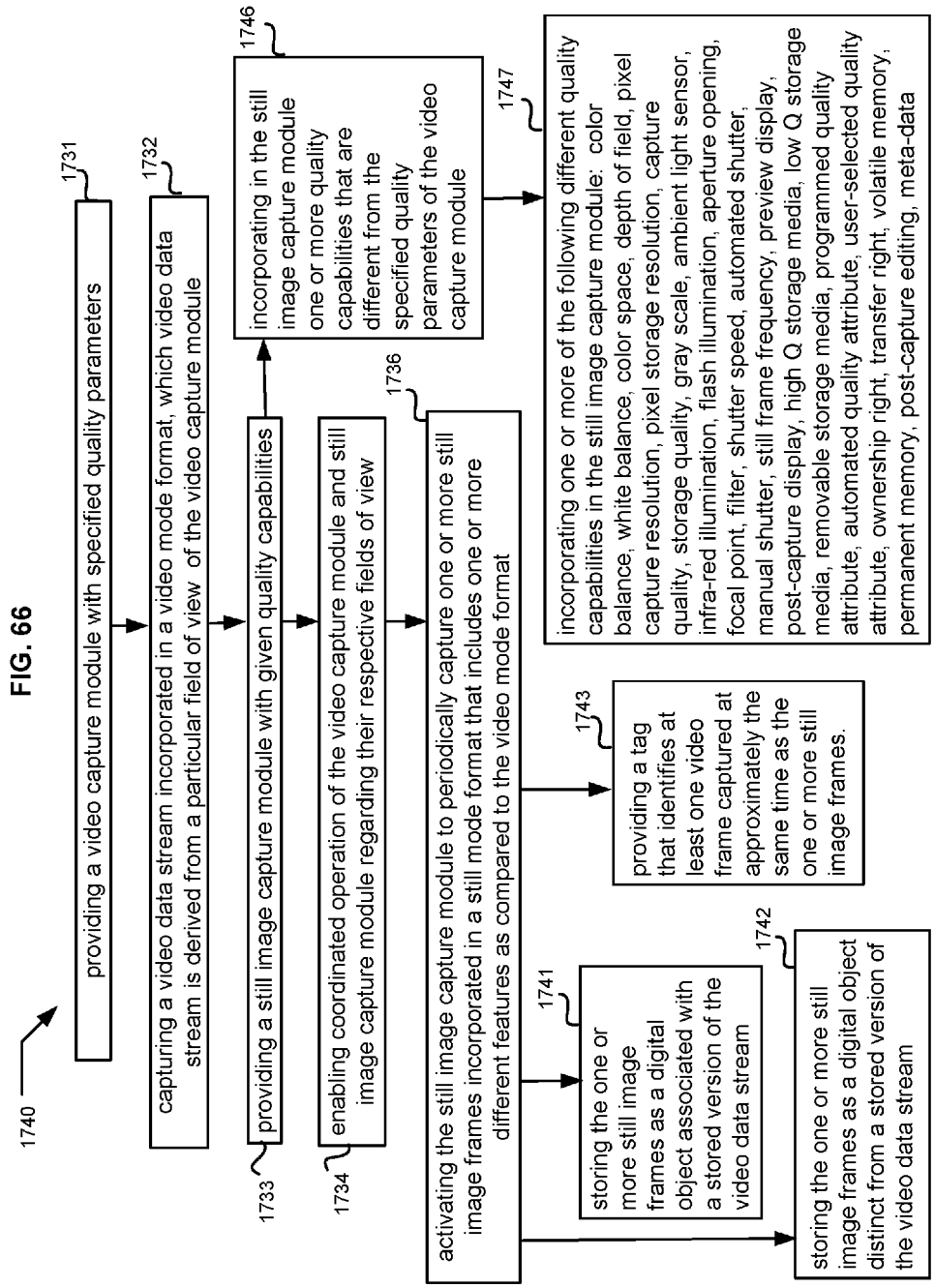
FIGS. 66-72 are detailed flow charts illustrating further exemplary embodiments.

Referring to the exemplary embodiments 1740 illustrated in FIG. 66, a possible technique may include previously described process features 1731, 1732, 1733, 1734, 1736 along with providing a tag that identifies at least one video frame captured at approximately the same time as the one or more still image frames (block 1743). Other possible implementation features may include storing the one or more still image frames as a digital object associated with a stored version of the video data stream (block 1741) or a digital object distinct from a stored version of the video data stream (block 1741).

Further exemplary aspects may include incorporating in the still image capture module one or more quality capabilities that are different from the specified quality parameters of the video capture module (block 1746). Other related aspects may include incorporating one or more of the following different quality capabilities in the still image capture module: color balance, white balance, color space, depth of field, pixel capture resolution, pixel storage resolution, capture quality, storage quality, gray scale, ambient light sensor, infra-red illumination, flash illumination, aperture opening, focal point, filter, shutter speed, automated shutter, manual shutter, still frame frequency, preview display, post-capture display, high quality storage media, low quality storage media, removable storage media, programmed quality attribute, automated quality attribute, user-selected quality attribute, ownership right, transfer right, volatile memory, permanent memory, post-capture editing, and meta-data (block 1747).

Figure 67:
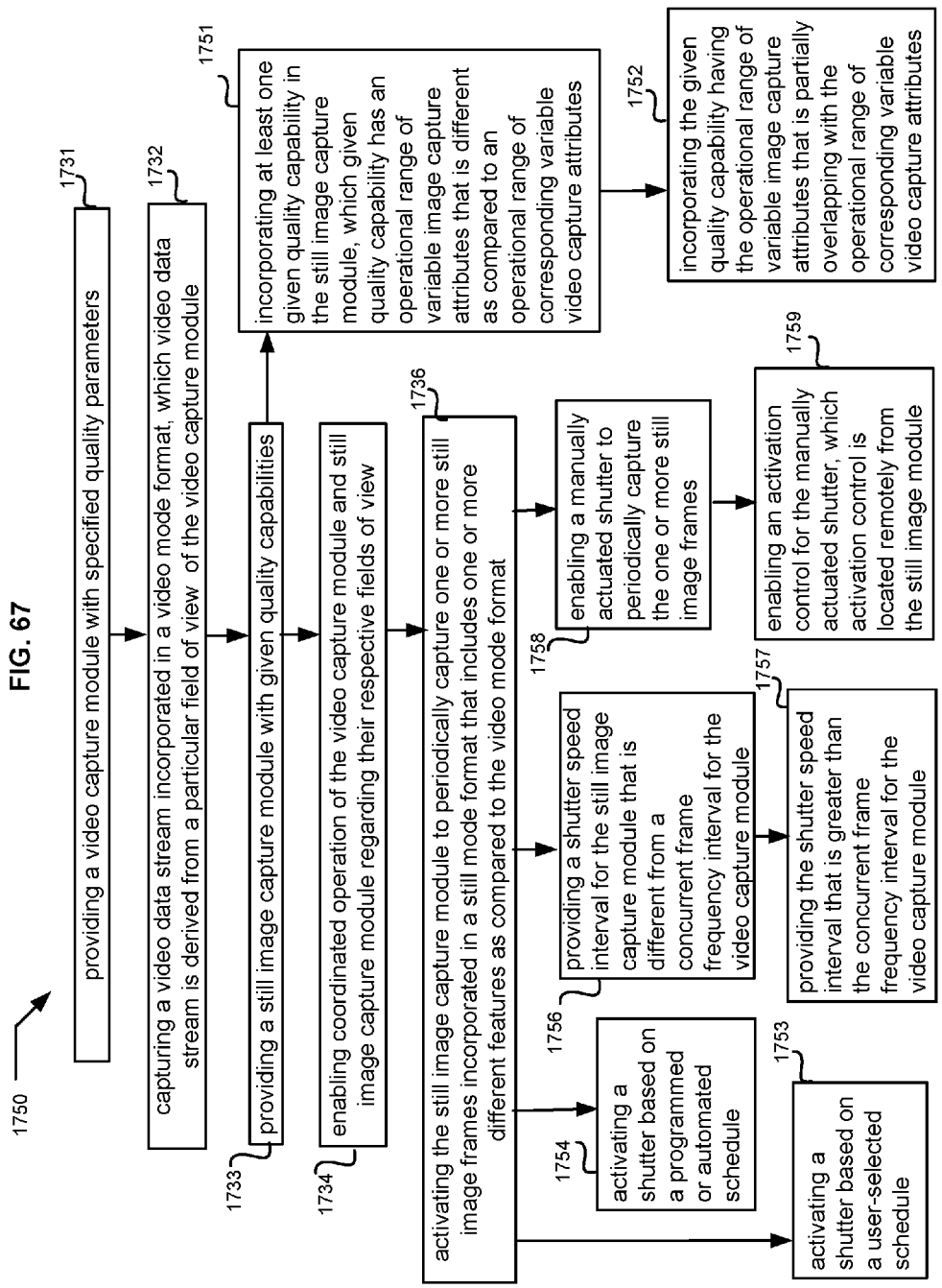

The various exemplary embodiments 1750 of FIG. 67 may include previously described features 1731, 1732, 1733, 1734, 1736 along with aspects related to quality capabilities of the still image capture module. For example some implementations may include incorporating at least one given still image quality capability having an operational range of variable image capture attributes that is different as compared to an operational range of corresponding variable video capture attributes (block 1751). Other implementations may include incorporating the given still image quality capability having the operational range of variable image capture attributes that is partially overlapping with the operational range of corresponding variable video capture attributes (block 1752).

Additional possible implementation features may include activating a shutter based on a user-selected schedule (block 1753), and activating a shutter based on a programmed or automated schedule (block 1754). Other possible features may include providing a shutter speed interval for the still image capture module that is different from a concurrent frame frequency interval for the video capture module (block 1756), and providing the shutter speed interval that is greater than the concurrent frame frequency interval for the video capture module (block 1757).

As shown in FIG. 67, other related aspects may include enabling a manually actuated shutter to periodically capture the one or more still image frames (block 1758); and enabling an activation control for the manually actuated shutter, which activation control is located remotely from the still image module (block 1759).

Figure 68:
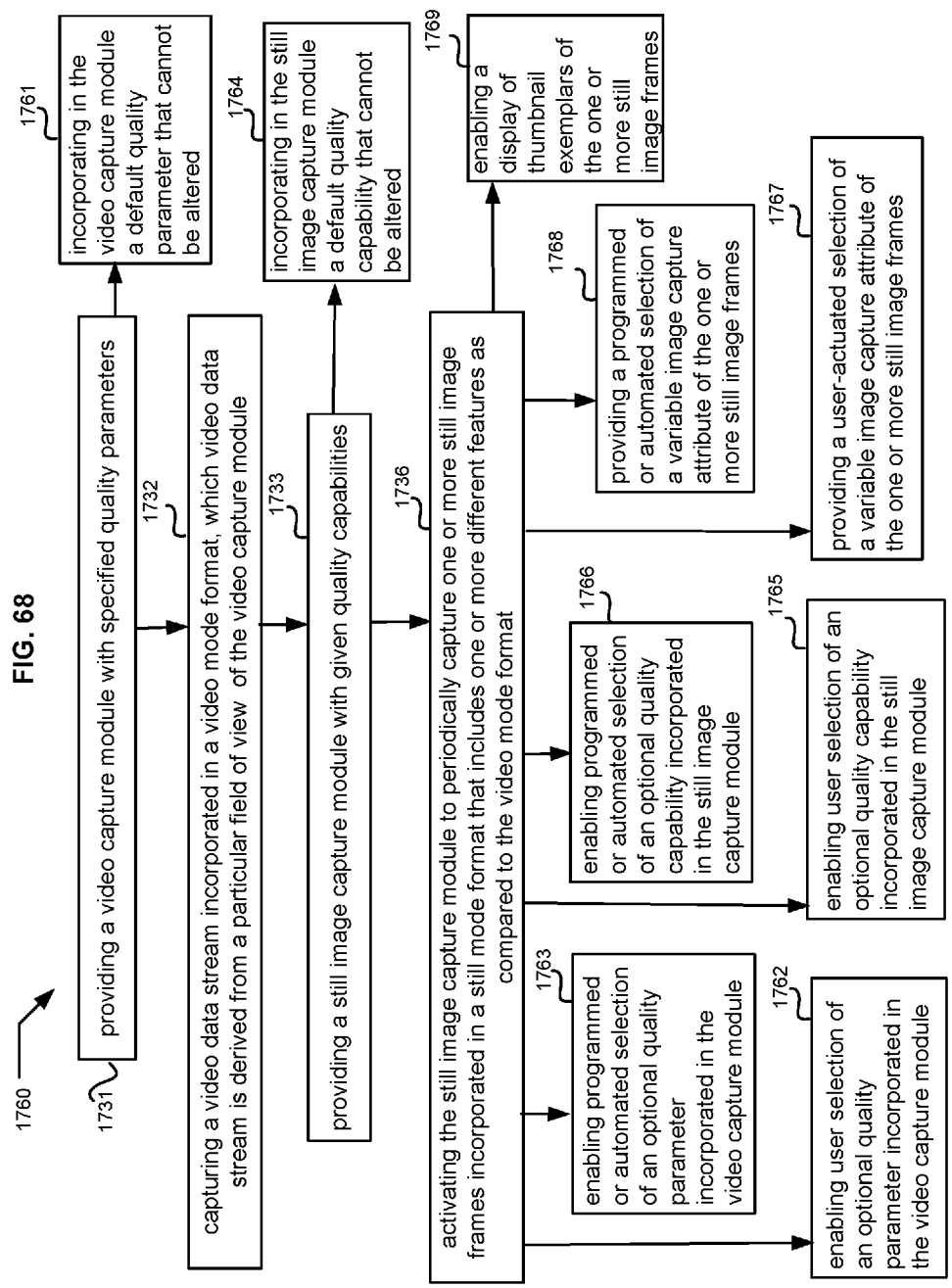

The various exemplary embodiments 1760 illustrated in FIG. 68 include previously described process components 1731, 1732, 1733, 1736 along with possible aspect of incorporating in the video capture module a default quality parameter that cannot be altered (block 1761), and incorporating in the image capture module a default quality capability that cannot be altered (block 1764).

Further exemplary aspects may include enabling user selection of an optional quality parameter incorporated in the video capture module (block 1762), and enabling programmed or automated selection of an optional quality parameter incorporated in the video capture module (block 1763). Additional process features may include enabling user selection of an optional quality capability incorporated in the still image capture module (block 1765), and enabling programmed or automated selection of an optional quality capability incorporated in the still image capture module (block 1766).

Other possible implementation features shown in FIG. 68 include providing a user-actuated selection of a variable image capture attribute of the one or more still image frames (block 1767), and providing a programmed or automated selection of a variable image capture attribute of the one or more still image frames (block 1768). An additional possible feature may include enabling a display of thumbnail exemplars of the one or more still image frames (block 1769).

Figure 69:
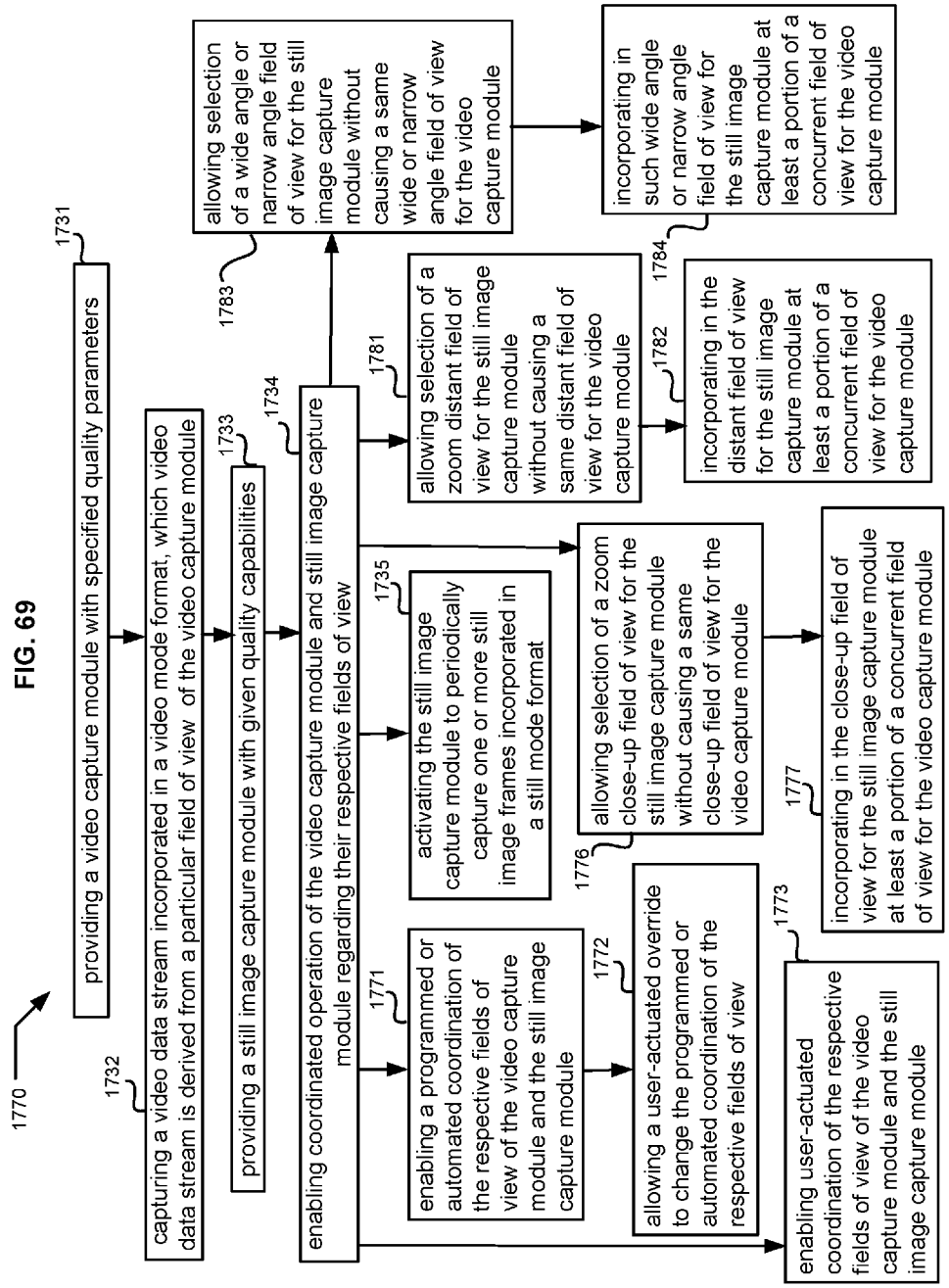

The exemplary embodiments 1770 shown in FIG. 69 include previously described process features 1731, 1732, 1733, 1734 along with a possibility of activating the still image capture module to periodically capture one or more still image frames incorporated in a still mode format (block 1735).

Other possible process features may include enabling a programmed or automated coordination of the respective fields of view of the video capture module and the still image capture module (block 1771), allowing a user-actuated override to change the programmed or automated coordination of the respective fields of view (block 1772), and enabling user-actuated coordination of the respective fields of view of the video capture module and the still image capture module (block 1773).

Further exemplary implementation features may include allowing selection of a zoom close-up field of view for the still image capture module without causing a same close-up field of view for the video capture module (block 1776), and incorporating in the close-up field of view for the still image capture module at least a portion of a concurrent field of view for the video capture module (block 1777).

Other possible aspects illustrated in FIG. 69 include allowing selection of a zoom distant field of view for the still image capture module without causing a same distant field of view for the video capture module (block 1781), and incorporating in the distant field of view for the still image capture module at least a portion of a concurrent field of view for the video capture module (block 1782).

Additional possible aspects may include allowing selection of a wide angle or narrow angle field of view for the still image capture module without causing a same wide angle or narrow angle field of view for the video capture module (block 1783), and incorporating in such field of view for the still image capture module at least a portion of a concurrent field of view for the video capture module (block 1784).

Figure 70:
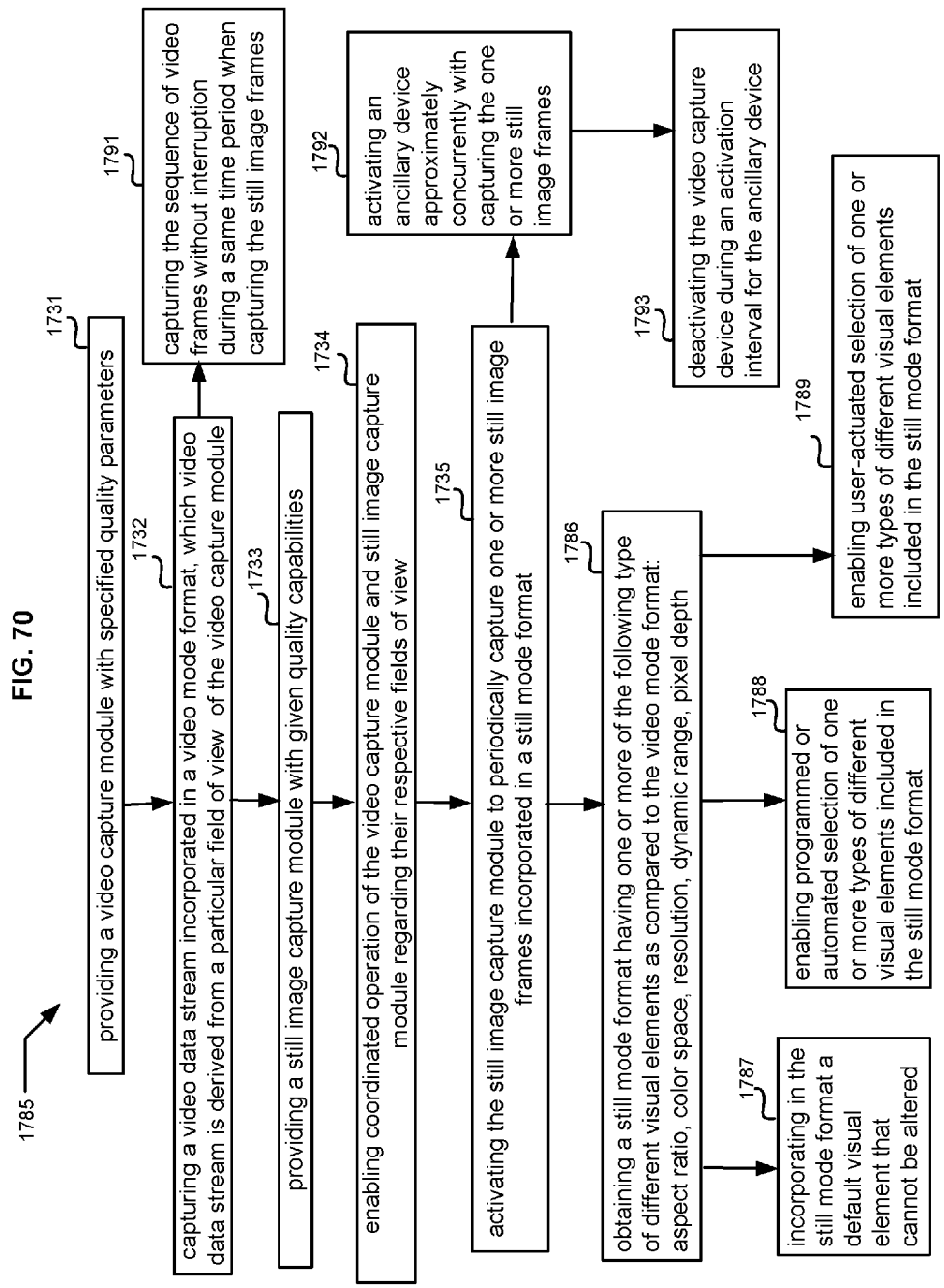

The various process embodiments 1785 illustrated in FIG. 70 include previously described features 1731, 1732, 1733, 1734, 1735 along with possible aspects pertaining to coordination between capturing the video data stream and capturing the still image frames. For example, a possible aspect may include capturing the sequence of video frames without interruption during a same time period when capturing the still image frames (block 1791). Other possible aspects may include activating an ancillary device approximately concurrently with capturing the one or more still image frames (block 1792), and deactivating the video capture device during an activation interval for the ancillary device (block 1793).

Additional implementation features may include obtaining a still mode format having one or more of the following type of different visual elements as compared to the video mode format: aspect ratio, color space, resolution, dynamic range, and pixel depth (block 1786). Another possible feature includes incorporating in the still mode format a default visual element that cannot be altered (block 1787).

Further possible features may include enabling programmed or automated selection of one or more types of different visual elements included in the still mode format (block 1788). Another possible feature may include enabling user-actuated selection of one or more types of different visual elements included in the still mode format (block 1789).

Figure 71:
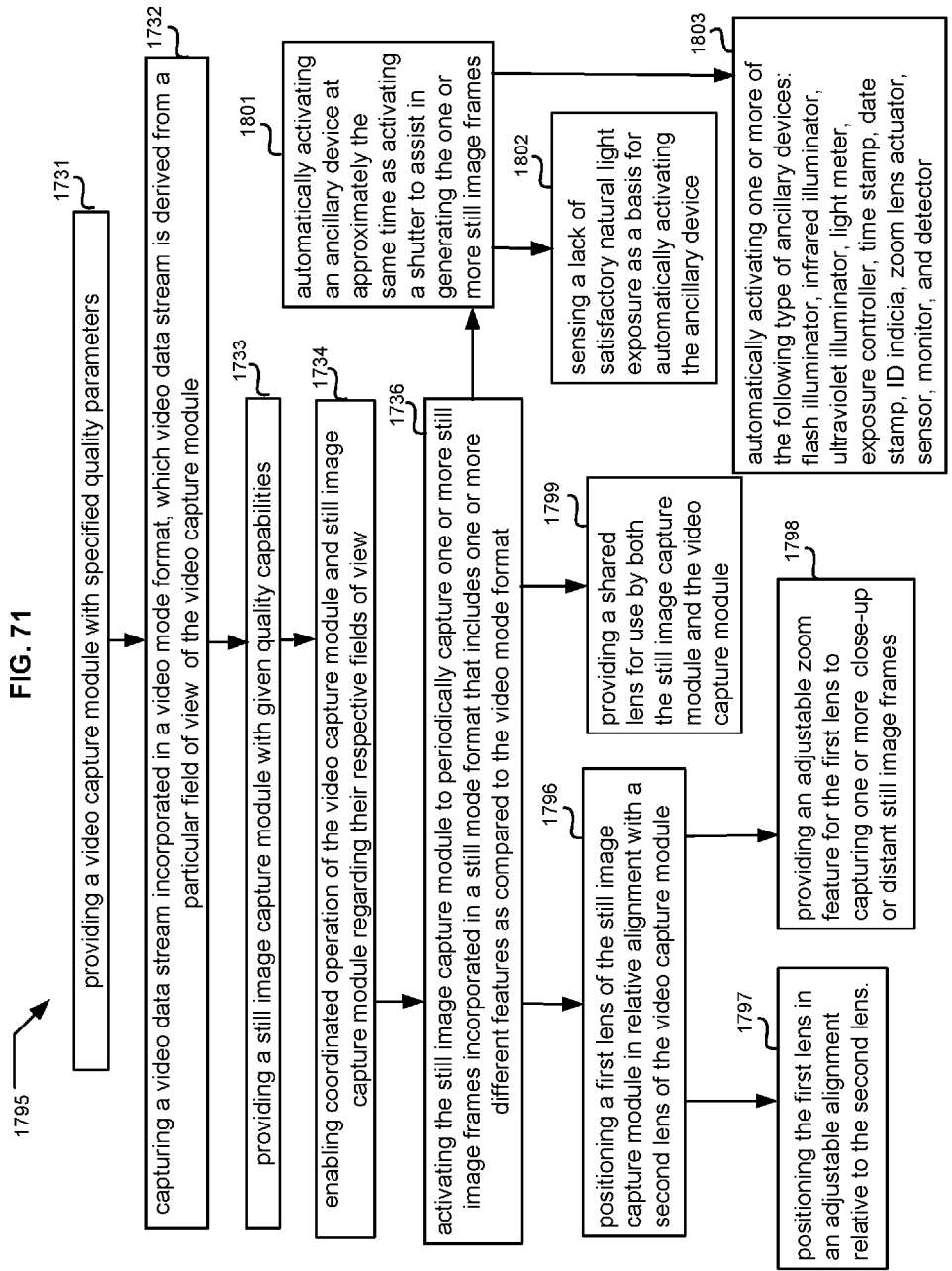

As shown in FIG. 71, exemplary process embodiments 1794 may include previously described features 1731, 1732, 1733, 1734, 1736 along with various possible aspects relating to capturing the video data stream or the still image frames. For example, a possible aspect may include positioning a first lens of the still image capture module in relative alignment with a second lens of the video capture module (block 1796).

Other possible aspects may include positioning the first lens in an adjustable alignment relative to the second lens (block 1797), and providing an adjustable zoom feature for the first lens to capturing one or more close-up or distant still image frames (block 1798). Yet another possible aspect may include providing a shared lens for use by both the still image capture module and the video capture module (block 1799).

Further possible features shown in FIG. 71 include automatically activating an ancillary device at approximately the same time as activating a shutter to assist in generating the one or more still image frames (block 1801), and sensing a lack of satisfactory natural light exposure as a basis for automatically activating the ancillary device (block 1802). An additional possible feature may include automatically activating one or more of the following type of ancillary devices: flash illuminator, infrared illuminator, ultraviolet illuminator, light meter, exposure controller, time stamp, date stamp, ID indicia, zoom lens actuator, sensor, monitor, and detector (block 1803).

Figure 72:
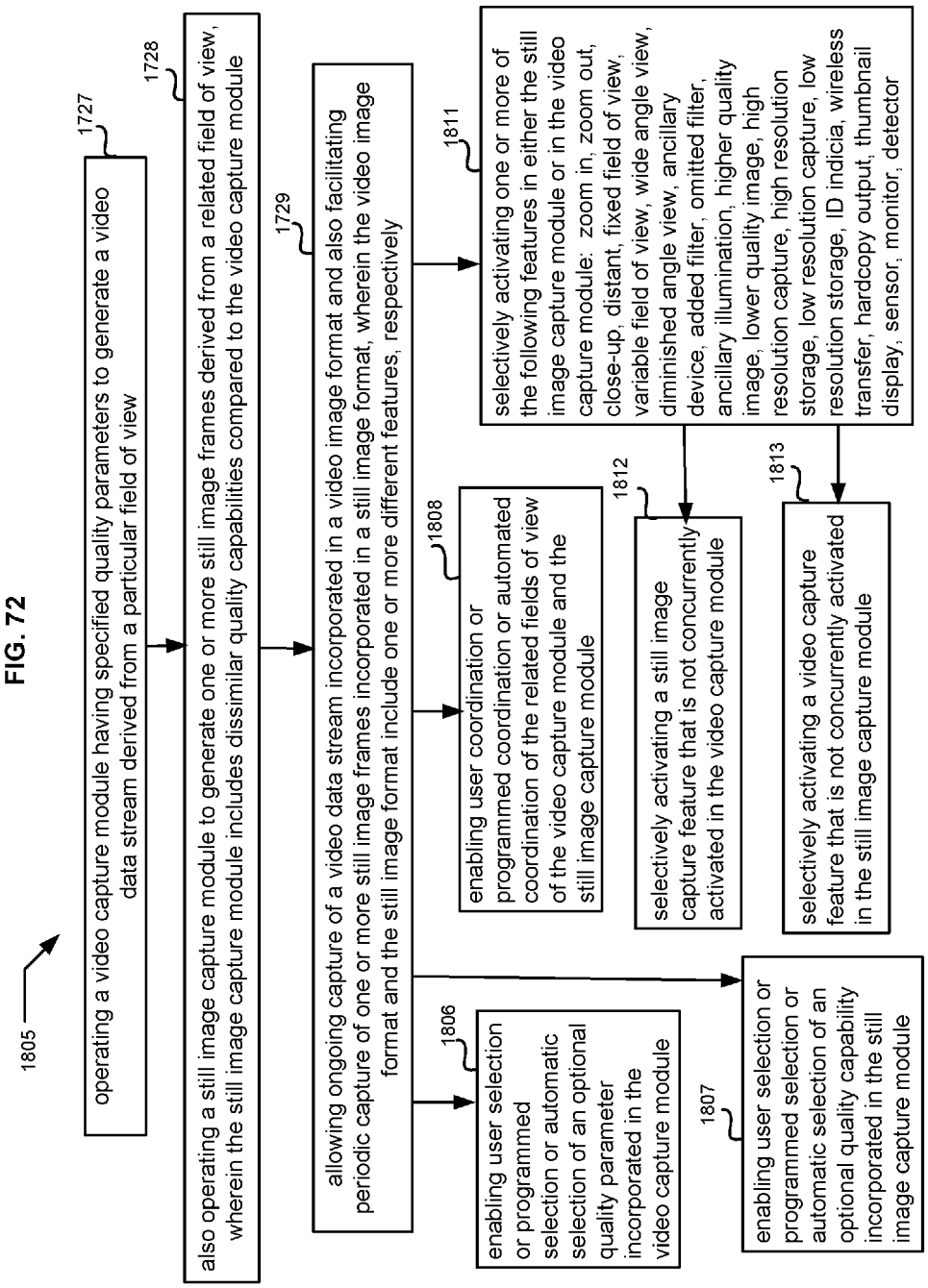

The various exemplary data capture embodiments 1805 of FIG. 72 include previously described process components 1727, 1728, 1729 in combination with other possible features including enabling user selection or programmed selection or automatic selection of an optional quality parameter incorporated in the video capture module (block 1806) and in the still image capture module (block 1807). Other possible implementation features may include enabling user coordination or programmed coordination or automated coordination of the related fields of view of the video capture module and the still image capture module (block 1808).

FIG. 72 illustrates additional possible aspects including selectively activating a still image capture feature that is not concurrently activated in the video capture module (block 1812), and selectively activating a video capture feature that is not concurrently activated in the still image module (block 1813).

Other possible aspects may include selectively activating one or more of the following features in either the still image capture module or in the video capture module: zoom in, zoom out, close-up, distant, fixed field of view, variable field of view, wide angle view, diminished angle view, ancillary device, added filter, omitted filter, ancillary illumination, higher quality image, lower quality image, high resolution capture, high resolution storage, low resolution capture, low resolution storage, ID indicia, wireless transfer, hardcopy output, thumbnail display, sensor, monitor, and detector (block 1811).

Figure 73:
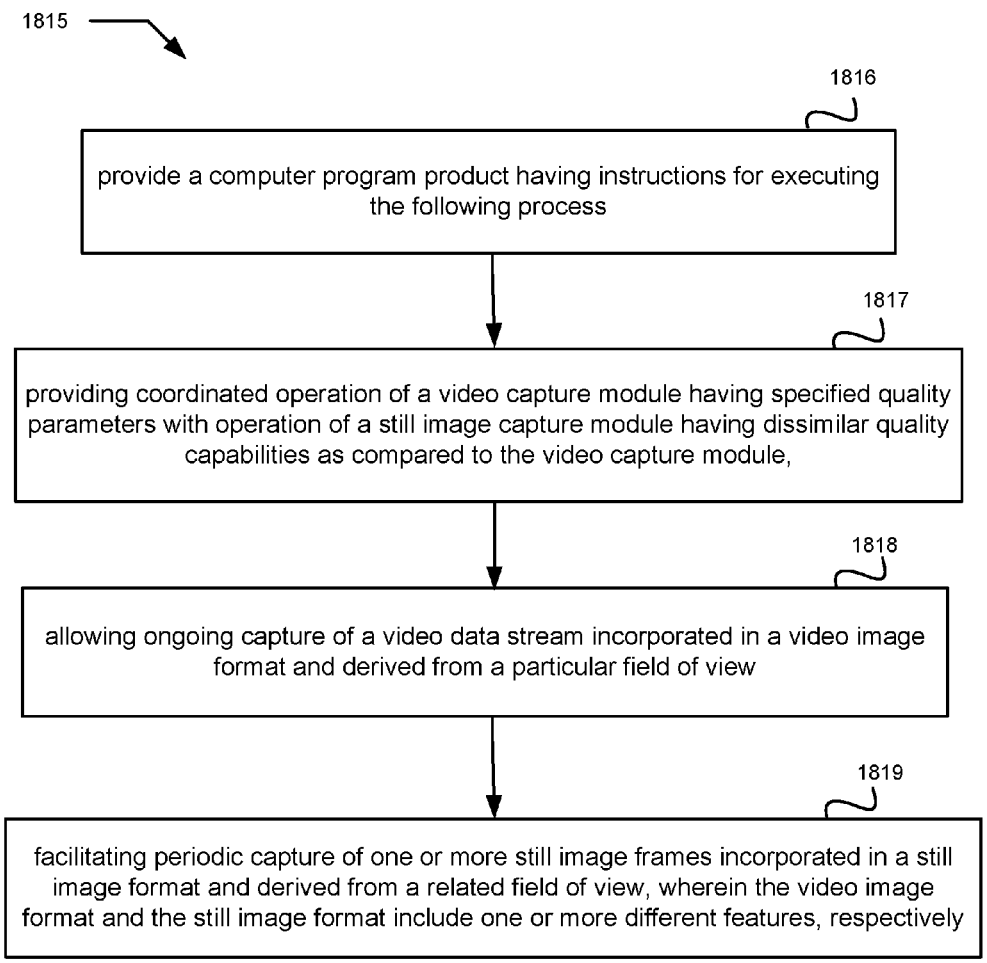
FIG. 73 illustrates another exemplary computer program product embodiment.

Referring to the exemplary embodiment 1815 of FIG. 73, a computer program product implementation may have instructions for executing a process that includes providing coordinated operation of a video capture module having specified quality parameters with operation of a still image capture module having dissimilar quality capabilities as compared to the video capture module (block 1817); allowing ongoing capture of a video data stream incorporated in a video image format and derived from a particular field of view (block 1818); and facilitating periodic capture of one or more still image frames incorporated in a still image format and derived from a related field of view, wherein the video image format and the still image format include one or more different features, respectively (block 1819).

It will be understood that various process aspects as disclosed herein may be incorporated as instructions in one or more computer programs. For example, such exemplary instructions may include implementation of one or more of the following dissimilar quality capabilities of the still image capture module: color balance, white balance, color space, depth of field, pixel capture resolution, pixel storage resolution, capture quality, storage quality, gray scale, ambient light sensor, infra-red illumination, flash illumination, aperture opening, focal point, filter, shutter speed, automated shutter, manual shutter, still frame frequency, preview display, post-capture display, high quality storage media, low quality storage media, removable storage media, programmed quality attribute, automated quality attribute, user-selected quality attribute, ownership right, transfer right, volatile memory, permanent memory, post-capture editing, and meta-data.

Additional exemplary instructions may include implementation of one or more of the following different features of the still image format: aspect ratio, color space, resolution, dynamic range, and pixel depth.

Figure 74:
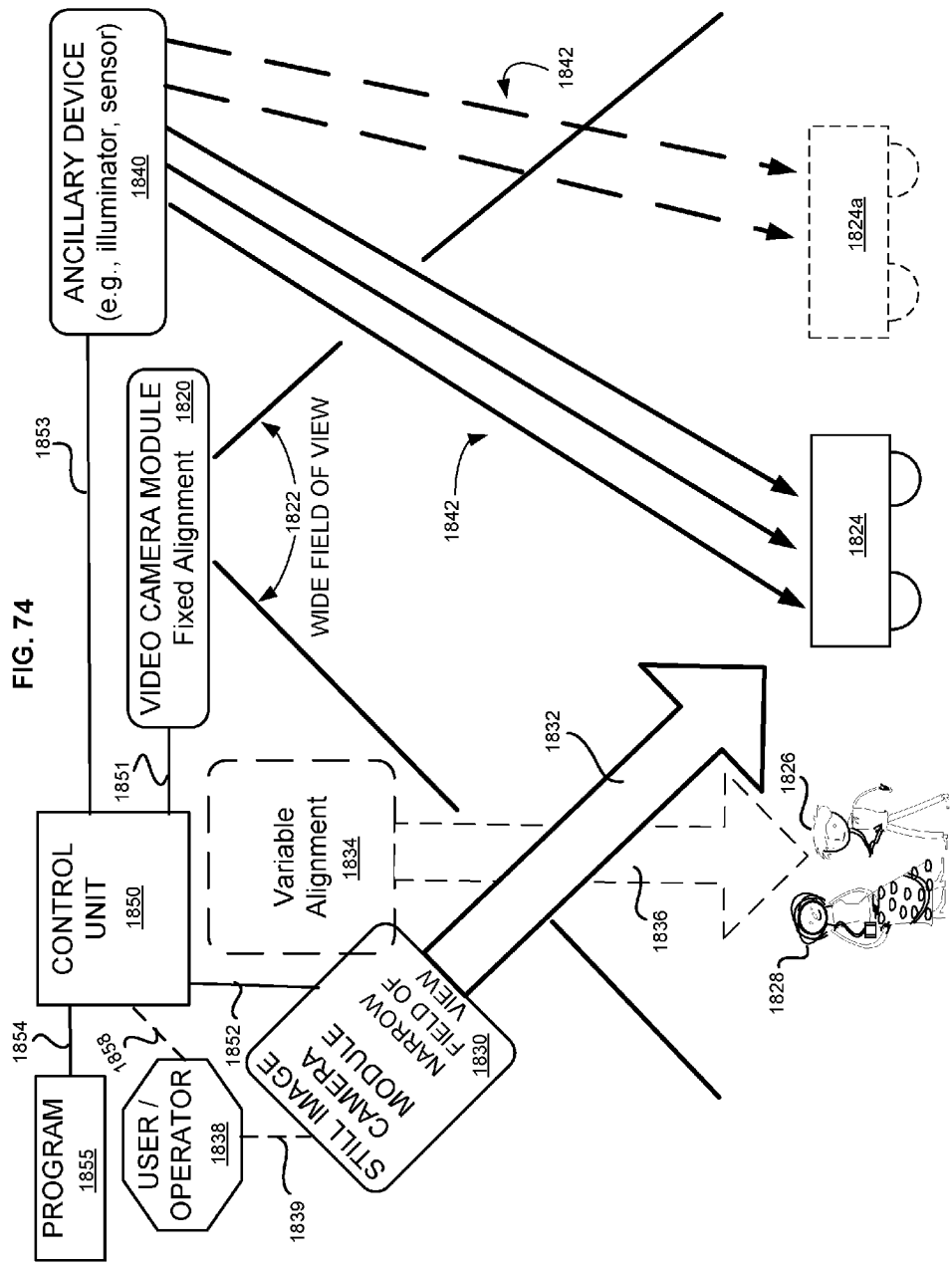
FIG. 74 shows a schematic diagram for an exemplary system embodiment incorporating video and still image modules.

Referring to the schematic diagram of FIG. 74, an exemplary data capture system embodiment may include a fixed alignment video camera module 1820 having a wide field of view 1822 that encompasses vehicle 1824 at different locations (see phantom position 1824*a*), and that also encompasses personages 1826, 1828 at varied locations. The system may further include an adjustable alignment still image camera module 1830 having a narrow field of view 1832 shown directed at vehicle 1824. An alignment change of still image camera module 1830 (see variable phantom alignment 1834) enables the still image camera module to have an adjusted field of view directed at personages 1826, 1828.

It will be understood that various possible control implementations may be used to coordinate operation of video camera module 1820 with operation of still image camera module 1830, and the illustrated implementation of FIG. 74 is by way of example only and is not intended to be limiting. A user/operator 1838 in some instances may have selective operational control 1839 of the still image camera module. In some instances selective operation control of the video camera module 1820 may be provided by user/operator 1838 or another user operator (not shown). Similar type of user selected operational control of ancillary device 1840 may also be provided.

The exemplary system embodiment of FIG. 74 may also include ancillary device 1840, control unit 1850 and program 1855. The control unit may be operably coupled to video camera module 1820 via 1851, and to still image camera module via 1852, and to ancillary device 1840 via 1853, and to program via 1854, and to user/operator 1838 via 1858. Accordingly it will be understood that automated or programmed control may be available for operation of video camera module 1820, still camera module 1830, and ancillary device 1840.

It will be understood that ancillary device 1840 may include various auxiliary features related to capturing the video data stream as well as capturing the still image frames. As shown schematically in FIG. 74, the ancillary device 1840 may in some exemplary implementations provide supplemental illumination (see directional arrows 1842) of vehicle 1824 to facilitate a desirable quality capture of individual still image frames as well as in some instances a desirable quality capture of a video data stream. In other exemplary implementations the ancillary device 1840 may be used to detect movement (see directional arrows 1842) of vehicle 1824 to a new location 1824*a*, which movement may have a possible causal effect on operation of the still image camera module 1830 as well as a possible causal effect on operation of the video camera module 1820. Such examples are by way of illustration and are not intended to be limiting.

Figure 75:
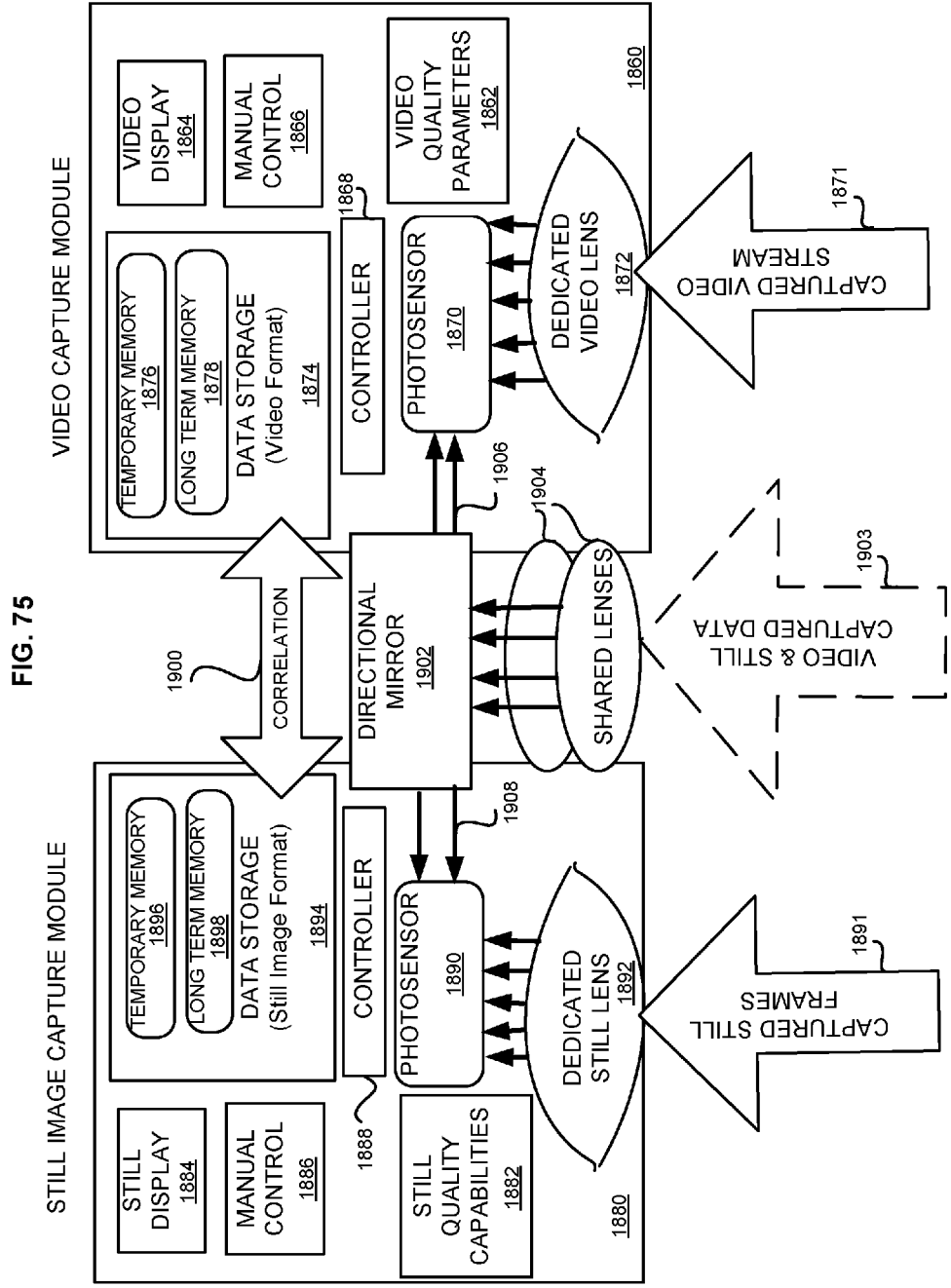
FIG. 75 is a schematic block diagram for an exemplary system for capturing both still image frames and video data streams.

Referring to the schematic block diagram of FIG. 75, another possible data capture system embodiment may include video capture module 1860 having specified video quality parameters 1862, video display 1864, manual control 1866, and controller 1868. A photosensor 1870 may be configured to receive a captured video stream 1871 through dedicated video lens 1872. In some implementations the video capture module may be configured to receive video data elements from a captured video/still data stream 1903 passing through shared lenses 1904 and directional mirror 1902 via communication link 1906 to photosensor 1870.

The captured video data stream may be incorporated in a particular video format that is saved by data storage media 1874 in temporary memory 1876 or long term memory 1878 for future availability and processing.

The exemplary data capture system embodiment of FIG. 75 may also include still image capture module 1880 having given quality capabilities 1882, still display 1884, manual control 1886, and controller 1888. A photosensor 1890 may be configured to receive captured still image frames 1891 through dedicated still lens 1892. In some implementations the still image capture module may be configured to receive still image data elements from a captured video/still data stream 1903 passing through shared lenses 1904 and directional mirror 1902 via communication link 1908 to photosensor 1890.

The captured still image frames may be incorporated in a particular still image format that is saved by data storage media 1894 in temporary memory 1896 or long term memory 1898 for future availability and processing.

It will be understood that in addition to coordination of the disclosed capturing techniques for generating video and still data from related fields of view, the various system and process components may also facilitate initial and ongoing correlation 1900 between captured versions (e.g., stored, edited, regenerated, combined, collated, etc.) of the video data stream and captured versions (e.g., stored, edited, regenerated, collated, etc.) of the still image frames.

It will be understood from the disclosures herein that an exemplary embodiments for implementing a dual mode data capture system may include various lens arrangements, including one or more shared lenses for capturing both the video data stream and the still image frames. Other embodiments may provide a first lens for capturing the video data stream and a second lens for capturing the still image frames.

Other system aspects that may be incorporated in a dual mode data capture system may include one or more given quality capabilities of the still image capture module that are different from the specified quality parameters of the video capture module.

Figure 76:
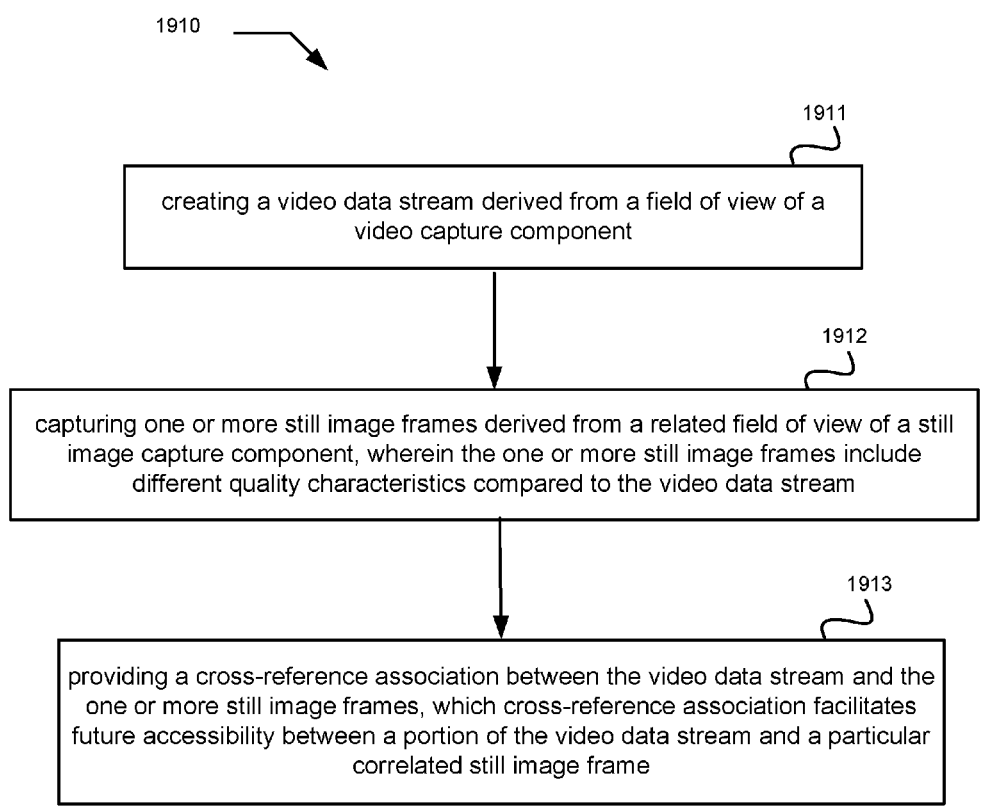
FIGS. 76-77 are high level flow charts showing further exemplary process embodiments.

The exemplary embodiment 1910 shown in the high level flow chart of FIG. 76 discloses a method of image capture correlation including creating a video data stream derived from a field of view of a video capture component (block 1911); capturing one or more still image frames derived from a related field of view of a still image capture component, wherein the one or more still image frames include different quality characteristics compared to the video data stream (block 1912); and providing a cross-reference association between the video data stream and the one or more still image frames, which cross-reference association facilitates future accessibility between a portion of the video data stream and a particular correlated still image frame (block 1913).

Figure 77:
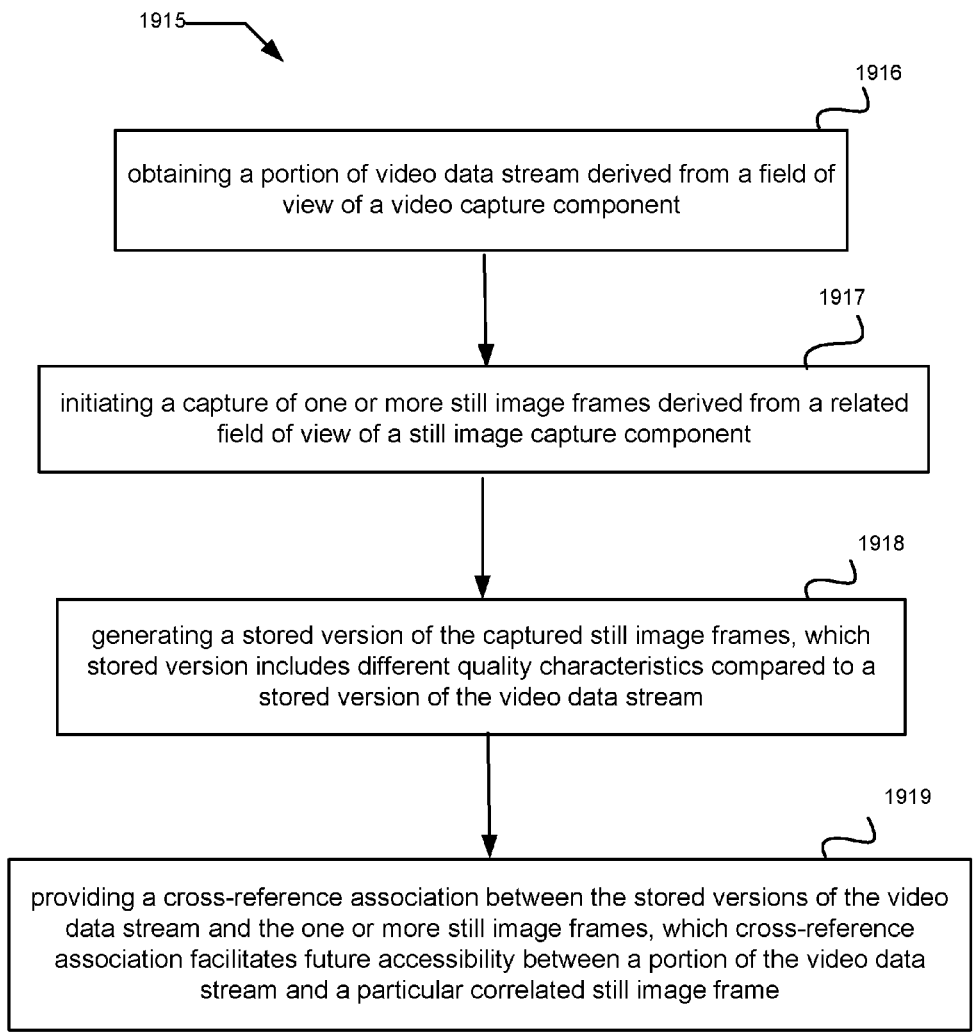

Another exemplary process embodiment 1915 illustrated in FIG. 77 discloses an image capture correlation method that includes obtaining a portion of video data stream derived from a field of view of a video capture component (block 1916); initiating a capture of one or more still image frames derived from a related field of view of a still image capture component (block 1917); generating a stored version of the captured still image frames, which stored version includes different quality characteristics compared to a stored version of the video data stream (block 1918); and providing a cross-reference association between the stored versions of the video data stream and the one or more still image frames, which cross-reference association facilitates future accessibility between a portion of the video data stream and a particular correlated still image frame (block 1919).

Figure 78:
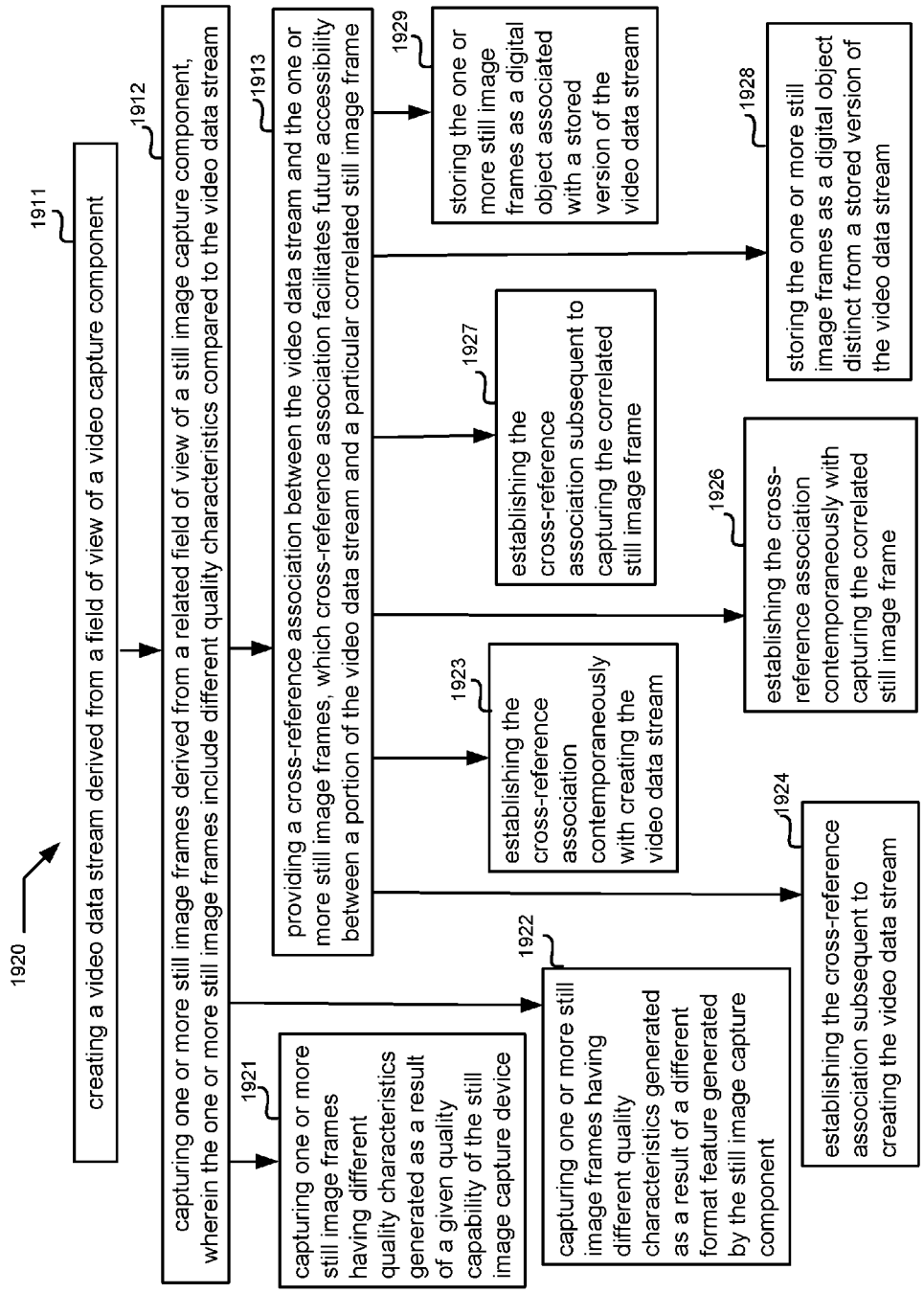
FIGS. 78-85 are detailed flow charts illustrating other exemplary embodiments.

Referring to the various exemplary embodiments 1920 of FIG. 78, previously described process components 1911, 1912, 1913 may be combined with other features relating to quality characteristics and cross-reference associations. For example, a possible aspect may include capturing one or more still image frames having different quality characteristics generated as a result of a given quality capability of the still image capture device (block 1921). Another possible aspect may include capturing one or more still image frames having different quality characteristics generated as a result of a different format feature generated by the still image capture component (block 1922).

Further possible features may include establishing the cross-reference association contemporaneously with creating the video data stream (block 1923), and in some instances subsequent to creating the video data stream (block 1924). Some implementation features may include establishing the cross-reference association contemporaneously with capturing the correlated still image frame (block 1926), and in other instances subsequent to capturing the correlated still image frame (block 1927).

Other possible process features may include storing the one or more still image frames as a digital object distinct from a stored version of the video data stream (block 1928), and storing the one or more still image frames as a digital object associated with a stored version of the video data stream (block 1929).

Figure 79:
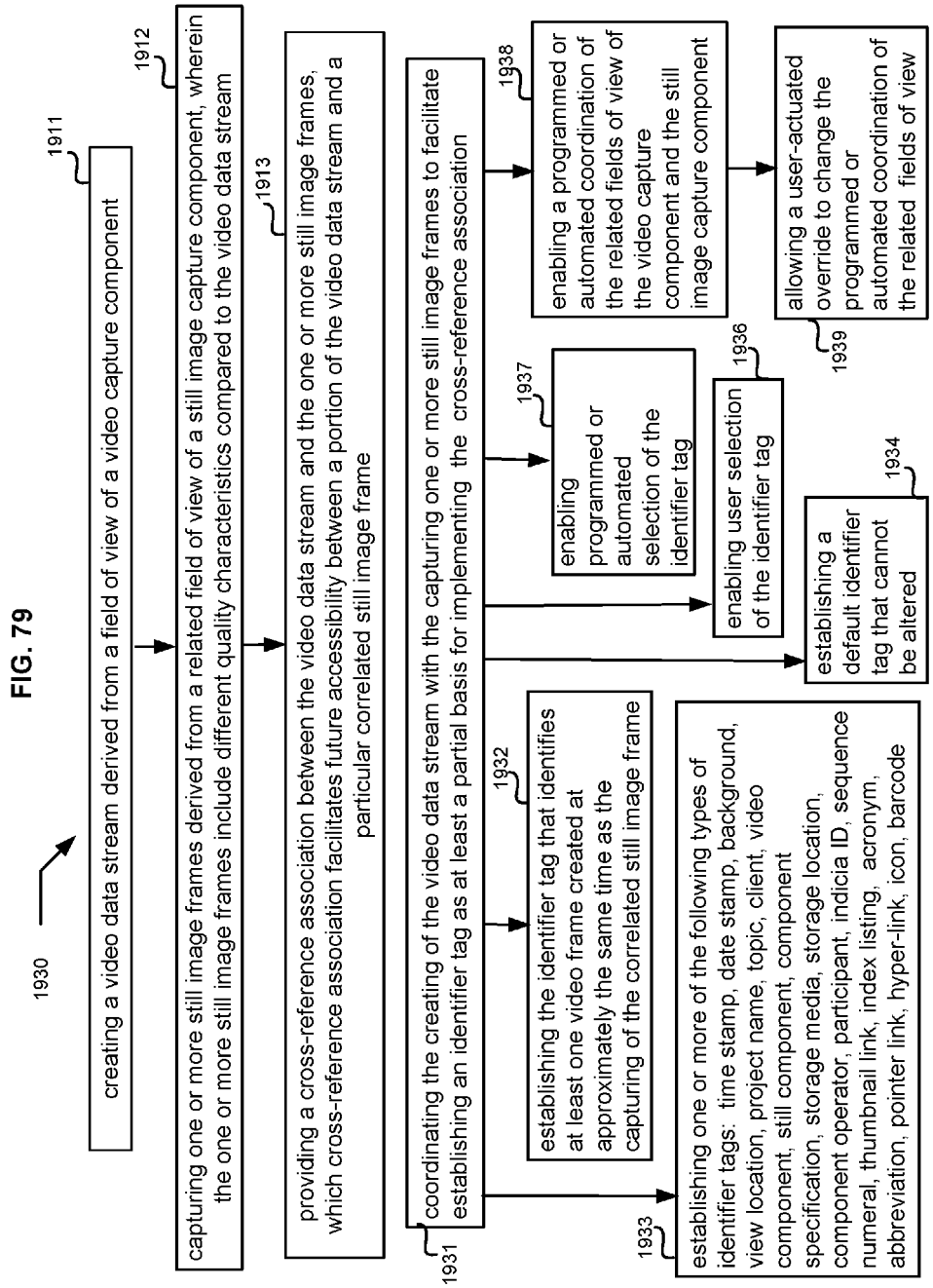

The additional exemplary embodiments 1930 shown in FIG. 79 may include previously described process components 1911, 1912, 1913 along with possible aspects relating to an identifier tag. For example, a possible aspect may include coordinating the creating of the video data stream with the capturing one or more still image frames to facilitate establishing an identifier tag as at least a partial basis for implementing the cross-reference association (block 1931). A further possible aspect may include establishing an identifier tag that identifies at least one video frame created at approximately the same time as the capturing of the correlated still image frame (block 1932).

Additional implementation features may include establishing one or more of the following types of identifier tags: time stamp, date stamp, background, view location, project name, topic, client, video component, still component, component specification, storage media, storage location, component operator, participant, indicia ID, sequence numeral, thumbnail link, index listing, acronym, abbreviation, pointer link, hyper-link, icon, and barcode (block 1933).

Further possible features shown in FIG. 79 include establishing a default identifier tag that cannot be altered (block 1934), enabling user selection of the identifier tag (block 1936), and enabling programmed or automated selection of the identifier tag (block 1937).

Other exemplary features may include enabling a programmed or automated coordination of the related fields of view of the video capture component and the still image capture component (block 1938), and allowing a user-actuated override to change the programmed or automated coordination of the related fields of view (block 1939).

Figure 80:
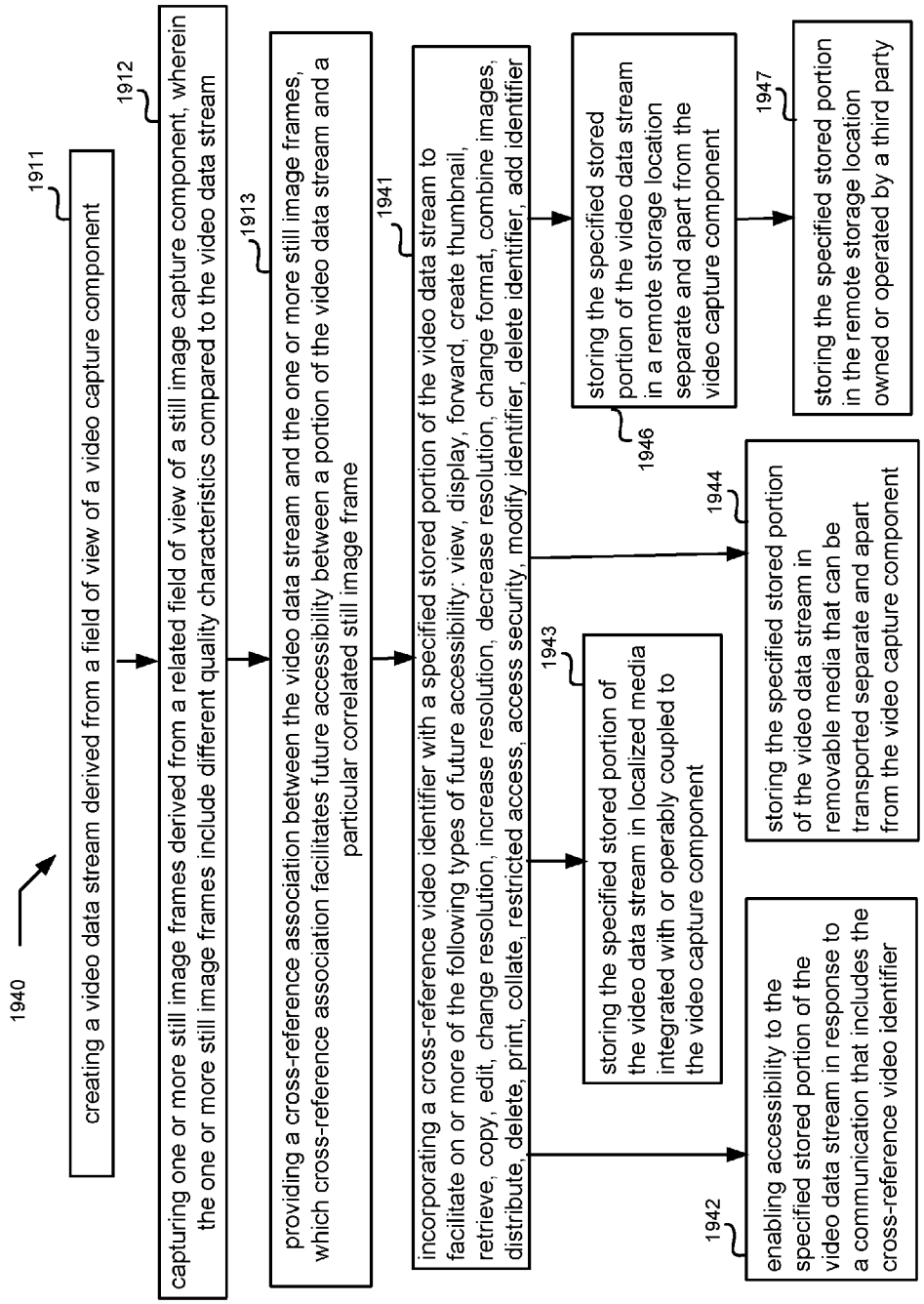

The various exemplary process embodiments 1940 of FIG. 80 may include previously described process features 1911, 1912, 1913 along with further possible accessibility aspects including incorporating a cross-reference video identifier with a specified stored portion of the video data stream to facilitate one or more of the following types of future accessibility: view, display, forward, create thumbnail, retrieve, copy, edit, change resolution, increase resolution, decrease resolution, change format, combine images, distribute, delete, print, collate, restricted access, access security, modify identifier, delete identifier, and add identifier (block 1941).

Additional possible aspects may include enabling accessibility to the specified stored portion of the video data stream in response to a communication that includes the cross-reference video identifier (block 1942), and storing the specified stored portion of the video data stream in localized media integrated with or operably coupled to the video capture component (block 1943). Another exemplary implementation feature may include storing the specified stored portion of the video data stream in removable media that can be transported separate and apart from the video capture component (block 1944).

Further possible features may include storing the specified stored portion of the video data stream in a remote storage location separate and apart from the video capture component (block 1946), and storing the specified stored portion in the remote storage location owned or operated by a third party (block 1947).

Figure 81:
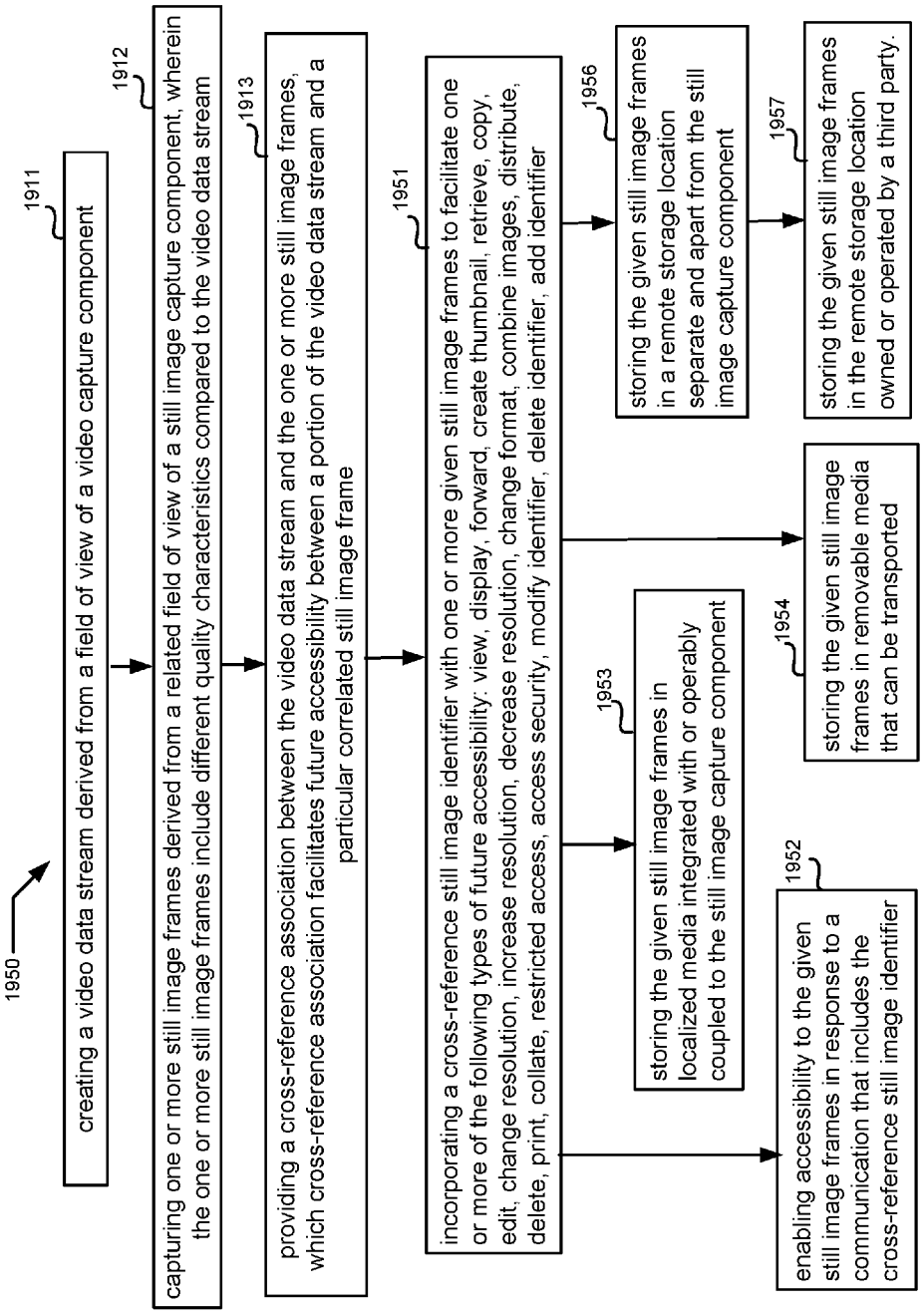

The embodiments 1950 shown in FIG. 81 include various possible implementation features relating to a still image identifier in combination with previously described process features 1911, 1912, 1913. Such exemplary implementation may include incorporating a cross-reference still image identifier with one or more given still image frames to facilitate one or more of the following types of future accessibility: view, display, forward, create thumbnail, retrieve, copy, edit, change resolution, increase resolution, decrease resolution, change format, combine images, distribute, delete, print, collate, restricted access, access security, modify identifier, delete identifier, and add identifier (block 1951).

Other storage accessibility aspects may include enabling accessibility to the given still image frames in response to a communication that includes the cross-reference still image identifier (block 1952), and storing the given still image frames in localized media integrated with or operably coupled to the still image capture component (block 1953). Another possible aspect may include storing the given still image frames in removable media that can be transported separate and apart from the still image capture component (block 1954).

Further possible implementation features may include storing the given still image frames in a remote storage location separate and apart from the still image capture component (block 1956), and storing the given still image frames in the remote storage location owned or operated by a third party (block 1957).

Figure 82:
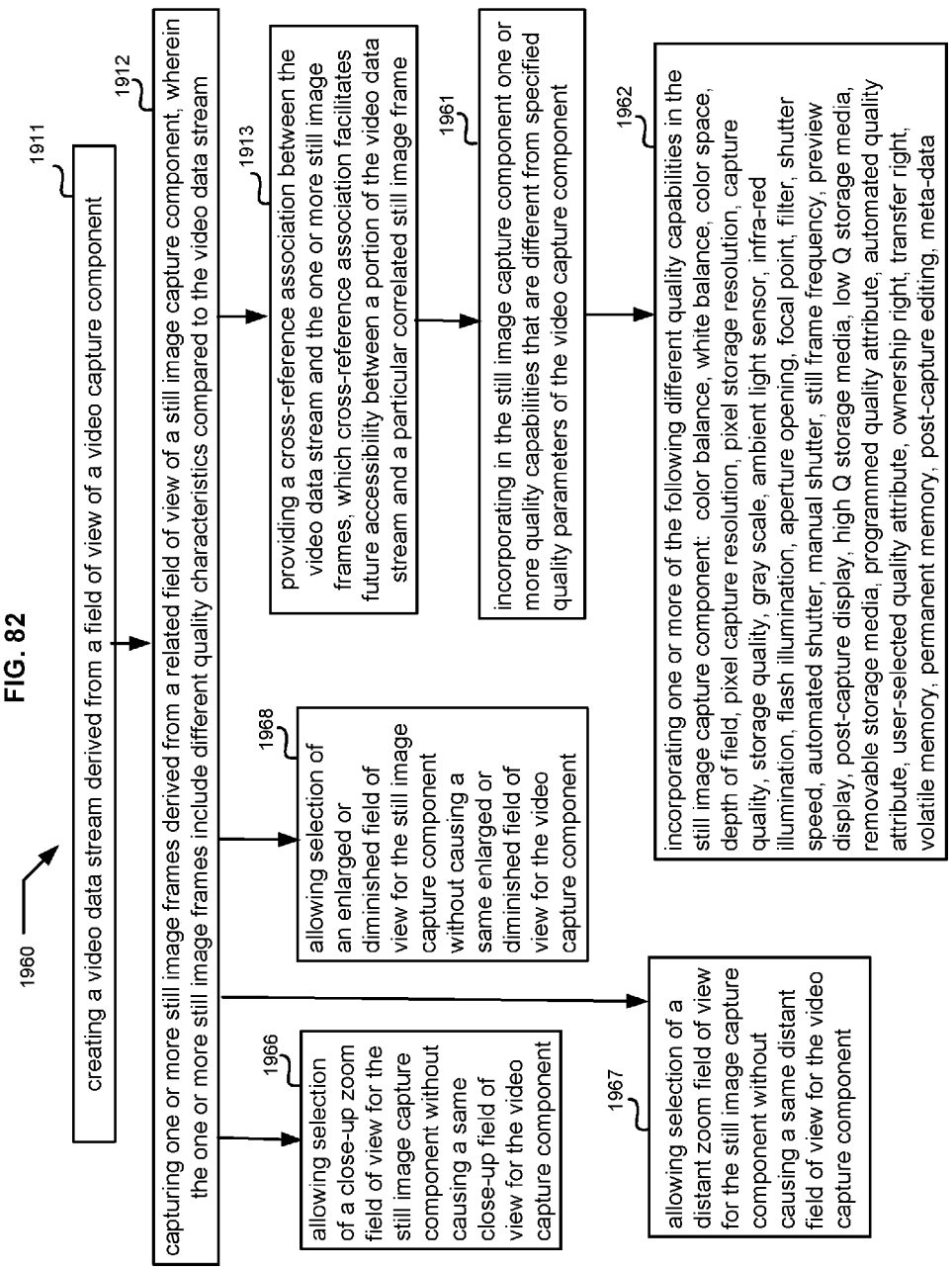

The exemplary embodiments 1960 of FIG. 82 may include previously described process components 1911, 1912, 1913 in combination with incorporating in the still image capture component one or more quality capabilities that are different from specified quality parameters of the video capture component (block 1961). A related aspect may include incorporating one or more of the following different quality capabilities in the still image capture component: color balance, white balance, color space, depth of field, pixel capture resolution, pixel storage resolution, capture quality, storage quality, gray scale, ambient light sensor, infra-red illumination, flash illumination, aperture opening, focal point, filter, shutter speed, automated shutter, manual shutter, still frame frequency, preview display, post-capture display, high Q storage media, low Q storage media, removable storage media, programmed quality attribute, automated quality attribute, user-selected quality attribute, ownership right, transfer right, volatile memory, permanent memory, post-capture editing, and meta-data (block 1962).

Further possible aspects may include allowing selection of a close-up zoom field of view for the still image capture component without causing a same close-up field of view for the video capture component (block 1966), allowing selection of a distant zoom field of view for the still image capture component without causing a same distant field of view for the video capture component (block 1967), and allowing selection of an enlarged or diminished field of view for the still image capture component without causing a same enlarged or diminished field of view for the video capture component (block 1968).

Figure 83:
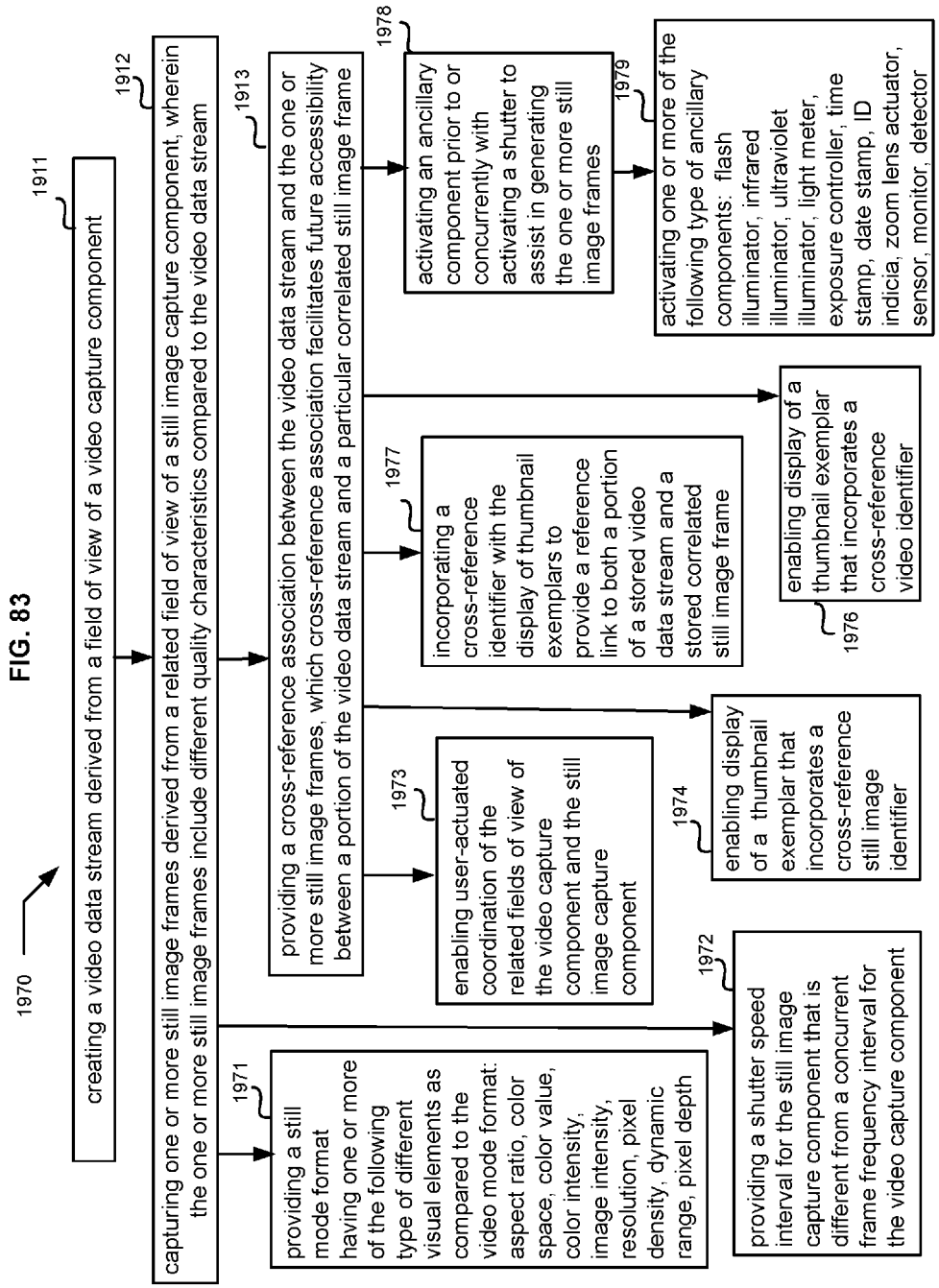

The detailed exemplary embodiments 1970 of FIG. 83 may include previously described process components 1911, 1912, 1913 along with other possible features such as providing a still mode format having one or more of the following type of different visual elements as compared to the video mode format: aspect ratio, color space, color value, color intensity, image intensity, resolution, pixel density, dynamic range, and pixel depth (block 1971).

Another possible aspect may include providing a shutter speed interval for the still image capture component that is different from a concurrent frame frequency interval for the video capture component (block 1972). A further exemplary aspect may include enabling user-actuated coordination of the related fields of view of the video capture component and the still image capture component (block 1973).

Additional exemplary features shown in FIG. 83 include enabling display of a thumbnail exemplar that incorporates a cross-reference still image identifier (block 1974), and enabling display of a thumbnail exemplar that incorporates a cross-reference video identifier (block 1976). A related possible feature may include incorporating a cross-reference identifier with the display of thumbnail exemplars to provide a reference link to both a portion of a stored video data stream and a stored correlated still image frame (block 1977).

Further aspects relating to an ancillary component may include activating an ancillary component prior to or concurrently with activating a shutter to assist in generating the one or more still image frames (block 1978). A related aspect may include activating one or more of the following type of ancillary components: flash illuminator, infrared illuminator, ultraviolet illuminator, light meter, exposure controller, time stamp, date stamp, ID indicia, zoom lens actuator, sensor, monitor, and detector (block 1979).

Figure 84:
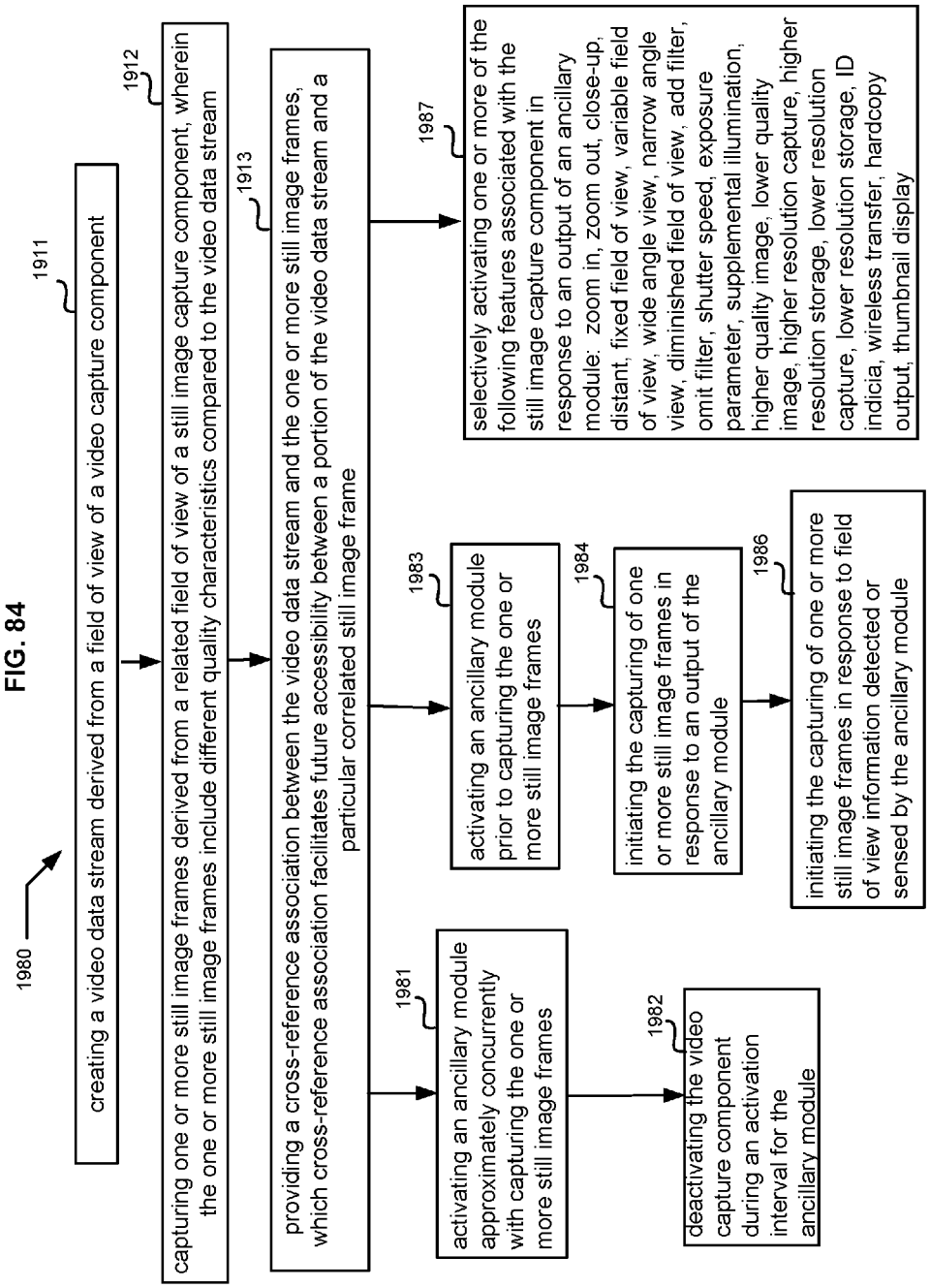

The detailed exemplary embodiments 1980 of FIG. 84 disclose other possibilities for implementing an image capture correlation method. Such possibilities may include previously described process components 1911, 1912, 1913 along with various aspects related to an ancillary module. For example, further exemplary aspects may include activating an ancillary module approximately concurrently with capturing the one or more still image frames (block 1981), and deactivating the video capture component during an activation interval for the ancillary module (block 1981).

Other possible features may include activating an ancillary module prior to capturing the one or more still image frames (block 1983), initiating the capturing of one or more still image frames in response to an output of the ancillary module (block 1984), and initiating the capturing of one or more still image frames in response to field of view information detected or sensed by the ancillary module (block 1986).

Yet another exemplary aspect may include selectively activating one or more of the following features associated with the still image capture component in response to an output of an ancillary module: zoom in, zoom out, close-up, distant, fixed field of view, variable field of view, wide angle view, narrow angle view, diminished field of view, add filter, omit filter, shutter speed, exposure parameter, supplemental illumination, higher quality image, lower quality image, higher resolution capture, higher resolution storage, lower resolution capture, lower resolution storage, ID indicia, wireless transfer, hardcopy output, and thumbnail display (block 1987).

Figure 85:
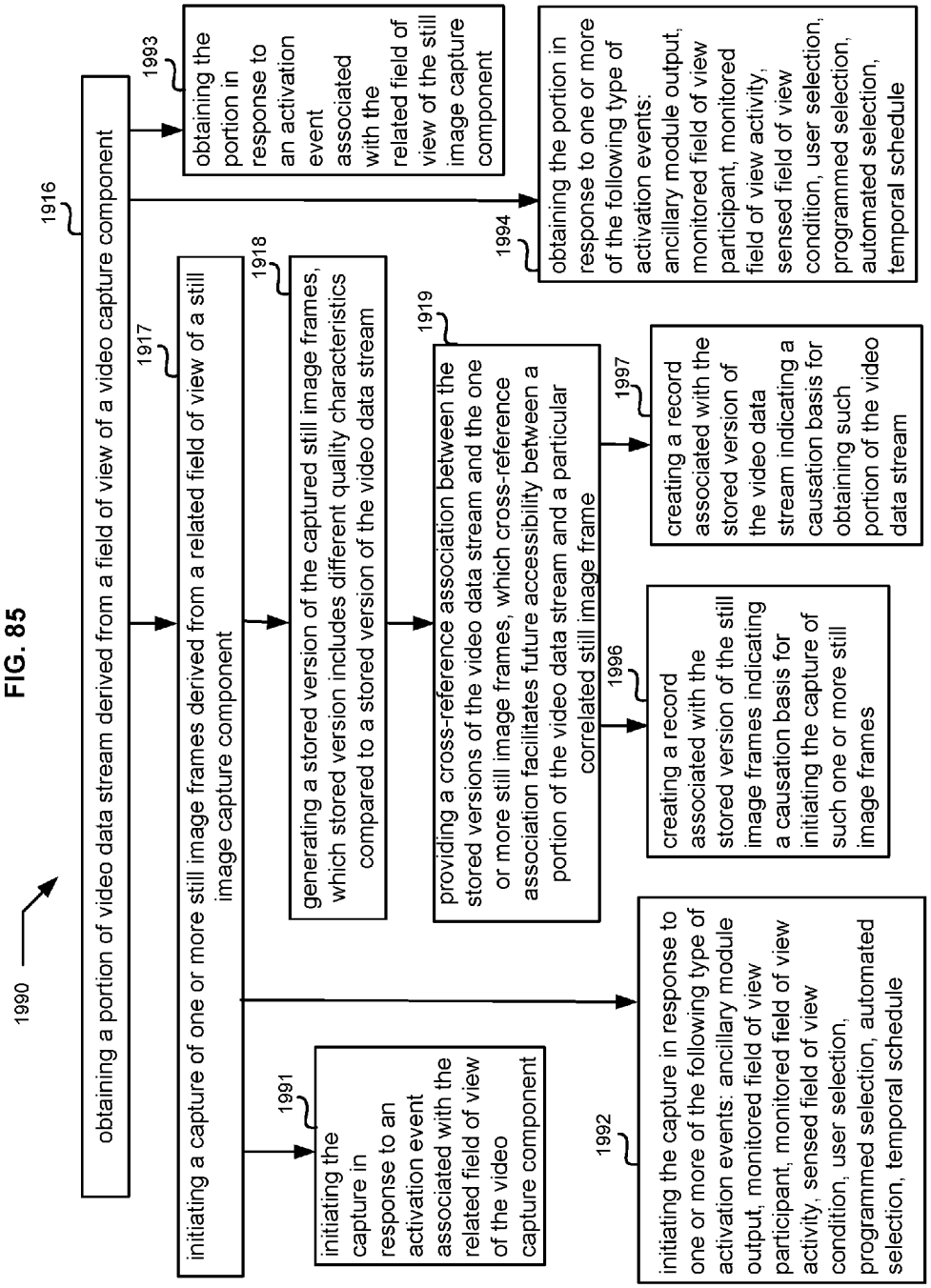

The exemplary embodiments 1990 of FIG. 85 may include previously described features 1916, 1917, 1918, 1919 as well as a possibility of initiating the capture of a still image frame in response to an activation event associated with the related field of view of the video capture component (block 1991). A further related aspect may include initiating such capture in response to one or more of the following type of activation events: ancillary module output, monitored field of view participant, monitored field of view activity, sensed field of view condition, user selection, programmed selection, automated selection, and temporal schedule (block 1992).

Further disclosed exemplary features may include obtaining a portion of the video data stream in response to an activation event associated with the related field of view of the still image capture component (block 1993), and obtaining a portion of the video data stream in response to one or more of the following type of activation events: ancillary module output, monitored field of view participant, monitored field of view activity, sensed field of view condition, user selection, programmed selection, automated selection, and temporal schedule (block 1994).

Other possible implementation features shown in FIG. 85 include creating a record associated with the stored version of the still image frames indicating a causation basis for initiating the capture of such still image frames (block 1996), and creating a record associated with the stored version of the video data stream indicating a causation basis for obtaining the video data stream portion (block 1997).

Figure 86:
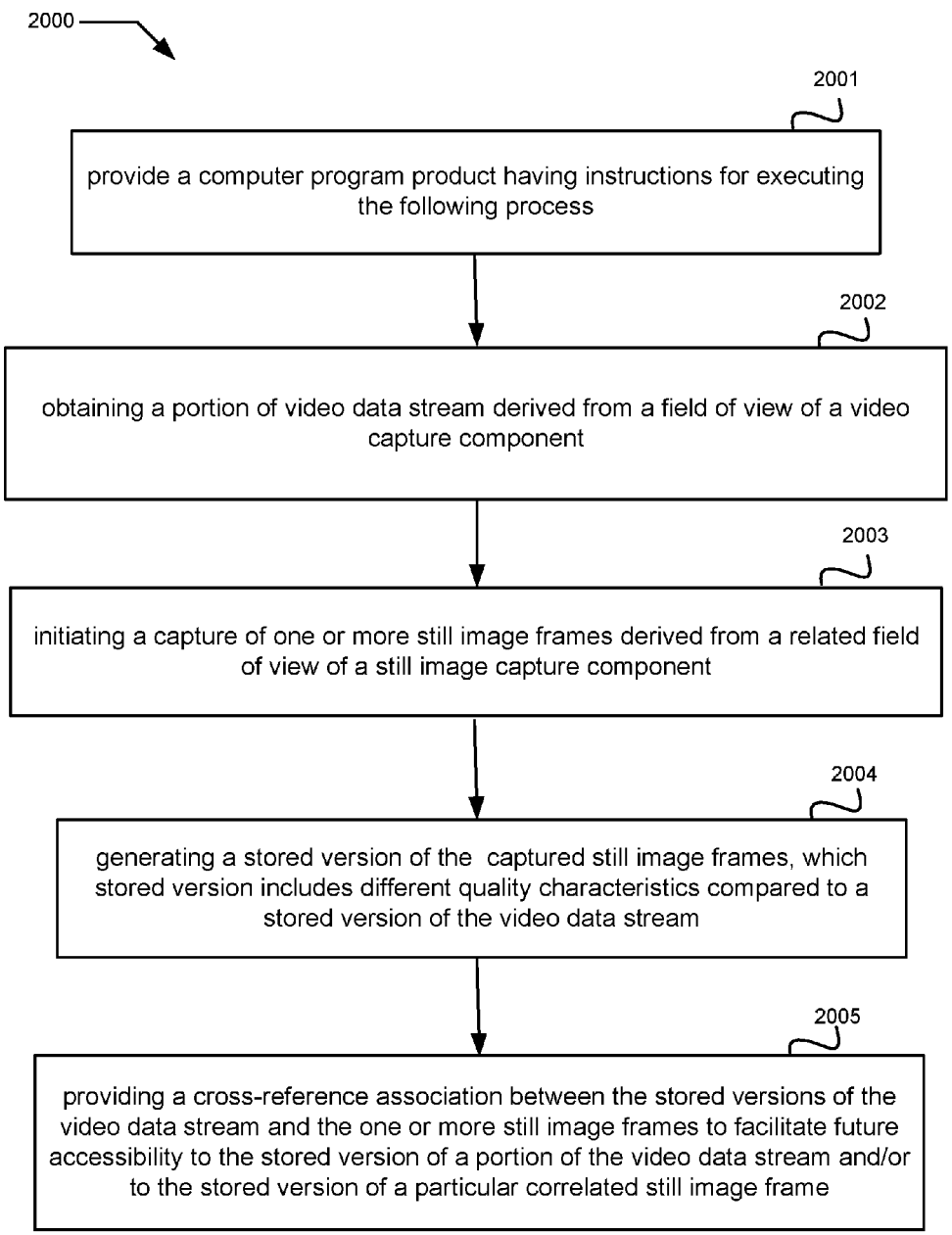
FIG. 86 illustrates a further exemplary computer program product embodiment.

An exemplary embodiment 2000 shown in FIG. 86 discloses a computer program product having instructions for executing a process (block 2001) that may include obtaining a portion of video data stream derived from a field of view of a video capture component (block 2002); initiating a capture of one or more still image frames derived from a related field of view of a still image capture component (block 2003); and generating a stored version of the captured still image frames, which stored version includes different quality characteristics compared to a stored version of the video data stream (block 2004).

A further possible process feature may include providing a cross-reference association between the stored versions of the video data stream and the one or more still image frames to facilitate future accessibility to the stored version of a portion of the video data stream and/or to the stored version of a particular correlated still image frame (block 2005).

It will be understood that various process features may be implemented in a computer program product. For example, process instructions may include enabling the cross-reference association to facilitate one or more of the following types of future accessibility to the stored versions of the video data stream and/or the one or more still image frames: view, display, forward, create thumbnail, retrieve, copy, edit, change resolution, increase resolution, decrease resolution, change format, combine images, distribute, delete, print, collate, restricted access, access security, modify cross-reference identifier, delete cross-reference identifier, and add cross-reference identifier.

Additional exemplary process instructions may include selectively activating a still image capture feature that is not concurrently activated in the video capture module. Further exemplary process instructions may include selectively activating a video capture feature that is not concurrently activated in the still image capture module.

Figure 87:
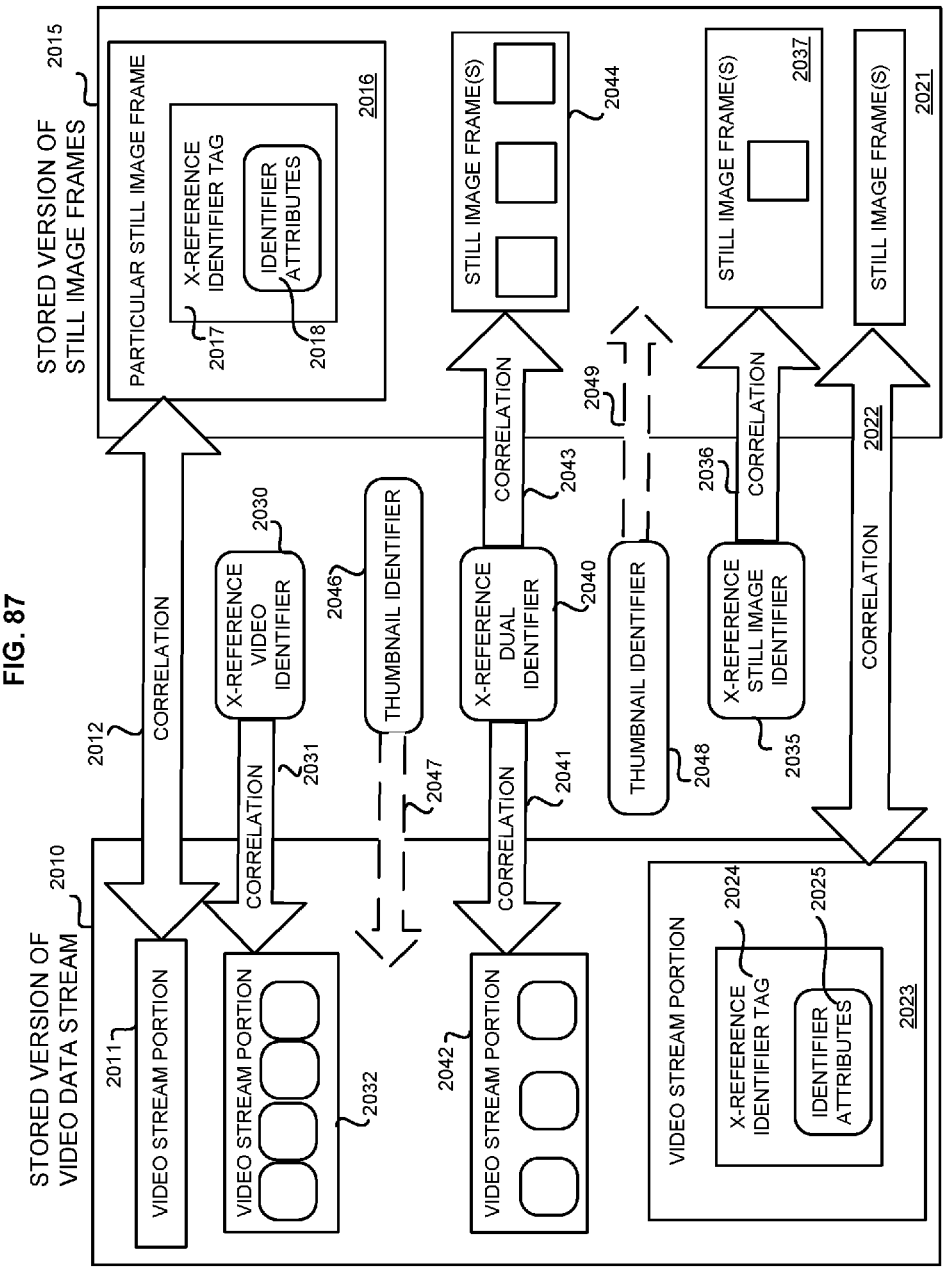
FIG. 87 is a schematic block diagram illustrating various exemplary embodiments for correlating captured video streams and still images.

Referring to the schematic block diagram of FIG. 87, an exemplary image capture system embodiment includes a stored version of video data stream 2010 and a stored version of still image frames 2015.

Various types of correlation features are illustrated in the embodiments shown in FIG. 87. For example, a bidirectional correlation 2012 may be provided between a stored video stream portion 2011 and a stored version of a particular still image frame 2016. This exemplary embodiment may provide a cross-reference (x-reference) identifier tag 2017 associated with the stored still image frame (or frames), which identifier tag may include one or more identifier attributes 2018. A similar or different identifier tag (not shown) may also be associated with the correlated video stream portion 2011.

In another example, a bidirectional correlation 2022 may be provided between a stored still image frame 2021 and a stored version of a video stream portion 2023. This exemplary embodiment includes a cross-reference (x-reference) identifier tag 2024 associated with the stored video stream portion (or individual video frame), which identifier tag may include one or more identifier attributes 2025. A similar or different identifier tag (not shown) may also be associated with the correlated still image frame 2021.

In a further example, a correlation 2031 may provide a cross-reference association (e.g., communication link, ID indicia, etc.) between a cross-reference video identifier 2030 and a stored video stream portion 2032 that is illustrated schematically as four sequential video frames.

In yet another example, a correlation 2036 may provide a cross-reference association between a cross-reference still image identifier 2035 and one or more stored image frames 2037 illustrated schematically as a single still frame.

In an additional example, a first correlation 2041 may provide a cross-reference association between a cross-reference dual identifier 2040 and a video stream portion 2042 illustrated schematically as three non-sequential video frames. In this instance a second correlation 2043 may provide a cross-reference association between the same cross-reference dual identifier 2040 and one or more still image frames 2044 illustrated schematically as three still frames. Of course such dual identifiers may also be incorporated in other exemplary embodiments.

Other possible exemplary embodiments may include a thumbnail identifier 2046 having a temporary correlation linkage (shown in phantom as 2047) with stored video data streams. The temporary correlation linkage 2047 may be capable of modification to provide correlation linkage to new or previously stored versions of captured video data streams. A further exemplary thumbnail identifier 2048 may also include different types of correlation linkages (shown in phantom as 2049) with stored still image frames. Of course such variable or temporary or changeable or updateable correlation features may be incorporated in other exemplary embodiments.

It will be understood that some x-reference identifiers may include a fixed default identifier (e.g., non-alterable) or may be subject to limited access (e.g., encoded, password protected, etc.) or may be accessible without restriction depending on the circumstances. The exemplary embodiments are disclosed for purposes of illustration only and are not intended to be limiting.

Various types of operational features disclosed herein may be implemented in an exemplary image capture system embodiment. For example, an exemplary system feature may include one or more ancillary components for helping to provide enhanced still images derived from a field of view for the still image capture module. Other possible system features may include one or more ancillary components for providing input information to the control means based on a monitored or sensed or detected event in a field of view of the video capture module or a related field of view of the still image capture module.

Further possible system features may include control means for implementing user coordination or programmed coordination or automated coordination of the related fields of view of the video capture module and the still image capture module.

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

The exemplary system, apparatus, and computer program product embodiments disclosed herein including FIGS. 1-4C and FIG. 10 and FIGS. 20A-23 and FIG. 30 and FIGS. 43-45 and FIGS. 53-55 and FIGS. 74-75 and FIG. 87 along with other components, devices, know-how, skill and techniques that are known in the art have the capability of implementing and practicing the methods and processes shown in FIGS. 5-9 and FIGS. 11-19 and FIGS. 24-29 and FIGS. 31-42 and FIGS. 46-52 and FIGS. 56-63 and FIGS. 64-73 and FIGS. 76-86. It is to be understood that the methods and processes can be incorporated in one or more different types of computer program products with a carrier medium having program instructions encoded thereon. However it is to be further understood by those skilled in the art that other systems, apparatus and technology may be used to implement and practice such methods and processes.

Those skilled in the art will also recognize that the various aspects of the embodiments for methods, processes, apparatus and systems as described herein can be implemented, individually and/or collectively, by a wide range of hardware, software, firmware, or any combination thereof.

It will be understood that variations may be incorporated in the methods, systems and program products disclosed herein for determining what data to transfer to the separate storage location, and what data to be retained by the capture device. Some predetermined guidelines or real-time decisions may be employed to determine how and whether to organize and reorganize the transferred data as well as how and whether to organize and reorganize the retained data. Possible factors may include rule guidelines, user input, context at the capture (e.g., transferring) device and/or at the separate storage location. Other types of factors may include space, bandwidth, device capabilities, accessibility of remote storage, cost task, preferences, etc.

It will be further understood that a possible return transfer (e.g., retrieval, etc.) from the separate storage location back to the capture device or other designated device (e.g., another device being used by an authorized user or other authorized third party) may depend on various factors such as freed-up or added device storage, bandwidth opportunities, tasks, context, etc.

Various computer program product embodiments and process components may include allowing accessibility to the selected captured data by an authorized party, as well as accessibility to the selected captured data by a designated device. Other possible features may include storage media or communication media for encoding process instructions.

It will be understood from the illustrative examples herein that a technique as disclosed herein processes captured data on a device, wherein selected captured data of a given quality resolution is transferred via a communication link to a separate storage location for future availability. A storage protocol may include different storage organization categories. A possible aspect includes an identifier record to enable future accessibility to selected captured data by one or more authorized parties or approved devices or authorized recipients. In some embodiments the captured data may include both a video data stream and one or more still image frames having different quality characteristics and/or formats. Initial and ongoing coordination as well as correlation may be facilitated between video and still image data derived from related fields of view.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost versus efficiency tradeoffs. Those having skill in the art will appreciate that there are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle may be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

As a further definition of "open" terms in the present specification and claims, it will be understood that usage of a language construction "A or B" is generally interpreted as a non-exclusive "open term" meaning: A alone, B alone, A and B together.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system, comprising:
   circuitry configured for acquiring on a server one or more captured images;
   circuitry configured for receiving an input indicative of a selection of a predetermined condition;
   circuitry configured for receiving an indication that at least one of the one or more captured images has been displayed, including at least circuitry configured for receiving an indication indicative of a user input from a touch screen display on a device to display the one or more images on the touch screen display of the device;
   circuitry configured for initiating at least one preselected time period based on the circuitry configured for receiving the indication that at least one of the one or more captured images has been displayed; and
   circuitry configured for deleting the one or more captured images upon occurrence of the predetermined condition, wherein the predetermined condition includes at least expiration of the preselected time period.

2. The system of claim 1, wherein circuitry configured for acquiring on a server one or more captured images comprises:
   circuitry configured for capturing one or more of a digital image or a video image via an image acquisition device.

3. The system of claim 1, wherein circuitry configured for acquiring on a server one or more captured images comprises:
   circuitry configured for receiving one or more of a digital image or a video image via a communication network.

4. The system of claim 1, wherein circuitry configured for initiating at least one preselected time period based on the circuitry configured for receiving the indication that at least one of the one or more captured images has been displayed comprises:
   circuitry configured for initiating at least one preselected time period based on an indication indicative of a user input signaling display of the one or more images.

5. The system of claim 1, wherein circuitry configured for initiating at least one preselected time period based on the circuitry configured for receiving the indication that at least one of the one or more captured images has been displayed comprises:
   circuitry configured for initiating at least one preselected time period based on an indication indicative that the one or more images have been displayed.

6. The system of claim 1, wherein circuitry configured for deleting the one or more captured images upon occurrence of the predetermined condition, wherein the predetermined condition includes at least expiration of the preselected time period comprises:
   circuitry for permanently deleting the one or more captured images from the server upon occurrence of the predetermined condition.

7. The system of claim 1, wherein circuitry configured for deleting the one or more captured images upon occurrence of the predetermined condition, wherein the predetermined condition includes at least expiration of the preselected time period comprises:

circuitry for permanently deleting the one or more captured images from a displaying device upon occurrence of the predetermined condition.

8. The system of claim 1, further comprising:
circuitry for enabling annotation of the one or more images.

9. The system of claim 8, wherein circuitry for enabling annotation of the one or more images comprises:
circuitry for enabling annotation of the one or more images following display of the one or more images.

10. The system of claim 8, wherein circuitry for enabling annotation of the one or more images comprises:
circuitry for enabling annotation of the one or more images prior to a transmission of the one or more images.

11. The system of claim 8, wherein circuitry for enabling annotation of the one or more images comprises:
circuitry for enabling annotation of the one or more images following display of the one or more images and prior to transmission of the one or more images.

12. The system of claim 8, wherein circuitry for enabling annotation of the one or more images comprises:
circuitry for enabling annotation of the one or more images with at least one of textual data, date information, or location information.

13. The system of claim 1, further comprising:
circuitry for storing the one or more images.

14. The system of claim 1, further comprising:
circuitry for storing a modified version of the one or more images.

15. The system of claim 1, further comprising:
circuitry for storing a decreased-resolution version of the one or more images.

16. The system of claim 15, wherein circuitry for storing a decreased-resolution version of the one or more images comprises:
circuitry for storing a version of the one or more images having at least one of an altered image intensity or an altered color value.

17. The system of claim 1, further comprising:
circuitry for storing a modified version of the one or more images based on a pre-determined condition.

18. The system of claim 1, further comprising:
circuitry for storing the one or more images in a local storage based on one or more retention policies that depend on a type of data captured in the one or more images.

19. A method, comprising:
acquiring on a server one or more captured images;
receiving an input indicative of a selection of a predetermined condition;
receiving an indication that at least one of the one or more captured images has been displayed, including at least receiving an indication indicative of a user input from a touch screen display on a device to display the one or more images on the touch screen display of the device;
initiating at least one preselected time period based on the receiving the indication that at least one of the one or more captured images has been displayed; and
deleting the one or more captured images upon occurrence of the predetermined condition, wherein the predetermined condition includes at least expiration of the preselected time period.

20. A system, comprising:
at least one processing device; and
one or more instructions which, when executed by the at least one processing device, configured the at least one processing device to perform one or more operations including at least:
acquiring on a server one or more captured images;
receiving an input indicative of a selection of a predetermined condition;
receiving an indication that at least one of the one or more captured images has been displayed, including at least receiving an indication indicative of a user input from a touch screen display on a device to display the one or more images on the touch screen display of the device;
initiating at least one preselected time period based on the receiving the indication that at least one of the one or more captured images has been displayed; and
deleting the one or more captured images upon occurrence of the predetermined condition, wherein the predetermined condition includes at least expiration of the preselected time period.

* * * * *